US012472492B2

(12) United States Patent
Wade

(10) Patent No.: US 12,472,492 B2
(45) Date of Patent: Nov. 18, 2025

(54) SYSTEMS AND METHODS OF SAMPLE DEPOSITING AND TESTING

(71) Applicant: ALVEO TECHNOLOGIES, INC., Alameda, CA (US)

(72) Inventor: Daniel J. Wade, San Ramon, CA (US)

(73) Assignee: ALVEO Technologies, Inc., Alameda, CA (US)

( * ) Notice: Subject to any disclaimer, the term of this patent is extended or adjusted under 35 U.S.C. 154(b) by 735 days.

(21) Appl. No.: 17/670,193

(22) Filed: Feb. 11, 2022

(65) Prior Publication Data

US 2022/0250054 A1 Aug. 11, 2022

Related U.S. Application Data

(63) Continuation-in-part of application No. PCT/US2021/045610, filed on Aug. 11, 2021, and a (Continued)

(51) Int. Cl.
*B01L 3/00* (2006.01)

(52) U.S. Cl.
CPC ....... *B01L 3/5023* (2013.01); *B01L 2200/026* (2013.01); *B01L 2200/16* (2013.01); (Continued)

(58) Field of Classification Search
CPC ............ B01L 3/5023; B01L 2200/026; B01L 2200/16; B01L 2300/046; (Continued)

(56) References Cited

U.S. PATENT DOCUMENTS 5,589,136 A 12/1996 Northrup et al.
6,403,367 B1 6/2002 Cheng et al.
(Continued)

FOREIGN PATENT DOCUMENTS

CN 101981445 2/2011
CN 102004126 4/2011
(Continued)

OTHER PUBLICATIONS

Extended European Search Report for Application No. EP 19899953.4, dated Sep. 9, 2022, in 9 pages.
(Continued)

*Primary Examiner* — Jennifer Wecker
*Assistant Examiner* — Britney N. Washington
(74) *Attorney, Agent, or Firm* — Knobbe, Martens, Olson & Bear, LLP

(57) ABSTRACT

The present application is generally directed to systems, methods, and devices for diagnostics for sensing and/or identifying pathogens, genomic materials, proteins, and/or other small molecules or biomarkers, for example, using loop-mediated isothermal amplification (LAMP). Some implementations include additional improvements, such as improvements to sample and reagent mixing, sample deposition, and compensation of inhibitors in the sample. Also disclosed herein are nucleic acid primers for use in the sensitive and specific detection of pathogens in biological samples by LAMP, which may be performed in the devices disclosed herein. The biological samples may be derived from patients including humans, plants, food, soil, contaminated surfaces, or animals such as livestock.

17 Claims, 84 Drawing Sheets

Specification includes a Sequence Listing.

Related U.S. Application Data continuation-in-part of application No. PCT/US2021/045600, filed on Aug. 11, 2021, and a continuation-in-part of application No. PCT/US2021/045608, filed on Aug. 11, 2021, and a continuation-in-part of application No. PCT/US2021/045596, filed on Aug. 11, 2021.

(60) Provisional application No. 63/066,059, filed on Aug. 14, 2020, provisional application No. 63/066,086, filed on Aug. 14, 2020, provisional application No. 63/066,047, filed on Aug. 14, 2020, provisional application No. 63/066,040, filed on Aug. 14, 2020.

(52) U.S. Cl.
CPC . *B01L 2300/046* (2013.01); *B01L 2300/0609* (2013.01); *B01L 2300/0645* (2013.01); *B01L 2300/123* (2013.01)

(58) Field of Classification Search
CPC ..... B01L 2300/0609; B01L 2300/0645; B01L 2300/123; B01L 3/502715; B01L 3/50273; B01L 2200/025; B01L 2200/0605; B01L 2200/10; B01L 2300/021; B01L 3/502707; B01L 3/502738; B01L 2200/027; B01L 7/52; B01L 2300/023; B01L 2300/042; B01L 2300/047; B01L 2300/049; B01L 2300/0681; B01L 2300/0816; B01L 2300/0838; B01L 2300/0864; B01L 2300/0867; B01L 2300/087; B01L 2300/1827; B01L 2400/0406; B01L 2400/043; B01L 2400/0481; B01L 2400/0487; B01L 2400/0655; B01L 3/5029; C12Q 1/6844
See application file for complete search history.

(56) References Cited

U.S. PATENT DOCUMENTS 6,524,532 B1 2/2003 Northrup
6,576,459 B2 6/2003 Miles et al.
6,602,473 B1 8/2003 Northrup
6,699,713 B2 3/2004 Benett et al.
6,875,602 B2 4/2005 Gutierrez
7,062,385 B2 6/2006 White et al.
7,135,294 B2 11/2006 Lee
7,157,050 B2 1/2007 Yazawa et al.
7,172,896 B2 2/2007 Cheng et al.
7,483,805 B2 1/2009 Sparks et al.
7,708,944 B1 5/2010 Sadik et al.
7,915,030 B2 3/2011 Inoue et al.
8,078,408 B2 12/2011 Albert et al.
8,106,428 B2 1/2012 Koh et al.
8,133,671 B2 3/2012 Williams et al.
8,173,077 B2 5/2012 Korampally et al.
8,202,495 B1 * 6/2012 Smith .................. B01L 3/0275 422/511
8,283,155 B2 10/2012 Holmes et al.
D672,042 S 12/2012 Delaey
8,329,453 B2 12/2012 Battrell et al.
8,354,074 B2 1/2013 Silverbrook et al.
8,370,070 B2 2/2013 Fernandez
8,383,064 B2 2/2013 Azimi et al.
8,414,844 B2 4/2013 Sadik et al.
8,431,389 B2 4/2013 Battrell et al.
8,431,390 B2 4/2013 Jovanovich et al.
8,480,980 B2 7/2013 Yoo
8,524,490 B2 9/2013 Lipscomb et al.
8,614,059 B2 12/2013 Young
8,716,007 B2 5/2014 Battrell et al.
8,841,076 B2 9/2014 Holmes et al.
8,865,075 B2 10/2014 Guzman
8,865,401 B2 10/2014 Young et al.
8,883,487 B2 11/2014 Collier et al.
8,951,472 B2 2/2015 Kellner et al.
8,956,858 B2 2/2015 Dineen et al.
9,029,168 B2 5/2015 McAlpine et al.
D742,524 S 11/2015 Yao et al.
D751,435 S 3/2016 Goldring
9,376,713 B2 6/2016 Bashir et al.
D771,660 S 11/2016 Zimmerman et al.
D773,067 S 11/2016 Wang et al.
D774,407 S 12/2016 Khattak et al.
9,921,182 B2 3/2018 Pennathur et al.
9,962,703 B2 * 5/2018 Khattak .............. G01N 33/581
10,196,678 B2 2/2019 Pennathur et al.
D871,422 S 12/2019 Vonnegut et al.
D882,800 S 4/2020 Lee
10,626,448 B2 4/2020 Pennathur et al.
11,465,141 B2 10/2022 Pierson et al.
11,473,128 B2 10/2022 Pennathur et al.
2002/0067174 A1 6/2002 McAllister
2004/0132059 A1 7/2004 Scurati et al.
2004/0166504 A1 8/2004 Rossier et al.
2004/0170530 A1 9/2004 Hefti
2005/0274612 A1 12/2005 Segawa
2006/0176179 A1 8/2006 Skorpik et al.
2006/0177842 A1 8/2006 Wangh
2007/0141605 A1 6/2007 Vann et al.
2007/0243634 A1 10/2007 Pamula et al.
2007/0298487 A1 12/2007 Bachur et al.
2008/0308846 A1 12/2008 Shim et al.
2009/0061450 A1 3/2009 Hunter
2010/0041056 A1 2/2010 Kinnon et al.
2010/0075311 A1 3/2010 Barrault et al.
2010/0075312 A1 3/2010 Davies et al.
2010/0105035 A1 4/2010 Hashsham et al.
2010/0193378 A1 8/2010 Bratov et al.
2010/0200400 A1 8/2010 Revol-Cavalier
2010/0216225 A1 8/2010 Dyer et al.
2010/0240044 A1 9/2010 Kumar et al.
2010/0243449 A1 9/2010 Oliver
2010/0261286 A1 10/2010 Kim et al.
2011/0039261 A1 2/2011 Hillebrand et al.
2011/0068015 A1 3/2011 Park
2011/0086352 A1 4/2011 Bashir et al.
2011/0091879 A1 4/2011 Hillebrand et al.
2011/0136104 A1 6/2011 Pregibon et al.
2011/0165572 A1 7/2011 O'Halloran
2011/0244467 A1 10/2011 Haswell
2011/0256551 A1 10/2011 Linder et al.
2011/0275162 A1 11/2011 Xie et al.
2011/0312073 A1 12/2011 Silverbrook et al.
2011/0312074 A1 12/2011 Azimi et al.
2011/0312610 A1 12/2011 Azimi et al.
2011/0312657 A1 12/2011 Azimi et al.
2011/0312683 A1 12/2011 Silverbrook et al.
2011/0312791 A1 12/2011 Silverbrook et al.
2011/0312826 A1 12/2011 Silverbrook et al.
2011/0312841 A1 12/2011 Silverbrook et al.
2011/0318728 A1 12/2011 Phan et al.
2012/0052562 A1 3/2012 Silverbrook et al.
2012/0053088 A1 3/2012 Azimi et al.
2012/0058547 A1 3/2012 Hsing et al.
2012/0064523 A1 3/2012 Ecker et al.
2012/0129709 A1 5/2012 Zhang
2012/0150004 A1 6/2012 Currie et al.
2012/0168306 A1 7/2012 Hassibi et al.
2012/0183965 A1 7/2012 Ward et al.
2012/0196354 A1 8/2012 Nakagawa
2012/0329144 A1 12/2012 Kwak
2013/0011912 A1 1/2013 Battrell et al.
2013/0029333 A1 1/2013 Son et al.
2013/0079254 A1 3/2013 Azimi et al.
2013/0085680 A1 4/2013 Arlen et al.
2013/0101990 A1 4/2013 Handique et al.
2013/0109021 A1 5/2013 Hwang
2013/0109022 A1 5/2013 Hwang
2013/0115685 A1 5/2013 Holmes et al.

(56) References Cited

U.S. PATENT DOCUMENTS

| | | | | |
|---|---|---|---|---|
| 2013/0130369 | A1 | 5/2013 | Wilson et al. | |
| 2013/0143775 | A1 | 6/2013 | Lee | |
| 2013/0154671 | A1 | 6/2013 | Lee | |
| 2013/0183750 | A1 | 7/2013 | Sadik et al. | |
| 2013/0244898 | A1 | 9/2013 | Burd et al. | |
| 2013/0252320 | A1 | 9/2013 | Burd et al. | |
| 2013/0267016 | A1 | 10/2013 | Niemz et al. | |
| 2013/0273528 | A1 | 10/2013 | Ehrenkranz | |
| 2013/0280725 | A1 | 10/2013 | Ismagilov et al. | |
| 2013/0309676 | A1 | 11/2013 | Layne | |
| 2013/0309679 | A1 | 11/2013 | Ismagilov et al. | |
| 2014/0050620 | A1 | 2/2014 | Johnson et al. | |
| 2014/0072962 | A1 | 3/2014 | Kelley et al. | |
| 2014/0099636 | A1 | 4/2014 | Lee | |
| 2014/0102915 | A1 | 4/2014 | Hu | |
| 2014/0170646 | A1 | 6/2014 | Kelley et al. | |
| 2014/0186935 | A1 | 7/2014 | Yoo | |
| 2014/0194305 | A1 | 7/2014 | Kayyem et al. | |
| 2014/0206562 | A1 | 7/2014 | McCormack et al. | |
| 2014/0287414 | A1 | 9/2014 | Chung et al. | |
| 2014/0329244 | A1 | 11/2014 | Ding et al. | |
| 2014/0335527 | A1 | 11/2014 | Goel | |
| 2014/0349298 | A1 | 11/2014 | Stanchina et al. | |
| 2014/0349381 | A1 | 11/2014 | Battrell et al. | |
| 2015/0041315 | A1 | 2/2015 | Jack | |
| 2015/0041317 | A1 | 2/2015 | Chan | |
| 2015/0041328 | A1 | 2/2015 | Chan | |
| 2015/0041336 | A1 | 2/2015 | Chan | |
| 2015/0044679 | A1 | 2/2015 | Jack | |
| 2015/0045254 | A1 | 2/2015 | Jack | |
| 2015/0064707 | A1 | 3/2015 | Collier | |
| 2015/0093304 | A1 | 4/2015 | Guzman | |
| 2015/0104792 | A1 | 4/2015 | Mazumdar et al. | |
| 2015/0111287 | A1 | 4/2015 | Rawle | |
| 2015/0141264 | A1 | 5/2015 | Jung et al. | |
| 2015/0141268 | A1 | 5/2015 | Rothberg et al. | |
| 2015/0330927 | A1 | 11/2015 | Lee et al. | |
| 2016/0097739 | A1 | 4/2016 | Pennathur | |
| 2016/0097740 | A1 | 4/2016 | Pennathur | |
| 2016/0097741 | A1 | 4/2016 | Pennathur | |
| 2016/0097742 | A1 | 4/2016 | Pennathur | |
| 2016/0129437 | A1* | 5/2016 | Kayyem | B01L 7/525 204/600 |
| 2016/0362748 | A1 | 12/2016 | Mongan et al. | |
| 2017/0039339 | A1 | 2/2017 | Bitran et al. | |
| 2017/0113221 | A1 | 4/2017 | Hoffman et al. | |
| 2018/0135117 | A1 | 5/2018 | Link | |
| 2018/0169658 | A1 | 6/2018 | Lei et al. | |
| 2019/0228247 | A1 | 7/2019 | Schueren et al. | |
| 2019/0232282 | A1 | 8/2019 | Pierson et al. | |
| 2020/0277660 | A1 | 9/2020 | Pennathur et al. | |
| 2022/0048031 | A1 | 2/2022 | Chiang et al. | |
| 2022/0056511 | A1 | 2/2022 | Gaiteri et al. | |
| 2022/0072539 | A1 | 3/2022 | Montgomery et al. | |
| 2022/0073975 | A1* | 3/2022 | Fang | G01N 27/02 |

FOREIGN PATENT DOCUMENTS

| | | |
|---|---|---|
| CN | 205538786 U | 8/2016 |
| EP | 2003446 | 12/2008 |
| GB | 6197905 | 4/2022 |
| GB | 6197906 | 4/2022 |
| GB | 6197907 | 4/2022 |
| JP | S59-139624 | 8/1984 |
| JP | H11-241977 | 9/1999 |
| JP | 2001-527220 | 12/2001 |
| JP | 2008-532005 | 8/2008 |
| JP | 2011-517769 | 6/2011 |
| JP | 2012-501627 | 1/2012 |
| JP | 2012-177599 | 9/2012 |
| JP | 2016-527510 | 9/2016 |
| KR | 10-2005-0024340 | 3/2005 |
| KR | 10-2009-0101764 | 9/2009 |
| TW | 2007-45551 | 12/2007 |
| TW | 2013-33188 | 8/2013 |
| WO | WO 1999/033559 | 7/1999 |
| WO | WO 2009/018642 | 2/2009 |
| WO | WO 2009/119971 | 10/2009 |
| WO | WO 2010/111605 | 9/2010 |
| WO | WO 2012/142192 | 10/2012 |
| WO | WO 2015/015175 | 2/2015 |
| WO | WO 2015/058008 | 4/2015 |
| WO | WO 2016/064635 | 4/2016 |
| WO | WO 2016/100335 | 6/2016 |
| WO | WO 2016/129894 | 8/2016 |
| WO | WO 2017/106790 | 6/2017 |
| WO | WO 2017/147486 | 8/2017 |
| WO | WO 2018/017884 | 1/2018 |
| WO | WO 2018/057647 | 3/2018 |
| WO | WO 2018/085151 | 5/2018 |
| WO | WO 2020/132008 | 6/2020 |

OTHER PUBLICATIONS

Partial European Search Report in Application No. 19900777.4, dated Oct. 21, 2022, in 16 pages.

Wang et al., "Two methods for increased specificity and sensitivity in loop-mediated isothermal amplification", Molecules, vol. 20(4):6048-6059, retrieved from internet https://www.ncbi.nlm.nih.gov/pmc/articles/PMC627222/pdf/molecules-20-06048.pdf (2015).

Xinxin et al., "Integrated biochip for label-free and real-time detection of DNA amplification by contactless impedance measurements based on interdigitated electrodes", Biosensors and Bioelectronics, vol. 44:241-247 (2013).

Abdelhalim et al., "Dielectric constant, electrical conductivity and relaxation time measurements of different gold nanoparticle sizes", International Journal of the Physical Sciences, 6 :5487-5491 (2011).

Andersen et al, "Surface-dependent chemical equilibrium constants and capacitances for bare and 3-10 cyanopropyldimethylchlorosilane coated silica nanochannels" J. Colloid Interface Sci. 353:301-310 (2011).

Angayarkanni et al., "Effect of nanoparticles aggregation on thermal and electrical conductivities of nanofluids", Journal of Nanofluids, 3: 17-25 (2014).

Arruebo et al., "Antibody-Conjugated Nanoparticles for Biomedical Applications", Journal of Nanomaterials 2009:Article ID 439389.

Backer et al., "Planar and 3D interdigitated electrodes for biosensing applications: The impact of a dielectric barrier on the sensor properties" Phys. Status Solidi A, 1-7 (2014).

Bhat, "Salinity (conductivity) sensor based on parallel plate capacitors" Thesis, 2005, Univ. South Florida.

Brito-Neto et al., "Understanding Capacitively Coupled Contactless Conductivity Detection in Capillary and Microchip Electrophoresis. Part 1. Fundamentals" Electroanalysis 2005, 17, No. 13.

Coltro et al., "Capacitively coupled contactless conductivity detection on microfluidic systems—ten years of development" Anal. Methods, 2012, 4, 25.

Coltro et al., "Microfluidic devices with integrated dual-capacitively coupled contactless conductivity detection to monitor binding events in real time" Sensors and Actuators B 192 (2014) 239-246.

"Conductivity Theory and Practice" Radiometer analytical SAS, 2004.

Credo et al., "Label-free electrical detection of pyrophosphate generated from DNA polymerase reactions on field-effect devices", Analyst 137:1351-1362 (2011).

Damen et al., "Characterization of the quantitative HCV NASBA assay", J. Virol. Methods, 82, 45-54 (1999).

Fang et al., "Integrated biochip for label-free and real-time detection of NDA amplification by contactless impedance measurements based on interdigitated electrodes", 2013, 44, 241-247.

Felhofer et al, "Recent developments in instrumentation for capillary electrophoresis and microchip-capillary electrophoresis", Eletrophoresis, 31(15): 2469-2486 (2010).

Fox et al., "Development and evaluation of nucleic acid sequence based amplification (NASBA) for diagnosis of enterovirus infections using the NucliSens Basic Kit", J. Clin. Virol., 24:117-130 (2002).

(56) References Cited

OTHER PUBLICATIONS

Ghaith, "Development of a reverse transcription loop-mediated isothermal amplification assay for rapid detection of foot-and-mouth disease virus", Master of Science Thesis, Aug. 2018.
Haldar, "Pyrophosphato-Complexes of Nickel and Cobalt in Solution" Nature 4226:744-745 (1950).
Hilland, "Simple sensor system for measuring the dielectric properties of saline solutions" Meas. Sci. Technol. 8 (1997) 901-910.
Hsieh et al, "Rapid, Sensitive and Quantitative Detection of Pathogenic DNA at the Point of Care via Microfluidic Electrochemical Quantitative Loop-Mediated Isothermal Amplification (MEQ-LAMP)" Angew Chem Intl Ed Engl 51(20):4896-4900 (2012).
Imai et al., "Rapid diagnosis of H5N1 avian influenza virus infection by newly developed influenza H5 hemagglutinin gene-specific loop mediated isothermal amplification method", J. Virol. Methods 141:173-180 (2007).
International Search Report for PCT/US2019/067134 dated Apr. 1, 2020, in 4 pages.
International Search Report for PCT/US2019/067077 dated Apr. 21, 2020, in 4 pages.
International Search Report for PCT/US2019/067082 dated May 11, 2020, in 5 pages.
International Search Report and Written Opinion for PCT/US2019/067080 dated Feb. 28, 2020, in 13 pages.
International Search Report and Written Opinion for PCT/US2021/45610 mailed on Feb. 4, 2022, in 19 pages.
International Search Report and Written Opinion for PCT/US2021/45608 mailed on Feb. 4, 2022, in 19 pages.
International Search Report and Written Opinion for PCT/US2021/45596, mailed on Nov. 15, 2021, in 14 pages.
International Search Report and Written Opinion for PCT/US2021/45600, mailed on Feb. 17, 2022, in 16 pages.
Jensen et al., "Hydronium-domination ion transport in carbon-dioxide-saturated electrolytes at low salt concentrations in nanochannels" Phys. Review E. 83:5 (2011), 056307.
Kim et al., "Chemosensors for pyrophosphate", Accounts of Chemical Research 42: 23-31 (2009).
Kuban et al., "A review of the recent achievements in capacitively coupled contactless conductivity detection" Analytica Chimica Acta 607 (2008) 15-29.
Kuban et al., "Contactless conductivity detection for analytical techniques: Developments from 2010 to 2012" Electrophoresis 2013, 34, 55-69.
Kuban et al., "Effects of the cell geometry and operating parameters on the performance of an external contactless conductivity detector for microchip electrophoresis" Lab Chip, 2005, 5, 407-415.
Lasia, "Electrochemical Impedance Spectroscopy and Its Applications", Modern Aspects of Electrochemistry, B. E. Conway, J. Bockris, and R.E. White, Edts., Kluwer Academic/Plenum Publishers, New York, 1999, vol. 32, p. 143-248.
Lee et al., "A fluorescent confirmation method for DNA amplification in PCR through a fluorescent pyrophosphate sensor", Bull. Korean Chem. Soc. 29: 497-498 (2007).
Lima et al., "Contactless conductivity biosensor in microchip containing folic acid as bioreceptor" Lab Chip, 2012, 12, 1963-1966.
Lima et al., "Highly sensitive contactless conductivity microchips based on concentric electrodes for flow analysis" Chem. Commun., 2013, 49, 11382.
Liu et al., "Fluorescence Turn on Chemosensors for Ag+ and Hg2+ based on tetraphenylethylene Motif Featuring Adenine and Thymine Moieties", Organic Letters 10(20):4581-4584 (2008).
Lu et al., "Plasmonic-based electrochemical impedance spectroscopy: application to molecular binding", Anal Chem. 84: 327-333 (2012).
Macdonald et al., "Fundamentals of impedance spectroscopy" Chapter1, Impedance Spectroscopy, Second Edition, edited by Evgenij Barsoukov and J. Ross Macdonald (2005).
Mahabadi et al., "Capacitively coupled contactless conductivity detection with dual top-bottom cell configuration for microchip electrophoresis". Electrophoresis 2010, 31, 1063-1070.
Maier et al, "An impedimetric sensor for real-time detection of antibiotic resistance genes employing rolling circle amplification", Int. J. Electrochem. Sci International Journal, 2015, 2026-2034.
Mori et al, "Detection of Loop-Mediated Isothermal Amplification Reaction by Turbidity Derived from Magnesium Pyrophosphate Formation" Biochemical and Biophysical Research Communications 289:150-154 (2001).
Mori et al, "Real-time turbidimetry of LAMP reaction for quantifying template Dna" J. Biochem Biphys Methods 59:145-157 (2004).
Morre et al., "Monitoring of chlamydia trachomatis infections after antibiotic treatment using rnA detection by nucleic acid sequence based amplification", J. Clin. Pathol.: Clin. Mol. Pathol. 51:149-154 (1998).
Murphy et al., "Multicenter comparison of Roche Cobas Amplicor Monitor Version 1.5, Organon Teknika NucliSens QT with Extractor, and Bayer Quantiplex Version 3.0 for Quantification of Human Immunodeficiency Virus Type 1 RNA in Plasma", J. Clin. Microbiol., 38: 4034-4041 (2000).
Nagamine et al, "Accelerated reaction by loop-mediated isothermal amplification using loop primers" Molecular and Cellular Probes 16:223-229 (2002).
Nakamura et al, "Detection of Six Single-Nucleotide Polymorphisms Associated with Rheumatoid Arthritis by a Loop-Mediated Isothermal Amplification Method and an Electrochemical DNA Chip" Anal Chem 79:9484-9493 (2007).
Notomi et al, "Loop-mediated isothermal amplification of DNA" Nucleic Acids Res 25(12): i-vii (2000).
Opekar et al., "Contactless Impedance Sensors and Their Application to Flow Measurements" Sensors 2013, 13, 2786-2801.
Parida et al., et al., "Development and evaluation of reverse transcription-loop-mediated isothermal amplification assay for rapid and real-time detection of Japanese encephalitis virus", J. Clin. Microbiol., 44:4172-4178 (2006).
Parida et al., "Rapid and real-time detection of chikungunya virus by reverse transcription loop-mediated isothermal amplification assay", J. Clin. Microbiol., 45: 351-357 (2007).
Parida et al., "Real-time reverse transcription loop-mediated isothermal amplification for rapid detection of West Nile Virus", J. Clin. Microbiol., 42: 257-263 (2004).
Parida et al., "Rapid detection and differentiation of dengue virus serotypes by a real-time reverse transcription-loop-mediated isothermal amplification assay", J. Clin. Microbiol., 43: 2895-2903 (2005).
Pennathur et al, "Low Temperature Fabrication and Surface Modification Methods for Fused Silica Micro- and Nanochannels," MRS Proceedings, 1659:15-26 (2014). doi:10.1557/opl.2014.32.
Phillips et al., "Strand displacement probes combined with isothermal nucleic acid amplification for instrument-free detection from complex samples", Anal. Chem. vol. 90(11):6580-6586 (Apr. 18, 2018).
Pourhassan-Moghaddam et al., "Protein detection through different platforms of immune-loop-mediated isothermal amplification", Nanoscale Research Letters, 8:485-496 (2013).
Pumera et al., "Contactless Conductivity Detector for Microchip Capillary Electrophoresis" Anal. Chem. 2002, 74, 1968-1971.
Pumera, "Contactless conductivity detection for microfluidics: Designs and applications" Talanta 74 (2007) 358-364.
Raistrick et al., "Theory" Chapter2, Impedance Spectroscopy, Second Edition, edited by Evgenij Barsoukov and J. Ross Macdonald (2005).
Ramos et al., "A Four-Terminal Water-Quality-Monitoring Conductivity Sensor". IEEE Transactions on Instrumentation and Measurement, vol. 57, No. 3, Mar. 2008.
Rana et al., "Comparison of Planar and 3-D Interdigitated Electrodes as Electrochemical Impedance Biosensors" Electroanalysis 2011, 23, No. 10, 2485-2490.
Rana et al., "Impedance spectra analysis to characterize interdigitated electrodes as electrochemical sensors" Electrochimica Acta 56 (2011) 8559-8563.
Rosenfeld et al, Lab on a Chip: 100-fold sample on paper-based microfluidic devices, Lab Chip http:pubs.rsc.org/en/content/articlelanding/2014/lc/c41c00734d (2014).

(56) References Cited

OTHER PUBLICATIONS

Schwartz et at, "Microfluidic Assay for Continuous Bacteria Detection Using Antimicrobial Peptides and Isotachophoresis" Anal Chem 86:10106-10113 (2014).
Simon et al., "Label-Free Detection Of DNA Amplification In Droplets Using Electrical Impedance" 15th International Conference on Miniaturized Systems for Chemistry and Life Sciences Oct. 2-6, 2011, Seattle, Washington, USA, pp. 1683-1685.
Tanyanyiwa et al., "High-Voltage Capacitively Coupled Contactless Conductivity Detection for Microchip Capillary Electrophoresis" Anal. Chem. 2002, 74, 6378-6382.
Thai et al, "Development and evaluation of a novel loop-mediated isothermal amplification method for rapid detection of severe acute respiratory syndrome coronavirus", J. Clin. Microbiol., 42:1956-1961 (2004).
Tomita et al, "Loop-mediated isothermal amplification (LAMP) of gene sequences and simple visual detection of products" Nature Protocols 3(5):877-822 (2008).
Tomsic et al., "Conductivity of Magnesium Sulfate in Water from 5 to 35 and from Infinite Dilution to Saturation" Journal of Solution Chemistry, vol. 31, No. 1, Jan. 2002.
Vincent et al., "Helicase-dependent isothermal DNA amplification", EMBO Rep., 5: 795-800 (2004).
Wang et al., "Microchip enzymatic assay of organophosphate nerve agents" Analytica Chimica Acta 505 (2004) 183-187.
Wang et al., "Recombinase Polymerase Amplification Assay—A Simple, Fast and Cost-Effective Alternative to Real Time PCR for Specific Detection of Feline Herpesvirus-1" PLOS ONE, Jan. 2017, pp. 1-8, vol. 12, No. 1.
Wang et al., "Towards disposable lab-on-a-chip: Poly(methylmethacrylate) microchip electrophoresis device with electrochemical detection", Electrophoresis vol. 23:596-601 (2002).
Xie et al, "Development of an electrochemical method for Ochratoxin A detection based on aptamer and loop-mediated isothermal amplification" Biosensors and Bioeletronics 55:324-329 (2014).
Yan et al., "Isothermal amplified detection of DNA and RNA", Mol. BioSyst., 10: 970-1003 (2014).
Zawrah et al., "Stability and electrical conductivity of water-base Al2O3 nanofluids for different amplifications", HBRC Journal 12:227-234 (2016).
Zhang et al., "Detection of human cytomegalovirus pp67 late gene transcripts in cerebrospinal fluid of human immunodeficiency virus type 1-infected patients by nucleic acid sequence-based amplification", J. Clin. Microbiol., 38: 1920-1925 (2000).
Zhang et al, "Quantitative determination of target gene with electrical sensor", Scientific Reports, 5(1):12539 (2015).
Zhang et al., "Monitoring the progression of loop-mediated isothermal amplification using conductivity", Analytical Biochemistry, vol. 466:16-18 (2014).

* cited by examiner

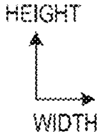
FIG. 4A
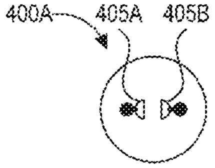
FIG. 4B
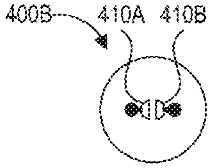
FIG. 4C
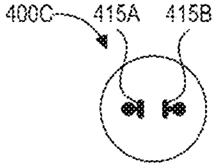
FIG. 4D
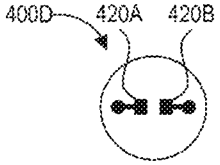
FIG. 4E
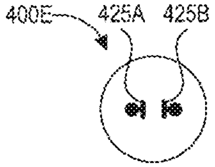
FIG. 4F
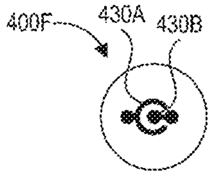
FIG. 4G
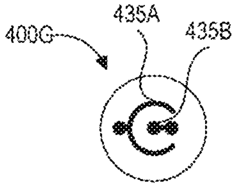

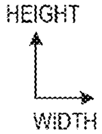
FIG. 4H
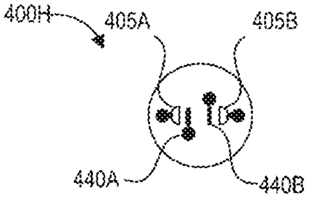
FIG. 4I
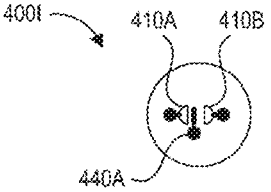
FIG. 4J
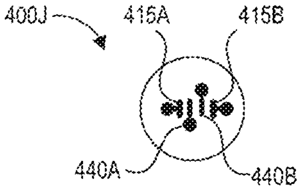
FIG. 4K
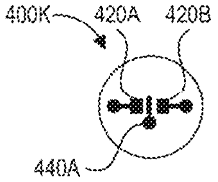
FIG. 4L
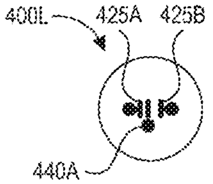
FIG. 4M
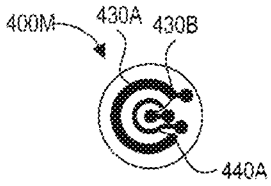
FIG. 4N
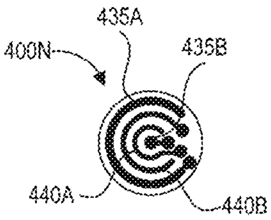

1520

1525

1530

1535

1550

1545

1540

| Primer Set | Primer Name | Primer Sequence | SEQ ID NO |
|---|---|---|---|
| Selected | SARS-CoV-2_Set 1_F3 | TTCACCGCTCTCACTCAAC | 1 |
| Selected | SARS-CoV-2_Set 1_FIP | GGACTGCTATTGGTGTTAGGCAAGGAAGACCTTAAATTCCCTC | 2 |
| Selected | SARS-CoV-2_Set 1_LF | ATTGGAACGCCTTGTCCTCGA | 3 |
| Selected | SARS-CoV-2_Set 1_BIP | ATGACCAAATTGGCTACTACCGTCACCACCACGAAT | 4 |
| Selected | SARS-CoV-2_Set 1_LB | ACCGAAGAGCTACCAGACGAATT | 5 |
| Selected | SARS-CoV-2_Set 1_B3 | CCATCTTGGACTGAGATCTTTCATTT | 6 |
| Alternate 1 | SARS-CoV-2_Set 2_F3 | TACGCAGAAGGGAGCAGAG | 7 |
| Alternate 1 | SARS-CoV-2_Set 2_FIP | TGCCTGGAGTTGAATTTCTCAAGCCTCTTCTCGTTCCT | 8 |
| Alternate 1 | SARS-CoV-2_Set 2_LF | TGAACTGTTGCGACTACGTGATGAGG | 9 |
| Alternate 1 | SARS-CoV-2_Set 2_BIP | AGGGGAACTTCTCCTGCTAAGCAAGAGCAGCATCACCG | 10 |
| Alternate 1 | SARS-CoV-2_Set 2_LB | AGAATGGCTGGCAATGGCGG | 11 |
| Alternate 1 | SARS-CoV-2_Set 2_B3 | ATCTGTCAAGCAGCAGCA | 12 |
| Alternate 2 | SARS-CoV-2_Set 3_F3 | TTGCAACTGAGGGAGCC | 13 |
| Alternate 2 | SARS-CoV-2_Set 3_FIP | TTGTTCCTTGAGGAAGTTGTTGGCACCCGCAATCCTGCT | 14 |
| Alternate 2 | SARS-CoV-2_Set 3_LF | AGCACGATTGCAGCATTGTTAGCA | 15 |
| Alternate 2 | SARS-CoV-2_Set 3_BIP | CATTGCCAAAAGGCTTCTACGAGAAGAGGCTTGACTGCCG | 16 |
| Alternate 2 | SARS-CoV-2_Set 3_LB | ACGCAGAAGGGAGCAGAGGC | 17 |
| Alternate 2 | SARS-CoV-2_Set 3_B3 | TTGCGACTACGTGATGAGGAGC | 18 |
| Alternate 3 | SARS-CoV-2_Set 4_F3 | ACATTGCGAAAAGGCTTCTACG | 19 |
| Alternate 3 | SARS-CoV-2_Set 4_FIP | GCGACTACGTGATGAGGATGAAGGGAGCAGAGGCGG | 20 |
| Alternate 3 | SARS-CoV-2_Set 4_LF | ACGAGAAGAGGCTTGACTGCCG | 21 |
| Alternate 3 | SARS-CoV-2_Set 4_BIP | TCAAGAAATTCAACTCCAGGCCGCCATTGCCAGCCATTCTAGC | 22 |
| Alternate 3 | SARS-CoV-2_Set 4_LB_1 | AGCAGTAGGGGAACTTCTCCTGC | 23 |
| Alternate 3 | SARS-CoV-2_Set 4_LB_2 | AGCAGTAAACGAACTTCTCCTGC | 24 |
| Alternate 3 | SARS-CoV-2_Set 4_B3 | AAAGCAAGAGCAGCATCAC | 25 |

FIG. 16A

| Primer Set | Primer Name | Primer Sequence | SEQ ID NO |
|---|---|---|---|
| Selected | HAV_Set 1_F3_1 | CAGTGTTAACTTGGCTTTCATGAAGCTTTT | 26 |
| Selected | HAV_Set 1_F3_2 | GGGACGCAGATGTTTGGGACG | 27 |
| Selected | HAV_Set 1_LF | GCCTAAGAGGTTTCACCCGTAGCC | 28 |
| Selected | HAV_Set 1_FIP | TATCCAAGGCATCTCTTCATAGAAGTATTTCTTCCACAAGGGGTAGGCT | 29 |
| Selected | HAV_Set 1_BIP | CGGTGGATATTGGTGAGTTTGGATGAGAGCCAGTCCTCCG | 30 |
| Selected | HAV_Set 1_LB | AAAACCATTCAACGCCGGA | 31 |
| Selected | HAV_Set 1_B3_1 | CCTGACAGTCAATCCACTCAATGCATCC | 32 |
| Selected | HAV_Set 1_B3_2 | CCTGACAGACAATCCACTTAATGCATC | 33 |
| Alternate 1 | HAV_Alt1_F3_1 | TAATTCCTGCAGGTTCAGGGTTCTTGAAT | 34 |
| Alternate 1 | HAV_Alt1_F3_2 | TTCACGCTCTCTGTCTGCT | 35 |
| Alternate 1 | HAV_Alt1_LF | GCGCAACGGCCAGAGCCTA | 36 |
| Alternate 1 | HAV_Alt1_FIP | CATGAAGTTGACCCCGCCGCTCTCCCCTTGCCCTAG | 37 |
| Alternate 1 | HAV_Alt1_BIP | GCTGTAGGAGTCTAAATTGGTCATGAGAGCCAAGTTAACACTGCAAG | 38 |
| Alternate 1 | HAV_Alt1_LB_1 | GGACGCAGATGTTTGGGACGTCACC | 39 |
| Alternate 1 | HAV_Alt1_LB_2 | ACACAGATGTTGGGAACGTCACCT | 40 |
| Alternate 1 | HAV_Alt1_B3_1 | CCTACCTCTTGTGGAAGATCAAGG | 41 |
| Alternate 1 | HAV_Alt1_B3_2 | GCCTACCTCTTGTGGAAGATCAAAG | 42 |
| Alternate 2 | HAV_Alt2_F3 | TTAGCATGGAGCTGTAGGAGTCTAAA | 43 |
| Alternate 2 | HAV_Alt2_LF | TCATGAGAGCCAAGTTAACACTGCAAGGT | 44 |
| Alternate 2 | HAV_Alt2_FIP | GCCTACCTCTTGTGGAAGATCATGGGGACACAGATGTTTGGGACG | 45 |
| Alternate 2 | HAV_Alt2_BIP | ACCTCTTAGGCTAATACTTCTATGAAGAGAACTCACCAATATCCGCCGC | 46 |
| Alternate 2 | HAV_Alt2_LB | TGCTTTGGATAGGGTAACAGCGG | 47 |
| Alternate 2 | HAV_Alt2_B3_1 | TCAATCCACTCAATGCATCCACTG | 48 |
| Alternate 2 | HAV_Alt2_B3_2 | CAATTCACTCAATGCATCCACT | 49 |

FIG. 17A

| Primer Set | Primer Name | Primer Sequence | SEQ ID NO |
|---|---|---|---|
| Selected | H1N1_Set1_F3_1 | CGAGATCGCACAGAGACTGGAAG | 50 |
| Selected | H1N1_Set1_F3_2 | CGAGATCGCACAGAGATTGGAAAGT | 51 |
| Selected | H1N1_Set1_B3_1 | CCCATTTCCATTTAGGGCATTTTGGACAA | 52 |
| Selected | H1N1_Set1_B3_2 | CCCATTTCCGTTTAGGGCATTTTG | 53 |
| Selected | H1N1_Set1_LF | AGCCATTCCATGAGAGCCTCAAGGTC | 54 |
| Selected | H1N1_Set1_LB_1 | CGTGCCAAGTGAGCGAGGA | 55 |
| Selected | H1N1_Set1_LB_2 | CGTGCCCAGTGAGCGAGGG | 56 |
| Selected | H1N1_Set1_FIP | AGTCAGAGGTGACAGGATTGGTCTTGTCTTGTCTTTGCAGGAAAG AACACAGAT | 57 |
| Selected | H1N1_Set1_BIP | GGGAATTTTGGGATTTGTGTTCACGCTCATCGTCTACGCTGCAGTC CT | 58 |
| Alternate | H1N1_Set2_F3 | TGAAAATTTGCAGGCCTATCAGAA | 59 |
| Alternate | H1N1_Set2_B3_1 | ACTCTAGCTCTATGCTGACAAAATG | 60 |
| Alternate | H1N1_Set2_B3_2 | ACTCCAGCTCTATGCTGACAAAATG | 61 |
| Alternate | H1N1_Set2_LF_1 | GCGGCAACAACAAGAGGATC | 62 |
| Alternate | H1N1_Set2_LF_2 | GCGGCAATAGTGAGAGGATC | 63 |
| Alternate | H1N1_Set2_LF_3 | GCTGCAATGACGAGAGGATC | 64 |
| Alternate | H1N1_Set2_LB | AGGGAAGAATATCAACAGGAACAGC | 65 |
| Alternate | H1N1_Set2_FIP | TGTCAAGTGCAAGATCCCAATGATATTGGGTGCAGATGCAACGGT TCAAGT | 66 |
| Alternate | H1N1_Set2_BIP | TACGGAAGGAGTGCCAAAGTCTATGATCGTCAGCATCCACAGCAC TCTG | 67 |

FIG. 18A

| Primer Set | Primer Name | Primer Sequence | SEQ ID NO |
|---|---|---|---|
| Selected | HIV_Set1_F3_1 | GGGGAAAGAATAATAGACATAATAGCAACA | 68 |
| Selected | HIV_Set1_F3_2 | TTCAAAATTTTCGGGTTTATT | 69 |
| Selected | HIV_Set1_LF_1 | AGCTTTGCTGGTCCTTTCC | 70 |
| Selected | HIV_Set1_LF_2 | GCTTTGCGTGTCCTTTCC | 71 |
| Selected | HIV_Set1_FIP | TGCCCCTTCACCTCTCCAGTACAGGGACAGCAGAGATCCACTTTGGA | 72 |
| Selected | HIV_Set1_BIP | AAAAGTAGTGCCAAGAAGAAAAGTGCCACACAATCATCACCTGCC | 73 |
| Selected | HIV_Set1_LB | AGATCATTAGGGATTATGGAAAACAGATGG | 74 |
| Selected | HIV_Set1_B3_1 | TCCTCATCCTGTCTACTT | 75 |
| Selected | HIV_Set1_B3_2 | ATCCTCATCCTGTCTACTA | 76 |
| Alternate 1 | HIV_Set2_F3 | TTTTCGGGGTTATTACAGGGACAGCAG | 77 |
| Alternate 1 | HIV_Set2_LF | CTTTCCAGAGAAGCTTTGCT | 78 |
| Alternate 1 | HIV_Set2_LF_2 | TTCCAGAGAAGCCTTGCTGG | 79 |
| Alternate 1 | HIV_Set2_LF_3 | CTTCCAGAGAAGCTTTGC | 80 |
| Alternate 1 | HIV_Set2_FIP | CTTGTATTACTACTGCCCCTTCGATCCACTTTGGAAAGGACC | 81 |
| Alternate 1 | HIV_Set2_BIP_1 | TAGTGACATAAAAGTAGTGCCAAGAAGGACAATCATCACCTGCCATC | 82 |
| Alternate 1 | HIV_Set2_BIP_2 | TAGTGACATAAAAGTAGTGCCAAGAAGGAATCATCGCCTGCCATCTGT | 83 |
| Alternate 1 | HIV_Set2_LB | AGCAAAGATCATTAGGGATTAT | 84 |
| Alternate 1 | HIV_Set2_LB_2 | GATCATTAGGGATTATGGAAAACAG | 85 |
| Alternate 1 | HIV_Set2_LB_3 | AAGATCATTAGGGATTATGGAAAACAG | 86 |
| Alternate 1 | HIV_Set2_B3 | ATCCTGTCTACTTGCCAC | 87 |
| Alternate 1 | HIV_Set2_B3_2 | TTAATCCTCATCCTGTCTACGTGCCA | 88 |
| Alternate 2 | HIV_Set3_F3_1 | AATAGCATCAGACATACAAACTAGAGAATT | 89 |
| Alternate 2 | HIV_Set3_F3_2 | GTTCAAAATTTTCGGGTTTATT | 90 |
| Alternate 2 | HIV_Set3_LF | AGCTTTGCTGGTCCTTTCCAG | 91 |
| Alternate 2 | HIV_Set3_FIP | CCCTTCACCTTTCCAGAGACAGGGACAGCAGAGAGCCACTTTG | 92 |
| Alternate 2 | HIV_Set3_BIP | AAAAGTAGTGCCAAGAAGAAAAGTACACAATCATCACCTGCCATCTGTTTG | 93 |
| Alternate 2 | HIV_Set3_LB_1 | AAGATCATTAGGGATTATGGAAG | 94 |
| Alternate 2 | HIV_Set3_LB_2 | AAGATCATTAAGGATTATGGAA | 95 |
| Alternate 2 | HIV_Set3_B3 | ATCCTCATTCTGTCTACTTGC | 96 |

FIG. 19A

| Primer Set | Primer Name | Primer Sequence | SEQ ID NO |
|---|---|---|---|
| Selected | RSV A_Set1_F3_1 | CTAATGCTTTGGCTAAGG | 97 |
| Selected | RSV A_Set1_F3_2 | ATTAATACAGTTAACCAATGCTTTGGC | 98 |
| Selected | RSV A_Set1_B3_1 | TTTAATTTCACAATTGTCATCTATTAG | 99 |
| Selected | RSV A_Set1_B3_2 | TCACAATTGTCATCTATTAGACCATTAGG | 100 |
| Selected | RSV A_Set1_LF_1 | TGTAATAACATGCACAAATACAATGC | 101 |
| Selected | RSV A_Set1_LF_2 | TGTAATAACATGAACAAATACAATGC | 102 |
| Selected | RSV A_Set1_LB_1 | ATGGAGGTTATATATGGGAAATGA | 103 |
| Selected | RSV A_Set1_FIP | CAATATTATTATTAGGGCAAATATCACTACGTTATACATACAATC AAATTGAATGGCA | 104 |
| Selected | RSV A_Set1_BIP | CAATTTCACAACAATGCCAGTATTACAGAAGCAGTGTGTTAATT CCATCAT | 105 |
| Alternate | RSV A_Set2_FIP | ATATGGTAGAATCCTGCTTCTCCACTACAAGCAGAAATGGAAC AAGT | 106 |
| Alternate | RSV A_Set2_BIP | TCAATTTCCTCACTTCTCTAGTGTTCTGTATTCTCCCATTATGCC | 107 |
| Alternate | RSV A_Set2_F3 | TTATGTTAGGACACGCTAGT | 108 |
| Alternate | RSV A_Set2_B3 | TCTTGATTCCTTGGTGTACC | 109 |
| Alternate | RSV A_Set2_LF | GAGCATACTCATACACCTCCACA | 110 |
| Alternate | RSV A_Set2_LB | TATTGGGCAATGCTGCTGGC | 111 |

FIG. 20A

| Primer Set | Primer Name | Primer Sequence | SEQ ID NO |
|---|---|---|---|
| Selected | RSV B_Set1_F3_1 | CTCAATTCCCTAACTTCTCAAGTGTGGTC | 112 |
| Selected | RSV B_Set1_F3_2 | ATATATTGAACAATCCAAAGGCATCATTGC | 113 |
| Selected | RSV B_Set1_B3 | TTGTTAACTTAAAGCTCTACGTCATCC | 114 |
| Selected | RSV B_Set1_LF_1 | TGATTTCTTGGTGTACCTCT | 115 |
| Selected | RSV B_Set1_LF_2 | TGGTTTCTTGGTGTACCTCT | 116 |
| Selected | RSV B_Set1_LF_3 | GGTTTCGTGGTGTACCTCT | 117 |
| Selected | RSV B_Set1_LB_1 | TGTATTAGACTTAACAACAGAAGAATTGGA | 118 |
| Selected | RSV B_Set1_LB_2 | GTATTAGATTTAACAACAGAGGAATTGGA | 119 |
| Selected | RSV B_Set1_LB_3 | TGTATTAGACTTAACAGCAGAAGAATTGGA | 120 |
| Selected | RSV B_Set1_FIP | CATATGCTTTGGCTGCATCATAGAGATCGGACTAGGCATAATGG GAGAGTATAGA | 121 |
| Selected | RSV B_Set1_BIP | ACTCAAAGAAAATGGAGTAATAAACTACAGGGTTGAGTTGATGC TTTATGGCTTCC | 122 |
| Alternate | RSV B_Set2_FIP | ATATGGTAGAAACCAGCTTCTCCTCTCCAAGCAGAAATGGAGCA AGT | 123 |
| Alternate | RSV B_Set2_BIP | TCAATTTCCTAACTTCTCAAGTGTTCTATACTCTCCCATTATGCC | 124 |
| Alternate | RSV B_Set2_F3 | TCATGCTAGGACATGCTAGT | 125 |
| Alternate | RSV B_Set2_B3 | TCTTGGTTTCTTGGTGTACC | 126 |
| Alternate | RSV B_Set2_LF | GTGCATACTCATAGACTTCCACA | 127 |
| Alternate | RSV B_Set2_LB | TCCTAGGCAATGCAGCAGGT | 128 |

FIG. 21A

| Primer Set | Primer Name | Primer Sequence | SEQ ID NO |
|---|---|---|---|
| Z3276 A | EC_Z3276_F3_1 | CGACACAATTGGGAAATCCAGCAA | 129 |
| Z3276 A | EC_Z3276_FIP_1 | TCTCCAGTAAAATCAGGTCGCAGGCAGTATTACCTTATGTG | 130 |
| Z3276 A | EC_Z3276_LF_1 | GTGCCTCTGGCTATTTTAACCAC | 131 |
| Z3276 A | EC_Z3276_BIP_1 | AGAAAATCTACCTGGTTTGACGATGACTCACCGCCA | 132 |
| Z3276 A | EC_Z3276_LB_1 | ATTTCAGATACCGTGATTGCAAATATTGG | 133 |
| Z3276 A | EC_Z3276_B3_1 | GCCTTACAAATACCCAACCAA | 134 |
| Z3276 B | EC_Z3276_F3_2 | TTAGGTAAAACCAGCGACACAA | 135 |
| Z3276 B | EC_Z3276_FIP_2 | AGGTGTGCCTCTGGCTATTGGGAAATCCAGCAATGCGC | 136 |
| Z3276 B | EC_Z3276_LF_2 | AACCACATAAGGTAATACTGCCTGC | 137 |
| Z3276 B | EC_Z3276_BIP_2 | CTGGAGAAAGAAAATCTACCTGACTCACCGCCAATATTTGCA | 138 |
| Z3276 B | EC_Z3276_LB_2 | TGGTTTATTTCAGATACCGTGATTGC | 139 |
| Z3276 B | EC_Z3276_B3_2 | CCTTACAAATACCCAACC | 140 |
| Stx1 A | EC_Stx1_F3_1 | ATCTGGATTTAATGTCGCATAG | 141 |
| Stx1 A | EC_Stx1_FIP_1 | CAGCTGTCACAGTAACAAGGAACCTCACTGACGCAGTC | 142 |
| Stx1 A | EC_Stx1_LF_1 | ACCGTAACATCGCTCTTGCCACAGAC | 143 |
| Stx1 A | EC_Stx1_BIP_1 | TACGTTTTCGGCAAATACCGCCCACTGAGATCATCCA | 144 |
| Stx1 A | EC_Stx1_LB_1 | AGAGGGGATTTCGTACAACACTGG | 145 |
| Stx1 A | EC_Stx1_B3_1 | CTTCAGCAGTCATTACATAAGAA | 146 |
| Stx1 B | EC_Stx1_F3_2 | TACAGCGTGTTGCAGGGA | 147 |
| Stx1 B | EC_Stx1_FIP_2 | CATTAAATCCAGATAAGAAGTCAGTCGTACGGGGATGCA | 148 |
| Stx1 B | EC_Stx1_LF_2 | AGTCAACGAATGGCGATTTATCTGC | 149 |
| Stx1 B | EC_Stx1_BIP_2 | GCATAGTGGAACCTCACTACAGTAACAAACCGTAACATCGCT | 150 |
| Stx1 B | EC_Stx1_LB_2 | GACGCAGTCTGTGGCAAGAGC | 151 |
| Stx1 B | EC_Stx1_B3_2 | ACGTAAAGCTTCAGCTGTC | 152 |
| Stx2 A | EC_Stx2_F3_1 | TCAGGCAGATACAGAGAGAATTTCGTC | 153 |
| Stx2 A | EC_Stx2_FIP_1 | GAGTGAGGTCCACGTCTCGGCACTGTCTGAAACTGCTCCT | 154 |
| Stx2 A | EC_Stx2_LF_1 | CCGGCGTCATCGTATACACAGG | 155 |
| Stx2 A | EC_Stx2_BIP_1 | GCGAATCAGCAATGTGCTTCCCCACTCTGACACCATCC | 156 |
| Stx2 A | EC_Stx2_LB_1 | CCGGAGTATCGGGGAGAGG | 157 |
| Stx2 A | EC_Stx2_B3_1 | ATCGCTGATATATTATTAAAGGATATTCT | 158 |
| Stx2 B | EC_Stx2_F3_2 | CATCCAGAGCAGTTCTGCG | 159 |
| Stx2 B | EC_Stx2_FIP_2 | CAGTGCCTGACGAAATTCTGTCACTGTCACAGCAGAAGCCT | 160 |
| Stx2 B | EC_Stx2_LF_2 | CTCTGTATCTGCCTGAAGCGTAAGG | 161 |
| Stx2 B | EC_Stx2_BIP_2 | ACTGCTCCTGTGTATACGCCCCAGTTCAGAGTGAGGTCC | 162 |
| Stx2 B | EC_Stx2_LB_2 | ATGACGCCGGGAGACGTGG | 163 |
| Stx2 B | EC_Stx2_B3_2 | CCCCACTCTGACACCAT | 164 |

FIG. 22A

| Mix Name | Primer Set Combinations |
|---|---|
| Selected | Z3276 B + Stx1 A + Stx2 B |
| Alt1 | Z3276 A + Stx1 A + Stx2 A |
| Alt2 | Z3276 A + Stx1 A + Stx2 B |
| Alt3 | Z3276 A + Stx1 B + Stx2 A |
| Alt4 | Z3276 A + Stx1 B + Stx2 B |
| Alt5 | Z3276 B + Stx1 A + Stx2 A |
| Alt6 | Z3276 B + Stx1 B + Stx2 A |
| Alt7 | Z3276 B + Stx1 B + Stx2 B |

| Primer Set | Primer Name | Primer Sequence | SEQ ID NO |
|---|---|---|---|
| All Sets | Listeria_F3_1 | ATGTAGAACTGACAAATATCATCAA | 165 |
| All Sets | Listeria_B3_3 | GTTGTTTCAATATATTCTGAGTTGTT | 166 |
| All Sets | Listeria_LF_1 | CGAGGTTACCGTCGATGATTTGAACTTC | 167 |
| Selected & Alternate 1 | Listeria_FIP_1 | TCAAAATATCTCGTAAGTCTCGGTGGCTCCGCAAAAGATGAAG | 168 |
| Alternate 2 | Listeria_FIP_2 | TTCAAAATATCTCGTAAGTCTTGGCTCCGCAAAAGATGAAG | 169 |
| Selected | Listeria_BIP_1 | GGTGCTACTTTTAACCGGCATTGTCTTTTAAGAAGTTTGTTGTATAGGCA | 170 |
| Alternate 1 & Alternate 2 | Listeria_BIP_2 | AGGTGCTACTTTTAACCGTGTCTTTTAAGAAGTTTGTTGTATAGGCAA | 171 |
| Selected | Listeria_LB_1 | GAAACACCAGGAGTTCCCATTGC | 172 |
| Alternate 1 & Alternate 2 | Listeria_LB_2 | GGAAACACCAGGAGTTCCCATTGC | 173 |

FIG. 23A

| Primer Set | Primer Name | Primer Sequence | SEQ ID NO |
|---|---|---|---|
| Alternate 1 | TB Set 1 F3 | GGTCGGAAGCTCCTATGACA | 174 |
| Alternate 1 | TB Set 1 B3 | TAGGCAGCCTCGAGTTCG | 175 |
| Alternate 1 | TB Set 1 FIP | AGGGCTTGCCGGGTTTGATCATGCACTAGCCGAGACGA | 176 |
| Alternate 1 | TB Set 1 BIP | CGGTCCATCGAGGATGTCGAGTCGCCGCAGTACTGGTAGA | 177 |
| Alternate 1 | TB Set 1 LF | TCGGTCTTGTATAGGCCGTTGA | 178 |
| Alternate 1 | TB Set 1 LB | GCTGGGTCGACTGGTTCAAC | 179 |
| Alternate 2 | TB Set 2 F3 | CGAGACGATCAACGGCCTAT | 180 |
| Alternate 2 | TB Set 2 B3 | TCCGGAGACTCTCTGATCTG | 181 |
| Alternate 2 | TB Set 2 FIP | TGGTTGAACCAGTCGACCCAGCAGCTGATCAAACCCGGCAAG | 182 |
| Alternate 2 | TB Set 2 BIP | TCTACCAGTACTGCGGCGACGTTCTCTGGCGTTGAGCGTAG | 183 |
| Alternate 2 | TB Set 2 LF | GACATCCTCGATGGACCGC | 184 |
| Alternate 2 | TB Set 2 LB | GGTCGAACTCGAGGCTGCCTA | 185 |
| Selected | TB Set 3 F3 | TCACCTATGTGTCGACCTGG | 186 |
| Selected | TB Set 3 B3 | CCGGATCGATGTGTACTGAG | 187 |
| Selected | TB Set 3 FIP | TGGAGGTGGCCATCGTGGAACCTACGTGGCCTTTGTCAC | 188 |
| Selected | TB Set 3 BIP | CCATCTGGACCCGCCAACAACCCCTATCCGTATGGTGGA | 189 |
| Selected | TB Set 3 LF | AGGATCCTGCGACGTAGGCG | 190 |
| Selected | TB Set 3 LB | GAAGGCGTACTCGACCTGAAAGAC | 191 |

FIG. 24A

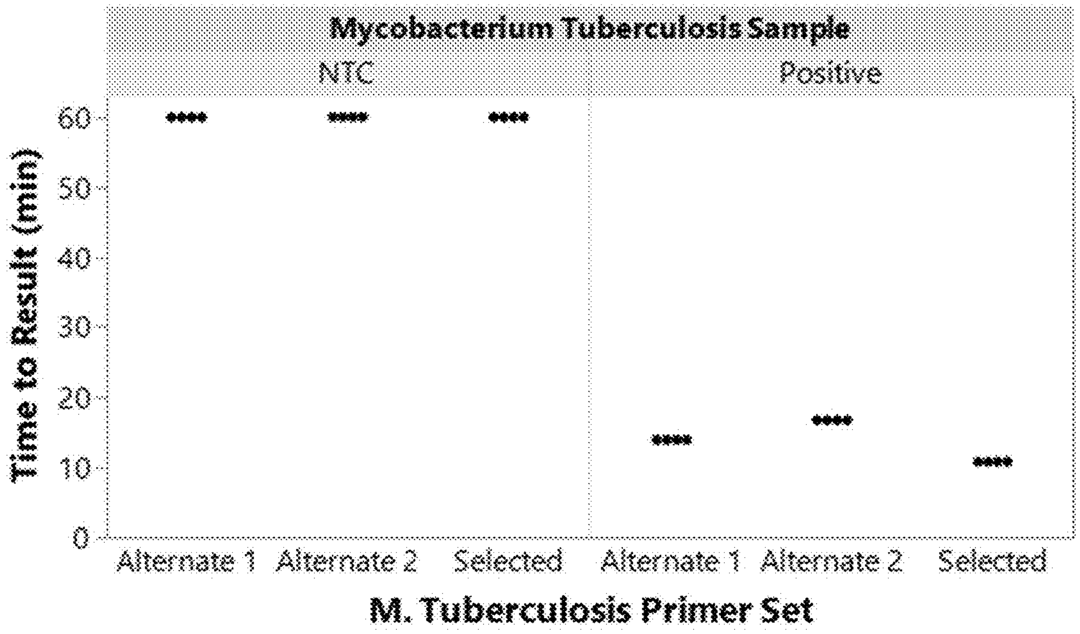

FIG. 24B

| Primer Set | Primer Name | Primer Sequence | SEQ ID NO |
|---|---|---|---|
| Alternate | Sal_F3_2 | TATTGGCGGTATTTCGGTG | 192 |
| Alternate | Sal_FIP_2 | TCAGCATGGTATAAGTAGGGATGACTCGCCATGGTATGG | 193 |
| Alternate | Sal_LF_3 | ACAGGGCGGAGGACAAATCC | 194 |
| Alternate | Sal_BIP_2 | TGGTGATGGTCTTGTCGCAAACCGGCACTAATCGCA | 195 |
| Selected | Sal_F3_1 | TATTGGCGGTATTTCGGT | 196 |
| Selected | Sal_FIP_1 | CAGCATGGTATAAGTAGAGGGATGACTCGCCATGGT | 197 |
| Selected | Sal_LF_1 | GGGCGGAGGACAAATCCATACC | 198 |
| Selected | Sal_LF_2 | GGCGGAGGACAAATCCATACC | 199 |
| Selected | Sal_BIP_1 | TTGGTGATGGTCTTGTCGCAAACCGGCACTAATCGCA | 200 |
| Both | Sal_LB_1 | CCAGATCCCCGCATTGTTGATTGC | 201 |
| Both | Sal_LB_2 | CAGATCCCCGCATTGTTGATTGC | 202 |
| Both | Sal_B3_1 | CATTTACGCGGGTCACGAT | 203 |
| Both | Sal_B3_2 | CCATTTACGCGGGTCACGAT | 204 |

FIG. 25A

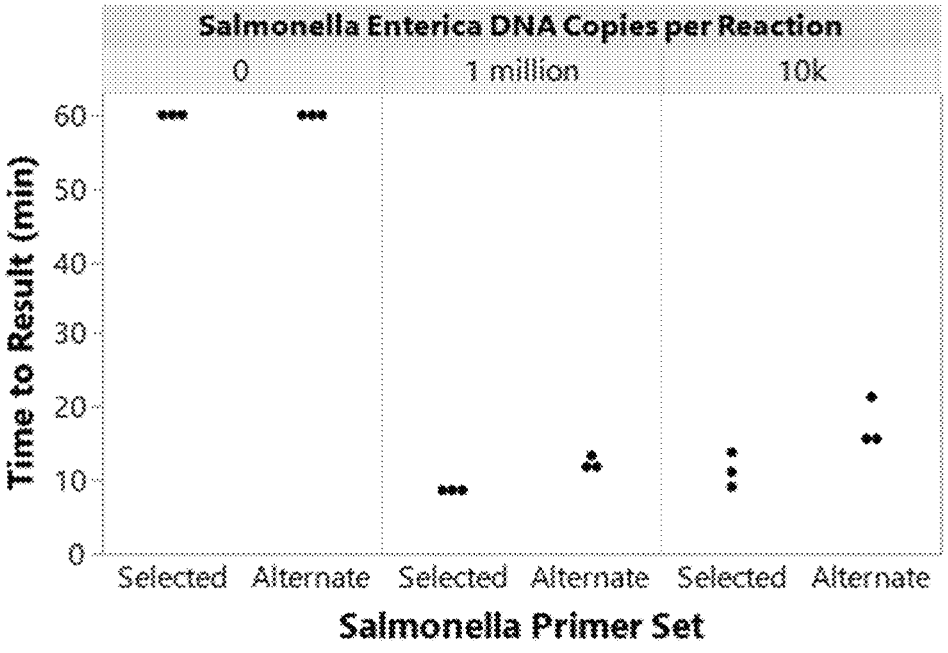

FIG. 25B

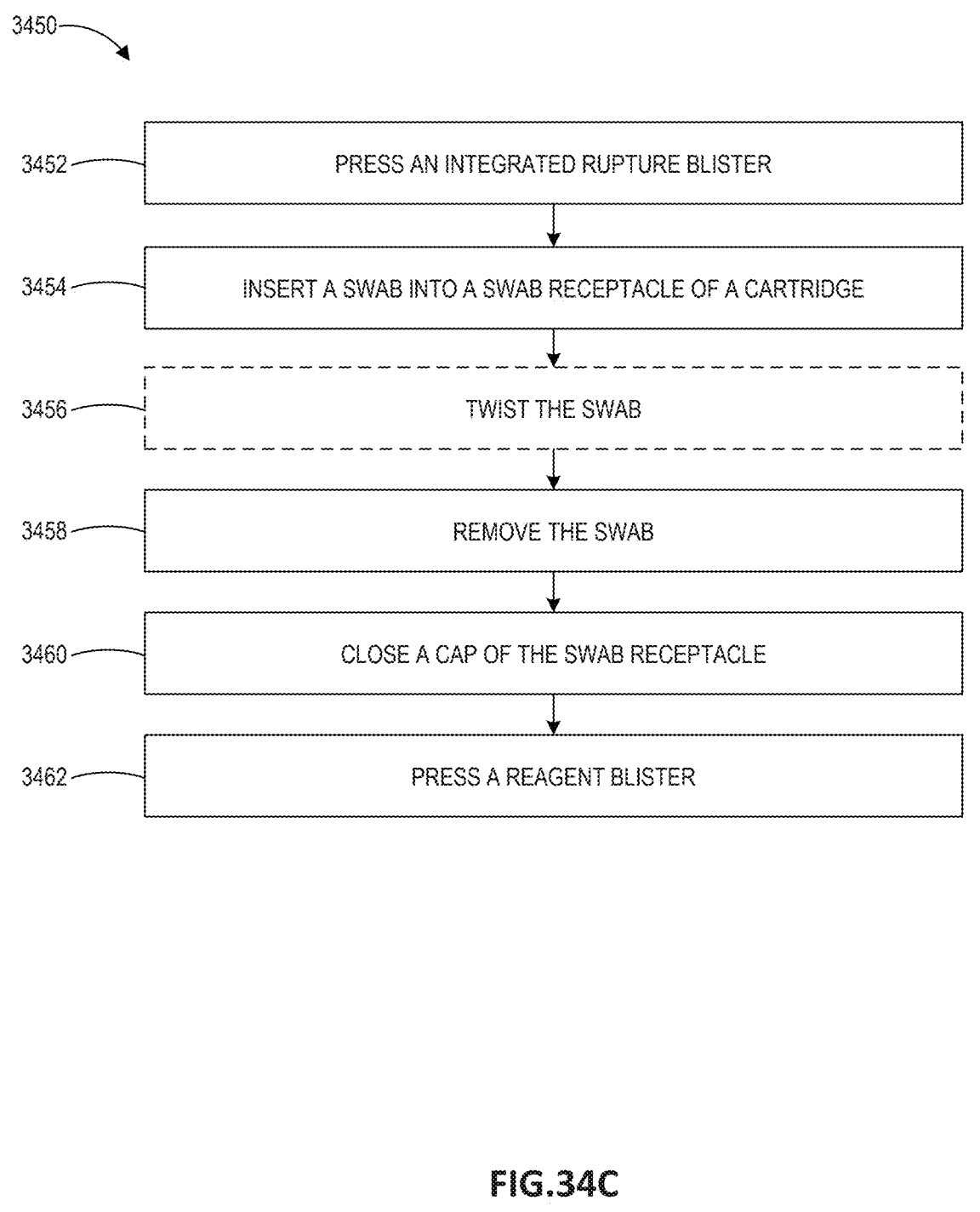

3450

3452 PRESS AN INTEGRATED RUPTURE BLISTER

3454 INSERT A SWAB INTO A SWAB RECEPTACLE OF A CARTRIDGE

3456 TWIST THE SWAB

3458 REMOVE THE SWAB

3460 CLOSE A CAP OF THE SWAB RECEPTACLE

3462 PRESS A REAGENT BLISTER

FIG.34C

SYSTEMS AND METHODS OF SAMPLE DEPOSITING AND TESTING

CROSS REFERENCE TO RELATED APPLICATIONS

This application is a Continuation-in-part of and claims priority to PCT/US2021/045596, filed Aug. 11, 2021, which claims priority to U.S. provisional application 63/066,059 filed on Aug. 14, 2020; PCT/US2021/045610, filed Aug. 11, 2021, which claims priority to U.S. provisional application 63/066,040 filed on Aug. 14, 2020; PCT/US2021/045608, filed Aug. 11, 2021, which claims priority to U.S. provisional application 63/066,086 filed on Aug. 14, 2020; and PCT/US2021/045600, filed Aug. 11, 2021, which claims priority to U.S. provisional application 63/066,047 filed on Aug. 14, 2020; all of which are hereby expressly incorporated by reference in their entireties.

REFERENCE TO SEQUENCE LISTING

The present application is being filed along with a Sequence Listing in electronic format. The Sequence Listing is provided as a file entitled ALVEO052P1SEQLISTING, created Feb. 11, 2022, which is approximately 37 Kb in size. The information in the electronic format of the Sequence Listing is incorporated herein by reference in its entirety.

FIELD

The present application is generally directed to systems, methods, and devices for sensing and/or identifying pathogens, genomic materials, proteins, and/or other small molecules or biomarkers and using historical sensing and testing results to track a subject's or product's wellness score or likelihood of being infected with a trackable pathogen. More specifically, the systems, methods, and devices described herein determine whether the subject or product is infected with a pathogen and/or generate a score representative of the subject's or product's health or wellness or consumability, where a score that deviates from a set threshold value, such as a higher or lower value depending on the parameters of the threshold set, indicates that the subject or product is healthy, well, or suitable for consumption, not infected with a pathogen and/or is of low risk to others in a population or indicates that the subject or product has compromised health, is infected with a pathogen, not suitable for consumption, and/or is a risk to others in the population.

BACKGROUND

Pathogens in a sample may be identified by detecting specific genomic material (DNA or RNA). In conventional nucleic acid testing ("NAAT"), genomic material in a sample may first be exponentially copied using a molecular amplification process known as the polymerase chain reaction ("PCR") until the quantity of DNA present is great enough to be measurable. In the case of RNA, the genomic material of many viruses, an additional step can be included to first transcribe the RNA into DNA before amplifying by PCR. As an alternative, loop-mediated isothermal amplification (LAMP) offers several advantages over PCR for pathogen detection purposes, including the ability to perform the amplification reaction at a non-cyclical and relatively low temperature. There is a lasting need for improved pathogen detection methods and tools, e.g., using LAMP, particularly in geographical regions where the use of complex laboratory equipment is not feasible.

SUMMARY

Some embodiments include an assay cartridge for containing a sample comprising a target agent for detection by a reader device, the assay cartridge comprising: a sample introduction area configured to receive a sample carrier containing the sample; a mixing region configured to mix the sample with a reagent to generate a sample mixture; at least one mixing object disposed in the mixing region and configured to move within the mixing region to enhance mixing of the sample with the reagent in response to a force applied to the mixing region; a test well containing an excitation electrode and a sensing electrode, wherein the test well is configured to contain at least a portion of the sample mixture undergoing an amplification process; and a fluid path fluidically coupling the sample introduction area to the mixing region and the mixing region to the test well.

In some embodiments, the force applied is the result of one or more of a magnetic field generator, a vibration generator, a sonic generator, and physical movement.

In some embodiments, the reagent comprises one of a dry reagent or a liquid reagent.

In some embodiments, the at least one mixing object comprises at least one magnetic bead and wherein the force is exerted by a first magnetic field generated by a first magnet, such as an electromagnet disposed in the reader near a first location of the mixing region when the assay cartridge is inserted into the reader.

In some embodiments, the force is further exerted by a second magnetic field generated by a second magnet, such as an electromagnet disposed in the reader near a second location of the mixing region when the assay cartridge is inserted into the reader.

Some embodiments include a control circuit configured to switch between which of the first magnet and the second magnetic is exerting the force at a given moment.

In some embodiments, the force is exerted by a movable force generator disposed in the reader.

In some embodiments, one or more of the sample introduction area, the mixing region, the test well, and the fluid path introduces an agent that reduces effects of one or more inhibitors that exist in the sample.

In some embodiments, the one or more of the sample introduction area, the mixing region, the test well, and the fluid path are coated with the agent.

In some embodiments, the reagent includes the agent that reduces effects of the one or more inhibitors.

In some embodiments, the one or more inhibitors that exist in the sample comprise one or more of lactoferrin, lysozyme, nucleases, DNAses, or RNases and wherein the agent is configured to improve a detection sensitivity of testing performed with the assay cartridge and the reader, preferably by inhibiting said one or more inhibitors.

In some embodiments, the agent comprises one or more of an antibody, aptamer, competitive binding protein or a proteinase and, optionally wherein said proteinase is inactivated by a chemical reaction, which produces heat once the proteinase has digested the protein in the sample.

Some embodiments also include a cap having an open configuration and a closed configuration, wherein when the cap is in the open configuration, the sample introduction area is configured to receive the sample carrier, and wherein when the cap in the closed configuration, the sample receptacle is sealed.

Some embodiments also include a scraper inside the sample introduction area, the scraper configured to contact the sample carrier when the sample carrier is position inside the sample introduction area and facilitate collection of the sample.

Some embodiments also include a retainer inside the sample introduction area, wherein the retainer is configured to hold the sample carrier in place inside the sample introduction area, and wherein at least a portion of the sample is collected from the sample carrier.

In some embodiments, the sample carrier comprises bristles or flock configured to collect the sample.

In some embodiments, the sample carrier comprises a stopper configured to abut an opening of the sample introduction area to prevent the sample carrier from entering further into the sample introduction area.

In some embodiments, the sample carrier comprises a marked section configured to indicate a position to break or cut the sample collection device after being inserted into the sample receptacle.

Some embodiments also include: a first storage device storing a first fluid; a second storage device storing a second fluid; and wherein the first fluid or the second fluid or both are configured to facilitate recovery of at least a portion of the sample from the sample carrier or facilitate transport of at least a portion of the sample from the sample introduction area to the mixing region or both.

In some embodiments, the first or second fluids comprise a buffer, and wherein the first or second fluids comprise a reagent configured to react with at least a portion of the biological sample, such as one or more salts e.g., magnesium.

In some embodiments, the first storage device and the second storage device are compressible, and wherein the first storage device and the second storage device are configured to release the first fluid and the second fluid, respectively, when compressed.

Some embodiments include an assay cartridge for containing a sample comprising a target agent for detection by a reader device, the assay cartridge comprising: a sample introduction area configured to receive a sample carrier containing the sample; a mixing region configured to mix the sample with a reagent to generate a sample mixture; a test well containing an excitation electrode and a sensing electrode, wherein the test well is configured to contain at least a portion of the sample mixture undergoing an amplification process; and a fluid path fluidically coupling the sample introduction area to the mixing region and the mixing region to the test well, wherein one or more of the sample introduction area, the mixing region, the test well, and the fluid path introduces an agent that reduces effects of one or more inhibitors that exist in the sample.

In some embodiments, the one or more of the sample introduction area, the mixing region, the test well, and the fluid path are coated with the agent.

In some embodiments, the reagent includes the agent that reduces effects of the one or more inhibitors.

In some embodiments, the one or more inhibitors that exist in the sample comprise one or more of lactoferrin, lysozyme, nucleases, DNAses or RNases and wherein the agent is configured to improve a detection sensitivity of testing performed with the assay cartridge and the reader preferably by inhibiting the one or more inhibitors.

In some embodiments, the agent comprises one or more of an antibody, aptamer, competitive binding protein or a proteinase and optionally wherein said proteinase is inactivated after digesting protein in the sample by a chemical reaction that creates heat.

Some embodiments also include at least one mixing object disposed in the mixing region and configured to move within the mixing region to enhance mixing of the sample with the reagent in response to a force applied to the mixing region.

In some embodiments, the force applied is the result of one or more of a magnetic field generator, a vibration generator, a sonic generator, and physical movement.

In some embodiments, the reagent comprises one of a dry reagent or a liquid reagent.

In some embodiments, the at least one mixing object comprises at least one magnetic bead and wherein the force is exerted by a first magnetic field generated by a first magnet such as an electromagnet disposed in the reader near a first location of the mixing region when the assay cartridge is inserted into the reader.

In some embodiments, the force is further exerted by a second magnetic field generated by a second magnet, such as an electromagnet disposed in the reader near a second location of the mixing region when the assay cartridge is inserted into the reader.

Some embodiments also include a control circuit configured to switch between which of the first magnet and the second magnetic is exerting the force at a given moment.

Some embodiments also include a cap having an open configuration and a closed configuration, wherein when the cap is in the open configuration, the sample introduction area is configured to receive the sample carrier, and wherein when the cap in the closed configuration, the sample receptacle is sealed.

Some embodiments also include a scraper inside the sample instruction area, the scraper configured to contact the sample carrier when the sample carrier is position inside the sample introduction area and facilitate collection of the sample.

Some embodiments also include a retainer inside the sample introduction area, wherein the retainer is configured to hold the sample carrier in place inside the sample introduction area, and wherein at least a portion of the sample is collected from the sample carrier.

In some embodiments, the sample carrier comprises bristles or flock configured to collect the sample.

In some embodiments, the sample carrier comprises a stopper configured to abut an opening of the sample introduction area to prevent the sample carrier from entering further into the sample introduction area.

In some embodiments, the sample collection device comprises a marked section configured to indicate a position to break or cut the sample collection device after being inserted into the sample receptacle.

Some embodiments also include: a first storage device storing a first fluid; a second storage device storing a second fluid; and wherein the first fluid or the second fluid or both are configured to facilitate recovery of at least a portion of the sample from the sample carrier or facilitate transport of at least a portion of the sample from the sample introduction area to the mixing region or both.

In some embodiments, the first or second fluids comprise a buffer, and wherein the first or second fluids comprise a reagent configured to react with at least a portion of the biological sample, such as one or more salts e.g., magnesium.

In some embodiments, the first storage device and the second storage device are compressible, and wherein the first storage device and the second storage device are configured to release the first fluid and the second fluid, respectively, when compressed.

In some embodiments, the sample carrier comprises: a body configured to hold the sample before depositing the sample into the assay cartridge; a tip fluidically coupled to the body and configured to fit into the sample introduction area of the assay cartridge, wherein the sample held in the body can be ejected from the sample carrier via the tip; and a membrane disposed between the body and the tip and configured to prevent molecules in the sample that exceed a threshold size from being ejected from the body via the tip.

In some embodiments, the sample carrier further comprises a gel filtration component, resin, size exclusion matrix, membrane, or resin, or filter such as a molecular weight filter configured to trap salt compounds in the sample such that the salt compounds are not ejected from the body via the tip.

In some embodiments, the gel filtration component comprises one of a gel filtration bead bed or a gel filtration matrix.

In some embodiments, the sample carrier further comprises a buffer component configured to assist in extracting the target agent from the sample.

In some embodiments, the buffer component comprises one of an elution buffer or a lysis buffer.

In some embodiments, the sample carrier further comprises a plunger component configured to apply a force to the sample in the body and cause the sample to pass through the membrane and the tip and into the sample introduction area of the assay cartridge.

In some embodiments, the sample carrier comprises bristles or flock configured to collect or hold the sample.

In some embodiments, the sample carrier comprises a stopper configured to abut an opening of the sample introduction area to prevent the sample carrier from entering further into the sample introduction area.

In some embodiments, the sample carrier comprises a marked section configured to indicate a position to break or cut the sample carrier after being inserted into the sample introduction area.

Some embodiments include a system for detecting a target agent in a sample using an assay cartridge and a reader, the system comprising: the assay cartridge, comprising: a sample introduction area configured to receive a sample carrier containing the sample; and the sample carrier for depositing the sample into the assay cartridge, the sample carrier comprising: a body configured to hold the sample before depositing the sample into the assay cartridge; a tip fluidically coupled to the body and configured to fit into the sample introduction area of the assay cartridge, wherein the sample held in the body can be ejected from the sample carrier via the tip; and a membrane disposed between the body and the tip and configured to prevent molecules in the sample that exceed a threshold size from being ejected from the body via the tip.

In some embodiments, the sample carrier further comprises a gel filtration component, resin, size exclusion matrix, membrane, or resin, or filter such as a molecular weight filter configured to trap salt compounds in the sample such that the salt compounds are not ejected from the body via the tip.

In some embodiments, the gel filtration component comprises one of a gel filtration bead bed or a gel filtration matrix.

In some embodiments, the sample carrier further comprises a buffer component configured to assist in extracting the target agent from the sample.

In some embodiments, the buffer component comprises one of an elution buffer or a lysis buffer.

In some embodiments, the sample carrier further comprises a plunger component configured to apply a force to the sample in the body and cause the sample to pass through the membrane and the tip and into the sample introduction area of the assay cartridge.

In some embodiments, the assay cartridge further comprises: a mixing region configured to mix the sample with a reagent to generate a sample mixture; at least one mixing object disposed in the mixing region and configured to move within the mixing region to enhance mixing of the sample with the reagent in response to a force applied to the mixing region; a test well containing an excitation electrode and a sensing electrode, wherein the test well is configured to contain at least a portion of the sample mixture undergoing an amplification process; and a fluid path fluidically coupling the sample introduction area to the mixing region and the mixing region to the test well.

In some embodiments, the force applied is the result of one or more of a magnetic field generator, a vibration generator, a sonic generator, and physical movement.

In some embodiments, the reagent comprises one of a dry reagent or a liquid reagent.

In some embodiments, the at least one mixing object comprises at least one magnetic bead and wherein the force is exerted by a first magnetic field generated by a first magnet such as an electromagnet disposed in the reader near a first location of the mixing region when the assay cartridge is inserted into the reader.

In some embodiments, the force is further exerted by a second magnetic field generated by a second magnet such as an electromagnet disposed in the reader near a second location of the mixing region when the assay cartridge is inserted into the reader.

Some embodiments also include a control circuit configured to switch between which of the first magnet and the second magnetic is exerting the force at a given moment.

In some embodiments, the force is exerted by a movable force generator disposed in the reader.

In some embodiments, one or more of the sample introduction area, the mixing region, the test well, and the fluid path introduces an agent that reduces effects of one or more inhibitors that exist in the sample.

In some embodiments, the one or more of the sample introduction area, the mixing region, the test well, and the fluid path are coated with the agent.

In some embodiments, the reagent includes the agent that reduces effects of the one or more inhibitors.

In some embodiments, the inhibitors that exist in the sample comprise one or more of lactoferrin, lysozyme, nucleases, DNAses or RNases and wherein the agent is configured to improve a detection sensitivity of testing performed with the assay cartridge and the reader.

In some embodiments, the agent comprises one or more of an antibody, aptamer, competitive binding protein or a proteinase and optionally wherein said proteinase is inactivated after digesting protein in the sample by a chemical reaction that creates heat.

In some embodiments, the assay cartridge comprises a cap having an open configuration and a closed configuration, wherein when the cap is in the open configuration, the sample introduction area is configured to receive the sample carrier, and wherein when the cap in the closed configuration, the sample introduction area is sealed.

In some embodiments, the assay cartridge comprises a scraper inside the sample introduction area, the scraper configured to contact the sample carrier when the sample carrier is position inside the sample introduction area and facilitate collection of the sample.

In some embodiments, the assay cartridge comprises a retainer inside the sample introduction area, wherein the retainer is configured to hold the sample carrier in place inside the sample introduction area, and wherein at least a portion of the sample is collected from the sample carrier.

In some embodiments, the sample carrier comprises bristles or flock configured to collect the sample.

In some embodiments, the sample carrier comprises a stopper configured to abut an opening of the sample introduction area to prevent the sample carrier from entering further into the sample introduction area.

In some embodiments, the sample carrier comprises a marked section configured to indicate a position to break or cut the sample collection device after being inserted into the sample receptacle.

In some embodiments, the assay cartridge further comprises: a first storage device storing a first fluid; a second storage device storing a second fluid; and wherein the first fluid or the second fluid or both are configured to facilitate recovery of at least a portion of the sample from the sample carrier or facilitate transport of at least a portion of the sample from the sample introduction area to the mixing region or both.

In some embodiments, the first or second fluids comprise a buffer, and wherein the first or second fluids comprise a reagent configured to react with at least a portion of the biological sample, such as one or more salts e.g., magnesium.

In some embodiments, the first storage device and the second storage device are compressible, and wherein the first storage device and the second storage device are configured to release the first fluid and the second fluid, respectively, when compressed.

In some embodiments, the assay cartridge further comprises: a mixing region configured to mix the sample with a reagent to generate a sample mixture; a test well containing an excitation electrode and a sensing electrode, wherein the test well is configured to contain at least a portion of the sample mixture undergoing an amplification process; and a fluid path fluidically coupling the sample introduction area to the mixing region and the mixing region to the test well, wherein one or more of the sample introduction area, the mixing region, the test well, and the fluid path introduces an agent that reduces effects of one or more inhibitors that exist in the sample.

In some embodiments, the one or more of the sample introduction area, the mixing region, the test well, and the fluid path are coated with the agent.

In some embodiments, the reagent includes the agent that reduces effects of the one or more inhibitors.

In some embodiments, the inhibitors that exist in the sample comprise one or more of lactoferrin, lysozyme, or RNases and wherein the agent is configured to improve a detection sensitivity of testing performed with the assay cartridge and the reader.

In some embodiments, the agent comprises one or more of an antibody, aptamer, competitive binding protein or a proteinase and optionally wherein said proteinase is inactivated after digesting protein in the sample by a chemical reaction that creates heat.

Some embodiments also include at least one mixing object disposed in the mixing region and configured to move within the mixing region to enhance mixing of the sample with the reagent in response to a force applied to the mixing region.

In some embodiments, the force applied is the result of one or more of a magnetic field generator, a vibration generator, a sonic generator, and physical movement.

In some embodiments, the reagent comprises one of a dry reagent or a liquid reagent.

In some embodiments, the at least one mixing object comprises at least one magnetic bead and wherein the force is exerted by a first magnetic field generated by a first magnet such as an electromagnet disposed in the reader near a first location of the mixing region when the assay cartridge is inserted into the reader.

In some embodiments, the force is further exerted by a second magnetic field generated by a second magnet such as an electromagnet disposed in the reader near a second location of the mixing region when the assay cartridge is inserted into the reader.

Some embodiments also include a control circuit configured to switch between which of the first magnet and the second magnetic is exerting the force at a given moment.

In some embodiments, the assay cartridge comprises a cap having an open configuration and a closed configuration, wherein when the cap is in the open configuration, the sample introduction area is configured to receive the sample carrier, and wherein when the cap in the closed configuration, the sample receptacle is sealed.

In some embodiments, the assay cartridge comprises a scraper inside the sample instruction area, the scraper configured to contact the sample carrier when the sample carrier is position inside the sample introduction area and facilitate collection of the sample.

In some embodiments, the assay cartridge comprises a retainer inside the sample introduction area, wherein the retainer is configured to hold the sample carrier in place inside the sample introduction area, and wherein at least a portion of the sample is collected from the sample carrier.

In some embodiments, the sample carrier comprises bristles or flock configured to collect the sample.

In some embodiments, the sample carrier comprises a stopper configured to abut an opening of the sample introduction area to prevent the sample carrier from entering further into the sample introduction area.

In some embodiments, the sample collection device comprises a marked section configured to indicate a position to break or cut the sample collection device after being inserted into the sample receptacle.

In some embodiments, the sample introduction area is configured to receive a sample carrier.

In some embodiments, the sample carrier comprises bristles or flock configured to collect the sample.

In some embodiments, the sample carrier comprises a stopper configured to abut an opening of the sample introduction area to prevent the sample carrier from entering further into the sample introduction area.

In some embodiments, the sample collection device comprises a marked section configured to indicate a position to break or cut the sample collection device after being inserted into the sample receptacle.

In some embodiments, the assay cartridge comprises: a first storage device storing a first fluid; a second storage device storing a second fluid; and wherein the first fluid or the second fluid or both are configured to facilitate recovery of at least a portion of the sample from the sample carrier or facilitate transport of at least a portion of the sample from the sample introduction area to the mixing region or both.

In some embodiments, the first or second fluids comprise a buffer, and wherein the first or second fluids comprise a reagent configured to react with at least a portion of the biological sample, such as one or more salts e.g., magnesium.

In some embodiments, the first storage device and the second storage device are compressible, and wherein the first storage device and the second storage device are configured to release the first fluid and the second fluid, respectively, when compressed.

Some embodiments include a system for determining a wellness score for a user, animal, or product, the system comprising: a database configured to store a plurality of user, animal, or product profiles, each user, animal, or product profile comprising health information for a single user, animal, or product of a plurality of users, animals, or products and user, animal, or product identifying information, a testing device comprising the assay cartridge of any of the embodiments disclosed herein, the testing device configured to: accept the sample from the user, animal, or product, generate test results based on the sample, and store the generated test results in the user, animal, or product profile for the user, animal, or product in the database; a computing system configured to: generate the wellness score for the user, animal, or product the wellness score based on the health information stored in the user, animal, or product profile, the health information comprising the generated test results, and store the wellness score in the user, animal, or product profile in the database; a remote computing device configured to: obtain biometric or identifying information, such as QR coding, RFID coding, or bar coding, for the user, animal, or product, request the wellness score for the user, animal, or product from the database based on the user's, animal's, or product's biometric or identifying information, and receive the wellness score for the user, animal, or product based on the computing system determining that the user's, animal's, or product's biometric or identifying information matches the user's, animal's, or product's identifier, wherein the wellness score is compared to a threshold value to determine whether the user, animal, or product is permitted entry to a location and optionally providing or displaying a visually identifiable signal or character indicating that the wellness score is at or exceeds the threshold value.

In some embodiments, the health information further comprises one or more of health information records acquired from a medical professional, health survey information provided by the user, or contact tracing information.

In some embodiments, the user identifying information comprises one or more of an identifier for the user, biometrics information for the user, and username and password information for the user.

In some embodiments, the wellness score is representative of whether the user, animal, or product is likely to be infected by a pathogen comprising one or more of a fungus, mold, bacteria, a virus, or another microbe.

In some embodiments, the testing device comprises: a cartridge configured to receive the biological sample, and a reader device comprising: a cavity configured to receive the cartridge, a memory storing at least computer-readable instructions, a processor in communication with the memory, and an electrode interface in communication with the processor and in contact with the cartridge when the cartridge is inserted into the cavity.

In some embodiments, the cartridge comprises: an external portion; an internal portion configured to fit within the cavity of the reader device, the internal portion including an electrode interface configured to establish an electrical connection with the electrode interface of the reader device when the cartridge is inserted into the reader device; and a flow path configured to sealingly enclose a biological sample within the cartridge.

In some embodiments, the cartridge comprises: a sample receptacle; a cap having a closed configuration and an open configuration, wherein when the cap is in the open configuration, the sample receptacle is configured to receive a sample collection device, and wherein when the cap in the closed configuration, the sample receptacle is sealed; and, optionally a scraper formed inside the sample receptacle, the scraper configured to contact the sample collection device when the sample collection device is in the sample receptacle and facilitate collection of the biological sample.

In some embodiments, the cartridge comprises a retainer, wherein the retainer is configured to hold the sample collection device in place inside the sample receptacle, and wherein at least a portion of the biological sample is collected from the sample collection device.

In some embodiments, the cartridge comprises: a first storage device storing a first fluid; a second storage device storing a second fluid; and a sample mixing portion fluidically coupled to the first storage device and the second storage device, wherein the first fluid or the second fluid or both are configured to facilitate recovery of at least a portion of the biological sample from the sample collection device or facilitate transport of the biological sample to the sample mixing portion or both.

In some embodiments, the first or second fluids comprise a buffer, and wherein the first or second fluids comprise a reagent configured to react with at least a portion of the biological sample, such as one or more salts e.g., magnesium.

In some embodiments, the first storage device and the second storage device are compressible, and wherein the first storage device and the second storage device are configured to release the first fluid and the second fluid, respectively, when compressed.

In some embodiments, the biological sample is collected using a sample collection device, wherein the sample collection device comprises bristles or flock configured to collect the biological sample.

In some embodiments, the sample collection device comprises a stopper configured to abut an opening of the sample receptacle to prevent the sample collection device from entering further into the sample receptacle.

In some embodiments, the sample collection device comprises a marked section configured to indicate a position to break or cut the sample collection device after being inserted into the sample receptacle.

In some embodiments, the reader device further includes a communication module configured to communicatively connect to the computing system or the remote computing device.

In some embodiments, the remote computing device or the computing system is wirelessly connected to the reader device.

In some embodiments, the testing device, the computing system, and the remote computing device are connected by at least one of a wireless, wired, or hybrid network.

In some embodiments, the remote computing device comprises a biometric input device that obtains the biometric information for the user from the user.

In some embodiments, the biometric information comprises one or more of fingerprint information, facial recognition information, retinal scan information, hand geometry information, finger geometry information, palm vein information, ear geometry information, voice information, hand writing information, signature information, typing pattern recognition, biological sample recognition, or movement recognition.

Some embodiments also include a user device configured to: capture location information for the user; capture identification information for other user devices of other users that come within a threshold distance of the user; and store the location information and identification information in the user profile in the database.

Some embodiments include a system of any one of the embodiments disclosed herein for use in detecting a target agent.

In some embodiments, the target agent indicates presents of a mold, fungus, bacteria, a virus, or another microbe.

In some embodiments, the biological sample is obtained from a subject, such as a human or an animal, a product, such as a food or beverage, or an object, such as a high contact surface.

Some embodiments include a method of using the system of any one of the embodiments disclosed herein for determining the wellness score for the user, animal, or product.

Some embodiments include a method of determining a wellness score for a user, animal, or product via the system of any one of the embodiments disclosed herein, the method comprising: creating a user, animal, or product profile for a user, animal, or product in a database, the user, animal, or product profile comprising health information and user, animal, or product identifying information; depositing a sample obtained from the user, animal, or product into a sample receptacle of a testing device; generating test results based on the sample; storing the generated test results in the user, animal, or product profile for the user, animal, or product; generating the wellness score for the user, animal, or product the wellness score based on the health information stored in the user, animal, or product profile, the health information comprising the generated test results; storing the wellness score in the user, animal, or product profile in the database; obtaining biometric or identifying information for the user, animal, or product; requesting the wellness score for the user, animal, or product from the database based on the user's, animal's, or product's biometric or identifying information; receiving the wellness score for the user, animal, or product based on the computing system determining that the user's, animal's, or product's biometric or identifying information matches the user's, animal's, or product's identifier; and comparing the wellness score to a threshold value to determine whether the user, animal, or product is permitted entry to a location and optionally providing or displaying a visually identifiable signal or character indicating that the wellness score is at or exceeds the threshold value.

Some embodiments include a method of collecting and testing a biological sample for detecting a target agent, the method comprising: inserting a sample collection device in a sample receptacle of a cartridge; and inserting the cartridge into a cavity of a reader device, the cavity configured to receive the cartridge.

Some embodiments also include breaking or cutting the sample collection device such that a portion of the sample collection device having at least a portion of the biological sample remains inside the sample receptacle; and closing a cap of the cartridge, the cap being configured to seal the sample receptacle when in a closed configuration.

Some embodiments also include coupling the sample collection device with a retainer of the sample receptacle such that the sample collection device is held in place inside the sample receptacle.

In some embodiments, the cartridge comprises a first storage device and a second storage device, wherein the method further comprises: compressing the first storage device prior to the inserting the sample collection device in the sample receptacle to provide a fluid to said sample receptacle; removing the sample collection device from the sample receptacle; closing a cap of the cartridge, the cap configured to seal the sample receptacle when in a closed configuration; and compressing the second storage device.

In a first embodiment, an assay cartridge for containing a sample comprising a target agent for detection by a reader device comprises a cartridge body configured to be received by the reader device, and a cap configured to hold the sample carrier containing the sample. The cartridge body includes a test well containing an excitation electrode and a sensing electrode, wherein the test well is configured to contain at least a portion of the sample comprising the target agent undergoing an amplification process; a sample introduction area configured to receive a sample carrier containing the sample; and a fluid path fluidically coupling the sample introduction area to the test well. The cap is further configured to mechanically couple to the cartridge body, wherein mechanically coupling the cap to the cartridge body causes compression of a trapped volume of a fluid to drive at least a portion of the sample through the fluid path into the test well.

In some embodiments, the sample carrier comprises a capillary tube, and the cap comprises a retaining well having an interior diameter larger than an exterior diameter of the capillary tube; and a retaining structure disposed within the retaining well and configured to retain the capillary tube at a position spaced from a side interior wall and a rear interior wall of the retaining well to form at least one air channel fluidically coupled to an inner end of the capillary tube. In some embodiments, the cap further comprises a plunger disposed about at least a portion of the retaining well, and the sample introduction area of the cartridge body comprises a capillary tube receiving well configured to sealingly receive an outer end of the capillary tube to fluidically couple an inner lumen of the capillary tube to the fluid path when the cap is mechanically coupled to the cartridge body; and a plunger receiving well configured to sealingly receive the plunger when the cap is mechanically coupled to the cartridge body, wherein, as the cap is mechanically coupled to the cartridge body, the plunger compresses a volume of air within the plunger receiving well, such that the air flows through the air channel and forces the sample to travel into the fluid path of the cartridge body. In some embodiments, the cartridge body comprises a base and a translucent cover, the translucent cover comprising a planar surface defining one side of at least one of the test well and the fluid path. In some embodiments, the cartridge body further comprise a hollow plunger comprising an interior space fluidically coupled to the fluid path of the cartridge body, wherein the cap comprises a plunger receiving well configured to sealingly receive the hollow plunger, and, as the cap is mechanically coupled to the cartridge body, the plunger compresses a volume of air within the plunger receiving well, such that the air flows through the hollow plunger and forces the sample to travel into the fluid path of the cartridge body. In some embodiments, the cartridge body comprises at least a second test well containing an excitation electrode and a sensing electrode, and a second fluid path fluidically coupling the sample introduction area to the second test well, wherein the second test well is configured to contain at least a portion of the sample comprising the target agent undergoing an amplification process. In some embodiments, the cartridge body comprises a base and a printed circuit board (PCB), the PCB comprising a planar surface defining one side of at least one of the test well and the fluid path. In some embodiments, the PCB comprises a heating element configured to heat the test well. In some embodiments, the PCB comprises the excitation electrode and the sensing electrode. In some embodiments, the test well is configured to mix a reagent and the sample into a substantially evenly mixed test fluid. In some embodiments, the reagent comprises one or more dried and/or lyophilized reagents stored within the test well. In some embodiments, the cartridge body comprises a plurality of test wells, and at least a first test well of the plurality of test wells stores a reagent different from a reagent stored in a second test well of the plurality of test wells. In some embodiments, the cartridge body comprises a plurality of test wells, and at least two test wells of the plurality of test wells store the same reagent. In some embodiments, the cartridge body further comprises a mixing chamber positioned between the sample introduction area and the test well along the fluid path, the mixing chamber configured to mix a reagent and the sample into a substantially evenly mixed test fluid. In some embodiments, the reagent comprises one or more dried and/or lyophilized reagents stored within the mixing chamber. In some embodiments, the assay cartridge further comprises a first electrode interface including a first contact pad leading to the excitation electrode and a second contact pad leading to the sensing electrode. In some embodiments, the assay cartridge further comprises a gas-permeable, liquid-impermeable vent fluidically coupled to the test well. In some embodiments, the assay cartridge further comprises a machine-readable cartridge identifier printed thereon, the cartridge identifier associated with one or more test protocols. In some embodiments, the assay cartridge is a disposable single-use assay cartridge. In some embodiments, the trapped volume of a fluid comprises air.

In a second embodiment, a detection system for detecting a target agent comprises a reader device, an assay cartridge, and a power cartridge. The reader device includes a cavity configured to receive cartridges; a memory storing at least computer-readable instructions; a processor in communication with the memory; and an electrode interface in communication with the processor. The assay cartridge includes an external portion; an internal portion configured to fit within the cavity of the reader device, the internal portion including an electrode interface configured to establish an electrical connection with the electrode interface of the reader device when the assay cartridge is inserted into the reader device; and a flow path configured to sealingly enclose a fluid sample within the assay cartridge. The power cartridge includes an internal portion configured to fit within the cavity; and circuitry disposed at least partially on the internal portion and configured to establish an electrical connection with the electrode interface when the power cartridge is inserted into the reader device. Inserting the power cartridge into the cavity causes the reader device to power off, and removing the power cartridge from the cavity causes the reader device to power on.

In some embodiments, the reader device further includes a communication module configured to connect to a remote computing device executing a user interface application. In some embodiments, the remote computing device is wirelessly connected to the reader device. In some embodiments, the remote computing device is connected to the reader device by at least one of WiFi or Bluetooth. In some embodiments, the reader device does not include a user interface. In some embodiments, the reader device includes a visual status indicator on an exterior portion of the reader device. In some embodiments, the visual status indicator comprises one or more light emitting diodes. In some embodiments, the visual status indicator comprises a plurality of differently colored light emitting diodes. In some embodiments, the visual status indicator comprises a plurality of individually controllable light emitting diodes. In some embodiments, the visual status indicator comprises a ring of lights at least partially surrounding the cavity of the reader device. In some embodiments, the visual status indicator is configured to indicate at least one of a ready status, a testing status, a completed testing status, an error status, and a wireless pairing status.

In some embodiments, the assay cartridge or system is for use in detecting a target agent. In some embodiments, the target agent is a nucleic acid, preferably a nucleic acid of a pathogen. In some embodiments, the sample is a biological sample. In some embodiments, including any one of the embodiments disclosed herein, the biological sample is obtained from a subject, preferably a human or other animal, a plant, a food, soil, or a surface, or any combination thereof. In some embodiments, the biological sample is obtained by swabbing. In some embodiments, the subject is a human. In some embodiments, the subject is an animal. In some embodiments, the animal is a mammal, such as a dog, cat, rabbit, rodent, mouse, rat, hamster, guinea pig, or ferret. In some embodiments, the animal is not a mammal, such as a reptile, amphibian, fish, or bird. In some embodiments, the animal is a livestock animal, such as a cow, pig, chicken, turkey, duck, goose, quail, pigeon, sheep, goat, horse, donkey, mule, alpaca, llama, buffalo, camel, or ox, or any other animal raised for food or products. In some embodiments, the plant is a vegetable, fruit or legume, such as a carrot, lettuce, cabbage, spinach, broccoli, cauliflower, cucumber, zucchini, squash, pepper, potato, yam, asparagus, onion, shallot, garlic, herb, apple, pear, orange, lemon, lime, grapefruit, peach, plum, banana, mango, strawberry, raspberry, blueberry, kiwi, watermelon, cantaloupe, tomato, avocado, pea, or bean, or any other plant grown for food or products. In some embodiments, the food is any edible substance, such as meat or plant. In some embodiments, soil may refer to the earthen material that plants are cultivated in. In some embodiments, the surface is any surface that is suspected of harboring biological material, including pathogens. In some embodiments, the surface is a livestock pen or other living area. In some embodiments, the surface is found in a hospital. In some embodiments, the surface is any surface that has been in contact or proximity to a subject that has or is suspected of having a pathogen.

In some embodiments, a method of using the assay cartridge or system for detecting a target agent comprises contacting a biological sample with the assay cartridge or system; and detecting the presence and/or amount of the target agent. In some embodiments, the target agent is a nucleic acid, preferably a nucleic acid of a pathogen. In some embodiments, the target agent is a nucleic acid and the assay cartridge or system or method further comprises amplifying the nucleic acid, such as by Loop-Mediated Isothermal Amplification (LAMP) and measuring or analyzing a modulation of an electrical signal, such as impedance or capacitance, which is desirably compared to a control. In some embodiments, the LAMP is reverse transcription LAMP (RT-LAMP).

In some embodiments of the assay cartridge, system, or method, the assay cartridge is configured to be used in determining an impedance or a capacitance using three-terminal sensing or four-terminal sensing. In some embodiments of the assay cartridge, the test well further contains a third electrode. In some embodiments, the third electrode is disposed between the excitation electrode and the sensing electrode. In some embodiments, the test well further contains a fourth electrode. In some embodiments, the third electrode and the fourth electrode are disposed between the excitation electrode and the sensing electrode.

In another embodiment, an assay cartridge for analyzing a sample comprising a target agent is described. The assay cartridge comprises a cartridge body and a reagent blister. The cartridge body is configured to be received by a reader device. The cartridge body includes at least one test well containing an excitation electrode and a sensing electrode, wherein the at least one test well is configured to contain at least a portion of the sample comprising the target agent undergoing an amplification process, a sample introduction area configured to receive a sample carrier containing the sample, and a fluid path fluidically coupling the sample introduction area to the test well. The reagent blister is configured to hold a reagent to be mixed with the sample prior to the amplification process. The reagent blister is further configured to be ruptured when the cartridge body is inserted into the reader device. The rupturing of the reagent blister produces a force that mixes the reagent with the sample and drives at least a portion of the reagent and at least the portion of the sample through the fluid path to the at least one test well.

In another embodiment, a detection system for detecting a target agent is disclosed. The detection system comprises a reader device, an assay cartridge, and a mobile device. The reader devices include a cavity configured to receive cartridges, a memory storing at least computer-readable instructions, a processor in communication with the memory, a communication interface, and an electrode interface in communication with the processor and electrodes of the cartridges. The assay cartridge includes an external portion, an internal portion configured to fit within the cavity of the reader device, the internal portion including electrodes configured to establish an electrical connection with the electrode interface of the reader device when the assay cartridge is inserted into the reader device, a flow path configured to fluidically couple a sample introduction area of the assay cartridge to at least one test well of the assay cartridge, and a reagent store configured to store a reagent for mixing with a sample prior to conveying at least a portion of a mixture of the reagent and the sample to the at least one test well. The mobile device includes a data store storing at least computer-readable instructions for the mobile device, a hardware processor in communication with the memory, an interface for identifying a type of assay cartridge, and a wireless communication interface in communication with the processor. The mobile device is configured to identify the type of the assay cartridge and communicate parameters for an analysis of the sample by the reader device to the reader device via the wireless communication interface.

In another embodiment, a method for identifying a target in a sample is described. The method comprises depositing the sample into a sample receptacle of a disposable cartridge, inserting the disposable cartridge into a cartridge receptacle of an analyzer device, and rupturing a reagent blister containing at least one reagent. The method further comprises generating a mixture by mixing the at least one reagent with the sample, conveying at least a portion of the mixture to at least one testing well comprising at least one dried and/or lyophilized enzyme and/or a detection agent, such as a set of, primers, antibody or binding fragment thereof, increasing a temperature of the at least one testing well, and measuring an electrical characteristic of at least the portion of the mixture in the at least on testing well. Insertion of the disposable cartridge into the cartridge receptacle causes the rupturing of the reagent blister, the generating of the mixture, and the conveying of at least the portion of the mixture to the at least one testing well.

Some embodiments comprise an assay cartridge for containing a sample, which comprises a target agent for detection by a reader device, wherein the assay cartridge comprises a sample introduction area configured to receive a sample carrier containing the sample, a retention feature configured to accept and retain the sample carrier, a mixing region configured to mix the sample with a reagent to generate a sample mixture, at least one mixing object disposed in the mixing region and configured to move within the mixing region to enhance mixing of the sample with the reagent in response to a force applied to the mixing region, a test well containing an excitation electrode and a sensing electrode, wherein the test well is configured to contain at least a portion of the sample mixture undergoing an amplification process, and a fluid path fluidically coupling the sample introduction area to the mixing region and the mixing region to the test well.

In some embodiments, the retention feature comprises a latch or a securing component, which is configured to retain the sample carrier. In some embodiments, the retention feature comprises a closure configured to accept and retain a swab, which optionally, comprises a flange.

Some embodiments comprise a sample cartridge comprising a sample introduction area configured to receive a swab containing a sample, the sample introduction area comprising a swab retention feature, a test well comprising an excitation electrode and a sensing electrode, wherein the test well is configured to contain at least a portion of the sample mixture, and a fluid path fluidically coupling the sample introduction area to the test well.

In some embodiments, the swab retention feature comprises a latch or a securing component, which is configured to retain the swab. In some embodiments, the retention feature comprises a closure configured to accept and retain the swab, which optionally, comprises a flange.

In some embodiments, the swab retention feature comprises an o-ring configured to contact and hold the flange against the closure.

In some embodiments, the closure is made from or comprises a plastic. In some embodiments, the plastic comprises acrylic, polymethyl methacrylate, polycarbonate, polyethylene, polypropylene, polyethylene terephthalate, polyvinyl chloride, and/or acrylonitrile-butadiene-styrene. In some embodiments, the plastic comprises a polyethylene.

In some embodiments, the retention feature comprises an o-ring configured to contact the flange and hold the flange against the closure, wherein, the o-ring comprises an elastomer. In some embodiments, the elastomer has a hardness between Shore 0A and Shore 60A. For instance, in some embodiments, the elastomer has a hardness at least or equal to Shore 0A, 5A, 10A, 15A, 20A, 25A, 30A, 35A, 40A, 45A, 50A, 55A, or 60A or has a hardness that is within a range of hardness defined by any two of the aforementioned hardness values. In some embodiments, the elastomer comprises a santoprene. Preferred additional alternatives are set forth below.

1. An additional alternative comprises an assay cartridge for containing a sample comprising a target agent for detection by a reader device, the assay cartridge comprising: a cartridge body configured to be received by the reader device, the cartridge body including: a test well containing an excitation electrode and a sensing electrode, wherein the test well is configured to contain at least a portion of the sample comprising the target agent undergoing an amplification process; a sample introduction area configured to receive a sample carrier containing the sample; and a fluid path fluidically coupling the sample introduction area to the test well; and a cap configured to hold the sample carrier containing the sample, the cap further configured to mechanically couple to the cartridge body, wherein mechanically coupling the cap to the cartridge body causes compression of a trapped volume of a fluid to drive at least a portion of the sample through the fluid path into the test well.

2. The assay cartridge of alternative 1, wherein the sample carrier comprises a capillary tube, and wherein the cap comprises: a retaining well having an interior diameter larger than an exterior diameter of the capillary tube; and a retaining structure disposed within the retaining well and configured to retain the capillary tube at a position spaced from a side interior wall and a rear interior wall of the retaining well to form at least one air channel fluidically coupled to an inner end of the capillary tube.

3. The assay cartridge of alternative 2, wherein the cap further comprises a plunger disposed about at least a portion of the retaining well, and wherein the sample introduction area of the cartridge body comprises: a capillary tube receiving well configured to sealingly receive an outer end of the capillary tube to fluidically couple an inner lumen of the capillary tube to the fluid path when the cap is mechanically coupled to the cartridge body; and a plunger receiving well configured to sealingly receive the plunger when the cap is mechanically coupled to the cartridge body, wherein, as the cap is mechanically coupled to the cartridge body, the plunger compresses a volume of air within the plunger receiving well, such that the air flows through the air channel and forces the sample to travel into the fluid path of the cartridge body.

4. The assay cartridge of any one of alternatives 1-3, wherein the cartridge body comprises a base and a translucent cover, the translucent cover comprising a planar surface defining one side of at least one of the test wells and the fluid path.

5. The assay cartridge of alternative 1, wherein the cartridge body further comprise a hollow plunger comprising an interior space fluidically coupled to the fluid path of the cartridge body, wherein the cap comprises a plunger receiving well configured to sealingly receive the hollow plunger, and wherein, as the cap is mechanically coupled to the cartridge body, the plunger compresses a volume of air within the plunger receiving well, such that the air flows through the hollow plunger and forces the sample to travel into the fluid path of the cartridge body.

6. The assay cartridge of alternative 5, wherein the cartridge body comprises at least a second test well containing an excitation electrode and a sensing electrode, and a second fluid path fluidically coupling the sample introduction area to the second test well, wherein the second test well is configured to contain at least a portion of the sample comprising the target agent undergoing an amplification process.

7. The assay cartridge of any one of alternatives 5 and 6, wherein the cartridge body comprises a base and a printed circuit board (PCB), the PCB comprising a planar surface defining one side of at least one of the test wells and the fluid path.

8. The assay cartridge of alternative 7, wherein the PCB comprises a heating element configured to heat the test well.

9. The assay cartridge of any one of alternatives 7 and 8, wherein the PCB comprises the excitation electrode and the sensing electrode.

10. The assay cartridge of any one of alternatives 5-9, wherein the test well is configured to mix a reagent and the sample into a substantially evenly mixed test fluid.

11. The assay cartridge of alternative 10, wherein the reagent comprises one or more dried and/or lyophilized reagents stored within the test well.

12. The assay cartridge of alternative 11, wherein the cartridge body comprises a plurality of test wells, and wherein at least a first test well of the plurality of test wells stores a reagent different from a reagent stored in a second test well of the plurality of test wells.

13. The assay cartridge of any one of alternatives 11 and 12, wherein the cartridge body comprises a plurality of test wells, and wherein at least two test wells of the plurality of test wells store the same reagent.

14. The assay cartridge of any one of alternatives 1-13, wherein the cartridge body further comprises a mixing chamber positioned between the sample introduction area and the test well along the fluid path, the mixing chamber configured to mix a reagent and the sample into a substantially evenly mixed test fluid.

15. The assay cartridge of alternative 14, wherein the reagent comprises one or more dried and/or lyophilized reagents stored within the mixing chamber.

16. The assay cartridge of any one of alternatives 1-15, further comprising a first electrode interface including a first contact pad leading to the excitation electrode and a second contact pad leading to the sensing electrode.

17. The assay cartridge of any one of alternatives 1-16, further comprising a gas-permeable, liquid-impermeable vent fluidically coupled to the test well.

18. The assay cartridge of any one of alternatives 1-17, further comprising a machine-readable cartridge identifier printed thereon, the cartridge identifier associated with one or more test protocols.

19. The assay cartridge of any one of alternatives 1-18, wherein the assay cartridge is a disposable single-use assay cartridge.

20. The assay cartridge of any one of alternatives 1-19, wherein the trapped volume of a fluid comprises air.

21. A detection system for detecting a target agent, the system comprising: a reader device including: a cavity configured to receive cartridges; a memory storing at least computer-readable instructions; a processor in communication with the memory; and an electrode interface in communication with the processor; an assay cartridge including: an external portion; an internal portion configured to fit within the cavity of the reader device, the internal portion including an electrode interface configured to establish an electrical connection with the electrode interface of the reader device when the assay cartridge is inserted into the reader device; and a flow path configured to sealingly enclose a fluid sample within the assay cartridge; and a power cartridge including: an internal portion configured to fit within the cavity; and circuitry disposed at least partially on the internal portion and configured to establish an electrical connection with the electrode interface when the power cartridge is inserted into the reader device, wherein inserting the power cartridge into the cavity causes the reader device to power off, and wherein removing the power cartridge from the cavity causes the reader device to power on.

22. The system of alternative 21, wherein the reader device further includes a communication module configured to connect to a remote computing device executing a user interface application.

23. The system of alternative 22, wherein the remote computing device is wirelessly connected to the reader device.

24. The system of any one of alternatives 22 and 23, wherein the remote computing device is connected to the reader device by at least one of WiFi or Bluetooth.

25. The system of any one of alternatives 21-24, wherein the reader device does not include a user interface.

26. The system of any one of alternatives 21-25, wherein the reader device includes a visual status indicator on an exterior portion of the reader device.

27. The system of alternative 26, wherein the visual status indicator comprises one or more light emitting diodes.

28. The system of alternative 27, wherein the visual status indicator comprises a plurality of differently colored light emitting diodes.

29. The system of any one of alternatives 26-28, wherein the visual status indicator comprises a plurality of individually controllable light emitting diodes.

30. The system of any one of alternatives 26-29, wherein the visual status indicator comprises a ring of lights at least partially surrounding the cavity of the reader device.

31. The system of any one of alternatives 26-30, wherein the visual status indicator is configured to indicate at least one of a ready status, a testing status, a completed testing status, an error status, and a wireless pairing status.

32. The assay cartridge or system of any one of alternatives 1-31 for use in detecting a target agent.

33. The assay cartridge or system of alternative 32, wherein the target agent is a nucleic acid, preferably a nucleic acid of a pathogen.

34. The assay cartridge or system of anyone of alternatives 32 or 33, wherein the sample is a biological sample.

35. A method of using the assay cartridge or system of any one of alternatives 1-31 for detecting a target agent comprising: contacting a biological sample, with the assay cartridge or system of any one of alternatives 1-30; and detecting the presence and/or amount of the target agent.

36. The method of alternative 35, wherein the target agent is a nucleic acid, preferably a nucleic acid of a pathogen.

37. The assay cartridge or system of anyone of alternatives 32-34 or the method of any one of alternatives 35 or 36, wherein the target agent is a nucleic acid and the assay cartridge or system or method further comprises amplifying the nucleic acid, such as by Loop-Mediated Isothermal Amplification (LAMP) and measuring or analyzing a modulation of an electrical signal, such as impedance or capacitance, which is desirably compared to a control.

38. The assay cartridge, system, or method of any one of alternatives 1-37, wherein the assay cartridge is configured to be used in determining an impedance or a capacitance using three-terminal sensing or four-terminal sensing.

39. The assay cartridge of any one of alternatives 1-20, wherein the test well further contains a third electrode.

40. The assay cartridge of alternative 39, wherein the third electrode is disposed between the excitation electrode and the sensing electrode.

41. The assay cartridge of alternative 39, wherein the test well further contains a fourth electrode.

42. The assay cartridge of alternative 41, wherein the third electrode and the fourth electrode are disposed between the excitation electrode and the sensing electrode.

43. An assay cartridge for analyzing a sample comprising a target agent, the assay cartridge comprising: a cartridge body configured to be received by a reader device, the cartridge body including: at least one test well containing an excitation electrode and a sensing electrode, wherein the at least one test well is configured to contain at least a portion of the sample comprising the target agent undergoing an amplification process; a sample introduction area configured to receive a sample carrier containing the sample; and a fluid path fluidically coupling the sample introduction area to the test well; and a reagent blister configured to hold a reagent to be mixed with the sample prior to the amplification process, the reagent blister further configured to be ruptured when the cartridge body is inserted into the reader device, wherein the rupturing of the reagent blister produces a force that mixes the reagent with the sample and drives at least a portion of the reagent and at least the portion of the sample through the fluid path to the at least one test well.

44. A detection system for detecting a target agent, the system comprising: a reader device including: a cavity configured to receive cartridges; a memory storing at least computer-readable instructions; a processor in communication with the memory; a communication interface; and an electrode interface in communication with the processor and electrodes of the cartridges; an assay cartridge including: an external portion; an internal portion configured to fit within the cavity of the reader device, the internal portion including electrodes configured to establish an electrical connection with the electrode interface of the reader device when the assay cartridge is inserted into the reader device; a flow path configured to fluidically couple a sample introduction area of the assay cartridge to at least one test well of the assay cartridge; and a reagent store configured to store a reagent for mixing with a sample prior to conveying at least a portion of a mixture of the reagent and the sample to the at least one test well; and a mobile device including: a data store storing at least computer-readable instructions for the mobile device; a hardware processor in communication with the memory; an interface for identifying a type of assay cartridge; and a wireless communication interface in communication with the processor, wherein the mobile device is configured to identify the type of the assay cartridge and communicate parameters for an analysis of the sample by the reader device to the reader device via the wireless communication interface.

45. The system of alternative 44, wherein the reader device is further configured to generate test results comprising a determination whether the target agent is present in the sample.

46. The system of any one of alternatives 44 and 45, wherein the mobile device is further configured to display a prompt for one or more symptoms experienced by a patient that provides the sample and receive the one or more symptoms experienced by the patient.

47. The system of alternative 46, wherein the mobile device comprises a user interface configured to prompt for and receive the one or more symptoms.

48. The system of any one of alternatives 46 and 47, wherein the one or more symptoms are selected from a list or entered by the user.

49. The system of any one of alternatives 46-48, wherein the user interface is further configured to provide instructions for collecting the sample for testing, loading the sample into the assay cartridge, and inserting the assay cartridge into the reader device.

50. The system of any one of alternatives 46-49, wherein the mobile device is further configured to receive the one or more symptoms before, while, or after the reader device determines whether the target agent is present in the sample.

51. The system of any one of alternatives 46-50, wherein the reader device is further configured to analyze the test results and the one or more symptoms to diagnose whether the patient is suffering from an ailment.

52. The system of any one of alternatives 46-51, wherein each of the one or more symptoms has associated therewith a sliding scale value representative of a severity of the symptom.

53. The system of any one of alternatives 46-52, wherein the mobile device is further configured to allow the user to compare previous test results for the patient with current test results.

54. The system of any one of alternatives 46-53, wherein the mobile device is further configured to display, to the user, information from the reader device, the information comprising a time remaining before the test results are generated, an identifier of the reader device, and an identifier of the assay cartridge.

55. The system of any one of alternatives 44-54, wherein the mobile device is further configured to display, to the user, test results for the sample, any symptoms associated with the sample, an indication of the diagnosed ailment, and one or more of a recommended follow-up steps for the diagnosed ailment.

56. The system of any one of alternatives 51-55, wherein the mobile device is further configured to share electronically the test results, the one or more symptoms, or the diagnosed ailment with another entity.

57. The system of any one of alternatives 46-56, wherein the mobile device is further configured to determine that the patient is a carrier for a disease based on test results positive for the target agent and no reported symptoms.

58. The system of any one of alternatives 46-57, wherein at least one of the one or more symptoms is weighted higher than one or more other symptoms of the one or more symptoms.

59. The system of any one of alternatives 46-58, wherein a threshold number of the one or more symptoms, weighting of each of the one or more symptoms, and specific symptoms of the one or more symptoms used to diagnose the ailment is determined based on one or more metrics.

60. The system of alternative 59, wherein the one or more metrics is received from one or more of the Center for Disease Control (CDC) or a national organization that monitors illnesses.

61. The system of any one of alternatives 46-60, wherein the mobile device is further configured to generate a score indicator representative of a probability that the patient is ill.

62. The system of any one of alternatives 46-61, wherein the score indicator falls within a range of 0 to 100, where 0 is a low probability that the patient is ill and 100 is a high probability that the patient is ill.

63. The system of any one of alternatives 46-62, wherein the mobile device is further configured to identify an illness that the patient is suffering from based on negative test results for the target agent and the one or more symptoms of the patient.

64. The system of any one of alternatives 46-63, further comprising an aggregating device that aggregates information from multiple mobile devices, the multiple mobile devices comprising the mobile device, and wherein the mobile device is further configured to determine that the patient is ill based on the test results, symptoms, and the aggregated information from the multiple mobile devices.

65. The system of any one of alternatives 46-64, wherein the mobile device is further configured to automatically perform one or more actions based on a determination that the patient is ill.

66. The system of alternative 65, wherein the one or more actions comprises generating and sending an alert to one or more of the patient, to the user, to attending medical staff, to the CDC, and to family of the patient.

67. The system of alternative 66, wherein the alert comprises one or more of a phone call, a text message, an e-mail message, a push message, an audio message, a flashing indicator, or audible indicator.

68. The system of alternative 64, wherein the aggregating device is further configured to track illnesses over a geographic area based on information received from the multiple mobile devices.

69. The system of alternative 68, wherein the aggregating device is further configured to generate a heat map of the illnesses over the geographic area.

70. The system of any one of alternatives 68 and 69, wherein the aggregating device is further configured to track quantities of available vaccines or medications and to compare a quantity of available vaccines or medications with a quantity of illnesses to determine whether sufficient vaccines or medications are available to treat or prevent the spread of the illnesses.

71. The system of alternative 70, wherein the aggregating device is further configured to automatically generate a request to vaccine and/or medication suppliers to increase the quantity of available vaccines or medications when insufficient vaccines or medications are available.

72. The system of any one of alternatives 64-71, wherein the mobile device is further configured to display any information tracked or generated by the aggregating device.

73. The system of any one of alternatives 44-72, wherein the samples comprise a biological secretion.

74. The system of alternative 73, wherein the biological secretion comprises blood, mucus, or saliva.

75. A method for identifying a target in a sample, the method comprising: depositing the sample into a sample receptacle of a disposable cartridge; inserting the disposable cartridge into a cartridge receptacle of an analyzer device; rupturing a reagent blister containing at least one reagent; generating a mixture by mixing the at least one reagent with the sample; conveying at least a portion of the mixture to at least one testing well comprising at least one dried and/or lyophilized enzyme and/or a detection agent, such as a set of, primers, antibody or binding fragment thereof; increasing a temperature of the at least one testing well; and measuring an electrical characteristic of at least the portion of the mixture in the at least on testing well, wherein insertion of the disposable cartridge into the cartridge receptacle causes the rupturing of the reagent blister, the generating of the mixture, and the conveying of at least the portion of the mixture to the at least one testing well.

76. A method of detecting the presence and/or amount of a nucleic acid, preferably a nucleic acid from a pathogen, in a biological sample, comprising: contacting the biological sample with an assay cartridge of a detection system; amplifying the nucleic acid by Loop-Mediated Isothermal Amplification (LAMP) with a primer set, wherein the primer set comprises any combination of: one or more F3 primers, one or more B3 primers, one or more LF primers, one or more LB primers, one or more FIP primers, and one or more BIP primers, and wherein the primer set is specific for a genome region of the pathogen; measuring or analyzing a modulation of an electrical signal, such as impedance or capacitance, for the duration of the amplification with the primer set using the detection system, thereby detecting successful amplification of the nucleic acid with the primer set; and determining the presence and/or amount of the nucleic acid in the biological sample.

77. The method of alternative 76, further comprising determining the biological sample as comprising the pathogen, or the genome region thereof.

78. The method of any one of alternatives 76 and 77, further comprising mixing the biological sample with a reagent and the primer set in the assay cartridge prior to the amplifying step, wherein the reagent is used for LAMP and comprises a strand-displacing DNA polymerase and optionally a reverse transcriptase.

79. The method of alternative 78, wherein the reagent or the primer set, or both, have been dried and/or lyophilized prior to mixing with the biological sample.

80. The method of any one of alternatives 75-79, wherein the detection system comprises a heater and the amplifying step comprises incubating the biological sample at, optionally a first temperature for a first time period, and one or more second temperatures for one or more second time periods.

81. The method of alternative 80, wherein the first temperature is 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., or 55° C., or about 20° C., about 21° C., about 22° C., about 23° C., about 24° C., or about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., or about 55° C., or any temperature within a range defined by any two of the aforementioned temperatures, preferably 23° C. or about 23° C. or 50° C. or about 50° C., and the first time period is 1, 2, 3, 4, 5, 6, 7, 8, 9, 10, 11, 12, 13, 14, or 15 minutes, or about 1, about 2, about 3, about 4, about 5, about 6, about 7, about 8, about 9, about 10, about 11, about 12, about 13, about 14, or about 15 minutes, or any time period within a range defined by any two of the aforementioned times, preferably 5 to 10 minutes or about 5 to about 10 minutes.

82. The method of one of alternatives 80 or 81, wherein each of the one or more second temperatures is 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., or 70° C., or about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C., about 60° C., about 61° C., about 62° C., about 63° C., about 64° C., about 65° C., about 66° C., about 67° C., about 68° C., about 69° C., or about 70° C., or any temperature within a range defined by any two of the aforementioned temperatures, preferably 50° C. or about 50° C., and each of the one or more second time periods is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes, or about 1, about 2, about 3, about 4, about 5, about 6, about 7, about 8, about 9, about 10, about 11, about 12, about 13, about 14, about 15 minutes, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 51, about 52, about 53, about 54, about 55, about 56, about 57, about 58, about 59, or about 60 minutes, or any time period within a range defined by any two of the aforementioned times, preferably 10 minutes or about 10 minutes.

83. The method of any one of alternatives 80-82, further comprising incubating the biological sample at a third temperature for a third time period, preferably wherein the first temperature is performed at room temperature (e.g., 23° C. or about 23° C.) for a time period sufficient to allow the dried down reagents to rehydrate (e.g., 10 minutes or about 10 minutes); the second temperature is performed at 50° C. or about 50° C. for 10 minutes or about 10 minutes, and the amplification period is then conducted at 65° C. or about 65° C.

84. The method of alternative 83, wherein the third temperature is 60° C., 61° C., 62° C., 63° C., 64° C., 65° C., 66° C., 67° C., 68° C., 69° C., or 70° C., or about 60° C., about 61° C., about 62° C., about 63° C., about 64° C., about 65° C., about 66° C., about 67° C., about 68° C., about 69° C., or about 70° C., or any temperature within a range defined by any two of the aforementioned temperatures, preferably 65° C. or about 65° C., and the third time period is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes, or about 1, about 2, about 3, about 4, about 5, about 6, about 7, about 8, about 9, about 10, about 11, about 12, about 13, about 14, about 15 minutes, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 51, about 52, about 53, about 54, about 55, about 56, about 57, about 58, about 59, or about 60 minutes, or any time period within a range defined by any two of the aforementioned times, preferably 30 minutes or about 30 minutes.

85. The method of any one of alternatives 76-84, wherein the pathogen is a microbe, fungus, mold, virus or bacteria.

86. The method of any one of alternatives 76-85, wherein the pathogen is SARS-CoV-2 and wherein: the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 1, 7, 13, 19; the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 6, 12, 18, 25; the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 3, 9, 15, 21; the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 5, 11, 17, 23, 24; the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 2, 8, 14, 20; and the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 4, 10, 16, 22.

87. The method of alternative 86, wherein the primer set comprises sequences having at least 85%, 86%, 87%, 88%, 89%, 90%, 91%, 92%, 93%, 94%, 95%, 96%, 97%, 98%, 99%, or 100% homology to the sequences of SEQ ID NOs: 1-6.

88. The method of alternative 86 or 87, wherein the primer set consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 1-6.

89. The method of any one of alternatives 76-85, wherein the pathogen is Hepatitis A Virus and wherein: the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 26, 27, 34, 35, 43; the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 32, 33, 41, 42, 48, 49; the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 28, 36, 44; the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 31, 39, 40, 47; the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 29, 37, 45; and the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 30, 38, 46.

90. The method of alternative 89, wherein the primer set comprises sequences having at least 85%, 86%, 87%, 88%, 89%, 90%, 91%, 92%, 93%, 94%, 95%, 96%, 97%, 98%, 99%, or 100% homology to the sequences of SEQ ID NOs: 26-33.

91. The method of alternatives 89 or 90, wherein the primer set consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 26-33.

92. The method of any one of alternatives 76-85, wherein the pathogen is Influenza A Virus Subtype H1N1 and wherein: the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 50, 51, 59; the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 52, 53, 60, 61; the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 54, 62, 63, 64; the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 55, 56, 65; the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 57, 66; and the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 58, 67.

93. The method of alternative 92, wherein the primer set comprises sequences having at least 85%, 86%, 87%, 88%, 89%, 90%, 91%, 92%, 93%, 94%, 95%, 96%, 97%, 98%, 99%, or 100% homology to the sequences of SEQ ID NOs: 50-58.

94. The method of alternative 92 or 93, wherein the primer set consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 50-58.

95. The method of any one of alternatives 76-85, wherein the pathogen is Human Immunodeficiency Virus-1 and wherein: the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 68, 69, 77, 89, 90; the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 75, 76, 87, 88, 96; the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 70, 71, 78, 79, 80, 91; the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 74, 84, 85, 86, 94, 95; the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 72, 81, 92; and the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 73, 82, 83, 93.

96. The method of alternative 95, wherein the primer set comprises sequences having at least 85%, 86%, 87%, 88%, 89%, 90%, 91%, 92%, 93%, 94%, 95%, 96%, 97%, 98%, 99%, or 100% homology to the sequences of SEQ ID NOs: 68-76.

97. The method of alternative 95 or 96, wherein the primer set consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 68-76.

98. The method of any one of alternatives 76-85, wherein the pathogen is Respiratory Syncytial Virus A and wherein: the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 97, 98, 108; the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 99, 100, 109; the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 101, 102, 110; the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 103, 111; the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 104, 106; and the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 105, 107.

99. The method of alternative 98, wherein the primer set comprises sequences having at least 85%, 86%, 87%, 88%, 89%, 90%, 91%, 92%, 93%, 94%, 95%, 96%, 97%, 98%, 99%, or 100% homology to the sequences of SEQ ID NOs: 97-105.

100. The method of alternative 98 or 99, wherein the primer set consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 97-105.

101. The method of any one of alternatives 76-85, wherein the pathogen is Respiratory Syncytial Virus B and wherein: the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 112, 113, 125; the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 114, 126; the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 115, 116, 117, 127; the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 118, 119, 120, 128; the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 121, 123; and the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 122, 124.

102. The method of alternative 101, wherein the primer set comprises sequences having at least 85%, 86%, 87%, 88%, 89%, 90%, 91%, 92%, 93%, 94%, 95%, 96%, 97%, 98%, 99%, or 100% homology to the sequences of SEQ ID NOs: 112-122.

103. The method of alternative 101 or 102, wherein the primer set consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 112-122.

104. The method of any one of alternatives 76-85, wherein the pathogen is *Escherichia coli*, the genome region comprises at least one of Z3276, Stx1, or Stx2 genes and wherein: the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 129, 135, 141, 147, 153, 159; the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 134, 140, 146, 152, 158, 164; the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 131, 137, 143, 149, 155, 161; the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 133, 139, 145, 151, 157, 163; the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 130, 136, 142, 148, 154, 160; and the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 132, 138, 144, 150, 156, 162.

105. The method of alternative 104, wherein the primer set comprises sequences having at least 85%, 86%, 87%, 88%, 89%, 90%, 91%, 92%, 93%, 94%, 95%, 96%, 97%, 98%, 99%, or 100% homology to the sequences of SEQ ID NOs: 135-140, 141-146, 159-164.

106. The method of alternative 104 or 105, wherein the primer set consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 135-140, 141-146, 159-164.

107. The method of any one of alternatives 76-85, wherein the pathogen is *Listeria monocytogenes* and wherein: the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NO: 165; the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NO: 166; the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NO: 167; the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 172, 173; the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 168, 169; and the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 170, 171.

108. The method of alternative 107, wherein the primer set comprises sequences having at least 85%, 86%, 87%, 88%, 89%, 90%, 91%, 92%, 93%, 94%, 95%, 96%, 97%, 98%, 99%, or 100% homology to the sequences of SEQ ID NOs: 165-168, 170, 172.

109. The method of alternative 107 or 108, wherein the primer set consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 165-168, 170, 172.

110. The method of any one of alternatives 76-85, wherein the pathogen is *Mycobacterium tuberculosis* and wherein: the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 174, 180, 186; the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 175, 181, 187; the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 178, 184, 190; the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 179, 185, 191; the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 176, 182, 188; and the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 177, 183, 189.

111. The method of alternative 110, wherein the primer set comprises sequences having at least 85%, 86%, 87%, 88%, 89%, 90%, 91%, 92%, 93%, 94%, 95%, 96%, 97%, 98%, 99%, or 100% homology to the sequences of SEQ ID NOs: 186-191.

112. The method of alternative 110 or 111, wherein the primer set consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 186-191.

113. The method of any one of alternatives 76-85, wherein the pathogen is *Salmonella enterica* and wherein: the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 192, 196; the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 203, 204; the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 194, 198, 199; the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 201, 202; the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 193, 197; and the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 195, 200.

114. The method of alternative 113, wherein the primer set comprises sequences having at least 85%, 86%, 87%, 88%, 89%, 90%, 91%, 92%, 93%, 94%, 95%, 96%, 97%, 98%, 99%, or 100% homology to the sequences of SEQ ID NOs: 196-204.

115. The method of alternative 113 or 114, wherein the primer set consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 196-204.

116. The method of any one of alternatives 76-115, wherein the biological sample is obtained from a subject, preferably a human or other animal, a plant, a food, soil, or a surface, or any combination thereof.

117. The method of alternative 116, wherein the biological sample is obtained by swabbing.

118. The method of alternative 116 or 117, wherein the animal is a livestock animal.

119. The method of any one of alternatives 116-118, wherein the plant is a vegetable, fruit, or legume.

120. The method of any one of alternatives 116-119, wherein the surface is a livestock pen or found in a hospital.

121. The method of any one of alternatives 76-120, wherein the method is multiplexed to detect the presence and/or amount of more than one nucleic acid, preferably more than one nucleic acid from more than one pathogen, comprising amplifying the more than one nucleic acid with more than one primer sets, each of which is specific for a genome region of the more than one pathogen, and determining the presence and/or amount of the more than one nucleic acid in the biological sample.

122. The F3, B3, LF, LB, FIP, or BIP primers of any one of alternatives 86-121.

123. A primer comprising the sequence having at least 85%, 86%, 87%, 88%, 89%, 90%, 91%, 92%, 93%, 94%, 95%, 96%, 97%, 98%, 99%, or 100% homology to any one of the sequences of SEQ ID NOs: 1-204.

124. The primer set of any one of alternatives 87, 88, 90, 91, 93, 94, 96, 97, 99, 100, 102, 103, 105, 106, 108, 109, 111, 112, 114, or 115.

125. The primer of alternative 123 or the primer set of alternative 124 for use in a nucleic acid amplification, such as Loop-Mediated Isothermal Amplification (LAMP), preferably, in a system, wherein an electrical signal, such as impedance or capacitance, is evaluated to detect the presence, absence, or amount of one or more amplified nucleic acids.

126. A system for determining a wellness score for a user, animal, or product, the system comprising: a database configured to store a plurality of user, animal, or product profiles, each user, animal, or product profile comprising health information for a single user, animal, or product of a plurality of users, animals, or products and user, animal, or product identifying information, a testing device configured to: accept a sample from the user, animal, or product, generate test results based on the sample, and store the generated test results in the user, animal, or product profile for the user, animal, or product in the database; a computing system configured to: generate the wellness score for the user, animal, or product the wellness score based on the health information stored in the user, animal, or product profile, the health information comprising the generated test results, and store the wellness score in the user, animal, or product profile in the database; a remote computing device configured to: obtain biometric or identifying information, such as QR coding, RFID coding, or bar coding, for the user, animal, or product, request the wellness score for the user, animal, or product from the database based on the user's, animal's, or product's biometric or identifying information, and receive the wellness score for the user, animal, or product based on the computing system determining that the user's, animal's, or product's biometric or identifying information matches the user's, animal's, or product's identifier, wherein the wellness score is compared to a threshold value to determine whether the user, animal, or product is permitted entry to a location.

127. The system of alternative 126, wherein the health information further comprises one or more of health information records acquired from a medical professional, health survey information provided by the user, or contact tracing information.

128. The system of any one of alternatives 126 and 127, wherein the user identifying information comprises one or more of an identifier for the user, biometrics information for the user, and username and password information for the user.

129. The system of any one of alternatives 126-128, wherein the wellness score is representative of whether the user, animal, or product is likely to be infected by a pathogen comprising one or more of a mold, fungus, bacteria, a virus, or another microbe.

130. The system of any one of alternatives 126-129, wherein the testing device comprises: a cartridge configured to receive the biological sample, and a reader device comprising: a cavity configured to receive the cartridge, a memory storing at least computer-readable instructions, a processor in communication with the memory, and an electrode interface in communication with the processor and in contact with the cartridge when the cartridge is inserted into the cavity.

131. The system of alternative 130, wherein the cartridge comprises: an external portion; an internal portion configured to fit within the cavity of the reader device, the internal portion including an electrode interface configured to establish an electrical connection with the electrode interface of the reader device when the cartridge is inserted into the reader device; and a flow path configured to sealingly enclose a biological sample within the cartridge.

132. The system of any one of alternatives 130 and 131, wherein the reader device further includes a communication module configured to communicatively connect to the computing system or the remote computing device.

133. The system of any one of alternatives 130-132, wherein the remote computing device or the computing system is wirelessly connected to the reader device.

134. The system of any one of alternatives 126-133, wherein the testing device, the computing system, and the remote computing device are connected by at least one of a wireless, wired, or hybrid network.

135. The system of any one of alternatives 126-134, wherein the remote computing device comprises a biometric input device that obtains the biometric information for the user from the user.

136. The system of any one of alternatives 126-135, wherein the biometric information comprises one or more of fingerprint information, facial recognition information, retinal scan information, hand geometry information, finger geometry information, palm vein information, ear geometry information, voice information, hand writing information, signature information, typing pattern recognition, biological sample recognition, or movement recognition.

137. The system of alternative 126, further comprising a user device configured to: capture location information for the user; capture identification information for other user devices of other users that come within a threshold distance of the user; and store the location information and identification information in the user profile in the database.

138. The system or testing device of any one of alternatives 126-137 for use in detecting a target agent.

139. The system of alternatives 138, wherein the target agent indicates presents of a mold, fungus, bacteria, a virus, or another microbe.

140. The system any one of alternatives 126-139, wherein the biological sample is obtained from a subject, such as a human or an animal, a product, such as a food or beverage, or an object, such as a high contact surface.

141. A method of using the system of any one of alternatives 126-140 for determining the wellness score for the user, animal, or product.

142. A method of determining a wellness score for a user, animal, or product the method comprising: creating a user, animal, or product profile for a user, animal, or product in a database, the user, animal, or product profile comprising health information and user, animal, or product identifying information; depositing a sample obtained from the user, animal, or product into a sample receptacle of a testing device; generating test results based on the sample; storing the generated test results in the user, animal, or product profile for the user, animal, or product; generating the wellness score for the user, animal, or product the wellness score based on the health information stored in the user, animal, or product profile, the health information comprising the generated test results; storing the wellness score in the user, animal, or product profile in the database; obtaining biometric or identifying information for the user, animal, or product; requesting the wellness score for the user, animal, or product from the database based on the user's, animal's, or product's biometric or identifying information at a remote computing device; receiving the wellness score for the user, animal, or product based on the computing system determining that the user's, animal's, or product's biometric or identifying information matches the user's, animal's, or product's identifier; and comparing the wellness score to a threshold value to determine whether the user, animal, or product is permitted entry to a location and optionally providing or displaying a visually identifiable signal or character indicating that the wellness score is at or exceeds the threshold value.

143. The method of alternative 142, wherein the health information further comprises one or more of health information records acquired from a medical professional, health survey information provided by the user, or contact tracing information.

144. The method of any one of alternatives 142 and 143, wherein the user identifying information comprises one or more of an identifier for the user, biometrics information for the user, and username and password information for the user.

145. The method of any one of alternatives 142-144, wherein the wellness score is representative of whether the user, animal, or product is likely to be infected by a pathogen comprising one or more of a mold, fungus, bacteria, a virus, or another microbe.

146. The method of any one of alternatives 142-145, wherein the testing device, the computing system, and the remote computing device are connected by at least one of a wireless, wired, or hybrid network.

147. The method of any one of alternatives 142-146, wherein the remote computing device comprises a biometric input device that obtains the biometric information for the user from the user.

148. The method of any one of alternatives 142-147, wherein the biometric information comprises one or more of fingerprint information, facial recognition information, retinal scan information, hand geometry information, finger geometry information, palm vein information, ear geometry information, voice information, hand writing information, signature information, typing pattern recognition, biological sample recognition, or movement recognition.

149. The method of alternative 142, further comprising: capturing location information for the user; capturing identification information for other user devices of other users that come within a threshold distance of the user; and storing the location information and identification information in the user profile in the database.

150. The method of any one of alternatives 142-149, further comprising detecting a target agent.

151. The method of alternative 150, wherein the target agent indicates presents of a mold, fungus, bacteria, a virus, or another microbe.

152. The method any one of alternatives 142-151, wherein the biological sample is obtained from a subject, such as a human or an animal, a product, such as a food or beverage, or an object, such as a high contact surface.

153. A system for determining a wellness score of an individual, comprising: a database configured to: create a data structure for a profile associated with the individual and configured to store information in the data structure, the information comprising one or more of health information for the individual, contact tracing for the individual, health surveys completed by the individual, temperature measurements for the individual, authentication information for the individual (can include biometric information), test results for the individual, or a wellness score for the individual; obtain information associated with the individual from a source; store the obtained information in the profile data structure; calculate the wellness score for the individual based on an algorithm that accounts for the information stored in the profile data structure, wherein the algorithm applies different weights to the different information in the profile data structure when calculating the wellness score; and update the data structure based on the calculated wellness score; a testing device configured to test a biological sample from the individual for a pathogen and provide results to the test to the database for the profile associated with the individual; and a site device configured to: access the profile for the individual from the database; compare the wellness score with a threshold score; and indicate that the individual is granted access to a location based on the wellness score being greater than or exceeding the threshold score and optionally providing or displaying a visually identifiable signal or character indicating that the wellness score is at or exceeds the threshold value.

154. An assay cartridge for containing a sample comprising a target agent for detection by a reader device, the assay cartridge comprising: a sample introduction area configured to receive a sample carrier containing the sample; a mixing region configured to mix the sample with a reagent to generate a sample mixture; at least one mixing object disposed in the mixing region and configured to move within the mixing region to enhance mixing of the sample with the reagent in response to a force applied to the mixing region; a test well containing an excitation electrode and a sensing electrode, wherein the test well is configured to contain at least a portion of the sample mixture undergoing an amplification process; and a fluid path fluidically coupling the sample introduction area to the mixing region and the mixing region to the test well.

155. The assay cartridge of alternative 154, wherein the force applied is the result of one or more of a magnetic field generator, such as an electromagnet, a vibration generator, a sonic generator, and physical movement.

156. The assay cartridge of any of alternatives 154 and 155, wherein the reagent comprises one of a dry reagent or a liquid reagent.

157. The assay cartridge of any of alternatives 154-156, wherein the at least one mixing object comprises at least one magnetic bead and wherein the force is exerted by a first magnetic field generated by a first magnet, such as an electromagnet, disposed in the reader near a first location of the mixing region when the assay cartridge is inserted into the reader.

158. The assay cartridge of alternative 157, wherein the force is further exerted by a second magnetic field generated by a second magnet, such as an electromagnet disposed in the reader near a second location of the mixing region when the assay cartridge is inserted into the reader.

159. The assay cartridge of alternative 158, further comprising a control circuit configured to switch between which of the first magnet and the second magnetic is exerting the force at a given moment.

160. The assay cartridge of any of alternatives 154-159, wherein the force is exerted by a movable force generator disposed in the reader.

161. The assay cartridge of any of alternatives 154-160, wherein one or more of the sample introduction area, the mixing region, the test well, and the fluid path introduces an agent that reduces effects of one or more inhibitors that exist in the sample.

162. The assay cartridge of alternative 161, wherein the one or more of the sample introduction area, the mixing region, the test well, and the fluid path are coated with the agent.

163. The assay cartridge of any of alternatives 161 and 162, wherein the reagent includes the agent that reduces effects of the inhibitors.

164. The assay cartridge of any of alternatives 161-163, wherein the one or more inhibitors that exist in the sample comprise one or more of lactoferrin, lysozyme, nucleases, DNAses, or RNases and wherein the agent is configured to improve a detection sensitivity of testing performed with the assay cartridge and the reader by inhibiting said inhibitors.

165. The assay cartridge of any of alternatives 161-164, wherein the agent comprises one or more of an antibody, aptamer, competitive binding protein, or a proteinase. In some embodiments, a chemical reaction is used to generate heat, which inactivates the proteinase after it has digested proteins in the sample.

166. An assay cartridge for containing a sample comprising a target agent for detection by a reader device, the assay cartridge comprising: a sample introduction area configured to receive a sample carrier containing the sample; a mixing region configured to mix the sample with a reagent to generate a sample mixture; a test well containing an excitation electrode and a sensing electrode, wherein the test well is configured to contain at least a portion of the sample mixture undergoing an amplification process; and a fluid path fluidically coupling the sample introduction area to the mixing region and the mixing region to the test well, wherein one or more of the sample introduction area, the mixing region, the test well, and the fluid path introduces an agent that reduces effects of one or more inhibitors that exist in the sample.

167. The assay cartridge of alternative 166, wherein the one or more of the sample introduction area, the mixing region, the test well, and the fluid path are coated with the agent.

168. The assay cartridge of any of alternatives 166 and 167, wherein the reagent includes the agent that reduces effects of the one or more inhibitors.

169. The assay cartridge of any of alternatives 166-168, wherein the one or more inhibitors that exist in the sample comprise one or more of lactoferrin, lysozyme, nucleases, DNAses or RNases and wherein the agent is configured to improve a detection sensitivity of testing performed with the assay cartridge and the reader.

170. The assay cartridge of any of alternatives 166-169, wherein the agent comprises one or more of an antibody, aptamer, competitive binding protein, or a proteinase. In some embodiments, a chemical reaction is used to generate heat, which inactivates the proteinase after it has digested proteins in the sample.

171. The assay cartridge of any of alternatives 166-170, further comprising at least one mixing object disposed in the mixing region and configured to move within the mixing region to enhance mixing of the sample with the reagent in response to a force applied to the mixing region.

172. The assay cartridge of alternative 171, wherein the force applied is the result of one or more of a magnetic field generator, a vibration generator, a sonic generator, and physical movement.

173. The assay cartridge of any of alternatives 171 and 172, wherein the reagent comprises one of a dry reagent or a liquid reagent.

174. The assay cartridge of any of alternatives 171-173, wherein the at least one mixing object comprises at least one magnetic bead and wherein the force is exerted by a first magnetic field generated by a first magnet, such as an electromagnet disposed in the reader near a first location of the mixing region when the assay cartridge is inserted into the reader.

175. The assay cartridge of alternative 174, wherein the force is further exerted by a second magnetic field generated by a second magnet, such as an electromagnet disposed in the reader near a second location of the mixing region when the assay cartridge is inserted into the reader.

176. The assay cartridge of alternative 175, further comprising a control circuit configured to switch between which of the first magnet and the second magnetic is exerting the force at a given moment.

177. The assay cartridge of any of alternatives 154-176, further comprising the sample carrier comprising: a body configured to hold the sample before depositing the sample into the assay cartridge; a tip fluidically coupled to the body and configured to fit into the sample introduction area of the assay cartridge, wherein the sample held in the body can be ejected from the sample carrier via the tip; and a membrane disposed between the body and the tip and configured to prevent molecules in the sample that exceed a threshold size from being ejected from the body via the tip.

178. The assay cartridge of alternative 177, wherein the sample carrier further comprises a gel filtration component, a resin, size-exclusion resin, bead, or matrix, such as a filter or molecular weight filter, configured to trap or retain salt compounds in the sample such that the salt compounds are not ejected from the body via the tip.

179. The assay cartridge of any of alternatives 177 and 178, wherein the gel filtration component comprises one of a gel filtration bead bed or a gel filtration matrix or a membrane, such as a molecular weight cut-off membrane.

180. The assay cartridge of any of alternatives 177-179, wherein the sample carrier further comprises a buffer component configured to assist in extracting the target agent from the sample.

181. The assay cartridge of alternative 180, wherein the buffer component comprises one of an elution buffer or a lysis buffer.

182. The assay cartridge of any of alternatives 177-181, wherein the sample carrier further comprises a plunger component configured to apply a force to the sample in the body and cause the sample to pass through the membrane and the tip and into the sample introduction area of the assay cartridge.

183. A system for detecting a target agent in a sample using an assay cartridge and a reader, the system comprising: the assay cartridge, comprising: a sample introduction area configured to receive a sample carrier containing the sample; and the sample carrier for depositing the sample into the assay cartridge, the sample carrier comprising: a body configured to hold the sample before depositing the sample into the assay cartridge; a tip fluidically coupled to the body and configured to fit into the sample introduction area of the assay cartridge, wherein the sample held in the body can be ejected from the sample carrier via the tip; and a membrane disposed between the body and the tip and configured to prevent molecules in the sample that exceed a threshold size from being ejected from the body via the tip.

184. The system of alternative 183, wherein the sample carrier further comprises a gel filtration component, a resin, size-exclusion resin, bead, or matrix, such as a filter or size-exclusion filter configured to trap or retain salt compounds in the sample such that the salt compounds are not ejected from the body via the tip.

185. The system of any of alternatives 183 and 184, wherein the gel filtration component comprises one of a gel filtration bead bed or a gel filtration matrix or a membrane, such as a molecular weight cut-off membrane.

186. The system of any of alternatives 183-185, wherein the sample carrier further comprises a buffer component configured to assist in extracting the target agent from the sample.

187. The system of any of alternatives 183-186, wherein the buffer component comprises one of an elution buffer or a lysis buffer.

188. The system of any of alternatives 183-187, wherein the sample carrier further comprises a plunger component configured to apply a force to the sample in the body and cause the sample to pass through the membrane and the tip and into the sample introduction area of the assay cartridge.

189. The system of any of alternatives 183-188, wherein the assay cartridge further comprises: a mixing region configured to mix the sample with a reagent to generate a sample mixture; at least one mixing object disposed in the mixing region and configured to move within the mixing region to enhance mixing of the sample with the reagent in response to a force applied to the mixing region; a test well containing an excitation electrode and a sensing electrode, wherein the test well is configured to contain at least a portion of the sample mixture undergoing an amplification process; and a fluid path fluidically coupling the sample introduction area to the mixing region and the mixing region to the test well.

190. The system of alternative 189, wherein the force applied is the result of one or more of a magnetic field generator, a vibration generator, a sonic generator, and physical movement.

191. The system of any of alternatives 189 and 190, wherein the reagent comprises one of a dry reagent or a liquid reagent.

192. The system of any of alternatives 189-191, wherein the at least one mixing object comprises at least one magnetic bead and wherein the force is exerted by a first magnetic field generated by a first magnet, such as an electromagnet disposed in the reader near a first location of the mixing region when the assay cartridge is inserted into the reader.

193. The system of alternative 192, wherein the force is further exerted by a second magnetic field generated by a second magnet, such as an electromagnet disposed in the reader near a second location of the mixing region when the assay cartridge is inserted into the reader.

194. The system of alternative 193, further comprising a control circuit configured to switch between which of the first magnet and the second magnetic is exerting the force at a given moment.

195. The system of any of alternatives 189-194, wherein the force is exerted by a movable force generator disposed in the reader.

196. The system of any of alternatives 189-195, wherein one or more of the sample introduction area, the mixing region, the test well, and the fluid path introduces an agent that reduces effects of one or more inhibitors that exist in the sample.

197. The system of alternative 196, wherein the one or more of the sample introduction area, the mixing region, the test well, and the fluid path are coated with the agent.

198. The system of any of alternatives 196 and 197, wherein the reagent includes the agent that reduces effects of the one or more inhibitors.

199. The system of any of alternatives 196-198, wherein the one or more inhibitors that exist in the sample comprise one or more of lactoferrin, lysozyme, nucleases, DNAses or RNases and wherein the agent is configured to improve a detection sensitivity of testing performed with the assay cartridge and the reader.

200. The system of any of alternatives 196-199, wherein the agent comprises one or more of an antibody or a proteinase. In some embodiments, a chemical reaction is used to generate heat, which inactivates the proteinase after it has digested proteins in the sample.

201. The system of any of alternatives 183-188, wherein the assay cartridge further comprises: a mixing region configured to mix the sample with a reagent to generate a sample mixture; a test well containing an excitation electrode and a sensing electrode, wherein the test well is configured to contain at least a portion of the sample mixture undergoing an amplification process; and a fluid path fluidically coupling the sample introduction area to the mixing region and the mixing region to the test well, wherein one or more of the sample introduction area, the mixing region, the test well, and the fluid path introduces an agent that reduces effects of one or more inhibitors that exist in the sample.

202. The system of alternative 201, wherein the one or more of the sample introduction area, the mixing region, the test well, and the fluid path are coated with the agent.

203. The system of any of alternatives 201 and 202, wherein the reagent includes the agent that reduces effects of the one or more inhibitors.

204. The system of any of alternatives 201-203, wherein the inhibitors that exist in the sample comprise one or more of lactoferrin, lysozyme, nucleases, DNAses or RNases and wherein the agent is configured to improve a detection sensitivity of testing performed with the assay cartridge and the reader.

205. The system of any of alternatives 201-204, wherein the agent comprises one or more of an antibody or a proteinase. In some embodiments, a chemical reaction is used to generate heat, which inactivates the proteinase after it has digested proteins in the sample.

206. The system of any of alternatives 201-205, further comprising at least one mixing object disposed in the mixing region and configured to move within the mixing region to enhance mixing of the sample with the reagent in response to a force applied to the mixing region.

207. The system of alternative 206, wherein the force applied is the result of one or more of a magnetic field generator, a vibration generator, a sonic generator, and physical movement.

208. The system of any of alternatives 206 and 207, wherein the reagent comprises one of a dry reagent or a liquid reagent.

209. The system of any of alternatives 206-208, wherein the at least one mixing object comprises at least one magnetic bead and wherein the force is exerted by a first magnetic field generated by a first magnet, such as an electromagnet disposed in the reader near a first location of the mixing region when the assay cartridge is inserted into the reader.

210. The system of alternative 209, wherein the force is further exerted by a second magnetic field generated by a second magnet, such as an electromagnet disposed in the reader near a second location of the mixing region when the assay cartridge is inserted into the reader.

211. The system of alternative 210, further comprising a control circuit configured to switch between which of the first magnet and the second magnetic is exerting the force at a given moment.

212. A system for determining a wellness score for a user, animal, or product, the system comprising: a database configured to store a plurality of user, animal, or product profiles, each user, animal, or product profile comprising health information for a single user, animal, or product of a plurality of users, animals, or products and user, animal, or product identifying information, a testing device comprising the assay cartridge of any of alternatives 153-182, the testing device configured to: accept the sample from the user, animal, or product, generate test results based on the sample, and store the generated test results in the user, animal, or product profile for the user, animal, or product in the database; a computing system configured to: generate the wellness score for the user, animal, or product the wellness score based on the health information stored in the user, animal, or product profile, the health information comprising the generated test results, and store the wellness score in the user, animal, or product profile in the database; a remote computing device configured to: obtain biometric or identifying information, such as QR coding, RFID coding, or bar coding, for the user, animal, or product, request the wellness score for the user, animal, or product from the database based on the user's, animal's, or product's biometric or identifying information, and receive the wellness score for the user, animal, or product based on the computing system determining that the user's, animal's, or product's biometric or identifying information matches the user's, animal's, or product's identifier, wherein the wellness score is compared to a threshold value to determine whether the user, animal, or product is permitted entry to a location and optionally providing or displaying a visually identifiable signal or character indicating that the wellness score is at or exceeds the threshold value.

213. The system of alternative 212, wherein the health information further comprises one or more of health information records acquired from a medical professional, health survey information provided by the user, or contact tracing information.

214. The system of any one of alternatives 212 and 213, wherein the user identifying information comprises one or more of an identifier for the user, biometrics information for the user, and username and password information for the user.

215. The system of any one of alternatives 212-214, wherein the wellness score is representative of whether the user, animal, or product is likely to be infected by a pathogen comprising one or more of a mold, fungus, bacteria, a virus, or another microbe.

216. The system of any one of alternatives 212-215, wherein the testing device comprises: a cartridge configured to receive the biological sample, and a reader device comprising: a cavity configured to receive the cartridge, a memory storing at least computer-readable instructions, a processor in communication with the memory, and an electrode interface in communication with the processor and in contact with the cartridge when the cartridge is inserted into the cavity.

217. The system of alternative 216, wherein the cartridge comprises: an external portion; an internal portion configured to fit within the cavity of the reader device, the internal portion including an electrode interface configured to establish an electrical connection with the electrode interface of the reader device when the cartridge is inserted into the reader device; and a flow path configured to sealingly enclose a biological sample within the cartridge.

218. The system of any one of alternatives 216 and 217, wherein the reader device further includes a communication module configured to communicatively connect to the computing system or the remote computing device.

219. The system of any one of alternatives 216-218, wherein the remote computing device or the computing system is wirelessly connected to the reader device.

220. The system of any one of alternatives 212-219, wherein the testing device, the computing system, and the remote computing device are connected by at least one of a wireless, wired, or hybrid network.

221. The system of any one of alternatives 212-220, wherein the remote computing device comprises a biometric input device that obtains the biometric information for the user from the user.

222. The system of any one of alternatives 212-221, wherein the biometric information comprises one or more of fingerprint information, facial recognition information, retinal scan information, hand geometry information, finger geometry information, palm vein information, ear geometry information, voice information, hand writing information, signature information, typing pattern recognition, biological sample recognition, or movement recognition.

223. The system of any one of alternatives 212-222, further comprising a user device configured to: capture location information for the user; capture identification information for other user devices of other users that come within a threshold distance of the user; and store the location information and identification information in the user profile in the database.

224. The system of any one of alternatives 212-223 for use in detecting a target agent.

225. The system of alternative 224, wherein the target agent indicates presents of a mold, fungus, bacteria, a virus, or another microbe.

226. The system any one of alternatives 212-225, wherein the biological sample is obtained from a subject, such as a human or an animal, a product, such as a food or beverage, or an object, such as a high contact surface.

227. A method of using the system of any one of alternatives 212-226 for determining the wellness score for the user, animal, or product.

228. A method of determining a wellness score for a user, animal, or product the method comprising: creating a user, animal, or product profile for a user, animal, or product in a database, the user, animal, or product profile comprising health information and user, animal, or product identifying information; depositing a sample obtained from the user, animal, or product into a sample receptacle of a testing device comprising the assay cartridge of any of alternatives 154-182; generating test results based on the sample; storing the generated test results in the user, animal, or product profile for the user, animal, or product; generating the wellness score for the user, animal, or product the wellness score based on the health information stored in the user, animal, or product profile, the health information comprising the generated test results; storing the wellness score in the user, animal, or product profile in the database; obtaining biometric or identifying information for the user, animal, or product; requesting the wellness score for the user, animal, or product from the database based on the user's, animal's, or product's biometric or identifying information; receiving the wellness score for the user, animal, or product based on the computing system determining that the user's, animal's, or product's biometric or identifying information matches the user's, animal's, or product's identifier; and comparing the wellness score to a threshold value to determine whether the user, animal, or product is permitted entry to a location and optionally providing or displaying a visually identifiable signal or character indicating that the wellness score is at or exceeds the threshold value.

229. A system for determining a wellness score of an individual, comprising: a database configured to: create a data structure for a profile associated with the individual and configured to store information in the data structure, the information comprising one or more of health information for the individual, contact tracing for the individual, health surveys completed by the individual, temperature measurements for the individual, authentication information for the individual (can include biometric information), test results for the individual, or a wellness score for the individual; obtain information associated with the individual from a source; store the obtained information in the profile data structure; calculate the wellness score for the individual based on an algorithm that accounts for the information stored in the profile data structure, wherein the algorithm applies different weights to the different information in the profile data structure when calculating the wellness score; and update the data structure based on the calculated wellness score; a testing device comprising the assay cartridge of any of alternatives 154-82 and configured to test a biological sample from the individual for a pathogen and provide results to the test to the database for the profile associated with the individual; and a site device configured to: access the profile for the individual from the database; compare the wellness score with a threshold score; and indicate that the individual is granted access to a location based on the wellness score being greater than or exceeding the threshold score and optionally providing or displaying a visually identifiable signal or character indicating that the wellness score is at or exceeds the threshold value.

230. A method of determining a wellness score for a user, animal, or product via the system of any one of alternatives 193-211, the method comprising: creating a user, animal, or product profile for a user, animal, or product in a database, the user, animal, or product profile comprising health information and user, animal, or product identifying information; depositing a sample obtained from the user, animal, or product into a sample receptacle of a testing device; generating test results based on the sample; storing the generated test results in the user, animal, or product profile for the user, animal, or product; generating the wellness score for the user, animal, or product the wellness score based on the health information stored in the user, animal, or product profile, the health information comprising the generated test results; storing the wellness score in the user, animal, or product profile in the database; obtaining biometric or identifying information for the user, animal, or product; requesting the wellness score for the user, animal, or product from the database based on the user's, animal's, or product's biometric or identifying information; receiving the wellness score for the user, animal, or product based on the computing system determining that the user's, animal's, or product's biometric or identifying information matches the user's, animal's, or product's identifier; and comparing the wellness score to a threshold value to determine whether the user, animal, or product is permitted entry to a location and optionally providing or displaying a visually identifiable signal or character indicating that the wellness score is at or exceeds the threshold value.

231. A method of improving a limit of detection of a nucleic acid by Loop-Mediated Isothermal Amplification (LAMP) with a primer set, comprising: amplifying a nucleic acid by LAMP with a primer set at a first temperature of between 23° C. and 55° C., and then at a second temperature of 60° C. to 70° C., wherein the primer set is specific for a genomic region of a pathogen; and measuring or analyzing a modulation of an electrical signal, such as impedance or capacitance, for the duration of the amplification with the primer set using a detection system, thereby detecting successful amplification of the nucleic acid with the primer set; and determining the presence of the nucleic acid in the biological sample, wherein a limit of detection of the nucleic acid is improved compared to performing LAMP only at the second temperature.

232. A method of improving a limit of detection of a nucleic acid by Loop-Mediated Isothermal Amplification (LAMP) with a primer set, comprising: amplifying a nucleic acid by LAMP with a primer set at a first temperature of between 23° C. and 55° C., preferably 50° C., and then at a second temperature of 60° C. to 70° C., preferably 65° C., optionally wherein the amplification at the first temperature is for 5, 6, 7, 8, 9, 10, 11, 12, 13, 14, or 15 minutes.

233. A method of improving a limit of detection of a nucleic acid by Loop-Mediated Isothermal Amplification (LAMP) with a primer set, comprising amplifying a nucleic acid by LAMP with a primer set at more than one temperature.

234. The method of any one of alternatives 231 to 233, wherein the primer set is the primer set of any alternative described above.

235. The method of any one of alternatives 231 to 234, wherein the nucleic acid is from a pathogen selected from the group consisting of SARS-CoV-2, hepatitis A virus, Influenza A virus subtype H1N1, human immunodeficiency virus-1, respiratory syncytial virus A, respiratory syncytial virus B, *Escherichia coli, Listeria monocytogenes, Mycobacterium tuberculosis*, and *Salmonella enterica*, or any combination thereof.

236. An assay cartridge for containing a sample comprising a target agent for detection by a reader device, the assay cartridge comprising:

a sample introduction area configured to receive a sample carrier containing the sample, comprising a retention feature configured to accept and retain the sample carrier;

a mixing region configured to mix the sample with a reagent to generate a sample mixture;

at least one mixing object disposed in the mixing region and configured to move within the mixing region to enhance mixing of the sample with the reagent in response to a force applied to the mixing region;

a test well comprising an excitation electrode and a sensing electrode, wherein the test well is configured to contain at least a portion of the sample mixture undergoing an amplification process; and a fluid path fluidically coupling the sample introduction area to the mixing region and the mixing region to the test well.

237. The assay cartridge of alternative 236, wherein the retention feature comprises a latch or closure.

238. The assay cartridge of alternative 236, wherein the retention feature comprises a closure configured to accept and retain the sample carrier comprising a swab, optionally, further comprising a flange.

239. The assay cartridge of alternative 238, wherein the closure comprises a plastic.

240. The assay cartridge of alternative 239, wherein the plastic comprises a polyethylene.

241. The assay cartridge of alternative 238, wherein the retention feature comprises an o-ring configured to contact the flange and hold the flange against the closure.

242. The assay cartridge of alternative 241, wherein the o-ring comprises an elastomer.

243. The assay cartridge of alternative 242, wherein the elastomer has a hardness between Shore 0A and Shore 60A.

244. The assay cartridge of alternative 242, wherein the elastomer comprises a santoprene.

245. A sample cartridge comprising:

a sample introduction area configured to receive a swab containing a sample, comprising a swab retention feature;

a test well comprising an excitation electrode and a sensing electrode, wherein the test well is configured to contain at least a portion of the sample mixture; and a fluid path fluidically coupling the sample introduction area to the test well.

246. The sample cartridge of alternative 245, the swab retention feature comprising a latch or closure configured to accept and retain the swab.

247. The sample cartridge of alternative 245, the swab retention feature comprising a closure configured to accept and retain the swab.

248. The sample cartridge of alternative 247, wherein the closure comprises a plastic.

249. The sample cartridge of alternative 248, wherein the plastic comprises a polyethylene.

250. The sample cartridge of alternative 247, the swab retention feature comprising an o-ring configured to contact and hold the flange against the closure.

251. The sample cartridge of alternative 250, wherein the o-ring comprises an elastomer.

252. The sample cartridge of alternative 251, wherein the elastomer has a hardness between Shore 0A and Shore 60A.

253. The sample cartridge of alternative 252, wherein the elastomer comprises a santoprene.

Additional embodiments disclosed herein are methods of detecting the presence and/or amount of a nucleic acid in a biological sample. In some embodiments, the nucleic acid is a nucleic acid from a pathogen, such as the DNA or RNA genome, or a fragment or derivative thereof, of the pathogen. The methods may include contacting the biological sample with any one of the assay cartridges or detection systems disclosed herein, amplifying the nucleic acid by loop-mediated isothermal amplification (LAMP) with a primer set, measuring or analyzing a modulation of an electrical signal for the duration of the amplification with the primer set using the assay cartridge or detection system disclosed herein, thereby detecting successful amplification of the nucleic acid with the primer set, and determining the presence and/or amount of the nucleic acid in the biological sample. In some embodiments, the biological sample is contacted with an assay cartridge that is part of a detection system. In some embodiments, the primer set comprises one or more F3 primers, one or more B3 primers, one or more LF primers, one or more LB primers, one or more FIP primers, and one or more BIP primers used for LAMP. In some embodiments, the primer set, and/or the constituent primers, are specific for a genome region of the pathogen. In some embodiments, the electrical signal that is measured or analyzed is impedance or capacitance. In some embodiments, the presence and/or amount of the nucleic acid in the biological sample allows for determination of the presence and/or amount of the pathogen, or the genome region thereof, in the biological sample. In some embodiments, the nucleic acid is RNA, and the LAMP is reverse transcription LAMP (RT-LAMP). In some embodiments, the subject is a mammal. In some embodiments, the subject is a human.

In some embodiments, any one of the assay cartridges or detection systems disclosed herein comprises a heater. The heater can be used to keep any one of the biological samples, primers, and reagents at a constant temperature during the amplification by LAMP. In some embodiments, the amplifying step comprises incubating the biological sample at, optionally a first temperature for a first time period, and at least a second temperature for a second time period. In some embodiments, the amplifying step further comprises incubating the biological sample at a third temperature for a third time period. In some embodiments, the amplifying step comprises incubating the biological sample at, optionally a first temperature for a first time period, and one or more additional temperatures for one or more additional time periods (e.g., a second temperature, a third temperature, a fourth temperature, a fifth temperature, and/or a sixth temperature or more for a second, third, fourth, fifth, sixth, and/or more time periods). The incubation at these temperatures for these time periods enables robust and rapid reverse transcription of RNA and/or LAMP amplification of the nucleic acid in the biological sample with the primer sets described herein.

In some embodiments, the primer sets, and the one or more F3 primers, one or more B3 primers, one or more LF primers, one or more LB primers, one or more FIP primers, and one or more BIP primers, are designed, configured or selected to be not only specific towards a genome region of a pathogen but also to amplify said specific genome region more efficiently than other primer sets (e.g., more rapidly, exhibiting a faster time to detection of a positive amplification and/or with greater specificity). In some embodiments, the pathogen is a virus or bacteria. In some embodiments, the pathogen is SARS-CoV-2, hepatitis A virus, Influenza A virus subtype H1N1, human immunodeficiency virus-1, respiratory syncytial virus A, respiratory syncytial virus B, *Escherichia coli, Listeria monocytogenes, Mycobacterium tuberculosis, Salmonella enterica*, or any combination thereof. In some embodiments, the primer sets comprise a functional set of LAMP primers (e.g. one or more of each of an F3 primer, a B3 primer, LF primer, LB primer, FIP primer, and BIP primer) selected from sequences having at least 85%, 86%, 87%, 88%, 89%, 90%, 91%, 92%, 93%, 94%, 95%, 96%, 97%, 98%, 99%, or 100% homology of SEQ ID NOs: 1-204. In some embodiments, the primers specific for SARS-CoV-2 comprise sequences selected from sequences having at least 85%, 86%, 87%, 88%, 89%, 90%, 91%, 92%, 93%, 94%, 95%, 96%, 97%, 98%, 99%, or 100% homology to SEQ ID NOs: 1-25. In a non-limiting embodiment, a primer set specific for SARS-CoV-2 comprises, consists essentially of, or consists of sequences having at least 85%, 86%, 87%, 88%, 89%, 90%, 91%, 92%, 93%, 94%, 95%, 96%, 97%, 98%, 99%, or 100% homology to SEQ ID NOs: 1-6. In some embodiments, the primers specific for hepatitis A virus comprise sequences selected from sequences having at least 85%, 86%, 87%, 88%, 89%, 90%, 91%, 92%, 93%, 94%, 95%, 96%, 97%, 98%, 99%, or 100% homology to SEQ ID NOs: 26-49. In a non-limiting embodiment, a primer set specific for hepatitis A virus comprises, consists essentially of, or consists of sequences having at least 85%, 86%, 87%, 88%, 89%, 90%, 91%, 92%, 93%, 94%, 95%, 96%, 97%, 98%, 99%, or 100% homology to SEQ ID NOs: 26-33. In some embodiments, the primers specific for influenza A virus subtype H1N1 comprise sequences selected from sequences having at least 85%, 86%, 87%, 88%, 89%, 90%, 91%, 92%, 93%, 94%, 95%, 96%, 97%, 98%, 99%, or 100% homology to SEQ ID NOs: 50-67. In a non-limiting embodiment, a primer set specific for influenza A virus subtype H1N1 comprises, consists essentially of, or consists of sequences having at least 85%, 86%, 87%, 88%, 89%, 90%, 91%, 92%, 93%, 94%, 95%, 96%, 97%, 98%, 99%, or 100% homology to SEQ ID NOs: 50-58. In some embodiments, the primers specific for HIV-1 comprise sequences selected from sequences having at least 85%, 86%, 87%, 88%, 89%, 90%, 91%, 92%, 93%, 94%, 95%, 96%, 97%, 98%, 99%, or 100% homology to SEQ ID NOs: 68-96. In a non-limiting embodiment, a primer set specific for HIV-1 comprises, consists essentially of, or consists of sequences having at least 85%, 86%, 87%, 88%, 89%, 90%, 91%, 92%, 93%, 94%, 95%, 96%, 97%, 98%, 99%, or 100% homology to SEQ ID NOs: 68-76. In some embodiments, the primers specific for respiratory syncytial virus A comprise sequences selected from sequences having at least 85%, 86%, 87%, 88%, 89%, 90%, 91%, 92%, 93%, 94%, 95%, 96%, 97%, 98%, 99%, or 100% homology to SEQ ID NOs: 97-111. In a non-limiting embodiment, a primer set specific for respiratory syncytial virus A comprises, consists essentially of, or consists of sequences having at least 85%, 86%, 87%, 88%, 89%, 90%, 91%, 92%, 93%, 94%, 95%, 96%, 97%, 98%, 99%, or 100% homology to SEQ ID NOs: 97-105. In some embodiments, the primers specific for respiratory syncytial virus B comprise sequences selected from sequences having at least 85%, 86%, 87%, 88%, 89%, 90%, 91%, 92%, 93%, 94%, 95%, 96%, 97%, 98%, 99%, or 100% homology to SEQ ID NOs: 112-128. In a non-limiting embodiment, a primer set specific for respiratory syncytial virus B comprises, consists essentially of, or consists of sequences having at least 85%, 86%, 87%, 88%, 89%, 90%, 91%, 92%, 93%, 94%, 95%, 96%, 97%, 98%, 99%, or 100% homology to SEQ ID NOs: 112-122. In some embodiments, the primers specific for *E. coli* (i.e. the pathogenic genes Z3276, Stx1 A, or Stx1 B) comprise sequences selected from sequences having at least 85%, 86%, 87%, 88%, 89%, 90%, 91%, 92%, 93%, 94%, 95%, 96%, 97%, 98%, 99%, or 100% homology to SEQ ID NOs: 129-164. In a non-limiting embodiment, a primer set specific for *E. coli* comprises, consists essentially of, or consists of sequences having at least 85%, 86%, 87%, 88%, 89%, 90%, 91%, 92%, 93%, 94%, 95%, 96%, 97%, 98%, 99%, or 100% homology to SEQ ID NOs: 135-140, 141-146, 159-164. In some embodiments, the primers specific for *L. monocytogenes* comprise sequences selected from sequences having at least 85%, 86%, 87%, 88%, 89%, 90%, 91%, 92%, 93%, 94%, 95%, 96%, 97%, 98%, 99%, or 100% homology to SEQ ID NOs: 165-173. In a non-limiting embodiment, a primer set specific for *L. monocytogenes* comprises, consists essentially of, or consists of sequences having at least 85%, 86%, 87%, 88%, 89%, 90%, 91%, 92%, 93%, 94%, 95%, 96%, 97%, 98%, 99%, or 100% homology to SEQ ID NOs: 165-168, 170, 172. In some embodiments, the primers specific for *M. tuberculosis* comprise sequences selected from sequences having at least 85%, 86%, 87%, 88%, 89%, 90%, 91%, 92%, 93%, 94%, 95%, 96%, 97%, 98%, 99%, or 100% homology to SEQ ID NOs: 174-191. In a non-limiting embodiment, a primer set specific for *M. tuberculosis* comprises, consists essentially of, or consists of sequences having at least 85%, 86%, 87%, 88%, 89%, 90%, 91%, 92%, 93%, 94%, 95%, 96%, 97%, 98%, 99%, or 100% homology to SEQ ID NOs: 186-191. In some embodiments, the primers specific for *S. enterica* comprise sequences selected from sequences having at least 85%, 86%, 87%, 88%, 89%, 90%, 91%, 92%, 93%, 94%, 95%, 96%, 97%, 98%, 99%, or 100% homology to SEQ ID NOs: 192-204. In a non-limiting embodiment, a primer set specific for *S. enterica* comprises, consists essentially of, or consists of sequences having at least 85%, 86%, 87%, 88%, 89%, 90%, 91%, 92%, 93%, 94%, 95%, 96%, 97%, 98%, 99%, or 100% homology to SEQ ID NOs: 196-204.

Also disclosed in some embodiments are the primers and/or primer sets, or compositions thereof, provided herein with sequences having at least 85%, 86%, 87%, 88%, 89%, 90%, 91%, 92%, 93%, 94%, 95%, 96%, 97%, 98%, 99%, or 100% homology to SEQ ID NOs: 1-204. These primer sets can be used in a nucleic acid amplification, such as Loop-Mediated Isothermal Amplification (LAMP), preferably, in a system, wherein an electrical signal, such as impedance or capacitance, is evaluated to detect the presence, absence, or amount of one or more amplified nucleic acids.

Additional embodiments disclosed herein comprise assay cartridges for containing a sample comprising a target agent for detection by a reader device. The assay cartridges comprise a sample introduction area configured to receive a sample carrier containing the sample, a mixing region configured to mix the sample with a reagent to generate a sample mixture, at least one mixing object disposed in the mixing region and configured to move within the mixing region to enhance mixing of the sample with the reagent in response to a force applied to the mixing region, a test well containing an excitation electrode and a sensing electrode, wherein the test well is configured to contain at least a portion of the sample mixture undergoing an amplification process, and a fluid path fluidically coupling the sample introduction area to the mixing region and the mixing region to the test well.

In some embodiments, the force applied is the result of one or more of a magnetic field generator (for example, a magnet or electromagnet), a vibration generator, a sonic generator, and physical movement. In some embodiments, the reagent comprises one of a dry reagent or a liquid reagent. In some embodiments, the at least one mixing object comprises at least one magnetic bead and wherein the force is exerted by a first magnetic field generated by a first magnet, such as an electromagnet disposed in the reader near a first location of the mixing region when the assay cartridge is inserted into the reader. In some embodiments, the force is further exerted by a second magnetic field generated by a second magnet, such as an electromagnet disposed in the reader near a second location of the mixing region when the assay cartridge is inserted into the reader. In some embodiments, the assay cartridges further comprise a control circuit configured to switch between which of the first magnet and the second magnetic is exerting the force at a given moment. In some embodiments, the force is exerted by a movable force generator disposed in the reader. In some embodiments, one or more of the sample introduction area, the mixing region, the test well, and the fluid path introduces an agent that reduces effects of one or more inhibitors that exist in the sample. In some embodiments, the one or more of the sample introduction area, the mixing region, the test well, and the fluid path are coated with the agent. In some embodiments, the reagent includes the agent that reduces effects of the one or more inhibitors. In some embodiments, the one or more inhibitors that exist in the sample comprise one or more of lactoferrin, lysozyme, nuclease, DNAse or RNases and wherein the agent is configured to improve a detection sensitivity of testing performed with the assay cartridge and the reader. In some embodiments, the agent comprises one or more of an antibody or a proteinase. In some embodiments, a chemical reaction is used to generate heat, which inactivates the proteinase after it has digested proteins in the sample.

Additional embodiments disclosed herein comprise assay cartridges for containing a sample comprising a target agent for detection by a reader device. The assay cartridges comprise: a sample introduction area configured to receive a sample carrier containing the sample; a mixing region configured to mix the sample with a reagent to generate a sample mixture; a test well containing an excitation electrode and a sensing electrode, wherein the test well is configured to contain at least a portion of the sample mixture undergoing an amplification process; and a fluid path fluidically coupling the sample introduction area to the mixing region and the mixing region to the test well, wherein one or more of the sample introduction area, the mixing region, the test well, and the fluid path introduces an agent that reduces effects of one or more inhibitors that exist in the sample.

In some embodiments, the one or more of the sample introduction area, the mixing region, the test well, and the fluid path are coated with the agent. In some embodiments, the reagent includes the agent that reduces effects of the one or more inhibitors. In some embodiments, the inhibitors that exist in the sample comprise one or more of lactoferrin, lysozyme, nucleases, DNAses or RNases and wherein the agent is configured to improve a detection sensitivity of testing performed with the assay cartridge and the reader by inhibiting these inhibitors. In some embodiments, the agent comprises one or more of an antibody, aptamer, competitive binding protein or a proteinase. In some embodiments, a chemical reaction is used to generate heat, which inactivates the proteinase after it has digested proteins in the sample. In some embodiments, the assay cartridges further comprise at least one mixing object disposed in the mixing region and configured to move within the mixing region to enhance mixing of the sample with the reagent in response to a force applied to the mixing region. In some embodiments, the force applied is the result of one or more of a magnetic field generator, a vibration generator, a sonic generator, and physical movement. In some embodiments, the reagent comprises one of a dry reagent or a liquid reagent. In some embodiments, the at least one mixing object comprises at least one magnetic bead and wherein the force is exerted by a first magnetic field generated by a first magnet, such as an electromagnet disposed in the reader near a first location of the mixing region when the assay cartridge is inserted into the reader. In some embodiments, the force is further exerted by a second magnetic field generated by a second magnet, such as an electromagnet disposed in the reader near a second location of the mixing region when the assay cartridge is inserted into the reader. In some embodiments, the assay cartridges further comprise a control circuit configured to switch between which of the first magnet and the second magnetic is exerting the force at a given moment. In some embodiments, the assay cartridges further comprise the sample carrier comprising: a body configured to hold the sample before depositing the sample into the assay cartridge; a tip fluidically coupled to the body and configured to fit into the sample introduction area of the assay cartridge, wherein the sample held in the body can be ejected from the sample carrier via the tip; and a membrane disposed between the body and the tip and configured to prevent molecules in the sample that exceed a threshold size from being ejected from the body via the tip. In some embodiments, the sample carrier further comprises a gel filtration component, resin, size-exclusion resin, membrane, or filter, such as a size exclusion filter configured to trap or retain salt compounds in the sample such that the salt compounds are not ejected from the body via the tip. In some embodiments, the gel filtration component comprises one of a gel filtration bead bed or a gel filtration matrix. In some embodiments, the sample carrier further comprises a buffer component configured to assist in extracting the target agent from the sample. In some embodiments, the buffer component comprises one of an elution buffer or a lysis buffer. In some embodiments, the sample carrier further comprises a plunger component configured to apply a force to the sample in the body and cause the sample to pass through the membrane and the tip and into the sample introduction area of the assay cartridge.

Additional embodiments disclosed herein comprise systems for detecting a target agent in a sample using an assay cartridge and a reader. The systems comprise the assay cartridge, comprising: a sample introduction area configured to receive a sample carrier containing the sample; and the sample carrier for depositing the sample into the assay cartridge, the sample carrier comprising: a body configured to hold the sample before depositing the sample into the assay cartridge; a tip fluidically coupled to the body and configured to fit into the sample introduction area of the assay cartridge, wherein the sample held in the body can be ejected from the sample carrier via the tip; and a membrane disposed between the body and the tip and configured to prevent molecules in the sample that exceed a threshold size from being ejected from the body via the tip.

In some embodiments, the sample carrier further comprises a gel filtration, resin, or membrane component configured to trap or retain salt compounds in the sample such that the salt compounds are not ejected from the body via the tip. In some embodiments, the gel filtration component comprises one of a gel filtration bead bed or a gel filtration matrix. In some embodiments, the sample carrier further comprises a buffer component configured to assist in extracting the target agent from the sample. In some embodiments, the buffer component comprises one of an elution buffer or a lysis buffer. In some embodiments, the sample carrier further comprises a plunger component configured to apply a force to the sample in the body and cause the sample to pass through the membrane and the tip and into the sample introduction area of the assay cartridge. In some embodiments, the assay cartridge further comprises: a mixing region configured to mix the sample with a reagent to generate a sample mixture; at least one mixing object disposed in the mixing region and configured to move within the mixing region to enhance mixing of the sample with the reagent in response to a force applied to the mixing region; a test well containing an excitation electrode and a sensing electrode, wherein the test well is configured to contain at least a portion of the sample mixture undergoing an amplification process; and a fluid path fluidically coupling the sample introduction area to the mixing region and the mixing region to the test well. In some embodiments, the force applied is the result of one or more of a magnetic field generator, a vibration generator, a sonic generator, and physical movement. In some embodiments, the reagent comprises one of a dry reagent or a liquid reagent. In some embodiments, the at least one mixing object comprises at least one magnetic bead and wherein the force is exerted by a first magnetic field generated by a first magnet, such as an electromagnet disposed in the reader near a first location of the mixing region when the assay cartridge is inserted into the reader. In some embodiments, the force is further exerted by a second magnetic field generated by a second magnet, such as an electromagnet disposed in the reader near a second location of the mixing region when the assay cartridge is inserted into the reader. In some embodiments, the assay cartridges further comprise a control circuit configured to switch between which of the first magnet and the second magnetic is exerting the force at a given moment. In some embodiments, the force is exerted by a movable force generator disposed in the reader. In some embodiments, one or more of the sample introduction area, the mixing region, the test well, and the fluid path introduces an agent that reduces effects of one or more inhibitors that exist in the sample. In some embodiments, the one or more of the sample introduction area, the mixing region, the test well, and the fluid path are coated with the agent. In some embodiments, the reagent includes the agent that reduces effects of the one or more inhibitors. In some embodiments, the one or more inhibitors that exist in the sample comprise one or more of lactoferrin, lysozyme, Nucleases, DNAses or RNases and wherein the agent is configured to improve a detection sensitivity of testing performed with the assay cartridge and the reader. In some embodiments, the agent comprises one or more of an antibody, aptamer, competitive binding protein or a proteinase. In some embodiments, a chemical reaction is used to generate heat, which inactivates the proteinase after it has digested proteins in the sample. In some embodiments, the assay cartridge further comprises: a mixing region configured to mix the sample with a reagent to generate a sample mixture; a test well containing an excitation electrode and a sensing electrode, wherein the test well is configured to contain at least a portion of the sample mixture undergoing an amplification process; and a fluid path fluidically coupling the sample introduction area to the mixing region and the mixing region to the test well, wherein one or more of the sample introduction area, the mixing region, the test well, and the fluid path introduces an agent that reduces effects of one or more inhibitors that exist in the sample. In some embodiments, the one or more of the sample introduction area, the mixing region, the test well, and the fluid path are coated with the agent. In some embodiments, the reagent includes the agent that reduces effects of the one or more inhibitors. In some embodiments, the one or more inhibitors that exist in the sample comprise one or more of lactoferrin, lysozyme, Nucleases, DNAses, or RNases and wherein the agent is configured to improve a detection sensitivity of testing performed with the assay cartridge and the reader. In some embodiments, the agent comprises one or more of an antibody, aptamer, competitive binding protein or a proteinase. In some embodiments, a chemical reaction is used to generate heat, which inactivates the proteinase after it has digested proteins in the sample. In some embodiments, the assay cartridges further comprise at least one mixing object disposed in the mixing region and configured to move within the mixing region to enhance mixing of the sample with the reagent in response to a force applied to the mixing region. In some embodiments, the force applied is the result of one or more of a magnetic field generator, a vibration generator, a sonic generator, and physical movement. In some embodiments, the reagent comprises one of a dry reagent or a liquid reagent. In some embodiments, the at least one mixing object comprises at least one magnetic bead and wherein the force is exerted by a first magnetic field generated by a first magnet, such as an electromagnet disposed in the reader near a first location of the mixing region when the assay cartridge is inserted into the reader. In some embodiments, the force is further exerted by a second magnetic field generated by a second magnet, such as an electromagnet disposed in the reader near a second location of the mixing region when the assay cartridge is inserted into the reader. In some embodiments, the assay cartridges further comprise a control circuit configured to switch between which of the first magnet and the second magnetic is exerting the force at a given moment.

Additional embodiments disclosed herein comprise a system for determining a wellness score for a user, animal, or product. The systems comprise: a database configured to store a plurality of user, animal, or product profiles, each user, animal, or product profile comprising health information for a single user, animal, or product of a plurality of users, animals, or products and user, animal, or product identifying information, a testing device comprising the assay cartridge described herein, the testing device configured to: accept the sample from the user, animal, or product, generate test results based on the sample, and store the generated test results in the user, animal, or product profile for the user, animal, or product in the database; a computing system configured to: generate the wellness score for the user, animal, or product the wellness score based on the health information stored in the user, animal, or product profile, the health information comprising the generated test results, and store the wellness score in the user, animal, or product profile in the database; a remote computing device configured to: obtain biometric or identifying information, such as QR coding, RFID coding, or bar coding, for the user, animal, or product, request the wellness score for the user, animal, or product from the database based on the user's, animal's, or product's biometric or identifying information, and receive the wellness score for the user, animal, or product based on the computing system determining that the user's, animal's, or product's biometric or identifying information matches the user's, animal's, or product's identifier, wherein the wellness score is compared to a threshold value to determine whether the user, animal, or product is permitted entry to a location.

In some embodiments, the health information further comprises one or more of health information records acquired from a medical professional, health survey information provided by the user, or contact tracing information. In some embodiments, the user identifying information comprises one or more of an identifier for the user, biometrics information for the user, and username and password information for the user. In some embodiments, the wellness score is representative of whether the user, animal, or product is likely to be infected by a pathogen comprising one or more of a mold, fungus, bacteria, a virus, or another microbe. In some embodiments, the testing device comprises: a cartridge configured to receive the biological sample, and a reader device comprising: a cavity configured to receive the cartridge, a memory storing at least computer-readable instructions, a processor in communication with the memory, and an electrode interface in communication with the processor and in contact with the cartridge when the cartridge is inserted into the cavity. In some embodiments, the cartridge comprises: an external portion; an internal portion configured to fit within the cavity of the reader device, the internal portion including an electrode interface configured to establish an electrical connection with the electrode interface of the reader device when the cartridge is inserted into the reader device; and a flow path configured to sealingly enclose a biological sample within the cartridge. In some embodiments, the reader device further includes a communication module configured to communicatively connect to the computing system or the remote computing device. In some embodiments, the remote computing device or the computing system is wirelessly connected to the reader device. In some embodiments, the testing device, the computing system, and the remote computing device are connected by at least one of a wireless, wired, or hybrid network. In some embodiments, the remote computing device comprises a biometric input device that obtains the biometric information for the user from the user. In some embodiments, the biometric information comprises one or more of fingerprint information, facial recognition information, retinal scan information, hand geometry information, finger geometry information, palm vein information, ear geometry information, voice information, hand writing information, signature information, typing pattern recognition, biological sample recognition, or movement recognition. In some embodiments, the assay cartridges further comprise a user device configured to: capture location information for the user; capture identification information for other user devices of other users that come within a threshold distance of the user; and store the location information and identification information in the user profile in the database. In some embodiments, the assay cartridges detect a target agent. In some embodiments, the target agent indicates presents of a mold, fungus, bacteria, a virus, or another microbe. In some embodiments, the biological sample is obtained from a subject, such as a human or an animal, a product, such as a food or beverage, or an object, such as a high contact surface.

Additional embodiments disclosed herein comprise methods of using the system of the assay cartridges for determining the wellness score for the user, animal, or product.

Additional embodiments disclosed herein comprise methods of determining a wellness score for a user, animal, or product. The methods comprise: creating a user, animal, or product profile for a user, animal, or product in a database, the user, animal, or product profile comprising health information and user, animal, or product identifying information; depositing a sample obtained from the user, animal, or product into a sample receptacle of a testing device comprising the assay cartridge; generating test results based on the sample; storing the generated test results in the user, animal, or product profile for the user, animal, or product; generating the wellness score for the user, animal, or product the wellness score based on the health information stored in the user, animal, or product profile, the health information comprising the generated test results; storing the wellness score in the user, animal, or product profile in the database; obtaining biometric or identifying information for the user, animal, or product; requesting the wellness score for the user, animal, or product from the database based on the user's, animal's, or product's biometric or identifying information; receiving the wellness score for the user, animal, or product based on the computing system determining that the user's, animal's, or product's biometric or identifying information matches the user's, animal's, or product's identifier; and comparing the wellness score to a threshold value to determine whether the user, animal, or product is permitted entry to a location.

Additional embodiments disclosed herein comprise systems for determining a wellness score of an individual. The systems comprise: a database configured to: create a data structure for a profile associated with the individual and configured to store information in the data structure, the information comprising one or more of health information for the individual, contact tracing for the individual, health surveys completed by the individual, temperature measurements for the individual, authentication information for the individual (can include biometric information), test results for the individual, or a wellness score for the individual; obtain information associated with the individual from a source; store the obtained information in the profile data structure; calculate the wellness score for the individual based on an algorithm that accounts for the information stored in the profile data structure, wherein the algorithm applies different weights to the different information in the profile data structure when calculating the wellness score; and update the data structure based on the calculated wellness score; a testing device comprising the assay cartridges described above and configured to test a biological sample from the individual for a pathogen and provide results to the test to the database for the profile associated with the individual; and a site device configured to: access the profile for the individual from the database; compare the wellness score with a threshold score; and indicate that the individual is granted access to a location based on the wellness score being greater than or exceeding the threshold score.

Additional embodiments disclosed herein comprise methods of determining a wellness score for a user, animal, or product via the systems described above. The methods comprise: creating a user, animal, or product profile for a user, animal, or product in a database, the user, animal, or product profile comprising health information and user, animal, or product identifying information; depositing a sample obtained from the user, animal, or product into a sample receptacle of a testing device; generating test results based on the sample; storing the generated test results in the user, animal, or product profile for the user, animal, or product; generating the wellness score for the user, animal, or product the wellness score based on the health information stored in the user, animal, or product profile, the health information comprising the generated test results; storing the wellness score in the user, animal, or product profile in the database; obtaining biometric or identifying information for the user, animal, or product; requesting the wellness score for the user, animal, or product from the database based on the user's, animal's, or product's biometric or identifying information; receiving the wellness score for the user, animal, or product based on the computing system determining that the user's, animal's, or product's biometric or identifying information matches the user's, animal's, or product's identifier; and comparing the wellness score to a threshold value to determine whether the user, animal, or product is permitted entry to a location.

In an additional embodiment, a method of determining a wellness score for a user, animal, or product is disclosed herein. The method comprises creating a user, animal, or product profile for a user, animal, or product in a database, the user, animal, or product profile comprising health information and user, animal, or product identifying information; depositing a sample obtained from the user, animal, or product into a sample receptacle of a testing device comprising the assay cartridge; amplifying a nucleic acid from a pathogen, such as a mold, fungus, bacteria, virus, or other microbe in the sample by Loop-Mediated Isothermal Amplification (LAMP) with a primer set, wherein the primer set comprises any combination of: one or more F3 primers, one or more B3 primers, one or more LF primers, one or more LB primers, one or more FIP primers, and one or more BIP primers, wherein the primer set is specific for a genome region of the pathogen, such as including a primer comprising the sequence having at least 85%, 86%, 87%, 88%, 89%, 90%, 91%, 92%, 93%, 94%, 95%, 96%, 97%, 98%, 99%, or 100% homology to any one of the sequences of SEQ ID NOs: 1-204, and wherein the nucleic acid is amplified with the primer set at least a first temperature of between 23° C. and 55° C., and then at a second temperature of 60° C. to 70° C., preferably wherein the first temperature is performed at room temperature (e.g., 23° C. or about 23° C.) for a time period sufficient to allow any dried down reagents to rehydrate (e.g., 10 minutes or about 10 minutes); the second temperature is performed at 50° C. or about 50° C. for 10 minutes or about 10 minutes, and a third temperature is performed at 65° C. or about 65° C.; measuring or analyzing a modulation of an electrical signal, such as impedance or capacitance, for the duration of the amplification with the primer set using the testing device, thereby detecting successful amplification of the nucleic acid with the primer set; determining the presence and/or amount of the nucleic acid in the sample, wherein a limit of detection of the nucleic acid is improved compared to performing LAMP only at the second temperature; generating test results based on the sample and the determined presence and/or amount of the nucleic acid in the sample; storing the generated test results in the user, animal, or product profile for the user, animal, or product; generating the wellness score for the user, animal, or product the wellness score based on the health information stored in the user, animal, or product profile, the health information comprising the generated test results; storing the wellness score in the user, animal, or product profile in the database; obtaining biometric or identifying information for the user, animal, or product; requesting the wellness score for the user, animal, or product from the database based on the user's, animal's, or product's biometric or identifying information; receiving the wellness score for the user, animal, or product based on the computing system determining that the user's, animal's, or product's biometric or identifying information matches the user's, animal's, or product's identifier; and comparing the wellness score to a threshold value to determine whether the user, animal, or product is permitted entry to a location and optionally providing or displaying a visually identifiable signal or character indicating that the wellness score is at or exceeds the threshold value.

In other embodiments, a system for determining a wellness score of an individual is described. The system comprises a database configured to: create a data structure for a profile associated with the individual and configured to store information in the data structure, the information comprising one or more of health information for the individual, contact tracing for the individual, health surveys completed by the individual, temperature measurements for the individual, authentication information for the individual (can include biometric information), test results for the individual, or a wellness score for the individual; obtain information associated with the individual from a source; store the obtained information in the profile data structure; calculate the wellness score for the individual based on an algorithm that accounts for the information stored in the profile data structure, wherein the algorithm applies different weights to the different information in the profile data structure when calculating the wellness score; and update the data structure based on the calculated wellness score. The system also comprises a testing device comprising the assay cartridge and configured to test a biological sample from the individual for a pathogen and provide results to the test to the database for the profile associated with the individual, wherein the testing device is configured to: amplify a nucleic acid from a pathogen, such as a microbe, fungus, mold, bacteria, or virus in the sample by Loop-Mediated Isothermal Amplification (LAMP) with a primer set, wherein the primer set comprises any combination of: one or more F3 primers, one or more B3 primers, one or more LF primers, one or more LB primers, one or more FIP primers, and one or more BIP primers, wherein the primer set is specific for a genome region of the pathogen, such as including a primer comprising the sequence having at least 85%, 86%, 87%, 88%, 89%, 90%, 91%, 92%, 93%, 94%, 95%, 96%, 97%, 98%, 99%, or 100% homology to any one of the sequences of SEQ ID NOs: 1-204 and, wherein the nucleic acid is amplified with the primer set at at least a first temperature of between 23° C. and 55° C., and then at a second temperature of 60° C. to 70° C., preferably wherein the first temperature is performed at room temperature (e.g., 23° C. or about 23° C.) for a time period sufficient to allow any dried down reagents to rehydrate (e.g., 10 minutes or about 10 minutes); the second temperature is performed at 50° C. or about 50° C. for 10 minutes or about 10 minutes, and a third temperature is performed at 65° C. or about 65° C., determine the presence and/or amount of the nucleic acid in the sample, wherein a limit of detection of the nucleic acid is improved compared to performing LAMP only at the second temperature, and generate the results based on the sample and the determined presence and/or amount of the nucleic acid in the sample. The system also comprises a site device configured to: access the profile for the individual from the database; compare the wellness score with a threshold score; and indicate that the individual is granted access to a location based on the wellness score being greater than or exceeding the threshold score.

BRIEF DESCRIPTION OF THE DRAWINGS

FIGS. 4A-4G depict various examples of electrodes that can be used in a test well of the cartridges of FIGS. 1A-2F or in the test well or channel of another suitable target detection cartridge as described herein.

FIGS. 4H-4N depict further examples of electrodes that can be used to implement three-terminal sensing and/or four-terminal sensing in a test well of the cartridges of FIGS. 1A-2F or in the test well or channel of another suitable target detection cartridge as described herein.

FIG. 16A depicts SARS-CoV-2-specific primer sequences for LAMP (SEQ ID NOs: 1-25). One selected and three alternative primer sets are depicted. F3, B3, LF, LB, FIP, and BIP primers are denoted accordingly in respective primer names. Primer sequences are shown 5' to 3'.

FIG. 17A depicts Hepatitis A Virus-specific primer sequences for LAMP (SEQ ID NOs: 26-49). One selected and two alternative primer sets are depicted. F3, B3, LF, LB, FIP, and BIP primers are denoted accordingly in respective primer names. Primer sequences are shown 5' to 3'.

FIG. 18A depicts Influenza A Virus Subtype H1N1-specific primer sequences for LAMP (SEQ ID NOs: 50-67). One selected and one alternative primer sets are depicted. F3, B3, LF, LB, FIP, and BIP primers are denoted accordingly in respective primer names. Primer sequences are shown 5' to 3'.

FIG. 19A depicts Human Immunodeficiency Virus-1 Subtype B (HIV-1B)-specific primer sequences for LAMP (SEQ ID NOs: 68-96). One selected and two alternative primer sets are depicted. F3, B3, LF, LB, FIP, and BIP primers are denoted accordingly in respective primer names. Primer sequences are shown 5' to 3'.

FIG. 20A depicts Respiratory Syncytial Virus A (RSV A)-specific primer sequences for LAMP (SEQ ID NOs: 97-111). One selected and one alternative primer sets are depicted. F3, B3, LF, LB, FIP, and BIP primers are denoted accordingly in respective primer names. Primer sequences are shown 5' to 3'.

FIG. 21A depicts Respiratory Syncytial Virus B (RSV B)-specific primer sequences for LAMP (SEQ ID NOs: 112-128). One selected and one alternative primer sets are depicted. F3, B3, LF, LB, FIP, and BIP primers are denoted accordingly in respective primer names. Primer sequences are shown 5' to 3'.

FIG. 23A depicts *Listeria monocytogenes*-specific primer sequences for LAMP (SEQ ID NOs: 165-173). One selected and two alternative primer sets are depicted. F3, B3, LF, LB, FIP, and BIP primers are denoted accordingly in respective primer names. Primer sequences are shown 5' to 3'. Primers listed as "All Sets" were used in all three primer sets.

FIG. 24A depicts *Mycobacterium tuberculosis*-specific primer sequences for LAMP (SEQ ID NOs: 174-191). One selected and two alternative primer sets are depicted. F3, B3, LF, LB, FIP, and BIP primers are denoted accordingly in respective primer names. Primer sequences are shown 5' to 3'.

FIG. 24B depicts the time to detection of a positive amplification, or lack thereof, of *M. tuberculosis* genome at 1 million copies per reaction, or non-template control (NTC) using the primer sets of FIG. 24A. Time points at "60 min" denote unsuccessful amplifications.

FIG. 25A depicts *Salmonella enterica*-specific primer sequences for LAMP (SEQ ID NOs: 192-204). One selected and one alternative primer sets are depicted. F3, B3, LF, LB, FIP, and BIP primers are denoted accordingly in respective primer names. Primer sequences are shown 5' to 3'. Primers listed as "Both" were used in both Selected and Alternative primer sets.

FIG. 25B depicts the time to detection of a positive amplification, or lack thereof, of *S. enterica* genome at 0, 1 million, or 10000 copies per reaction using the primer sets of FIG. 25A. Time points at "60 min" denote unsuccessful amplifications.

FIGS. 34A-34C are flow diagrams representing example processes of collecting and testing a sample.

DETAILED DESCRIPTION

Figure 1A:
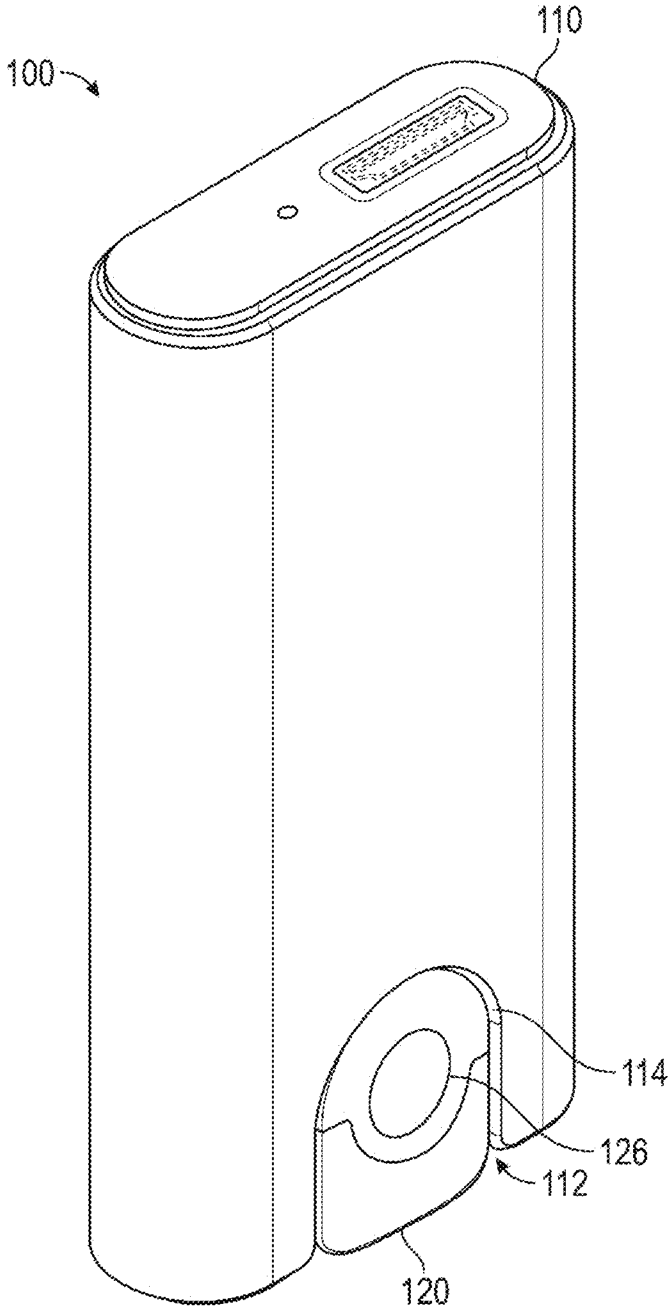
FIGS. 1A-1C depict an example handheld system for detection of a target.

Aspects of the disclosure herein concern the use of amplification and contactless electrical sensing to detect the presence and/or amount of a target in a sample. Such a diagnostic platform may replace the complex optical systems and expensive fluorescent labels used for optical detection and the electrodes and electroactive agents used in existing electrochemical and FET techniques with common electronic components. In some aspects, the amplification can be isothermal. In some embodiments, the amplification is loop-mediated isothermal amplification (LAMP). In some embodiments, the amplification is reverse transcription loop-mediated isothermal amplification (RT-LAMP). The platform described herein is inexpensive, robust, portable, and consumes less power than traditional diagnostic systems. In some aspects, the diagnostic platform is small enough to fit in the palm of a consumer's hand and capable of performing in the field, for example, a diagnosis in a doctor's office, in the home, in a location remote from a medical facility.

Many commercially available nucleic acid detection platforms utilize traditional PCR, thereby requiring temperature cycling, fluorescent labels and optical detection instrumentation. These factors result in expensive, lab-based instrumentation which employ delicate, vibration sensitive detectors, costly fluorescent markers, and have a large footprint. The equipment requires operation, and frequent calibration, by highly trained personnel.

These large, unwieldy platforms make routine use of conventional NAAT challenging to use in the clinic, much less in the home. NAAT remains a costly and slow strategy closely tied to centralized laboratory facilities. The presently disclosed technology, in contrast, avoids these challenges.

A hurdle to point of care ("POC") testing is the potential inhibition of amplification by interferents often encountered in crude, unprocessed clinical samples such as whole blood, saliva, mucus, or any other bodily fluid or biological component. The mitigation of amplification inhibitors may challenge the direct detection of target nucleic acids from clinically relevant biologic samples. As described herein, a sample may comprise one or more of blood, saliva, mucus, or any other bodily fluid or biological secretion or component.

Traditional detection strategies commonly rely on fluorescence detection techniques. Such techniques may be complex, more expensive, and require precision optical systems. The present disclosure however, generally relies on electrical detection systems. Such electrical detection systems may leverage microelectronics that consume relatively low power and can be manufactured at a reduced cost due to high volume manufacturing. Thus, electrical detection of genomic material may transfer the advances of the computer industry to bioassay sensing.

Existing electronic methods for monitoring amplification may require the binding of an electrochemically active label or the selective binding of the amplified material to a surface. However, when used in real world clinical applications, these techniques often suffer from slow response times, biofouling of the electrode or binding surfaces resulting in poor signal to noise ratios, and limitations on the lifetime and reliability of the device. While potentially enabling great sensitivity, the use of electrochemical or field effect transistor "FET" detection adds a layer of complexity to the detection. This can result in more expensive and less robust strategies than POC and other consumer applications typically dictate. Accordingly, the need for additional diagnostic devices is manifest.

The platform disclosed herein relies on measurement of the change in electrical conductivity that occurs during nucleic acid amplification. In sum, during biochemical synthesis of DNA from nucleotide triphosphates, the number and the mobility of electrically charged molecules are altered. This, in turn, results in a change in the solution conductivity as amplification progresses. This change in solution electrical conductivity may be sensed using frequency-dependent capacitively coupled contactless conductivity detection ("f$C^4$D").

In some implementations, f$C^4$D uses a pair of electrodes in close proximity to, but not in contact with, a fluid disposed in an amplification chamber to measure the solution's electrical properties. The ability to measure the properties of the solution in this way, without direct contact, avoids the challenges of surface fouling common to other electrical measurement methods.

In some implementations, utilizing f$C^4$D, a high frequency alternating current ("AC") signal is applied to the excitation electrode. This signal is capacitively coupled through the solution where it is detected at the signal electrode. By comparing the excitation signal with the signal at the signal electrode, the solution's conductivity can be determined.

Informed by high-resolution finite element models and empirical studies, specific tolerances of f$C^4$D based technology may achieve the optimal detection sensitivity and dynamic sensing range for particular implementations of the platform. Such calculated and empirically determined parameters of microfluidic dimensions, capacitive coupling characteristics, and the applied frequency can enable the determination of the effective parameters for detecting solution conductivity changes. In some embodiments, the parameters corresponding to optimal detection can be interdependent variables. According to the following equation, the measured impedance is a function of the solution resistance, capacitance and the applied frequency:

$$Z=R-(1/pi*f*C)*j$$

As the thickness of the electrode passivation layer increases, a parasitic capacitance due to this layer consequently increases. The optimal AC frequency with which to measure solution conductivity by $fC^4D$ therefore can be chosen with respect to the capacitance of the passivation layer.

Some embodiments provided herein include aspects disclosed in WO 2020/132008; WO 2016/057422; WO 2018/057647; WO 2020/132042; WO 2020/132042; WO 2020/132005; WO 2020/132010; WO 2020/132008; U.S. 2016/0097740; U.S. 2016/0097741; U.S. 2016/0097739; U.S. 2016/0097742; and U.S. 2016/0130639 which are each incorporated by reference in its entirety for all purposes.

Overview of Example Cartridges, Readers, and Signal Processing

In some aspects, a system for detecting a target in a sample includes a removable fluidics cartridge that is couplable to a companion reader device. A user can apply a sample to the cartridge and then insert it into the reader device. The reader device is configured for performing the testing procedures using the cartridge and analyzing the test data to determine the presence, absence, or quantity of a target in the sample. For example, the cartridge can be provided with the desired agents, proteins, or other chemical matter for an amplification process by which a target initially present in the sample is amplified. Specifically, some cartridges can be provided with the desired chemical matter for nucleic acid testing, wherein genomic material in the sample is exponentially copied using a molecular amplification process, as described herein. The cartridge can also include a test well for containing the amplification process, where a test well refers to a well, chamber, channel, or other geometry configured for containing (or substantially containing) test fluid and constituents of the amplification process. The reader device may maintain a desired temperature or other test environment parameters for the cartridge to facilitate the amplification process, and can electronically monitor a test well of the cartridge throughout some or all of the amplification process. The reader device can thus gather signal data representing the impedance of the test well over time during the amplification process, and can analyze the impedance as described herein to ascertain the presence, absence, or quantity of the target in the sample. As an example, the amplification process can range from five minutes to sixty minutes, with some examples ranging from ten minutes to thirty minutes. Preferably, in some embodiments, the amplification products are detected while being suspended in the fluid within the wells such that the amplification products are not attached or sequestered to the wells or fixed or bound to probes, which are bound to the wells. In other embodiments, the amplification products are detected as they are attached or sequestered to the wells e.g., fixed or bound to probes, which are bound to the wells.

Such systems can beneficially provide target detection performable in a clinical setting or even the home of a user, rather than requiring the sample to be sent to a laboratory for amplification and analysis. In the clinical setting, this can avoid the delays of conventional nucleic acid testing thereby enabling clinicians to determine diagnoses within the typical timeframe of a patient's office visit. As such, the disclosed systems enable clinicians to develop treatment plans for patients during their initial office visit, rather than requiring the clinician to wait for hours or even days to receive test results back from a laboratory. For example, when a patient visits a clinic a nurse or other healthcare practitioner can collect a sample from the patient and begin testing using the described system. The system can provide the test result by the time the patient consults with their doctor or clinician to determine a treatment plan. Particularly when used to diagnose pathologies that progress quickly, the disclosed systems can avoid the delays associated with laboratory testing that can negatively impact the treatment and outcome of the patient.

As another benefit, the disclosed systems can be used outside of the clinical setting (e.g., in the field, in rural settings without easy access to an established healthcare clinic) to detect health conditions such as contagious diseases (e.g., Ebola), thus enabling the appropriate personnel to take immediate action to prevent or mitigate the spread of a contagious disease. Similarly, the disclosed systems can be used in the field or at the site of a suspected hazardous contaminant (e.g., anthrax) to quickly determine whether a sample contains the hazardous contaminant, thus enabling the appropriate personnel to take immediate action to prevent or mitigate human exposure to the contaminant. Additionally, the disclosed systems can be used to detect contaminants in the blood or plasma supply or in the food industry. It will be appreciated that the disclosed systems can provide similar benefits in other scenarios in which real-time detection of a target enables more effective action than delayed detection through sending a sample to an off-site laboratory.

Another benefit of such systems is their use of low-cost, disposable single use cartridges together with a reusable reader device that can be used many times with different cartridges and/or for tests with different targets. In some embodiments disclosed herein, a single use cartridge includes a cartridge body and a cap which, when mechanically coupled together, create pressurized air that propels a collected sample from the cap into a mixing well and a test well of the cartridge body, reducing a necessary level of skill required to operate the reader device and reducing the complexity of both the cartridge and the reader device.

Figure 1B:
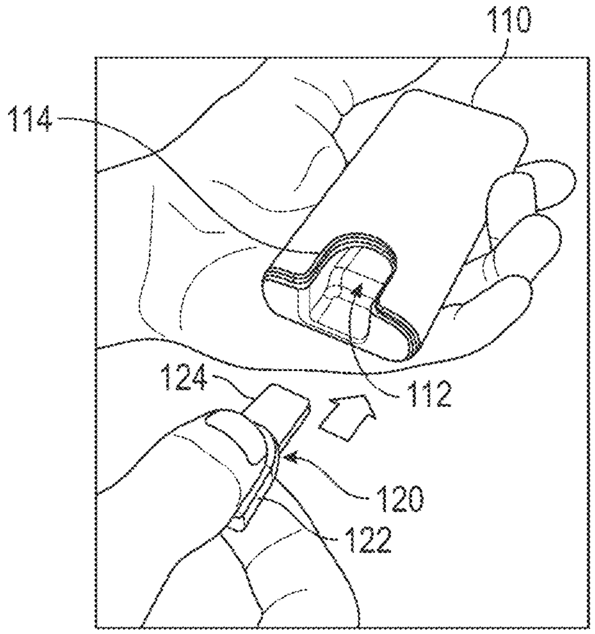
Figure 1C:
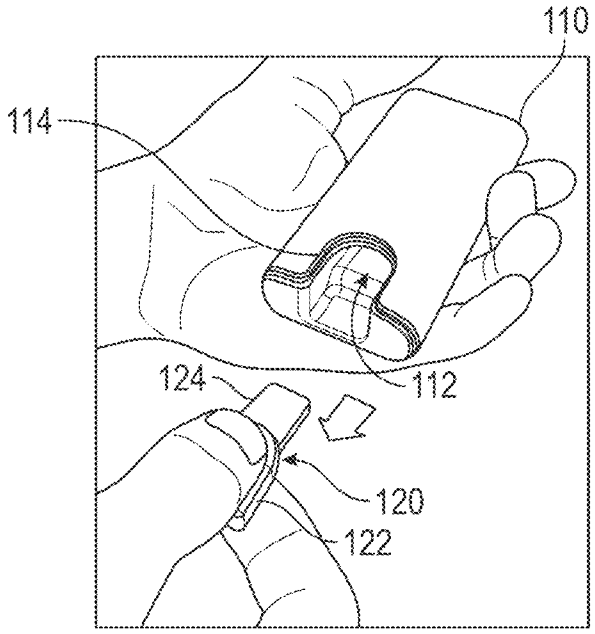

FIGS. 1A-1C depict an example handheld detection system 100 for detection of a target. The system 100 includes a reader device 110 and a cartridge 120 configured to fit within a cavity 112 of the reader device 110. The cartridge 120 generally includes an external section 122 and an internal section 124. When the cartridge 120 is inserted within the reader device 110, some or all of the internal section 124 is contained within the reader device 110. The external section 122 is sized and shaped to be gripped by a user and may include one or more three-dimensional surface features such as an indentation 126 to facilitate insertion and/or removal of the cartridge 120 from the reader device 110.

As shown in FIGS. 1B and 1C, the reader device 110 and the cartridge 120 are sized and shaped such that one or more interchangeable cartridges 120 can be inserted and/or removed by hand at the cavity 112. As will be described in greater detail, the reader device 110 can include one or more heating components configured to heat at least a portion of the internal section 124 of the cartridge 120. The reader device 110 can further include circuitry configured to connect with circuitry of the cartridge 120 to detect one or more electrical properties of a sample contained within the cartridge.

In some embodiments, some of the cartridges 120 can be power cartridges. The reader device 110 can be powered on and powered off by a power cartridge 120, instead of or in addition to a conventional power switch or button on the exterior of the reader device 110. A power cartridge 120 may have a size and shape similar to other cartridges for use with the reader device 110. In operation, the power cartridge 120 may be kept engaged within the cavity 112 when the reader device 110 is powered off. Circuitry of the power cartridge 120 can be in contact with internal circuitry of the reader device 110 such that removal of the power cartridge 120 from the reader device 110 causes the reader device 110 to power on for testing. After completion of one or more tests, or at any other time when the reader device 110 is to be powered off, the power cartridge 120 is inserted into the cavity 112. As the power cartridge 120 is inserted, the circuitry of the power cartridge 120 again comes into contact with the internal circuitry of the reader device 110 such that insertion of the power cartridge 120 causes the reader device 110 to power off. Power cartridge applications are discussed in greater detail with reference to FIG. 6.

In some embodiments, one or more external status indicators can be provided on an exterior portion of the reader device 110 to provide status indications to a user. For example, in one particular implementation the status indicator may include a light ring 114 disposed about the cavity 112. In other implementations, the optional status indicators may be located at any suitable location on the reader device 110. The light ring 114 or other status indicator may include one or more light sources, such as light emitting diodes (LEDs) or the like. The light ring may also be configured to indicate e.g., when the device is in use or not in use, or when different stages of the detection method using the device have been reached, completed, or are being performed, such as sample being received by the device or in the well(s), amplification being performed, detection of aggregates in the well(s), or transmission of the results to a receiver. Different colored lights can be used to indicate different stages of the detection method using the device such as those mentioned above.

In some embodiments, a plurality of differently colored LEDs may be provided within the light ring 114 or other status indicator in order to display a variety of status indications. For example, light ring 114 may include a combination of two or more colors (e.g., white, blue, and red), each of which may be independently activated. Each light source may be operated in a number of modes, such as a "solid" mode characterized by continuous activation of the light source (e.g., a steady "on" state), a "blinking" mode characterized by repeated activation and deactivation of the light source, a "flash" mode characterized by a single activation and deactivation of the light source, a "breathing" mode characterized by repeated gradual brightening and dimming of the light source, etc.

Combinations of colors and activation modes may be used to indicate the status of the reader device 100. For example, in some embodiments, the light ring 114 or other status indicator may display a first indication such as a solid white light when the reader device 100 is powered up and ready to receive an assay cartridge 120 (e.g., when a power cartridge is removed). Other examples of device status that may be indicated by the status indicator include, for example, a cartridge 120 is inserted into the reader device 110, a test has been started and is running, a test is complete, a cartridge is removed after completion of a test, an error (e.g., a test malfunction, premature removal of the cartridge 120, etc.), Bluetooth pairing, or any other status of the reader device 110. In one non-limiting example, a solid white light ring 114 indicates that a power cartridge has been removed and the device is powered up or that a test cartridge has been removed after completion of a test, a solid blue light ring 114 indicates that a test cartridge has been inserted into the reader device 110, a breathing blue light ring 114 indicates that a test has been started and is running, a breathing white light ring 114 indicates that a test is completed and the cartridge may be removed, a solid, breathing, or blinking red light ring indicates an error, a flash of blue and red at the light ring 114 indicates Bluetooth pairing in progress, and a steady, flashing, or blinking blue light ring 114 indicates Bluetooth pairing complete. It will be understood that other implementations may include any combination or subcombination of the status indicator modes listed above, and/or may include further status indications, light colors, operation modes, or the like.

FIGS. 2A-2F depict an example cartridge 200 configured for detection of a target. As described herein, the target may be a viral target, bacterial target, antigen target, parasite target, microRNA target, or agricultural analyte. Some embodiments of the cartridge 200 can be configured for testing for a single target, while some embodiments of the cartridge 200 can be configured for testing for multiple targets. The cartridge 200 includes a cartridge body 210 and a cap 240 configured to be mechanically coupled to the cartridge body 210. When the cartridge body 210 and the cap 240 are coupled together, the cartridge body 210 forms the internal section 204 of the cartridge 200 and a portion of the external section 202. The cap 240 forms a remaining portion of the external section 202.

Figure 2A:
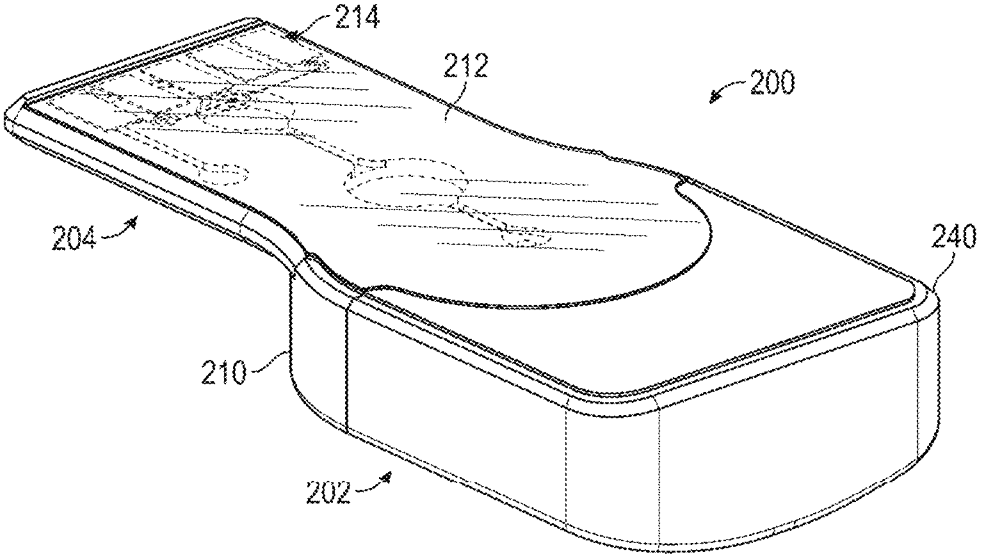
FIGS. 2A-2F depict an example cartridge for detection of a target that can be used in the handheld system of FIGS. 1A-1C.
Figure 2B:
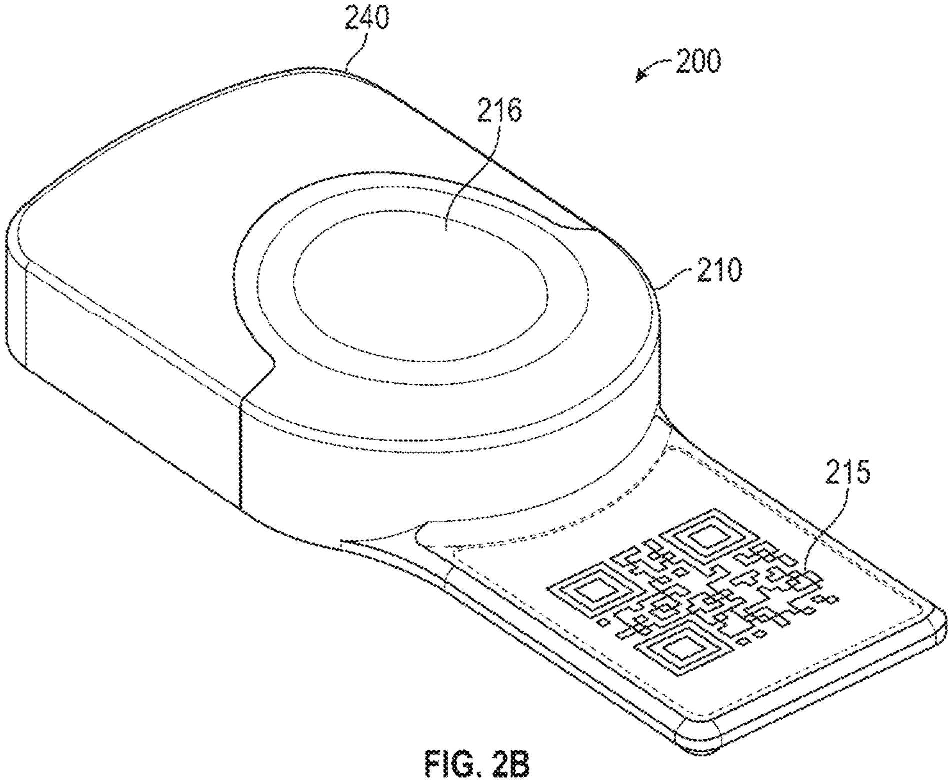

FIGS. 2A and 2B depict a complete cartridge 200 including the cartridge body 210 and the cap 240 coupled together. In use, the cap 240 and cartridge body 210 can operate to seal a provided sample within the cartridge 200, thereby preventing exposure of test operators to the sample and preventing any liquid from escaping into the electronics of an associated reader device. The cartridge body 210 and the cap 240 may be coupled by a friction fit, a snap fit, and/or one or more mechanical or chemical securing means. Coupling of the cartridge body 210 and the cap 240 is discussed in greater detail with reference to FIGS. 3A-3E.

The cartridge body 210 and the cap 240 can be formed from suitable fluid-impermeable materials such as plastic, metals, or the like, and may be opaque, translucent, or transparent. The cartridge body 210 can also include a translucent or transparent cover 212 partially defining a fluid path within the cartridge body 210, and one or more electrode interfaces 214. The cover 212, fluid paths, and electrode interfaces 214 are discussed in greater detail with reference to FIGS. 2C and 2D. The cartridge body 210 and/or the cap 240 can further include a cartridge identifier 215. The cartridge identifier 215 may include human-readable and/or machine-readable information, such as text, a barcode, a QR code, or the like. The cartridge identifier 215 can include any suitable information associated with the cartridge, such as information specifying a type of test, a target agent, a sample type, a cartridge serial number or other individual cartridge identifier, etc. In addition to serving as an identifier for a user of the type of test associated with the cartridge 200, the cartridge identifier 215 may also be scanned by a user (e.g., using a user interface device in communication with a reader device) to communicate one or more test protocols to the reader device. The cartridge body 210 and/or the cap 240 can include ergonomic features such as an indentation 216 to facilitate handling of the cartridge 200.

Figure 2C:
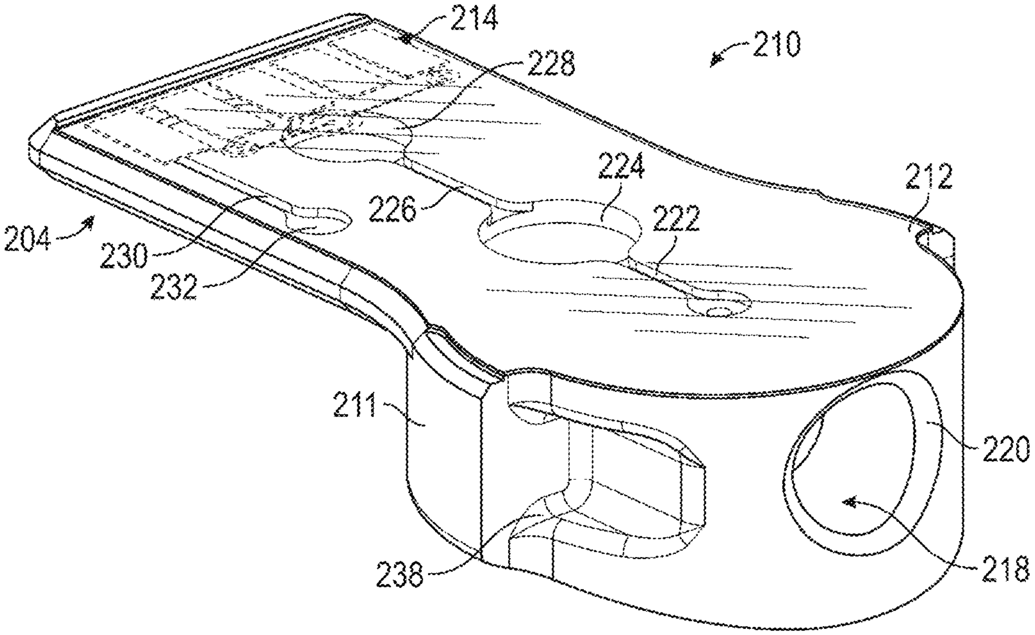
Figure 2D:
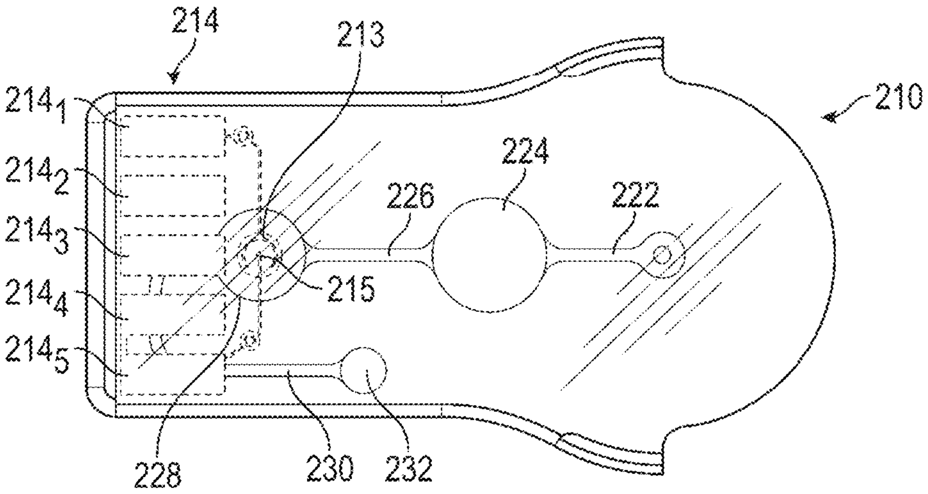

FIGS. 2C and 2D depict the cartridge body 210 component of the cartridge 200 of FIGS. 2A and 2B. The cartridge body 210 includes a base 211 and a cover 212. The base 211 can be formed from a fluid-impermeable material, for example injection molded or milled acrylic or plastic. The base 211 includes a receiving well 218 and components of a cartridge body flow path, including a first segment 222, a mixing well 224, a second segment 226, a test well 228, a third segment 230, and a vent 232. It will be appreciated that the particular geometric configurations or relative arrangements of these features may be varied in other embodiments. As used herein, fluidic communication refers to the capability to transfer fluids (e.g., liquid or gas). The cover 212 can be formed from a fluid-impermeable material. In some embodiments, the cover 212 is a translucent or transparent material, such as glass, plastic, or the like. The cover 212 is sealed to the base 211 to form the cartridge body 210 and to serve as a boundary confining fluids within the cartridge body flow path components described above. In some embodiments, a translucent or transparent cover 212 advantageously allows for visual inspection of a fluid within the cartridge body flow path (e.g., to verify that the test well is full prior to testing, etc.). One or more conductive components of an electrode interface 214 are disposed on the cover 212. Mating features 238 are sized and shaped to receive corresponding mating features of the cap 240. The receiving well 218 optionally includes a chamfer 220 to facilitate coupling of the cap 240 to the cartridge body 210.

The cartridge body flow path includes segments 222, 226, and 230, as well as an inlet (FIG. 3C) fluidically coupling the receiving well 218 to the first segment 222, the mixing well 224, and the test well 228. The first segment 222 of the cartridge body flow path leads from the inlet to the mixing well 224. The second segment 226 of the cartridge body flow path leads from the mixing well 224 to the test well 228. The third segment 230 is a test well outlet path leading from the test well 228 to a vent 232 that allows gas to escape from the test well 228 and out of the cartridge 200.

The mixing well 224 may include one or more reagents in a dry form (e.g., a powder). Powdered reagents and/or other dry reagents may be hydrated by a fluid sample when the fluid sample enters the mixing well 224. The reagents provided in the mixing well 224 can be selected based on one or more protocols of the intended test associated with the cartridge 200. Even or homogenous mixing of the reagents with the fluid sample can yield more accurate test results in some embodiments. As such, the mixing well 224 is configured to promote even mixing of the reagent with the fluid sample, for example by including curved regions and/or a cross-sectional shape that promote turbulent flow rather than laminar flow of the liquids within the mixing well 224. Turbulent flow is a flow regime in fluid dynamics characterized by chaotic changes in pressure and flow velocity of a fluid. Turbulent flow is in contrast to laminar flow, which occurs when fluid flows in parallel layers, with no disruption between those layers.

The segments 222, 226, and 230 of the cartridge body flow path, the mixing well 224, and/or the test well 228 can be entirely encased within the material of the base 211, or can have three surfaces formed from the material of the base 211 with the cover 212 forming an upper surface that seals these channels.

The internal section 204 or test region of the cartridge body 210 includes the segments 226, 230 of the cartridge body flow path, the test well 228, the valve 232, electrodes 213, 215, and an electrode interface 214. The electrode interface 214 includes a plurality of contact pads 214$_1$-214$_5$. Although five contact pads 214$_1$-214$_5$ are depicted, the cartridge body 210 may equally include more or fewer than five contact pads. A first contact pad 214$_1$ is electrically connected to a first electrode 213 of the test well 228, and a second contact pad 214$_5$ is electrically connected to a second electrode 215 of the test well 228. One of the contact pads 214$_1$, 214$_5$ is configured for coupling an excitation electrode of a test well with a voltage or current source of a reader device and the other of the contact pads 214$_1$, 214$_5$ is configured for electrically coupling a signal electrode of the test well with a signal reading conductor of the test device. Additional ones of the contact pads 214$_1$-214$_5$ may serve other purposes in conjunction with the reader device. For example, one or more of the contact pads 214$_1$-214$_5$ may couple to circuitry of the electrode interface of the reader device to indicate one or more test protocols to the reader. In another example, a power cartridge, as described above with reference to FIGS. 1A-1C, may include a similar set of contact pads 214$_1$-214$_5$ configured to connect to circuitry of the reader device's electrode interface to activate a power circuit of the reader device.

The mixing well 224 can be provided with solid dried and/or lyophilized constituents for the testing process, for example primers and proteins. The particular selection and chemistry of these dried and/or lyophilized constituents can be tailored to a particular target or targets for which the cartridge 200 is designed to test. These dried and/or lyophilized constituents can be hydrated with the liquid e.g., a buffer or liquid sample that flows into the test well (e.g., the fluid sample within the cartridge 200) and thus activated for the test procedure. Beneficially, providing the dried and/or lyophilized solid constituents in the mixing well 224 enables the cartridge 200 to be stored before use containing the components needed for the amplification process, while also delaying initiation of amplification until after the sample has been applied.

The test well 224 is depicted as a generally cylindrical well formed as a circular opening in the material of the base 211 and bounded by the planar surface of the cover 212. The test well 224 contains two electrodes 213, 215, with one electrode being an excitation electrode configured to apply current to the sample in the test well 224 and the other electrode being a signal electrode configured to detect current flowing from the excitation electrode through the liquid sample. In some embodiments, one or more test wells can be provided with a thermistor in place of the electrodes in order to provide for monitoring of the temperature of the fluid within the cartridge 100.

In some embodiments, gas bubbles within the test well 224, particularly if positioned along the current path between the electrodes 213, 215, can create noise in the signal picked up by the signal electrode. This noise can reduce the accuracy of test results determined based on the signal from the signal electrode. A desired high-quality signal may be obtained when only liquid is present along the current path or when minimal gas bubbles are present along the current path. As described above, any air initially present in the fluid flowing along the cartridge body flow path can be pushed out through the vent 232. In addition, the electrodes 213, 215 and/or test well 224 can be shaped to mitigate or prevent nucleation of the liquid sample in which air or gas bubbles form in the fluid sample and collect along the electrodes 213, 215.

For example, the electrodes 213, 215 may be positioned at the bottom of the test well 224 in some embodiments. This can allow any air or gas to rise to the top of the fluid in the test well and away from the path between the electrodes. As used herein, the bottom of the test well 224 refers to the portion of the test well in which heavier liquid settles due to gravity, and the top of the test well refers to the portion of the test well in which lighter gas rises above the heavier liquids. Further, the electrodes 213, 215 are positioned away from the perimeter or edges of the test well 224 which is a location at which bubble nucleation typically occurs.

Further, the electrodes 213, 215 can be formed from a thin, flat layer of material that has minimal height relative to the underlying circuit board layer that forms the bottom of the test well 224. In some embodiments, the electrodes 213, 215 can be formed using electrodeposition and patterning to form a thin layer of metal film, for example around 300 nm in height. This minimal height can help prevent or mitigate air bubbles from becoming trapped along the interface between the electrode and the underlying layer. In some embodiments, a layer of conductive material can be deposited on top of each electrodes to create a smoother transition between the edge of the electrode and the bottom of the test well. For example, a thin polymid layer (e.g., around 5 microns in height) can be deposited on top of the electrode or the circuit board can be butter coated. Additionally or alternatively, the electrodes can be positioned in grooves in the underlying layer with the grooves having a depth approximately equal to the height of the electrode. These and other suitable methods can achieve an electrode that is approximately flat or flush with the bottom surface of the well.

Beneficially, the above-described features can help to keep the electrodes 213, 215 surrounded by liquid and prevent or reduce gas bubbles from becoming positioned along the current path between the electrodes 213, 215.

Figure 2E:
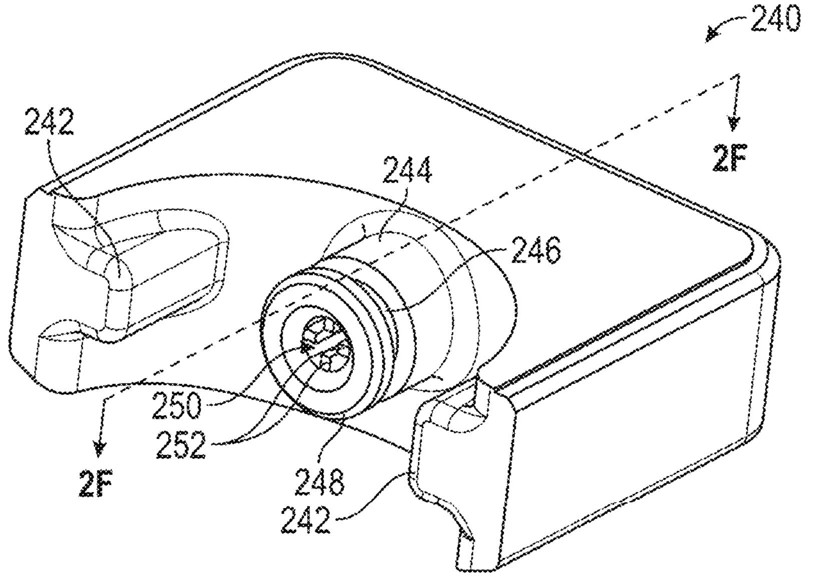
Figure 2F:
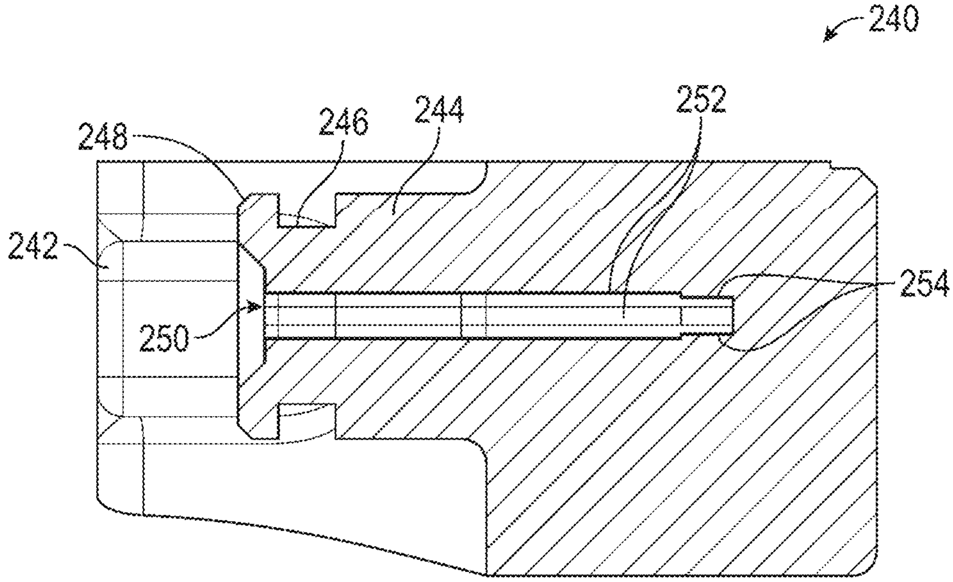

FIGS. 2E and 2F depict the cap 240 component of the cartridge 200. FIG. 2F is a cross-sectional view taken about the line 2F-2F in FIG. 2E to illustrate internal structures of the cap 240. The cap 240 is sized and shaped to mate with or otherwise mechanically couple to the cartridge body 210 to form a complete cartridge 200. The cap 240 includes mating features 242 configured to interlock with corresponding mating features 238 of the cartridge body when the cartridge 200 is assembled. The cap further includes a plunger 244 disposed about a retaining well 250 for retaining a capillary tube therein.

The plunger 244 is sized and shaped to sealingly engage with the receiving well 218 of the cartridge body 210 (FIGS. 2C-2D). The plunger 244 optionally includes a groove 246 configured to receive an O-ring or other gasket to eve and/or enhance the seal between the plunger 244 and the receiving well 218. An optional chamfer 248 at a distal end of the plunger 244 may facilitate the engagement of the plunger 244 with the receiving well 218, alone or in combination with the chamfer 200 of the receiving well 218 (FIGS. 2C-2D). As will be described in greater detail with reference to FIGS. 3A-3E, the plunger 244 thus sealingly engages with the receiving well 218 to propel a fluid sample into the cartridge body 210.

The retaining well 250 is configured to partially surround a capillary tube containing a fluid sample for testing. The retaining well 250 preferably has an interior diameter larger than the exterior diameter of the capillary tube to be inserted. A plurality of retaining structures 252 extend inward from the interior walls of the retaining well 250 to hold the capillary tube at a central location within the retaining well 250. Preferably, the distance between opposing retaining structures 252 is approximately equal to or slightly larger than the exterior diameter of the capillary tube. As shown in FIG. 2F, a rear portion 254 of each retaining structure 252 extends further inward relative to the remaining portion of the retaining structure 252. The distance between opposing rear portions 254 is small enough that the capillary tube cannot fit between the rear portions 254. Accordingly, the rear portions 254 of the retaining structures 252 block the movement of the capillary tube along the retaining well 250 and maintain a space between the capillary tube and the rear wall of the retaining well 250. As will be described in greater detail with reference to FIGS. 3A-3E, this spaced location of the capillary tube within the cap 240 allows air or other fluid to flow into the retaining well 250 around the sides of a capillary tube between the retaining structures and into the rear of the capillary tube.

The cartridge 200 of FIGS. 2A-2F provides a self-contained, easy to use device for performing an amplification-based test for a target, for example nucleic acid testing wherein genomic material in the sample is exponentially copied using a molecular amplification process. Beneficially, the user only needs to apply the sample and insert the cartridge 200 into a reader device in order to ascertain the result of the test in some embodiments, as the solid constituents of the amplification process are pre-provided within the cartridge and automatically mixed with the sample. In some embodiments, one or both of the cartridge or reader may include a heater and a controller configured to operate the heater to maintain the cartridge at the desired temperature for amplification. In some embodiments, one or both of the cartridge or reader may include a motor to impart vibrations to or otherwise agitate the cartridge to cause any trapped gas to rise to the top of the liquid and vent from the test wells.

FIGS. 3A-3E illustrate mechanical fluid transfer aspects of the cartridges 120, 200 described herein. As will be described in greater detail, the cartridge body 210 and cap 240 are configured to create air pressure when coupled together, such that the air pressure propels a fluid sample through the fluid path of the cartridge body 210. In some embodiments, the fluid sample may be driven through the fluid path of the cartridge body 210 by capillary action or wicking, instead of or in addition to fluid pressure. FIGS. 3A-3E illustrate the cap 240 with translucency to reveal interior features of the cap 240. The cartridge body 210 is illustrated in a cutaway view in FIGS. 3C-3E to reveal interior features of the cartridge body 210.

Figure 3A:
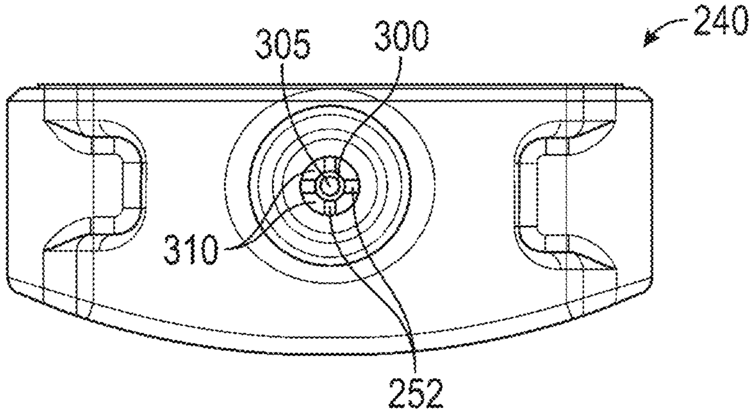
FIGS. 3A-3E depict a mechanical fluid transfer mechanism of the example cartridge of FIGS. 2A-2F.
Figure 3B:
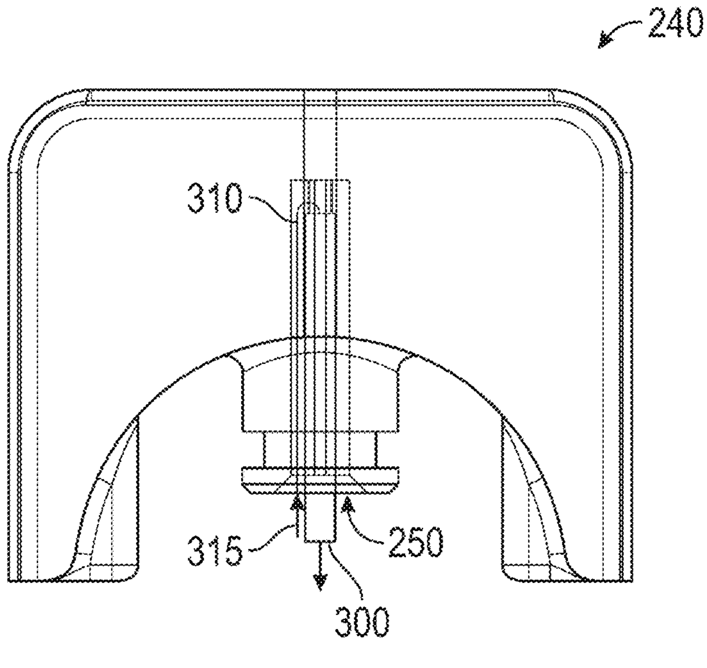

With reference to FIGS. 3A and 3B, a fluid sample may be received in a capillary tube 300, for example, within an inner lumen 305 of the capillary tube 300. The cap 240 is sized and shaped to receive the capillary tube 300 as described above with reference to FIGS. 2E and 2F. The fluid sample may be introduced into the capillary tube 300 while the capillary tube 300 is within the cap 240, or the capillary tube 300 may contain the fluid sample when it is placed into the cap 240.

FIG. 3A is a front view of the cap 240 of the cartridge 200. While the capillary tube 300 is disposed within the retaining well 250 of the cap 240, the retaining structures 252 hold the capillary tube 300 in a position spaced from the walls of the retaining well 250. Thus, a plurality of air channels 310 are formed between the interior of the retaining well 250 and the exterior of the capillary tube 300.

FIG. 3B is a top view of the cap 240 of FIG. 3A. A rear portion 310 of some or all of the retaining structures 310 (e.g., the rear portions 254 of FIG. 2F) cause the capillary tube 300 to remain spaced from the rear of the retaining well 250. This arrangement forms a cap fluid path 315 such that air or other fluids can flow into the retaining well 250 through the air channels 310, around the rear of the capillary tube 300, and out of the retaining well 250 through the inner lumen 305 of the capillary tube 300. Accordingly, application of a relatively high pressure at the air channels 310 can cause a fluid within the inner lumen 305 to flow out of the capillary tube 300 along the cap fluid path 315.

Figure 3C:
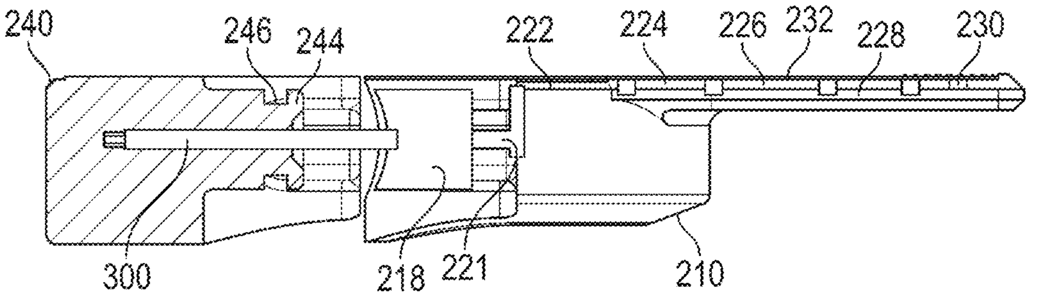
Figure 3D:
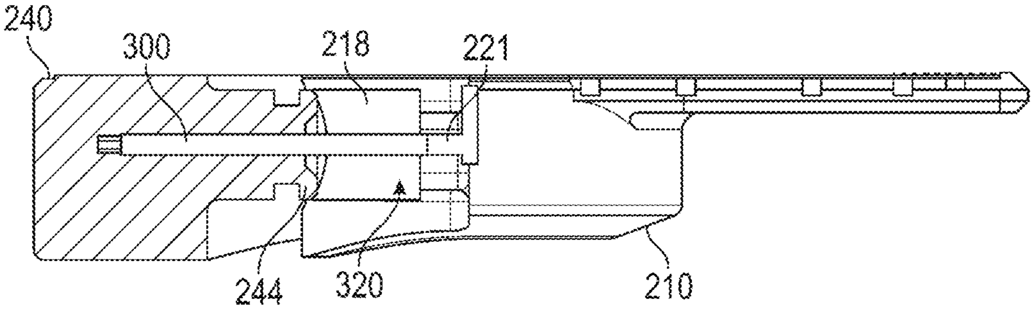
Figure 3E:
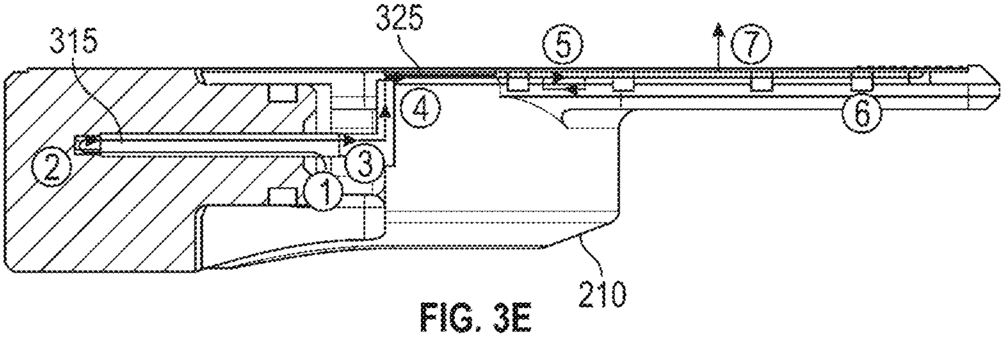

FIGS. 3C-3E illustrate various stages in a process of coupling the cap 240 to the cartridge body 210, together with associated fluid paths for effecting sample movement into the test well 228 and other components of a cartridge body flow path 325. FIG. 3C depicts the cap 240 adjacent but not coupled to the cartridge body 210, FIG. 3D depicts the cap 240 being coupled to the cartridge body 210, and FIG. 3E depicts the cap 240 fully coupled with the cartridge body 210.

As shown in FIG. 3C, the plunger 244, retaining well 250, and capillary tube 300 are aligned with the receiving well 218 of the cartridge body 210. The plunger 244 is sized and shaped to sealingly engage the receiving well 218. An O-ring or other seal (not shown) can be positioned in the groove 246 of the plunger 244 to achieve and/or enhance the seal between the plunger 244 and the receiving well 218. The receiving well 218 is fluidically coupled to the mixing well 224 by an inlet 221 sized and shaped to sealingly receive an end of the capillary tube 300. When the cap 240 is aligned with the cartridge body 210, the process continues to the configuration of FIG. 3D.

As shown in FIG. 3D, the plunger 244 engages the walls of the receiving well 218. As the plunger 244 (and/or an O-ring disposed on the plunger 244) engages the walls of the receiving well 218, a volume of ambient air is trapped within the receiving well 218. This trapped air 320 has a volume defined by the portion of the receiving well 218 not occupied by the plunger 244. As the cap 240 is pressed further onto the cartridge body 210, an outer end of the capillary tube 300 enters and sealingly engages with the inlet 221. Thus, as cap 240 and the cartridge body 210 are pressed further together, the trapped air 320 is compressed within the shrinking volume of the portion of the receiving well 218 not occupied by the plunger 214. Because the inlet 221 is blocked by the capillary tube 300, the compression of the trapped air 320 causes the trapped air 320 to flow along the cap flow path 315 of FIG. 3B.

Referring now to FIG. 3E, the fluid transfer effected by coupling the cap 240 and the cartridge body 210 will be described. FIG. 3E illustrates the flow along the cap flow path 315 and the cartridge body flow path 325 with encircled numbers shown as labels for certain points along the fluid path. The encircled numbers are discussed below as example steps of a progression of trapped air 320 and a fluid sample as they travel through the cap flow path 315 and the cartridge body flow path 325 within the cartridge 200, with each step including a directional arrow showing the direction of fluid travel at that step. For clarity and simplicity of FIG. 3E, some components labeled with reference numbers in FIGS. 2A-3D are not labeled in FIG. 3E.

Prior to step (1), a user provides a fluid sample within a capillary tube 300. Also prior to step (1), the capillary tube 300 is placed within the retaining well 250 of the cap 240 between the retaining structures 252 to form the cap flow path 315.

At step (1), as the plunger 244 compresses the trapped air 320, the trapped air 320 is forced into the air channels 310. The trapped air 320 flows along the cap flow path 315 through the air channels 310 between the retaining structures 252 and along the exterior of the capillary tube 300.

At step (2), the trapped air 320 reaches the rear of the retaining well 218. The trapped air 320 continues along the cap flow path 315 into the inner lumen 305 of the capillary tube 300. Upon entering the inner lumen 305, the trapped air 320 contacts and exerts a pressure upon the fluid sample contained within the capillary tube 300. The pressure is directed along the length of the capillary tube 300 toward the cartridge body 210.

At step (3), the fluid sample flows out of the capillary tube 300 and into the inlet 221 of the cartridge body 210. The fluid sample is propelled into the inlet 221 by the pressured exerted at the opposite end of the capillary tube 300 by the trapped air 320. Capillary action or wicking may also propel the fluid sample into the inlet 221, for example, where the inlet and fluidically connected segments along the cartridge body flow path 325 are suitably narrow to cause wicking. At step (4), the fluid sample travels through the first segment 222 of the cartridge body flow path 325.

At step (5), the fluid sample enters the mixing well 224. The mixing well may include one or more reagents. Agitation caused by the flow of the fluid sample within the relatively larger space of the mixing well 224 causes the reagent and the sample to be mixed. In some embodiments, the reagent and the fluid sample are mixed into a homogeneous solution in which the reagent is evenly distributed throughout the fluid sample. The depth, width, and/or cross-sectional profile of the mixing well 224 may be selected to facilitate mixing of the reagent and the fluid sample.

At step (6), the mixed reagent and fluid sample (referred to as the "test fluid") leave the mixing well 224 and travel along the second segment 226 of the cartridge body flow path 325 into the test well 228.

At step (7), a portion of the test fluid continues along the third segment 230 of the cartridge body flow path 325 to fill any remaining open volume within the cartridge body flow path 325. The path of step (7) shows the optional flow of a gas (e.g., a gas portion of the test fluid or ambient air present within the cartridge body 210) through the valve 232. In some embodiments, the valve 232 can include a liquid-impermeable, gas-permeable filter to allow any gas present in the test fluid or within the cartridge body 210 to vent through the valve 232 as the test fluid fills the space within the cartridge body flow path 325. The valve 232 may further minimize the occurrence of air bubbles within the test well 228. In some embodiments the valve 232 may not present and/or may not be configured to vent gas.

Following the completion of steps (1)-(7), the cartridge 200 is sealed and contains the test fluid within the cartridge body 210 and the cap 240. The sealed cartridge 200 may then be placed into a reader device such as the reader devices 110, 600 described herein, for testing to detect one or more target agents within the test fluid. In various embodiments, the size of the fluid sample and/or the quantity of the reagent may preferably be selected to provide sufficient test fluid to substantially fill the fluid space enclosed within the cartridge 200 along the cap flow path 315 and the cartridge body flow path 325. The volume of the receiving well 218, and the corresponding size of the plunger 244, may preferably be selected so that the receiving well 218 contains sufficient air for transporting the fluid sample along the length of the fluid path and into the test well 328. It will be understood that the propulsion of the fluid sample through the capillary tube 300 into and along the cartridge body flow path 325, as described above with reference to FIGS. 3A-3E, may occur due to capillary action or wicking, fluid pressure due to the compression of a trapped liquid or gas (e.g., air) within the receiving well 218, or both.

FIGS. 4A-4N depict various examples of electrode configurations that can be used in a test well of the cartridges of FIGS. 2A-3E or in the test well or channel of another suitable target detection cartridge as described herein. The test wells shown in FIGS. 4A-4N are depicted as circular, however the electrodes can be used in test wells of other geometries in other examples. Unless otherwise noted, the solid circles in FIGS. 4A-4N represent contacts between the disclosed electrodes and conductors leading to or from the electrode. "Width" as used below refers to a dimension along the horizontal direction of the pages of FIGS. 4A-4N, and "height" as used below refers to a dimension along the vertical direction of the pages of FIGS. 4A-4N. Though depicted in a particular orientation, the illustrated electrodes of FIGS. 4A-4N can be rotated in other implementations. Further, the disclosed example dimensions represent certain potential implementations of the electrode configurations 400A-400G, and variations can have different dimensions that follow the same ratios between the provided example dimensions. The electrodes shown in FIGS. 4A-4N can be made from suitable materials including platinum, gold, steel, or tin. In experimental testing, tin and platinum performed similarly and suitably for certain test setups and test targets.

FIG. 4A depicts a first electrode configuration 400A wherein the first and second electrodes 405A, 405B are each formed as a semicircular perimeter. The straight edge of the first electrode 405A is positioned adjacent to the straight edge of the second electrode 405B and separated by a gap along the width of the configuration 400A. The gap is larger than the radius of the semicircle of the electrodes. Thus, the first and second electrodes 405A, 405B are positioned as mirrored semicircular perimeters. In one example of the first electrode configuration 400A, the gap between the closest portions of the first and second electrodes 405A, 405B spans approximately 26.369 mm, the height (along the straight edge) of each of the electrodes 405A, 405B is approximately 25.399 mm, and the radius of the semicircle of each of the electrodes 405A, 405B is approximately 12.703 mm.

FIG. 4B depicts a second electrode configuration 400B. Similar to the first electrode configuration 400A, the first and second electrodes 410A, 410B of the second electrode configuration 400B are each formed as a semicircular perimeter and are positioned as mirrored semicircles with their straight edges facing one another. The first and second electrodes 410A, 410B of the second electrode configuration 400B can be the same size as the first and second electrodes 405A, 405B of the first configuration 400A. In the second electrode configuration 400B, the gap along the width of the configuration 400B between the first and second electrodes 410A, 410B is smaller than in the first configuration 400A, and the gap is smaller than the radius of the semicircle of the electrodes 410A, 410B. In one example of the second electrode configuration 400B, the gap between the closest portions of the first and second electrodes 410A, 410B spans approximately 10.158 mm, the height (along the straight edge) of each of the electrodes 410A, 410B is approximately 25.399 mm, and the radius of the semicircle of each of the electrodes 410A, 410B is approximately 12.703 mm.

FIG. 4C depicts a third electrode configuration 400C having first and second linear electrodes 415A, 415B separated by a gap along the width of the configuration 400C, where the gap is approximately equal to the height of the electrodes 415A, 415B. The width of the electrodes 415A, 415B is approximately one half to one third of the height of the electrodes. In one example of the third electrode configuration 400C, the gap between the closest portions of the first and second electrodes 415A, 415B spans approximately 25.399 mm, the height of each of the electrodes 415A, 415B is also approximately 25.399 mm, and the width of each of the electrodes 415A, 415B is approximately 10.158 mm. The ends of the first and second electrodes 415A, 415B can be radiused, for example having a radius of around 5.078 mm.

FIG. 4D depicts a fourth electrode configuration 400D having first and second rectangular electrodes 420A, 420B separated by a gap along the width of the configuration 400D, where the gap is approximately equal to the width of the electrodes 420A, 420B. In one example of the fourth electrode configuration 400D, the gap between the closest portions of the first and second electrodes 420A, 420B spans approximately 20.325 mm, the height of each of the electrodes 420A, 420B is also approximately 23.496 mm, and the width of each of the electrodes 420A, 420B is approximately 17.777 mm.

FIG. 4E depicts a fifth electrode configuration 400E having first and second linear electrodes 425A, 425B separated by a gap along the width of the configuration 400E, where the gap is approximately equal to the height of the electrodes 425A, 425B. The fifth electrode configuration 400E is similar to the third electrode configuration 400C, with the width of the electrodes 425A, 425B reduced to around one half to two thirds of the width of the electrodes 415A, 415B while having the same height. In one example of the fifth electrode configuration 400E, the gap between the closest portions of the first and second electrodes 425A, 425B spans approximately 25.399 mm, the height of each of the electrodes 425A, 425B is also approximately 25.399 mm, and the width of each of the electrodes 425A, 425B is approximately 5.078 mm. The ends of the first and second electrodes 425A, 425B can be radiused, for example having a radius of around 2.542 mm.

FIG. 4F depicts a sixth electrode configuration 400F having concentric annular electrodes 430A, 430B. The sixth electrode configuration 400F is the configuration shown in the test well 228 of FIGS. 2A, 2C, and 2D. The inner electrode 430B can be a disc or circular-shaped electrode and can be positioned in the center of the test well. The outer electrode 430A can be a semicircular electrode formed concentrically around the inner electrode 430B and separated from the inner electrode 430B by a gap. In the sixth electrode configuration 400F, the gap is approximately equal to the radius of the inner electrode 430B. A break in the semicircle of the outer electrode 430A occurs where a conductive lead connects the inner electrode 430B to the current providing conductor. In one example of the sixth electrode configuration 400F, the gap between the inner edge of the annular first electrode 430A and the outer perimeter of the circular second electrode 430B spans approximately 11.430 mm, the radius of the circular second electrode 430B is approximately 17.777 mm, and the thickness of the annulus of the annular first electrode 430A is approximately 5.080 mm. The ends of the first electrode 430A can be radiused, for example having a radius of around 2.555 mm, and the gap between the open ends of the annulus of the first electrode 435A can be around 28.886 mm from vertex to vertex.

FIG. 4G depicts a seventh electrode configuration 400G having concentric annular electrodes 435A, 435B. Similar to the embodiment of FIG. 4F, the inner electrode 435B can be a disc or circular-shaped electrode having the same radius as inner electrode 430B and can be positioned in the center of the test well. The outer electrode 435A can be a semicircular electrode formed concentrically around the inner electrode 435A and separated from the inner electrode 435A by a gap. In the seventh electrode configuration 400G, the gap is greater than the radius of the inner electrode 435B, for example two to three times greater. Correspondingly, the outer electrode 435B has a larger radius than the outer electrode 430B. In one example of the seventh electrode configuration 400G, the gap between the inner edge of the annular first electrode 435A and the outer perimeter of the circular second electrode 435B spans approximately 24.131 mm, the radius of the circular second electrode 435B is approximately 17.777 mm, and the thickness of the annulus of the annular first electrode 435A is approximately 5.080 mm. The ends of the first electrode 435A can be radiused, for example having a radius of around 2.555 mm, and the gap between the open ends of the annulus of the first electrode 435A can be around 46.846 mm from vertex to vertex.

In the embodiments of FIGS. 4A-4E, either electrode can be used as the excitation electrode and the other electrode can be used as the signal electrode. In the embodiments of FIGS. 4F and 4G, the inner electrode 430B, 435B is configured to be used as the excitation electrode (e.g., coupled to a current source) and the outer electrode 430A, 435A is configured to be used as the signal electrode (e.g., provides its signal to a memory or processor). In some example tests, the sixth electrode configuration 400F exhibited the best performance of the configurations shown in FIGS. 4A-4G.

FIGS. 4H-4N depict further examples of electrode configurations suitable for implementing three-terminal sensing and/or four-terminal sensing. In some embodiments, three-terminal sensing (e.g., potentiostat-type or 3-wire measurement) or four-terminal sensing (e.g., Kelvin-type or 4-wire measurement) may improve the accuracy of impedance measurements in the systems and methods described herein. For example, the excitation electrode and the signal electrode may themselves carry some charge. Additionally, there may be some additional impedance related to surface effects at the electrode-fluid interface. Accordingly, a third electrode or a third and fourth electrode (e.g., a second electrode pair) may further be disposed within the test well. The third and/or fourth electrodes can carry a substantially smaller or negligible current relative to the current carried by the excitation and signal electrodes. The third and/or fourth electrodes may thus be used to accurately determine a voltage (e.g., a voltage between the third and fourth electrodes, or a voltage between the third electrode and the excitation or signal electrode). This precisely measured voltage may be used to determine an impedance measurement having enhanced accuracy. It will be understood that the configurations of three or four electrodes illustrated in FIGS. 4H-4N are merely examples of a number of three- or four-terminal configurations that may be provided within the test wells of the present disclosure.

FIG. 4H depicts an electrode configuration similar to the electrode configuration of FIG. 4A, with the addition of a third electrode 440A and a fourth electrode 440B disposed between the first electrode 405A and the second electrode 405B. Either or both of the third electrode 440A and the fourth electrode 440B may be used to implement three- or four-terminal sensing.

FIG. 4I depicts an electrode configuration similar to the electrode configuration of FIG. 4B, with the addition of a third electrode 440A disposed between the first electrode 410A and the second electrode 410B. The third electrode 440A may be used to implement three-terminal sensing.

FIG. 4J depicts an electrode configuration similar to the electrode configuration of FIG. 4C, with the addition of a third electrode 440A and a fourth electrode 440B disposed between the first electrode 415A and the second electrode 415B. Either or both of the third electrode 440A and the fourth electrode 440B may be used to implement three- or four-terminal sensing.

FIG. 4K depicts an electrode configuration similar to the electrode configuration of FIG. 4D, with the addition of a third electrode 440A disposed between the first electrode 420A and the second electrode 420B. The third electrode 440A may be used to implement three-terminal sensing.

FIG. 4L depicts an electrode configuration similar to the electrode configuration of FIG. 4E, with the addition of a third electrode 440A disposed between the first electrode 425A and the second electrode 425B. The third electrode 440A may be used to implement three-terminal sensing.

FIG. 4M depicts an electrode configuration similar to the electrode configuration of FIG. 4F, with the addition of a third electrode 440A disposed between the outer electrode 430A and the inner electrode 430B. The third electrode 440A may be used to implement three-terminal sensing.

FIG. 4N depicts an electrode configuration similar to the electrode configuration of FIG. 4G, with the addition of a third electrode 440A and a fourth electrode 440B disposed between the outer electrode 435A and the inner electrode 435B. Either or both of the third electrode 440A and the fourth electrode 440B may be used to implement three- or four-terminal sensing.

Figure 5A:
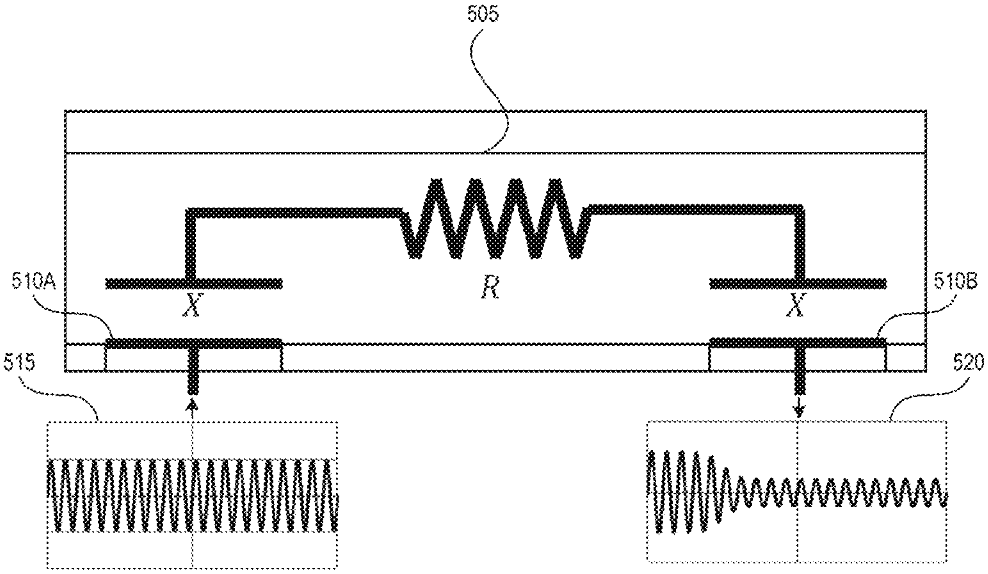
FIG. 5A depicts a first electrode or excitation electrode and a second electrode or signal electrode that may be spaced apart from one another within a test well of the cartridges of FIGS. 1A-2F or in the test well or channel of another suitable target detection cartridge as described herein.

FIG. 5A schematically depicts a first electrode or excitation electrode and a second electrode or signal electrode that may be spaced apart from one another within a test well of the cartridges of FIGS. 2A-3E or in the test well or channel of another suitable target detection cartridge as described herein.

The formation of an aggregate, nucleic acid complex, or polymer, for example during an amplification process in the test wells of cartridges of FIGS. 2A-3E, can affect waveform characteristics of one or more electrical signals that are sent through a channel. As shown in FIG. 5A, a first electrode or excitation electrode 510A is spaced apart from a second electrode or sensing electrode 510B within test well 505. The test well 505 can contain a test solution undergoing an amplification process. During some of all of that process, an excitation voltage 515 can be provided to the excitation electrode 510A, from which the excitation voltage 515 is transmitted into the fluid (preferably all or substantially all liquid) within the well 505.

After passage through and attenuation by the liquid sample (represented schematically by the resistance R and reactance X), the attenuated excitation voltage is sensed or detected at the sensing electrode 510B. The fluid acts as a resistor R in series with the excitation electrode 510A and the sensing electrode 510B. The fluid also acts as in series capacitor(s), shown by the reactance X. The raw sensed signal during some or all of the duration of a test can be represented over time as a sinusoidal curve with varying amplitudes, similar to that shown in plot 520.

The excitation voltage 515 can be an alternating current at a predetermined drive frequency. The particular frequency selected can depend for example upon the particular target sought to be detected, the medium of the test sample, the chemical makeup of the amplification process constituents, the temperature of the amplification process, and/or the excitation voltage. In some embodiments of the cartridges of FIGS. 2A-3E, the excitation drive frequency can be between 1 kHz and 10 kHz at as low an excitation voltage as possible. As one example, in tests performed to identify a target of *H. influenzae* ($10^6$ copies/reaction) spiked into 5% whole blood, excitation sensor drive frequency was varied from 100 Hz to 100,000 Hz at 0.15 Volts. These tests revealed that the desired "signal cliff," an artifact in a portion of the signal indicative of a positive test sample described in more detail below, becomes more easily detectable below 100 Hz and is most easily detectable between 1 kHz and 10 kHz. Further, with frequencies in the range between 1 kHz and 10 kHz, the signal cliff advantageously could be identified before 12 minutes of test time had elapsed. Beneficially, faster identification of the signal cliff can result in shorter test times, in turn resulting in quicker provision of test results and the ability to perform more tests per day. At frequencies lower than 1 kHz, the reactance component of the signal (in which the signal cliff may be found in a positive sample) decreased monotonically. The sensor drive frequency can be similarly fine-tuned for other tests to optimize performance, that is, to optimize the detectability of a signal cliff. Detectability of a signal cliff refers to the ability to consistently differentiate between a positive sample and a negative sample.

Figure 5B:
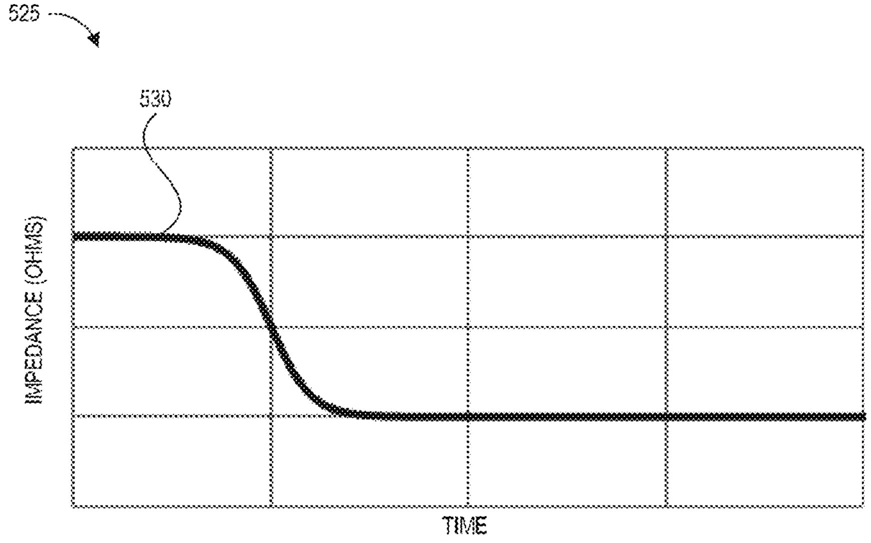
FIG. 5B depicts an example signal that can be extracted from the signal electrode of FIG. 5A.

FIG. 5B depicts an example plot 525 showing an impedance signal 530 that can be extracted from the raw signal 520 provided by the sensing electrode 510B. The impedance signal 530 represents the electrical impedance Z of the test well over time. The impedance Z can be represented by a Cartesian complex number equation as follows:

$$Z=R+jX$$

where R represents the resistance of the test well and is the real part of the above equation and the X represents the reactance of the test well and is the imaginary part of the above equation (denoted by j). Thus, the impedance of the test well can be parsed into two components, the resistance R and the reactance X.

Initially, the value of the resistance R can be determined by taking a baseline measurement of the test well prior to or at the outset of the amplification process. Although the resistance of the test fluid can drift away from this baseline value throughout the duration of the test, the current sensed by the sensing electrode 510B due to the resistance of the test fluid can be in phase with the signal provided through the excitation electrode 510A. Thus, changes or drift in the resistance can be identified by values of the in-phase component of the signal 520 over time. The reactance can arise from the effect of inductance in the test fluid, capacitance in the test fluid, or both; this effect can cause the fluid to retain current (e.g., electrons provided by excitation electrode 510A) temporarily. After some time, this retained current flows out of the test fluid into the sensing electrode 510B. Due to this delay, the current sensed by the sensing electrode 510B due to the reactance of the test fluid can be out of phase with the current sensed from the resistance of the test fluid. Thus, values of the reactance of the test fluid can be identified by values of the out of phase component of the signal 520 over time. The reactance can fluctuate throughout the duration of the test based on changes to the chemical constituents of the test fluid due to the amplification process. The signal cliff (e.g., a rise or drop in the reactance at or greater than a threshold rate or magnitude and/or during a predetermined window of time) indicative of a positive sample can be found in the reactance X.

During a test, the excitation electrode 510A can be sinusoidally excited with some amplitude and voltage. The excitation electrode 510A is in series with the test liquid in the well, which can be considered as a resistor R. The resistor (e.g., the test fluid) and electrode form a voltage divider, which has a voltage determined by the ratio of the resistor and electrode chemistry/impedances. The resulting voltage waveform sensed at the sensing electrode 510B represents the complex impedance signal 530. In some embodiments, a curve such as the impedance signal 530 may not be generated, but rather the raw sensed signal 520 can be parsed into its resistance and reactance components as described herein. The impedance signal 530 is provided as an example representation of a combined curve representing both the resistance of the test fluid and the reactance of the test fluid over time. The complex impedance signal 530 can be interpreted as a quadrature-modulated waveform (e.g., a combination of an in-phase waveform resulting from the resistance of the test fluid and an out-of-phase waveform resulting from the reactance of the test fluid), where the in-phase and out-of-phase components change on a timescale much greater than the modulation frequency. The in-phase waveform is in-phase with the composite waveform of the complex impedance. Some implementations can use a synchronous detector, for example having multipliers and low pass filters implemented in a field programmable gate array (FPGA), to extract the in-phase and out-of-phase components from the raw signal 520 and compute their amplitude and phase.

In order to parse the impedance signal 530 (or the raw sensed signal 520) into its constituent resistance and reactance components, the voltage waveform 520 at the sensing electrode 510B is sampled faster than its Nyquist frequency (e.g., two times the highest frequency of the excitation voltage) and then decomposed into an in-phase component (resistance) and an out-of-phase component (reactance). The in-phase and out-of-phase voltage components can be computed using the known series resistance (e.g., the value of R) to calculate the real component of the impedance (the resistance) and the imaginary component of the impedance (the reactance).

Figure 5C:
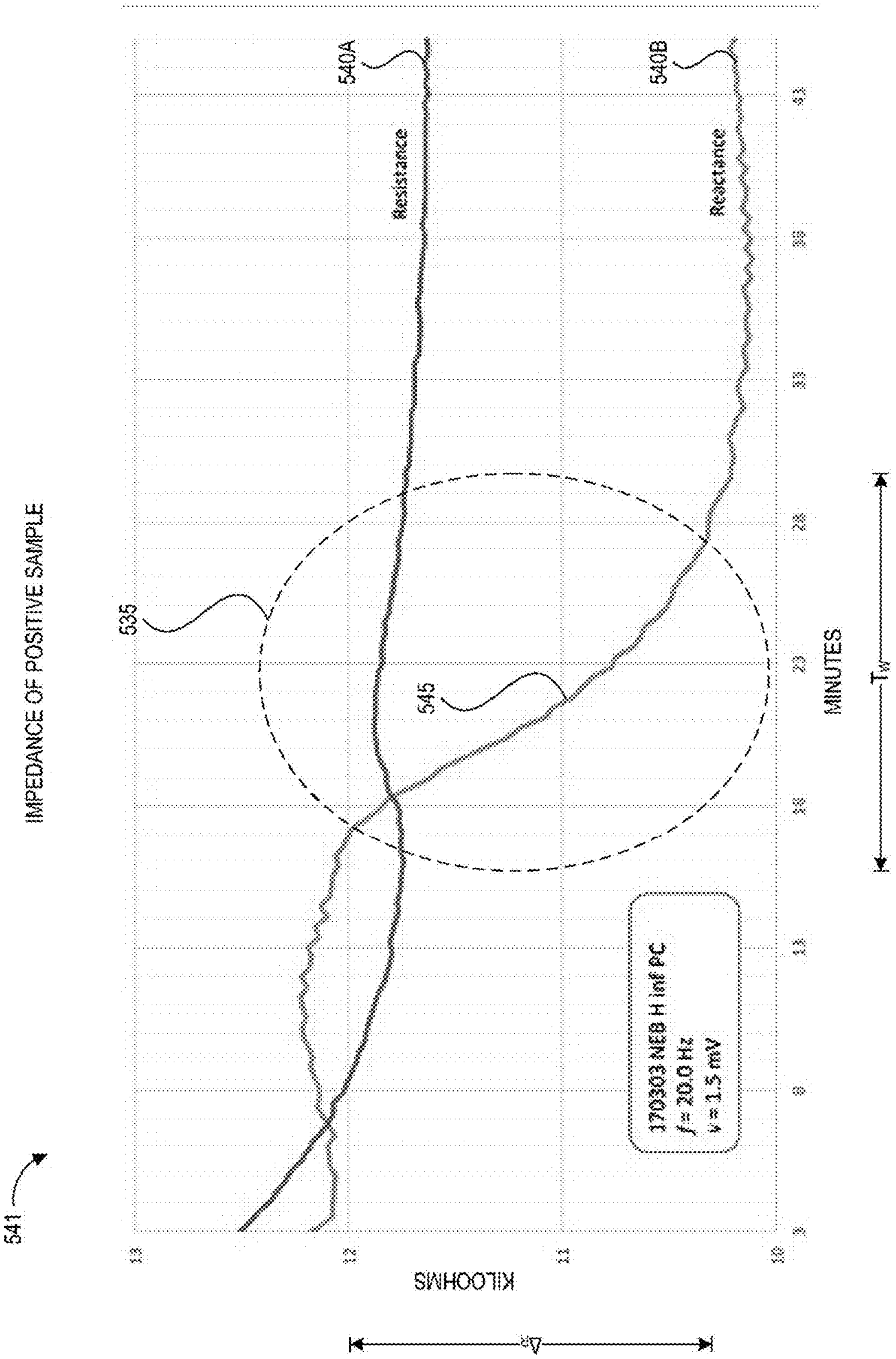
FIG. 5C depicts the resistance and reactance components extracted from a signal as shown in FIG. 5B generated based on an example positive test.

FIG. 5C depicts a plot 541 of the resistance 540A and reactance components 540B over time (t=3 minutes to t=45 minutes) extracted from a raw signal 520 generated based on an example positive test. As illustrated, the signal cliff 545 represents a change $\Delta_R$ in the reactance 540B during a particular window of time $T_W$. The signal cliff 545 indicates a positive sample. At times occurring prior to the signal cliff 545, the reactance curve 540B is relatively flat or stable, and again after the signal cliff 545 the reactance curve 540B is relatively flat or stable. Thus, in this embodiment the signal cliff 545 for the particular test parameters represented by the plot 541 occurs as a drop of $\Delta_R$ in the expected region 535.

The magnitude of the change $\Delta_R$ in the reactance that corresponds to a positive sample signal cliff 545, as well as the position and/or duration of the particular window of time $T_W$ at which the signal cliff 545 is expected to occur, can vary depending on a number of parameters of the test. These parameters include the particular target of the test (e.g., the rate at which that target amplifies), the frequency of the excitation voltage, the configuration of the excitation and sensor electrodes (e.g., their individual shapes and dimensions, the gap separating the electrodes, and the material of the electrodes), the sampling rate, the quantity of amplification agents provided at the start of the test, the temperature of the amplification process, and the amount of target present in the sample. In some embodiments, the expected characteristics of a signal cliff of a positive sample, predetermined for example through experimentation, can be used for differentiating between positive samples and negative samples. In some embodiments, the expected characteristics of a signal cliff can be used for determining the severity or progress of a medical condition, for example via correlations between particular signal cliff characteristics and particular initial quantities of the target in the sample. The predetermined expected characteristics can be provided to, stored by, and then accessed during test result determination by a reader device configured to receive signals from the sensing electrode(s) of a test cartridge.

For a given test, the expected magnitude of the change $\Delta_R$ in the reactance and the expected window of time $T_W$ of a signal cliff 545 for a positive sample can be determined experimentally based on monitoring and analyzing the reactance curves generated by positive control samples (and optionally negative control samples). In some embodiments, the test parameters influencing the signal cliff can be varied and fine-tuned to identify the parameters that correspond to an accurately distinguishable signal cliff. A reader and cartridge as described herein can be configured to match the tested configuration and provided with expected signal cliff characteristics for that test.

For example, in a set of experimental tests for *H. influenzae*, the test fluid initially included amplification primers and 1,000,000 added target copies, the excitation voltage was 200 mV P2P, the test parameters included a 10 kHz sweep start and a 10 MHz sweep stop for the frequency of the excitation current, and close and far electrode gaps were configured at 2.55 mm and 5 mm respectively. The amplification temperature was set to 65.5 degrees Celsius, and the two electrode setups (one for each of the close and far gaps) included platinum electrodes. At low frequencies (10 kHz-100 kHz), detectable signal cliffs were identified beginning around 23 minutes into amplification around 10 kHz and around 30 minutes around 100 kHz using the 5 mm gap electrode configuration, with the magnitude of change in reactance being around 3.5-4 Ohms at 10 kHz and dropping to around 3.25-3.5 Ohms at 100 kHz. At low frequencies (10 kHz-100 kHz), detectable signal cliffs were identified beginning around 25 minutes into amplification around 10 kHz and around 30 minutes around 100 kHz using the 2.5 mm gap electrode configuration, with the magnitude of change in reactance being around 3.5-4 Ohms. At higher frequencies, the drop in reactance of the signal cliff decreased, and the time at which these smaller signal cliffs were identified was shifted to later in the amplification process. Accordingly, in this example a test well in a test cartridge may be configured with the 5 mm gap electrodes and a reader device may be configured to provide 10 kHz excitation current to the test cartridge during amplification. The reader device can be provided with instructions to provide this current and monitor the resulting reactance of the test well throughout amplification or for a window of time around the expected signal cliff time (here, 23 minutes), for example between 20 and 35 minutes. The reader device can also be provided with instructions to identify a positive sample based on the reactance exhibiting around a 3.5-4 Ohm change around 23 minutes into amplification, or within the window of time around the expected signal cliff time.

Once identified, the values for $\Delta_R$ and $T_W$ can be provided to reader devices for use in distinguishing between positive and negative samples for that particular test. In some examples, such devices can determine whether the reactance curve 540B has the required value and/or slope at the identified window of time $T_W$ to correspond to the signal cliff. In other embodiments, the reader device can analyze the shape of the reactance curve over time to determine whether it contains a signal cliff. In some embodiments, a reader can modify its testing procedures based on the identified window of time $T_W$ at which the signal cliff 545 is expected to occur, for example by only providing the excitation voltage and monitoring the resultant signal within this window, advantageously conserving power and processing resources compared to continuous monitoring during an entire test time.

Figure 5D:
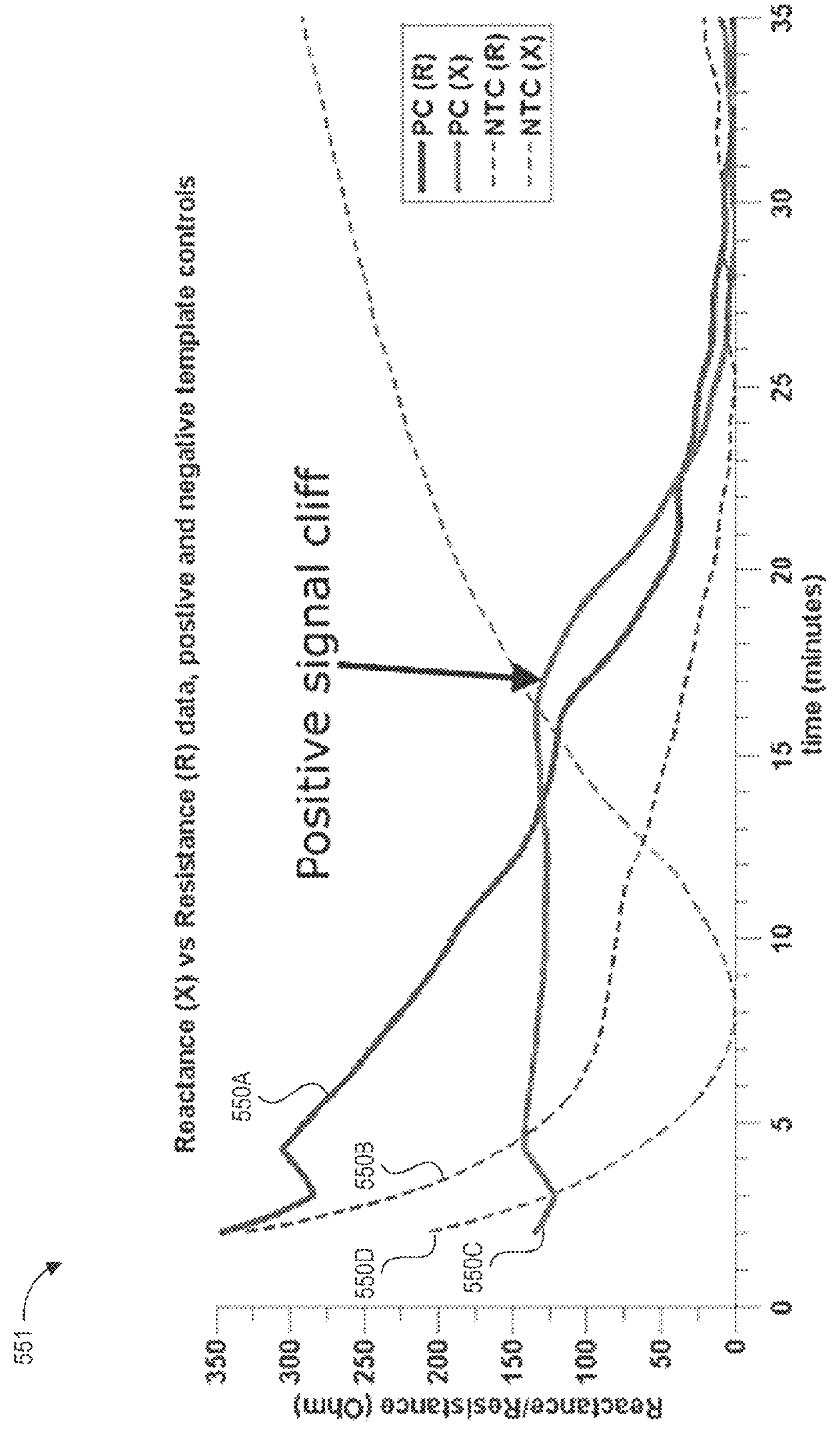
FIG. 5D depicts the resistance and reactance components extracted from signals as shown in FIG. 5B from example tests of positive and negative controls.

FIG. 5D depicts a plot 551 of the resistance and reactance components extracted from the raw sensor data of a sensing electrode 510B during example tests of positive and negative controls. Specifically, the plot 551 shows a curve 550A of the resistance of the positive sample, a curve 550B of the reactance of the positive sample, a curve 550C of the resistance of the positive sample, and a curve 550D of the reactance of the positive sample over the 35 minute duration of the test. As shown by FIG. 5D, the positive sample signal cliff occurs around 17 minutes into the test, with a relatively flat and stable reactance curve 550B leading up to the signal cliff. In contrast, at this same time the negative sample reactance curve 550D exhibits no signal cliff, but rather maintains a quadratic curvature from around t=8 minutes through the end of the test.

Figure 5E:
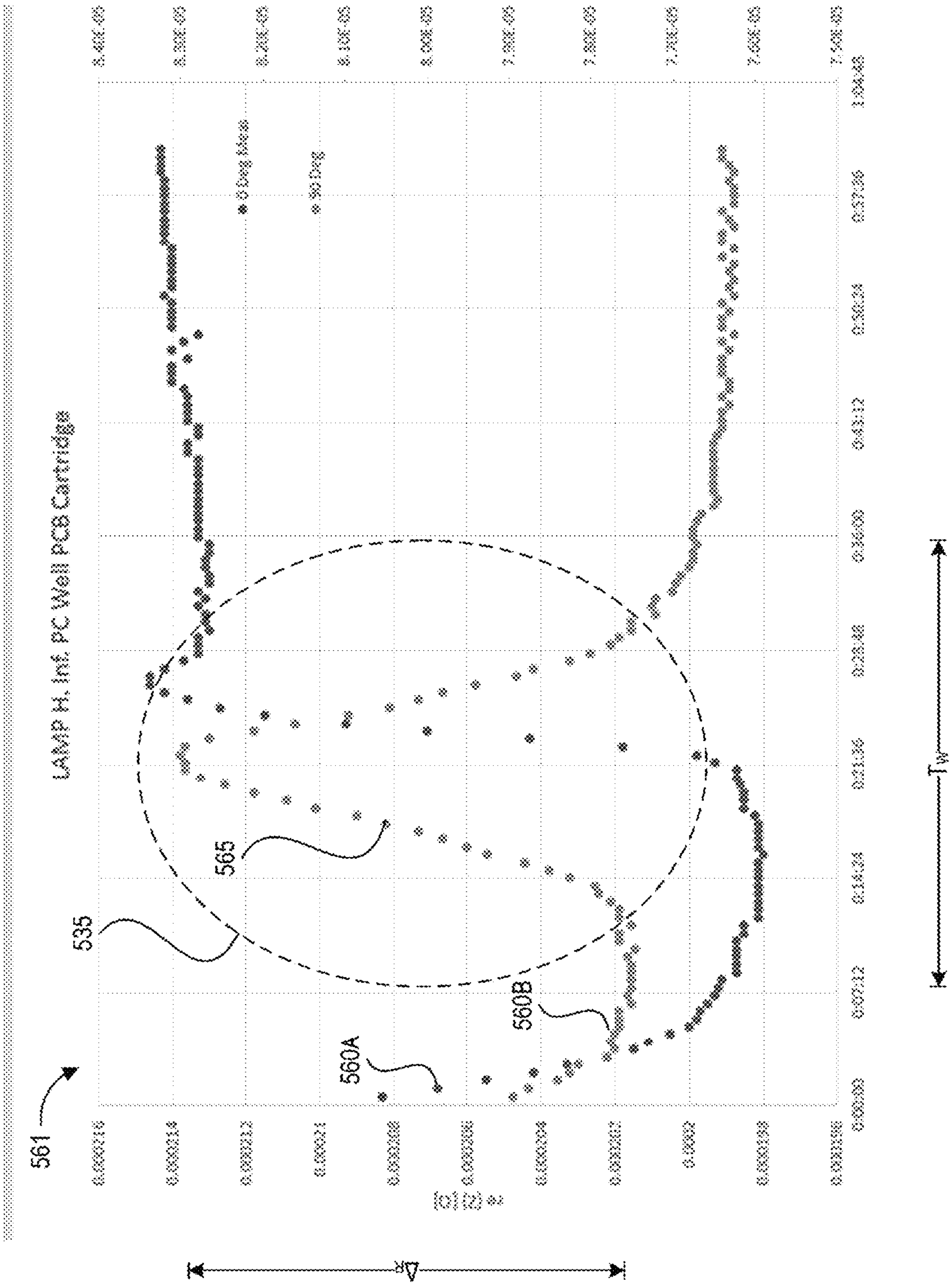
FIG. 5E depicts the resistance and reactance components extracted from a signal as shown in FIG. 5B generated based on another example positive test.

FIG. 5E depicts a plot 561 of the resistance 560A and reactance components 560B over time (t=0 minutes to t=60 minutes since the start of amplification) extracted from a raw signal 520 generated based on an example positive test. As illustrated, the signal cliff 565 represents a change $\Delta_R$ in the reactance 560B during a particular window of time $T_W$. The signal cliff 565 indicates a positive sample. At times occurring prior to the signal cliff 565, the reactance curve 560B is relatively flat or stable, and again after the signal cliff 565 the reactance curve 560B is relatively flat or stable with slight concavity. The signal cliff 565 for the particular test parameters represented by the plot 561 occurs as a peak, spike, or bell curve in the expected region 535, during which the reactance values rise and fall by the $\Delta_R$ value in an approximately parabolic curve. As described herein, varying of certain test parameters (e.g., test well configuration, chemistry and initial quantity of amplification constituents, target, and excitation current characteristics) can vary the geometry of the signal cliff yielded from a positive sample. Thus, in some embodiments the geometry of a "signal cliff" in the reactance values vs time curve can vary from test to test, though for a particular test the curve geometry and/or timing signal cliff remains consistent within reactance change and/or timing parameters across positive samples for that test.

Figure 6:
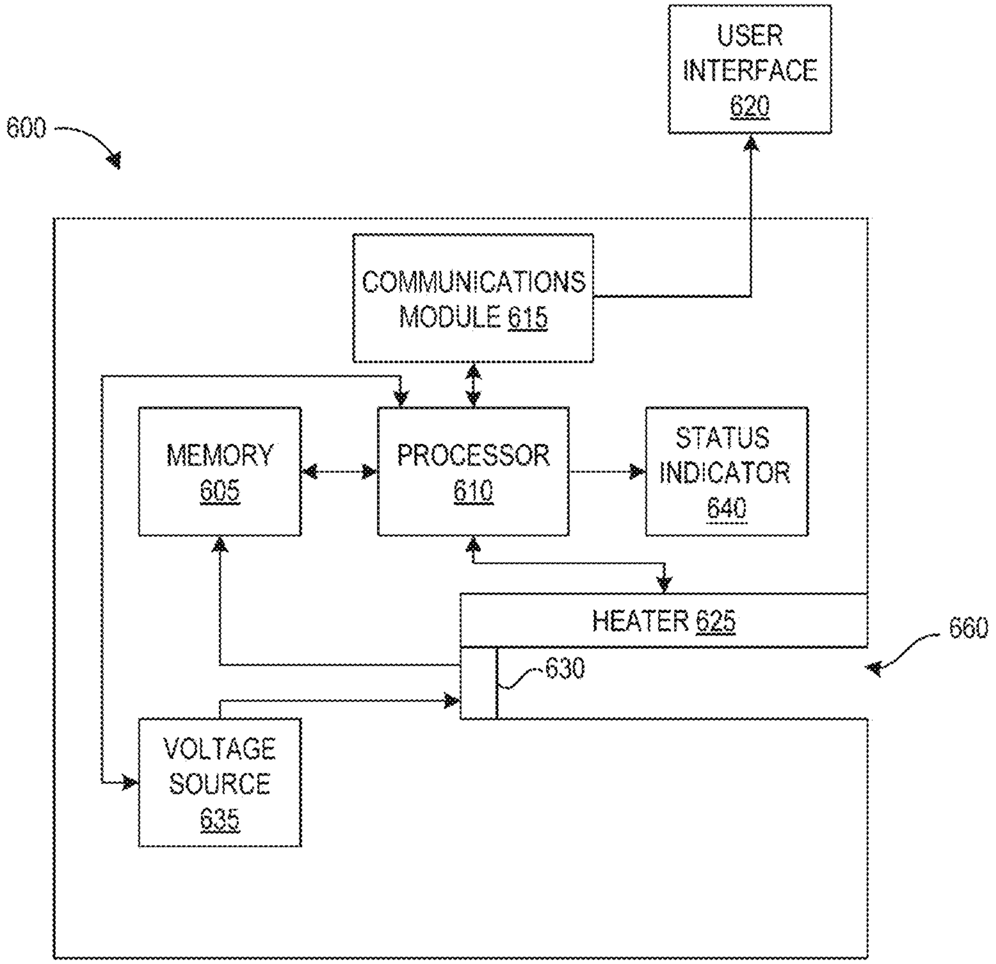
FIG. 6 depicts a schematic block diagram of an example reader device that can be used with the cartridges described herein.

FIG. 6 depicts a schematic block diagram of an example reader device 600 that can be used with the cartridges described herein, for example the cartridges 120 or 200. The schematically illustrated reader device 600 may be, for example, the reader device 110 of FIGS. 1A-1C. The reader device 600 includes a memory 605, processor 610, communications module 615, heater 625, electrode interface 630, voltage source 635, and a cavity 660 into which a cartridge can be inserted. The reader device 600 may further include a status indicator 640. The reader device 600 is in communication with a user interface 620, which may include a user interface of a remote computing device such as a smartphone, tablet, or other device having a testing control application executing thereon.

When test cartridge 120, 200 is inserted into the cavity 660 of the reader device 600, the electrode interface 214 of the cartridge couples with the electrode interface 630 of the reader device 600. This can allow the reader device 600 to detect that a cartridge is inserted, for example by testing whether a communication path is established. In some embodiments, the optional power cartridges described above with reference to FIGS. 1B and 1C may activate a power supply circuit of the reader device 600 when the electrode interface 214 of the cartridge couples with the electrode interface 630 of the reader device 600. Further, such communications can enable the reader device 600 to identify a particular inserted test cartridge 120, 200 and access corresponding testing protocols. Testing protocols can include the duration of the test, the temperature of the test, the characteristics of a positive sample impedance curve, and the information to output to the user based on various determined test results. In other embodiments, the reader device 600 can receive an indication via user interface 620 that a cartridge is inserted (e.g., by a user inputting a "begin testing" command and optionally a test cartridge identifier).

The memory 605 includes one or more physical electronic storage devices configured for storing computer-executable instructions for controlling operations of the reader device 600 and data generated during use of the reader device 600. For example, the memory 605 can receive and store data from sensing electrodes coupled to the electrode interface 630.

The processor 610 includes one or more hardware processors that execute the computer-executable instructions to control operations of the reader device 600 during a test, for example by controlling the heater 625, controlling the communications module 615 to interact with the user interface 620, and activating the voltage source 635. One example of testing operations is described with respect to FIG. 7A below. The processor 610 can be also be configured by the instructions to determine test results based on data received from the excitation electrodes of an inserted test cartridge, for example by performing the process of FIG. 7B described below.

The communications module 615 includes network-enabled hardware components, for example wired or wireless networking components, for providing networked communications between the reader device 600 and remote computing devices. Suitable networking components include WiFi, Bluetooth, cellular modems, Ethernet ports, or USB ports, and the like. Beneficially, networking capabilities can enable the reader device 600 to interact with and be controlled by remote computing devices such as one or more additional handheld computing devices (e.g., smartphones, tablets, etc.). In some embodiments, remote devices may be in communication additional remote computing systems such as hospital information systems and/or laboratory information systems that store electronic medical records, national health agency databases, and the computing devices of clinicians or other designated personnel. In addition, the networking capabilities can enable the reader device 600 to receive information over the network from remote computing devices, for example updated signal cliff parameters for existing test, new signal cliff parameters for new tests, and updated or new testing protocols.

The user interface 620 can be implemented within a remote device connected to the communications module 615 via WiFi, or Bluetooth, or the like. The remote device may have a testing control application installed thereon to provide a testing system user interface, for providing control options and/or presenting test results and other test information to users, on a display of the remote device. Further details of the user interface 620 are described with reference to FIGS. 8A-8D and FIGS. 15A-15P.

The heater 625 can be positioned adjacent to the cavity 660 for heating an inserted cartridge to the desired temperature for an amplification process. Though depicted on a single side of the cavity 660, in some embodiments the heater 625 can surround the cavity.

As described herein, the voltage source 635 can provide an excitation signal at a predetermined voltage and frequency to the excitation electrode of an inserted test cartridge.

The status indicator 640 may include any suitable notification device, such as one or more lights, sound generators, or the like. Operation of a light-based status indicator is described in greater detail with reference to FIGS. 1A-1C.

Figure 7A:
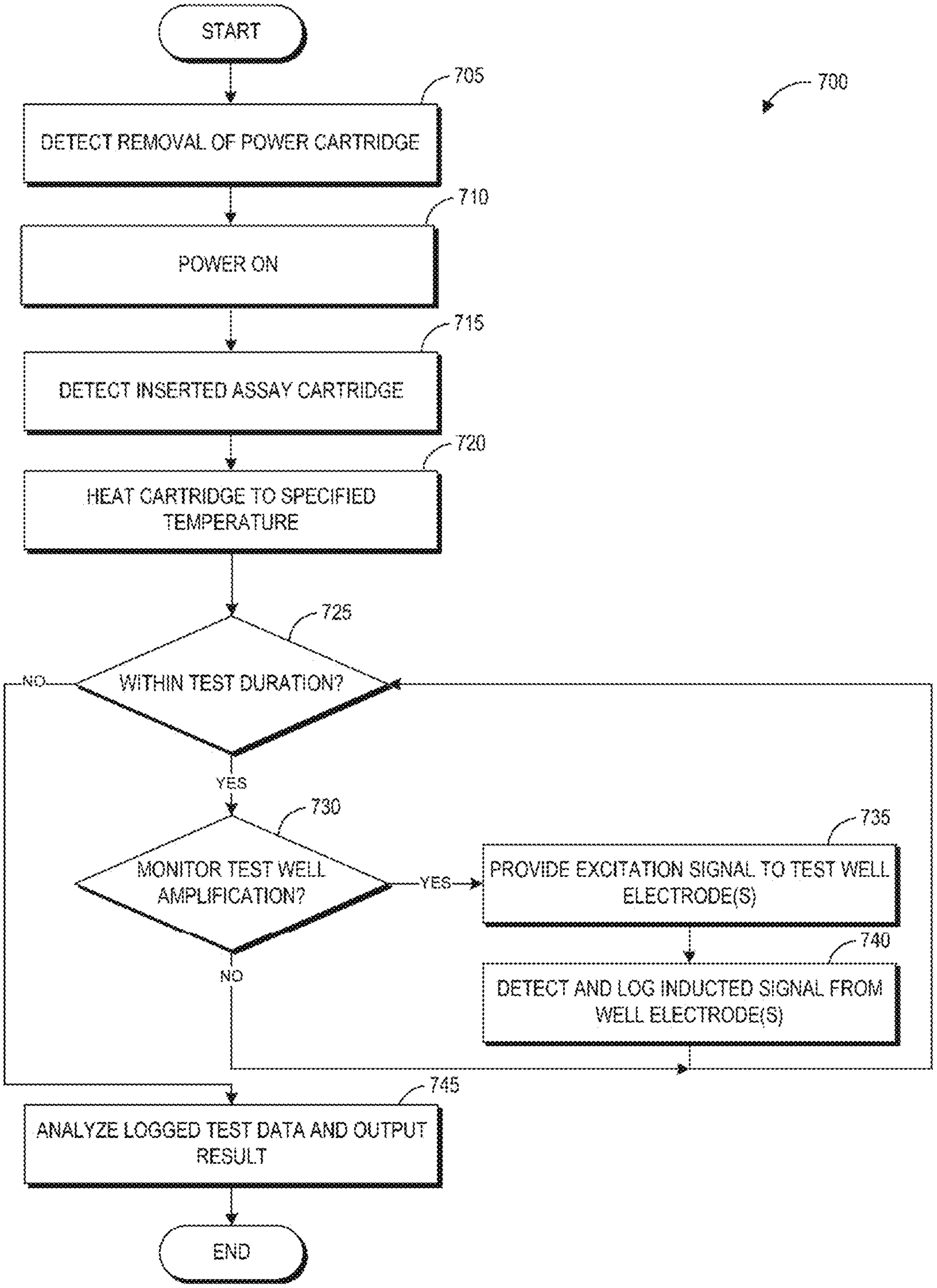
FIG. 7A depicts a flowchart of an example process for operating a reader device during a test as described herein.

FIG. 7A depicts a flowchart of an example process 700 for operating a reader device during a test as described herein. The process 700 can be performed by the reader device 600 described above.

At block 705, the reader device 600 can detect that a power cartridge has been removed from the reader device 600. In some embodiments, the detection of block 705 can occur based on the disconnection of a signal path between the electrode interface 630 of the reader device 600 and one or more contact pads $214_1$-$214_5$ (FIG. 2D) of the power cartridge.

At block 710, the reader device 600 automatically powers on in response to detecting the removal of the power cartridge at block 705. In some embodiments, the reader device may transmit a notification to a user interface 620 device and/or illuminate one or more status lights of a status indicator 640 to indicate that the reader device 600 is powered on and ready to receive an assay cartridge 120, 200.

At block 715, the reader device 600 can detect that an assay cartridge 120, 200, has been inserted, for example in response to user input or in response to establishing a signal path with the inserted cartridge. In some embodiments, the cartridge 120, 200 can include an information element that identifies the particular test(s) to be performed to the reader device 600 and optionally includes test protocol information.

At block 720, the reader device 600 can heat the cartridge 120, 200 to a specified temperature for amplification. For example, the temperature can be provided by information stored on the cartridge 120, 200 or accessed in the internal memory of the reader device 600 in response to identification of the cartridge 120, 200.

At decision block 725, the reader device 600 can determine whether the test is still within its specified test duration. For example, where the expected window of time in which a signal cliff should appear in a positive sample is known, the duration of the test may end at or some predetermined period of time after the end of the window. If so, the process 700 transitions to optional decision block 730 or, in embodiments omitting block 730, to block 735.

At optional decision block 730, the reader device 600 determines whether to monitor the test well amplification by logging data from the test well sensing electrode. For example, the reader 600 may be provided with instructions to only monitor the impedance of the test well during a particular window or windows of a test. If the reader device 600 determines not to monitor the test well amplification, the process 700 loops back to decision block 725.

If the reader device 600 determines to monitor the test well amplification, the process 700 transitions to block 735. At block 735, the reader device 600 provides an excitation signal to the excitation electrode of the test well(s) of the inserted cartridge. As described above, this can be an alternating current at a particular frequency and voltage.

At block 740, the reader device 600 detects and logs data from the sensing electrode of the test well(s) of the inserted cartridge. In some embodiments, this data can be stored for later analysis, for example after completion of the test. In some embodiments, the reader device 600 can analyze this data in real time (e.g., as the test is still occurring) and may stop the test once a positive sample signal cliff is identified.

When the reader device 600 determines at block 725 that the test is not still within its specified duration, the process 700 moves to block 745 to analyze the test data and output the test result. The test result can include an indication that the sample tested positive or negative for the target, or can more specifically indicate an estimated quantity of the target in the tested sample. Following the conclusion of the test, further tests may be performed by returning to block 715 for a new assay cartridge. Alternatively, the reader device 600 may detect insertion of a power cartridge and power off in response.

Figure 7B:
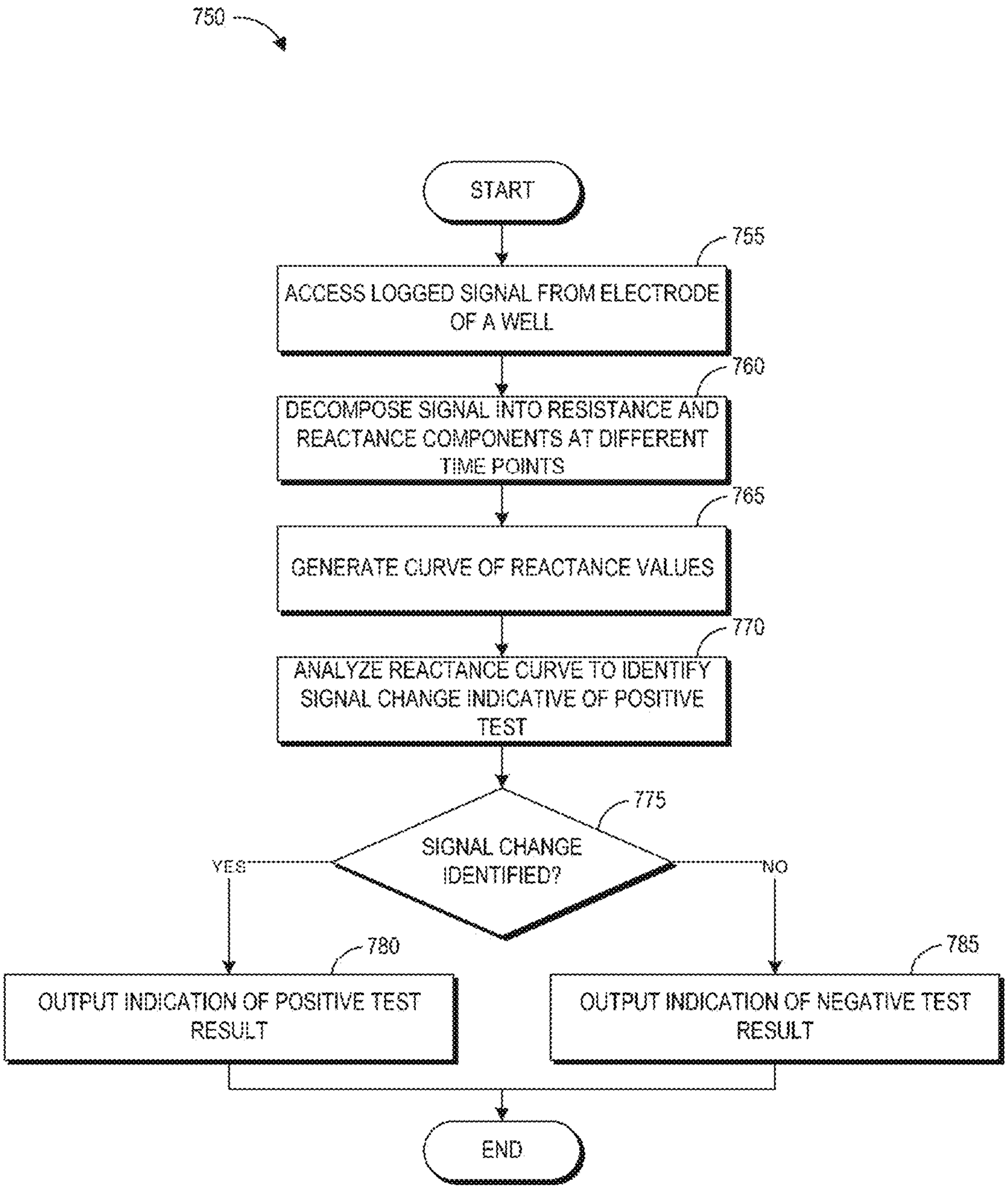
FIG. 7B depicts a flowchart of an example process for analyzing test data to detect a target as described herein.

FIG. 7B depicts a flowchart of an example process 750 for analyzing test data to detect a target as described herein that can be performed by the reader device 600 as block 745 of FIG. 7A.

At block 755, the reader device 600 can access logged signal data received from the electrode of a well.

At block 760, the reader device 600 can decompose the signal into resistance and reactance components across some or all of the different time points of the test. For example, as described above, at each time point the reader device 600 can determine in phase and out of phase components of the raw sampled voltage waveform and can then deconvolute these components using known series resistance of the electrode circuit to calculate the in-phase (resistance) and out-of-phase (reactance) portions of the impedance of the test well.

At block 765, the reader device 600 can generate a curve of the reactance values over time. Also, at block 765, the reader device 600 can optionally generate a curve of the resistance values over time.

At block 770, the reader device 600 can analyze the reactance curve to identify a signal change indicative of a positive test. As described above with respect to the signal cliff of FIG. 5C, the reader device 600 can look for greater than a threshold change in reactance, can look for such a change within a predetermined window of time, can analyze the slope of the reactance curve at a predetermined time, or can analyze the overall shape of the reactance curve in order to determine whether a signal cliff (e.g., a rise or drop in the signal preceded and followed by relatively more stable values) is present.

At decision block 775, based on the analysis performed at block 770, the reader device 600 can determine whether the sought-after signal change was identified in the reactance curve. If so, the process 750 transitions to block 780 to output an indication of a positive test result to the user. If not, the process 750 transitions to block 785 to output an indication of a negative test result to the user. The result can be output locally, for example on the display of the device, or output over a network to a designated remote computing device.

FIGS. 8A-8D depict screens of an example graphical user interface 800 of a user device implementing an example testing process in communication with a reader device as described herein. The user interface 800 may be, for example, the user interface 620 illustrated in connection with the reader device 600 of FIG. 6. The user interface 800 may be implemented with any of the reader devices 110, 600 and/or assay cartridges 120, 200 described herein. The screens depicted in FIGS. 8A-8D may be displayed, for example, by an application executing on a smartphone or other user interface device paired to the reader device 110, 600 (e.g., by WiFi, Bluetooth, or the like) so as to allow a user to control and/or monitor the reader device 110, 600 from the user interface device.

Figure 8A:
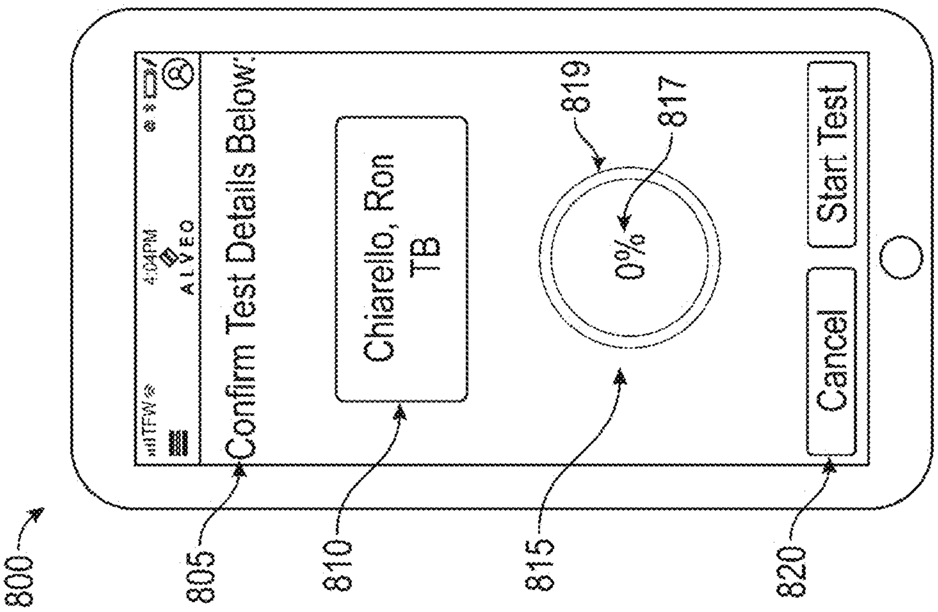
FIGS. 8A-8D depict an example user interface of a user device implementing an example testing process in communication with a reader device as described herein.

FIG. 8A depicts an initial pre-test screen which may be displayed after an inserted assay cartridge 120, 200 has been detected. In one example, a user scans a cartridge identifier (e.g., cartridge identifier 215 of FIG. 2B) of a cartridge before inserting the cartridge into the reader device. When the device is inserted, the paired reader device detects the inserted cartridge and sends a message to the user interface device that the cartridge has been inserted. The application then displays the initial pre-test screen depicted in FIG. 8A.

The initial pre-test screen includes a status indication area 805, a test identifying area 810, a progress indication area 815 including a numeric progress indication 817 and a graphical progress indication 819, and an input area 820. The status indication area 805 may include an instruction, such as a request for the user to confirm the information in the test identifying area 810. The test identifying area 810 includes information associated with the test to be performed, such as a name or other identifier of a test subject, a condition or target agent to be detected, or the like. In the initial pre-test screen of FIG. 8A, the input area 820 includes user-selectable “cancel” and “start test” options to allow the user to cancel the test or confirm the details and start the test.

Figure 8B:
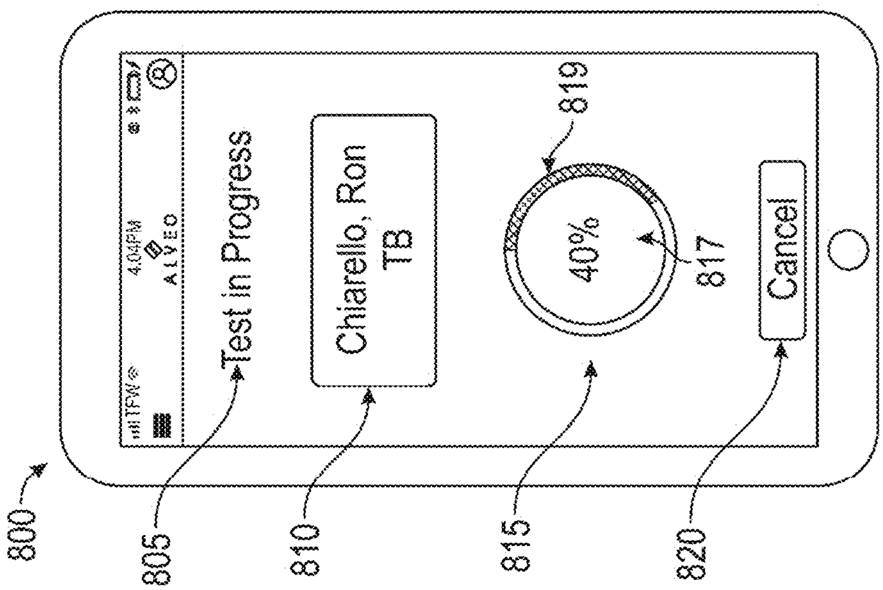

FIG. 8B depicts a mid-test screen that may be displayed while the reader device is conducting the test on the fluid sample within the cartridge. The status indication area 805 indicates that the test is in progress. As the test progresses, the numeric progress indication 817 and the graphical progress indication 819 are updated to display the current progress of the test. A user-selectable option to cancel the test is provided in the input area to allow a user to stop the test if desired.

Figure 8C:
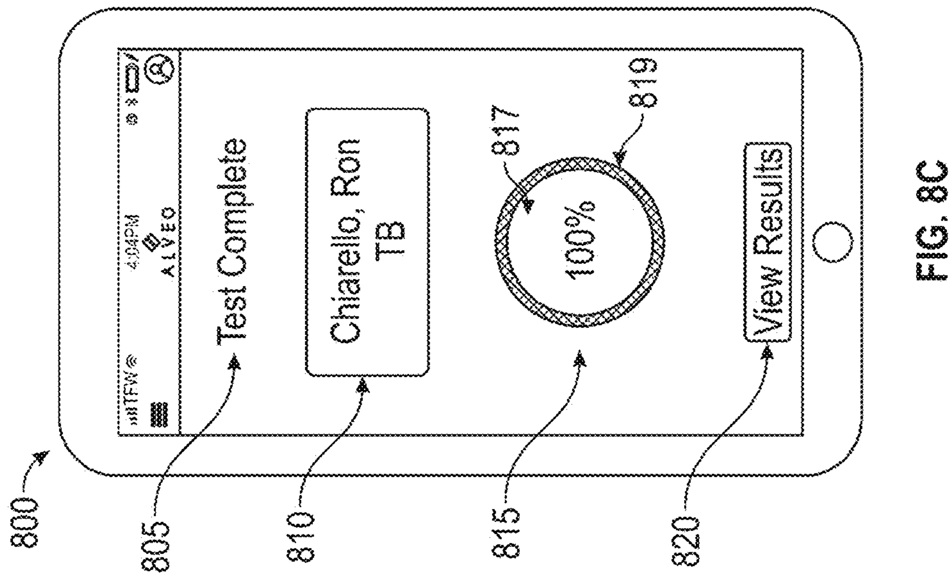

FIG. 8C depicts an initial test completion screen that may be displayed when the reader device has completed the test and has analyzed the logged test data to determine a test result. The status indication area 805, numerical progress indication 817, and/or the graphical progress indication 819 may indicate that the test is complete. In the input area 820, a user-selectable option to view the test results is provided.

Figure 8D:
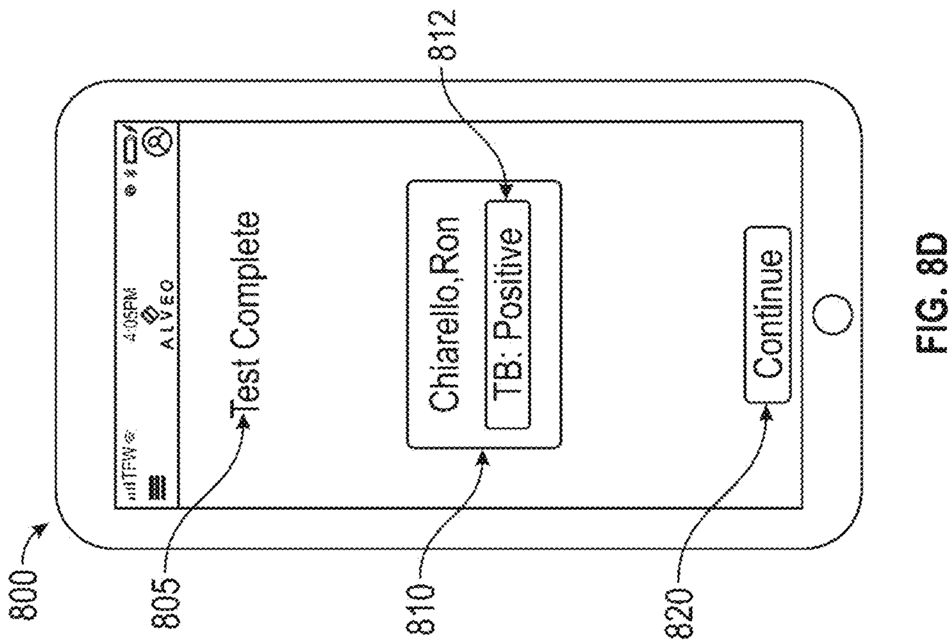

FIG. 8D depicts a test result display screen for communicating the results of the test to a user. The test identifying area 810 may still display some or all of the originally displayed test identifying information. The test identifying area 810 may additionally display an outcome 812, such as positive or negative, or other condition associated with the test results. The input area 820 may provide a user-selectable option to continue (e.g., to conduct additional tests, transmit results, etc.).

Figure 9A:
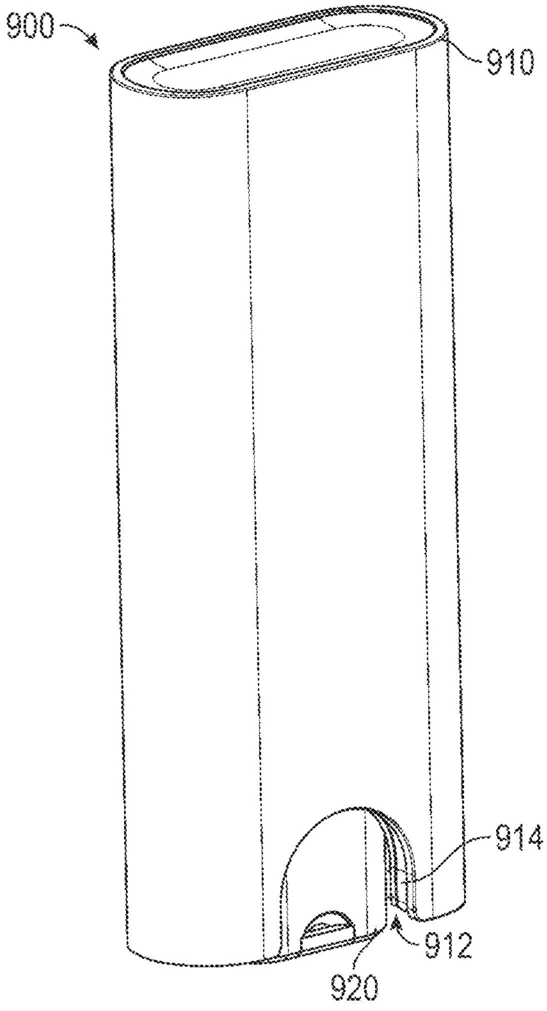
FIGS. 9A and 9B depict an example handheld system for detection of a target.
Figure 9B:
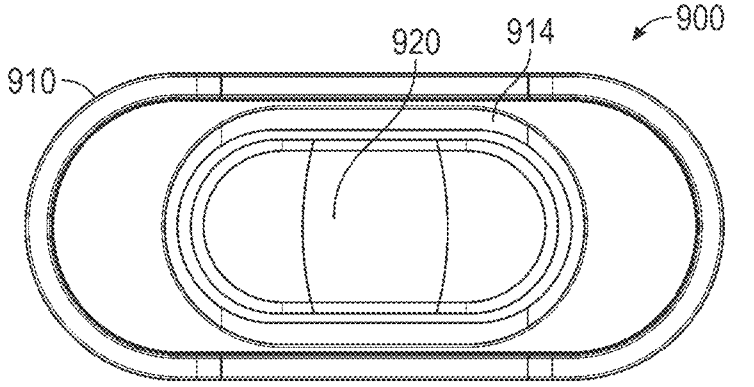

FIGS. 9A and 9B depict a further example of a handheld detection system 900 for detection of a target. Similar to the system 100 of FIGS. 1A-1C, the system 900 may be implemented in conjunction with any of the target detection processes, systems, and devices described herein. The system 900 includes a reader device 910 and a cartridge 920 configured to fit within a cavity 912 of the reader device 910. The cartridge 920 is sized and shaped to be gripped by a user to facilitate insertion and/or removal of the cartridge 920 from the reader device 910. The reader device 910 may further include a light ring 914 disposed about the cavity 912. The light ring 914 may include any or all of the light sources, colors, operation modes, etc., described above with reference to the light ring 114 of FIGS. 1A-1C.

FIGS. 10A-10K depict an example cartridge 1000 configured for detection of a target. As described herein, the target may be a viral target, bacterial target, antigen target, parasite target, microRNA target, or agricultural analyte.

Some embodiments of the cartridge 1000 can be configured for testing for a single target, while some embodiments of the cartridge 1000 can be configured for testing for multiple targets. The cartridge 1000 includes a cartridge body 1010 and a cap 1050 configured to be mechanically coupled to the cartridge body 1010. The cartridge body 1010 and the cap 1050, when coupled together, can form an assembled cartridge 1000 for insertion into a reader device such as the reader device 910 of FIGS. 9A and 9B. As will be described in greater detail below, the cartridge body 1010 may include a plurality of test wells therein, such that a single cartridge 1000 can be configured for testing a single sample for multiple targets.

Figure 10A:
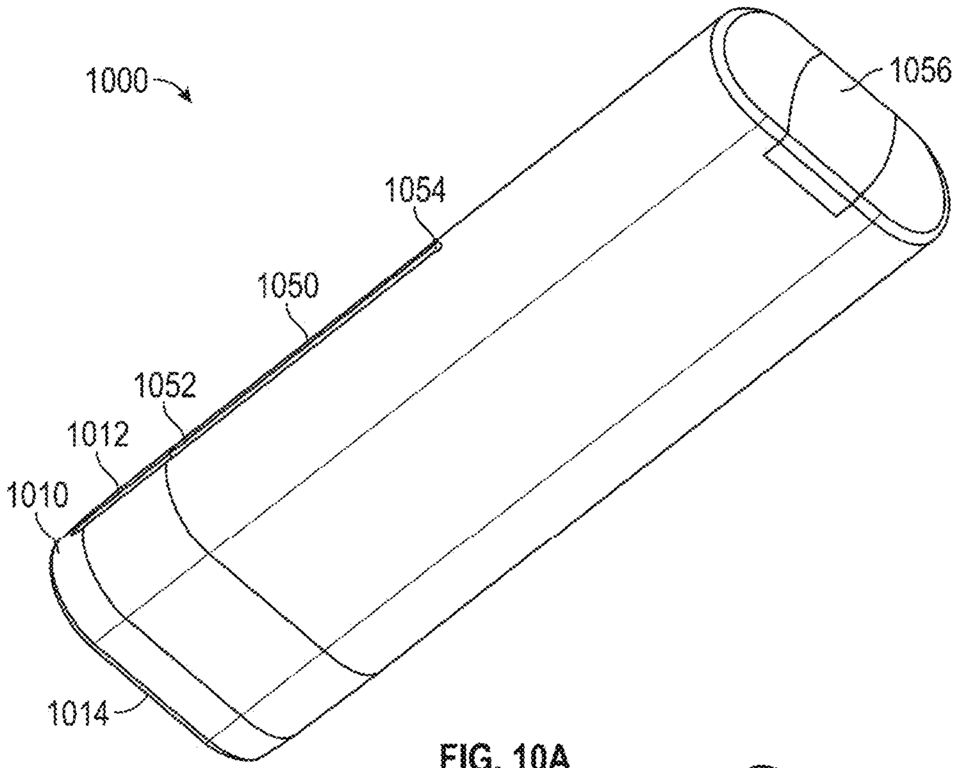
FIGS. 10A-10K depict an example cartridge for detection of a target that can be used in the handheld system of FIGS. 9A and 9B.
Figure 10B:
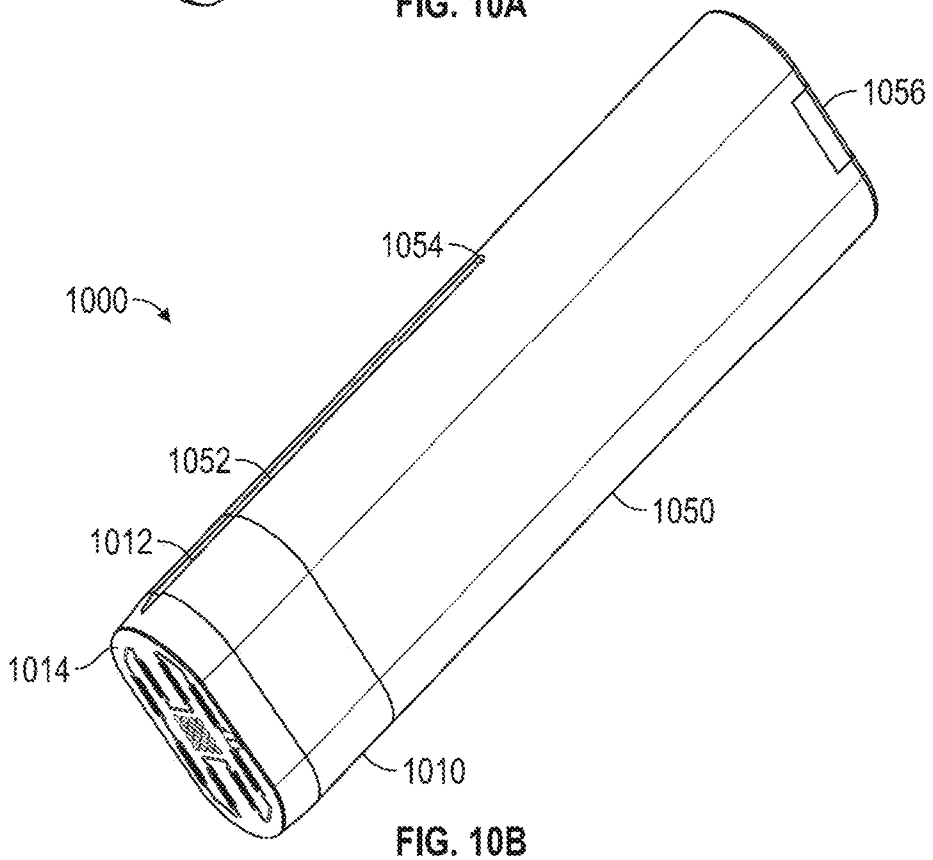

FIGS. 10A and 10B depict a complete cartridge 1000 including the cartridge body 1010 and the cap 1050 coupled together. In use, the cap 1050 and the cartridge body 1010 can operate to seal a provided sample within the cartridge 1000, thereby preventing exposure of test operators to the sample and preventing any liquid from escaping into the electronics of an associated reader device. The cartridge body 1010 and the cap 1050 may be coupled by a friction fit, a snap fit, and/or one or more mechanical or chemical securing means. Coupling of the cartridge body 1010 and the cap 1050 is discussed in greater detail with reference to FIGS. 11A-11D.

The cartridge body 1010 and the cap 1050 can be formed from suitable fluid-impermeable materials such as plastic, metals, or the like, and may be opaque, translucent, or transparent. The cartridge body 1010 can also include a transparent, translucent, or opaque cover surface such as a printed circuit board (PCB) 1014 or other surface partially defining a fluid path within the cartridge body 1010. The PCB 1014 and fluid paths are discussed in greater detail with reference to FIGS. 10E-10K. The cartridge body 1010 and/or the cap 1050 can further include a cartridge identifier 1011. The cartridge identifier 1011 may include human-readable and/or machine-readable information, such as text, a barcode, a QR code, or the like. The cartridge identifier 1011 can include any suitable information associated with the cartridge, such as information specifying a type of test, a target agent, a sample type, a cartridge serial number or other individual cartridge identifier, etc. In addition to serving as an identifier for a user of the type of test associated with the cartridge 1000, the cartridge identifier 1011 may also be scanned by a user (e.g., using a user interface device in communication with a reader device) to communicate one or more test protocols to the reader device.

The cartridge body 1010 and/or the cap 1050 can include ergonomic features such as an indentation or the like to facilitate handling of the cartridge 1000. In the example cartridge 1000 depicted, the cartridge body 1010 further includes an alignment groove 1012 located to align with an alignment groove 1052 of the cap 1050. The alignment groove 1052 of the cap 1050 terminates at a stop 1054 configured to engage a protrusion within a corresponding reader device (e.g., the reader device 910 of FIGS. 9A and 9B) to define a fully inserted position of the cartridge 1000 within the reader device. The cap 1050 can further include a sample receiving area cap 1056 sized and shaped to sealingly close an opening in the cap 1050 for receiving a swab or other sample carrying holding a sample to be analyzed.

Figure 10C:
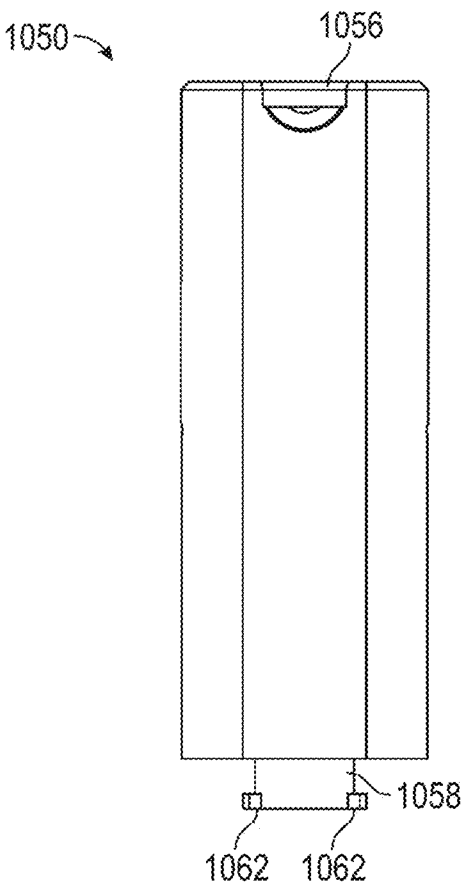
Figure 10D:
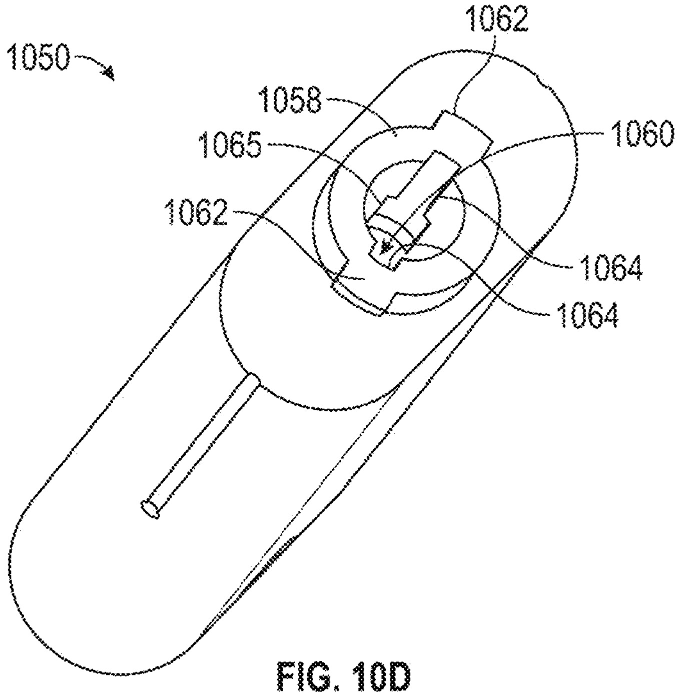

FIGS. 10C and 10D depict the cap 1050 component of the cartridge 1000 of FIGS. 10A and 10B. The cap 1050 comprises an elongate body which is at least partially hollow to receive a sample carrier such as a swab or the like. An opening in the cap 1050 for receiving the sample carrier may be sealed by the sample receiving area cap 1056, which may include one or more O-rings or other resilient structures to sealingly block the opening in the cap 1050.

The cap 1050 further includes a collar 1058 protruding from the cap 1050. The collar 1058 is sized and shaped to facilitate coupling with the cartridge body 1010. The collar 1058 generally comprises a hollow cylindrical body defining a plunger receiving well 1060 through which the fluid sample may pass from the cap 1050 into the cartridge body 1010. The collar 1058 includes interlocking fins 1062 extending radially outward from an exterior surface of the collar 1058, and receiving channels 1064 within an interior surface of the collar 1058. Each receiving channel 1064 terminates in a widened section 1065 such that the receiving channels 1064 are configured to receive and retain one or more snap-fit connectors of the cartridge body 1010, as will be described with reference to FIGS. 11A-11D.

The cap 1050 may further include one or more liquid constituents therein to be mixed with a received sample. For example, liquid constituents may include one or more amplification reagents, buffer solutions, water, mucin mitigating agents, or other desired liquid constituents for the testing process. The particular selection and chemistry of these liquids can be tailored to a particular target or targets for which the cartridge 1000 is designed to test. In some embodiments, the liquid constituents may be contained within a blister pack within the cap 1050. The blister pack may be punctured by, for example, insertion of a sample carrier, coupling of the cap 1050 to the cartridge body 1010, etc.

Figure 10E:
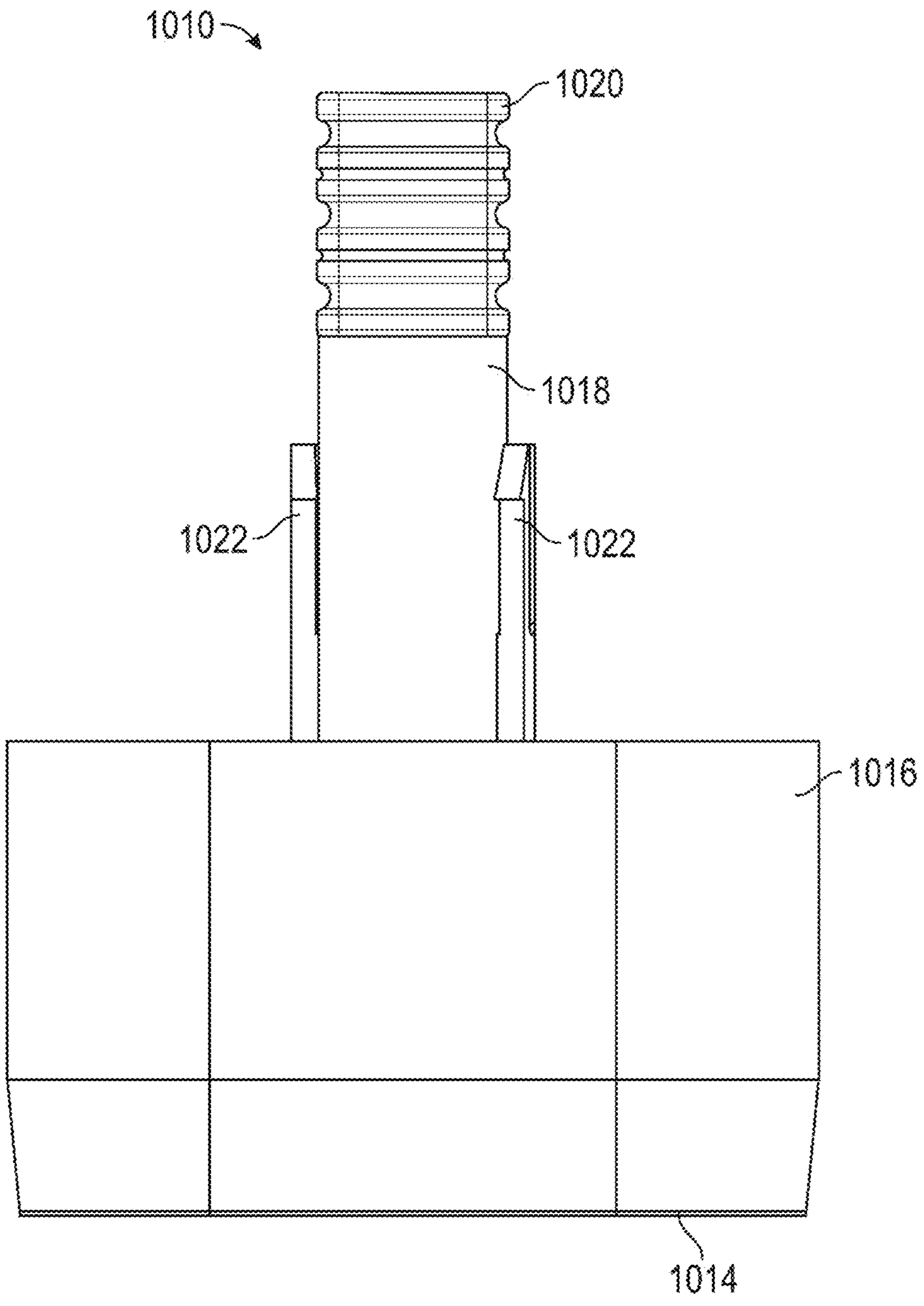
Figure 10F:
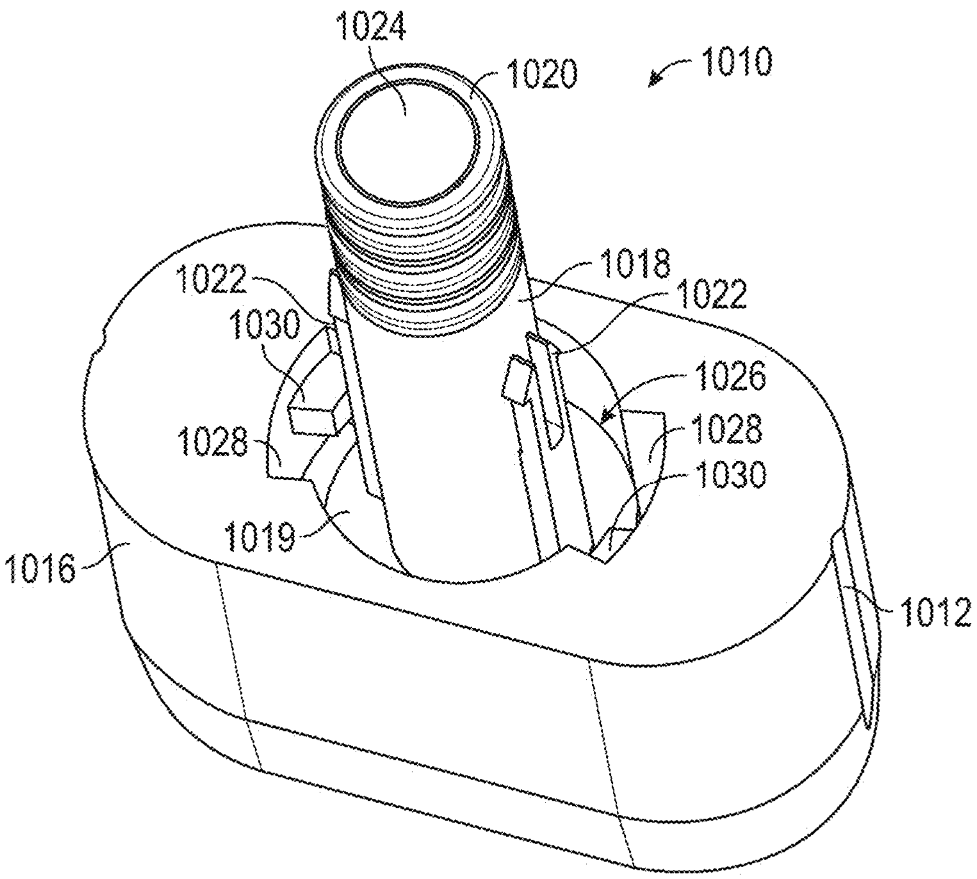
Figure 10G:
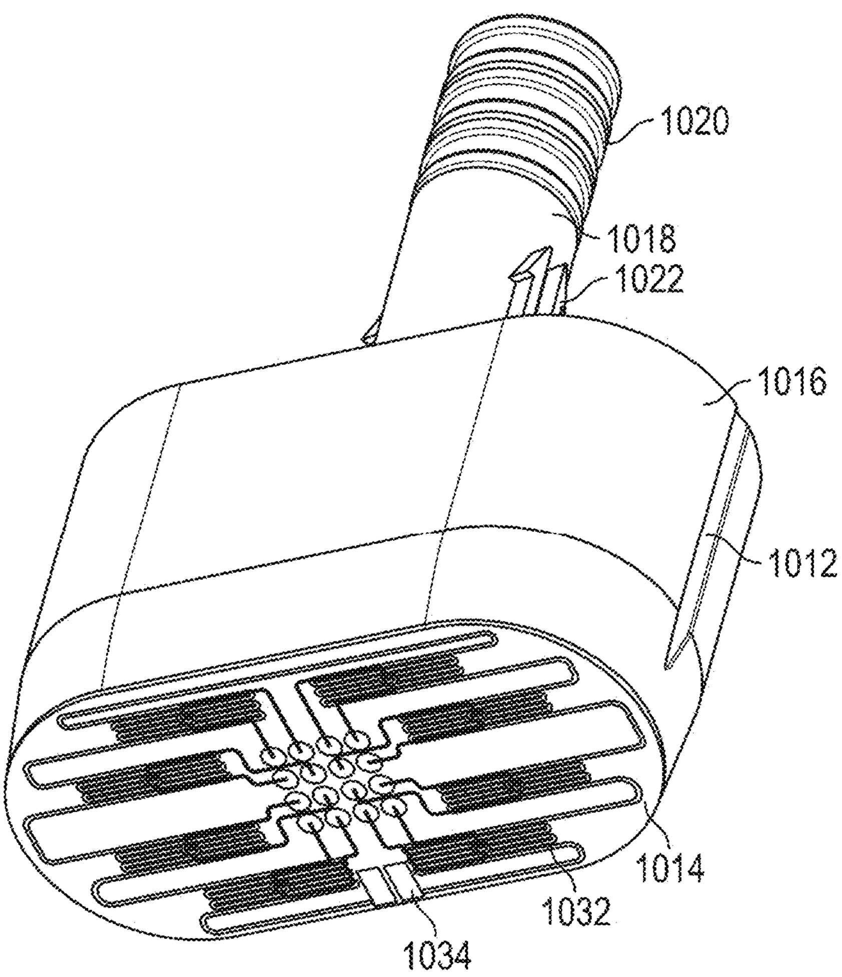
Figure 10H:
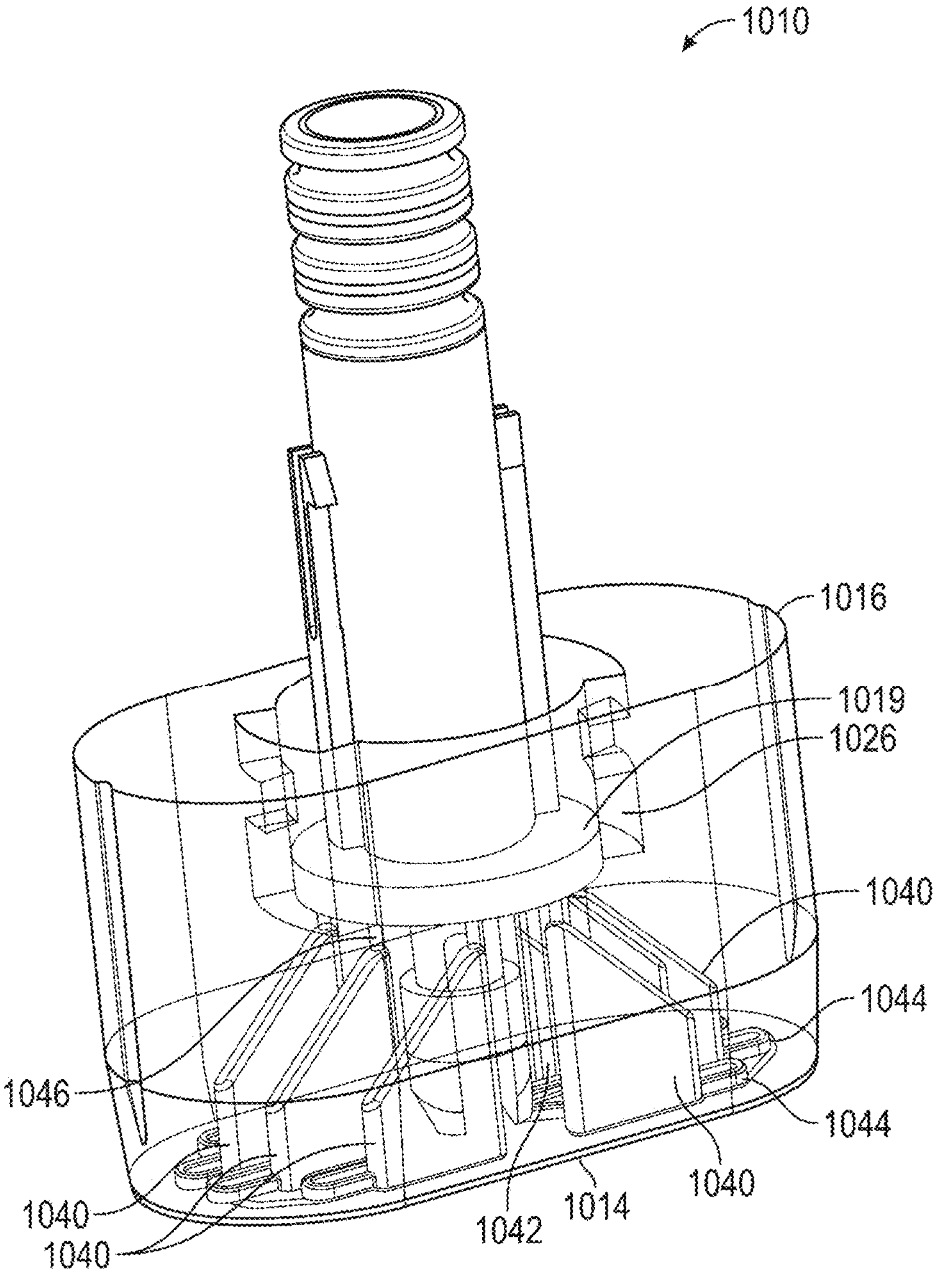
Figure 10I:
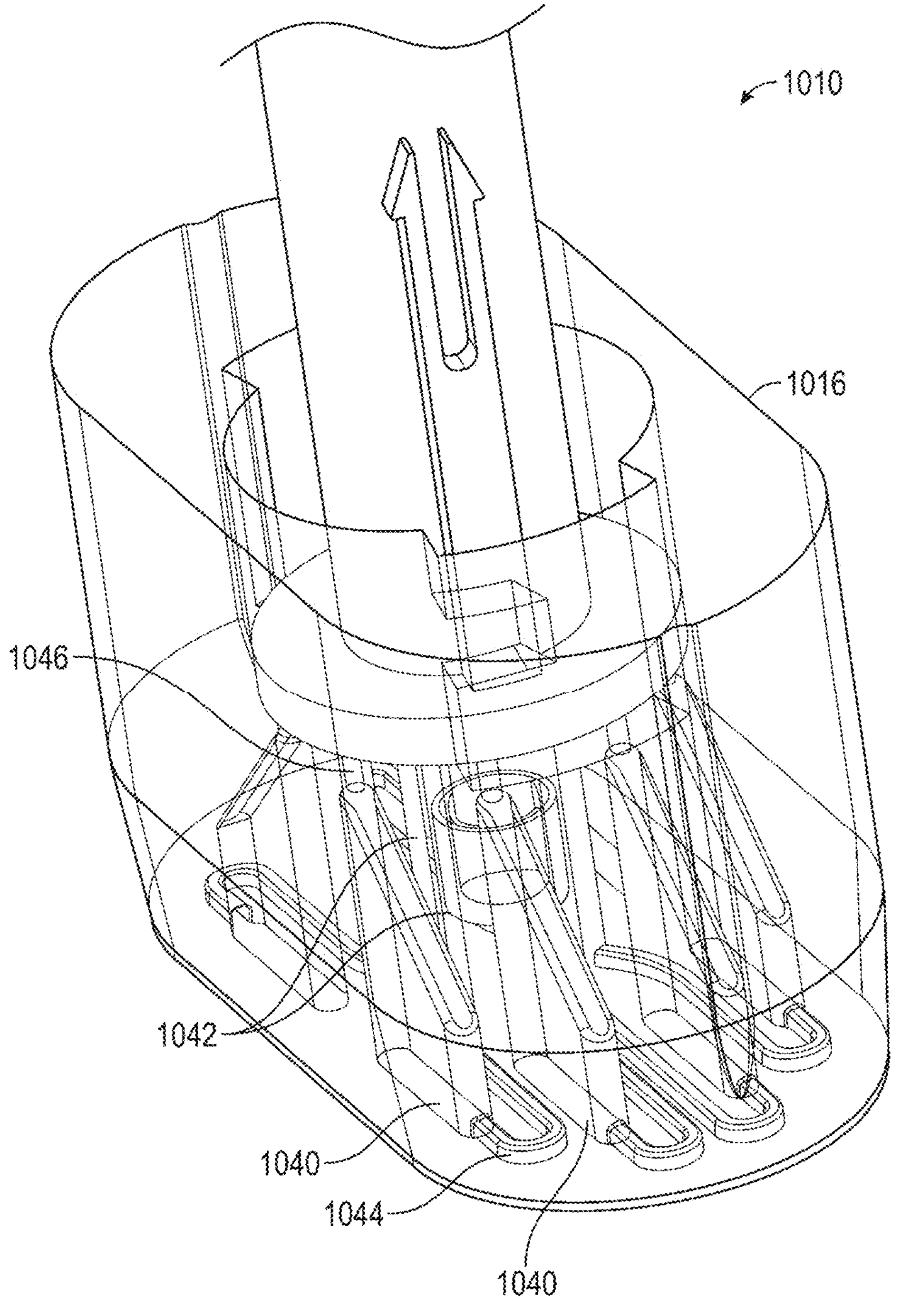
Figure 10J:
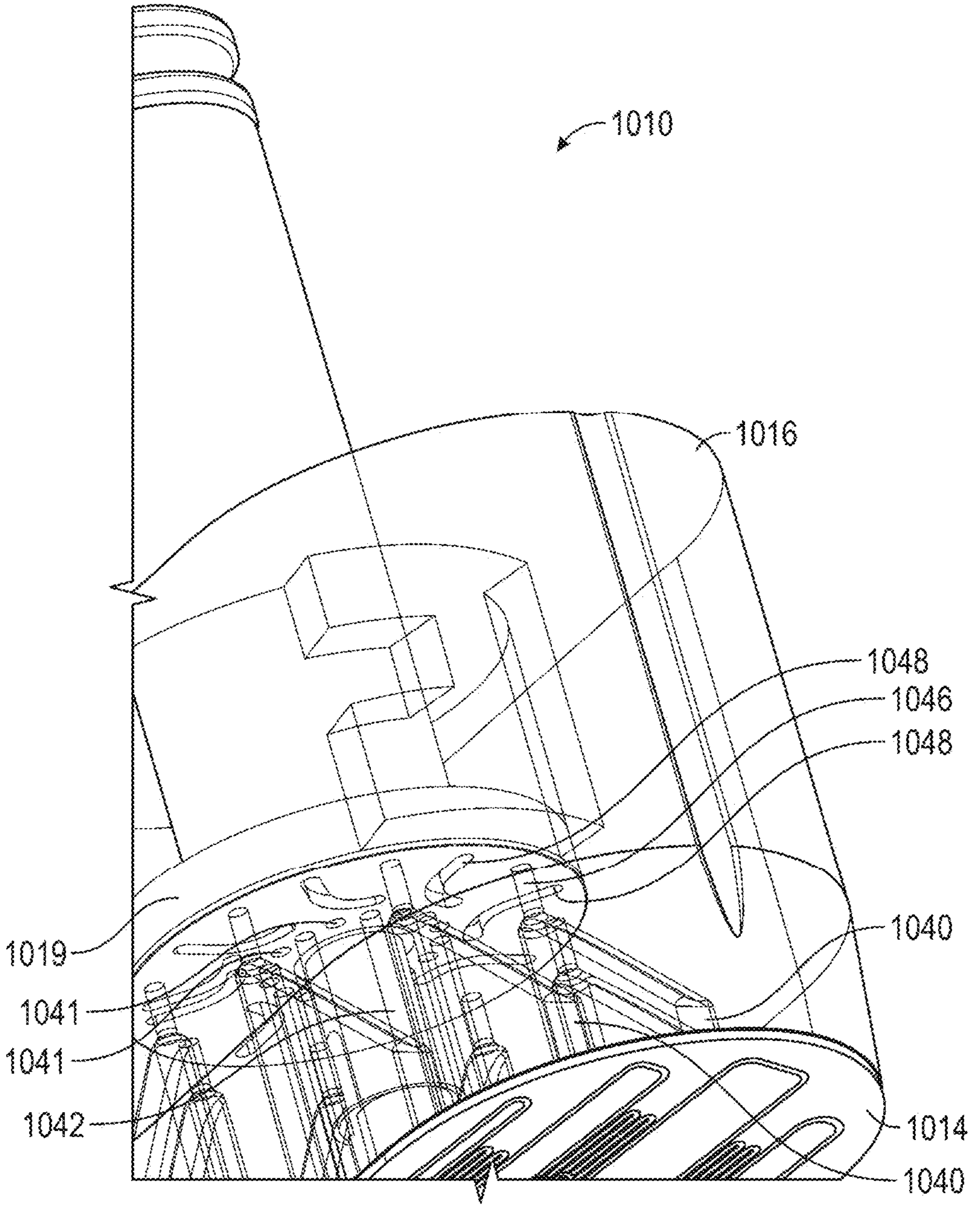
Figure 10K:
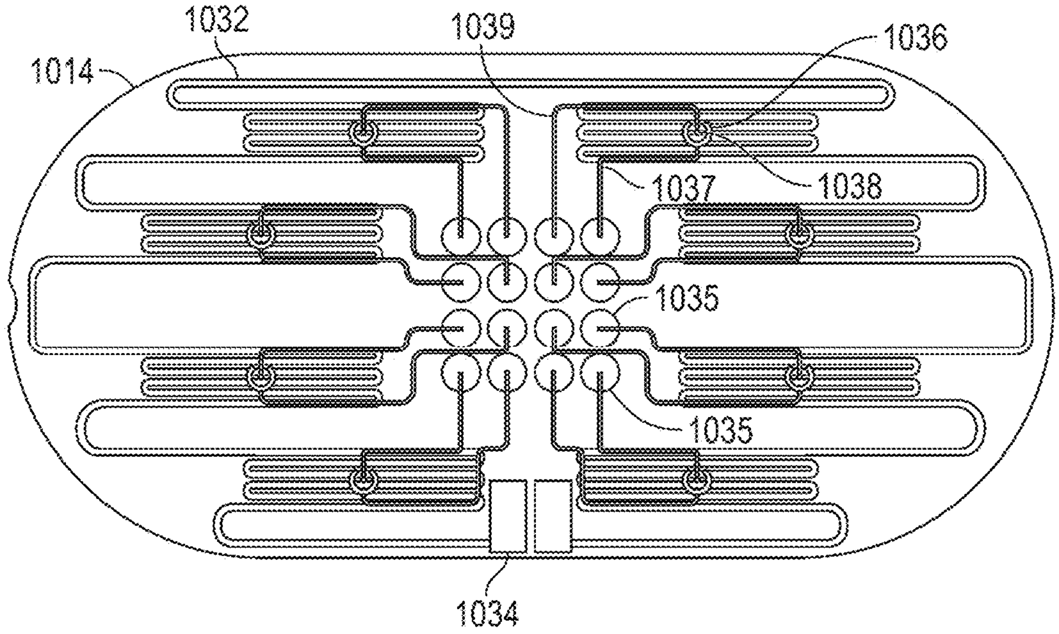

FIGS. 10E-10K depict the cartridge body 1010 component of the cartridge 1000 of FIGS. 10A and 10B. FIGS. 10E-10G are exterior views of the cartridge body 1010. FIGS. 10H-10J depict the cartridge body 1010 with partial translucency to illustrate fluid paths integrally formed therein. FIG. 10K is an enlarged view depicting the PCB 1014 of the cartridge body 1010. Referring to FIGS. 10E-10G, the cartridge body 1010 includes a base 1016 and a hollow plunger 1018 rotatably coupled within a receiving well 1026 of the base such that the plunger 1018 can rotate about its longitudinal axis while being retained within the receiving well 1026.

The plunger 1018 comprises a generally cylindrical body sized and shaped to fit within the plunger receiving well 1060 of the cap 1050 (FIGS. 10C and 10D). A sealing portion 1020 of the plunger 1018 is disposed at a distal end of the plunger 1018 and may include one or more resilient structures (e.g., one or more O-rings, integrally formed elastomeric structures, etc.) having an appropriate diameter to sealingly engage with the interior walls of the plunger receiving well 1060 of the cap 1050. A sacrificial seal 1024 such as a layer of a metallic foil or other thin material may be provided to prevent exposure of the interior of the cartridge body 1010 to the atmosphere prior to use. The plunger 1018 additionally includes one or more snap-fit clips 1022 extending along the exterior of the plunger 1018 parallel to the longitudinal axis of the plunger. The snap-fit clips 1022 are sized and shaped to engage within and be retained by the receiving channels 1064 of the plunger receiving well 1060 of the cap 1050. A plunger baseplate 1019 is rotationally fixed to the plunger 1018 (e.g., may be integrally formed with the plunger 1018). The diameter of the plunger baseplate 1019 may be substantially equal to or slightly larger than the outer diameter of the collar 1058 of the cap 1050.

In some embodiments, one or more liquid constituents may be included within the plunger 1018, instead of or in addition to liquid constituents included within the cap 1050. For example, the sacrificial seal 1024 may contain the liquid constituents within the plunger 1018 and/or the liquid constituents may be contained within a blister pack within the plunger 1018. Liquid constituents contained within the plunger may include one or more amplification reagents, buffer solutions, water, mucin mitigating agents, or other desired liquid constituents for the testing process. The particular selection and chemistry of these liquids can be tailored to a particular target or targets for which the cartridge 1000 is designed to test. The blister pack may be punctured by, for example, insertion of a sample carrier, coupling of the cap 1050 to the cartridge body 1010, etc.

The receiving well 1026 is coaxial with the plunger 1018 and has a generally cylindrical profile with a diameter substantially equal to or slightly larger than the plunger baseplate 1019 and/or the collar 1058 of the cap 1050. The receiving well 1026 further includes cutouts 1028 sized to receive the interlocking fins 1062 of the cap 1050. Stops 1030 within the cutouts 1028 are disposed within the cutouts 1028 to block longitudinal motion of the interlocking fins 1062 in certain rotational positions, as will be described in greater detail with reference to FIGS. 11A-11D.

FIGS. 10H-10J depict additional views of the cartridge body 1010 in which the base 1016 is illustrated with transparency to show the fluid paths contained therein. The base 1016 may comprise any suitable liquid-impermeable material, such as plastic or metal. The base 1016 may be formed by one or more processes such as injection molding, die casting, milling, or the like, such that the depicted fluid paths can be integrally formed therein.

The base 1016 of FIGS. 10H-10J includes eight substantially identical fluid paths, each fluid path including a test well 1040. Various embodiments may include fewer than eight or more than eight fluid paths and test wells 1040 without departing from the scope of the present disclosure. For example, a base 1016 may include 1, 2, 3, 4, 5, 6, 7, 9, 10, 11, 12, or more fluid paths. Multiple identical or similar fluid paths within the base may accommodate simultaneous testing for a plurality of different targets and/or a plurality of simultaneous tests for the same target (e.g., to improve reliability of results).

Each fluid path includes an inlet channel 1042, a lateral channel 1044, a test well 1040, and an outlet channel 1046. Each inlet channel 1042 extends vertically through the base 1016 to fluidically connect a first end adjacent to the plunger baseplate 1019 to an opposite end adjacent to the PCB 1014. Each lateral channel 1044 fluidically connects an inlet channel 1042 to the corresponding test well 1040. Each outlet channel 1046 extends vertically from a test well 1040 to fluidically connect the test well 1040 to the bottom of the plunger baseplate 1019. In the cartridge body 1010 of FIGS. 10H-10J, the PCB 1014 forms a boundary partially defining each lateral channel 1044 and each test well 1040. In this example embodiment, the PCB 1014 may be oriented with the electrodes 1036, 1038 on the side adjacent to the cartridge body 1010 such that the electrodes 1036, 1038 are in contact with the interior of the test wells 1040.

As shown in FIG. 10J, each inlet channel 1042 is disposed radially outward from the longitudinal axis of the plunger baseplate 1019 at substantially the same distance as an array of sample inlets 1041 of the plunger baseplate 1019. Similarly, each outlet channel 1046 is disposed radially outward from the longitudinal axis of the plunger baseplate 1019 at substantially the same distance as the outer ends of an array of J-shaped sample outlets 1048 of the plunger baseplate 1019. The sample inlets 1041 and the inner ends of the J-shaped sample outlets 1048 are fluidically connected through the plunger baseplate 1019 to one or more interior spaces within the plunger 1018. Accordingly, when the plunger baseplate 1019 is rotated to an engaged position, as will be described with reference to FIGS. 11B and 11C, the sample inlets 1041 align with the inlet channels 1042, and the sample outlets 1048 align with the outlet channels 1046, such that a fluid sample within the plunger 1018 can flow into and fill the fluid paths within the base 1016 of the cartridge body 1010.

FIG. 10K illustrates components of the PCB 1014, which may be disposed along a surface of the cartridge body 1010 opposite the receiving well 1026 as shown in FIGS. 10E-10K. In some embodiments, the PCB 1014 may perform heating and/or electrode interface functions, and may further serve as a boundary for one or more fluid paths within the cartridge body 1010. Although the example PCB 1014 depicted herein includes heating and electrode interface functionality, these functions may equally be performed by two or more discrete elements in the cartridge body 1010. In some embodiments, heating may be achieved by heating elements located within a corresponding reader device instead of or in addition to heating elements disposed on or in the cartridge 1000.

The PCB 1014 comprises a generally planar surface having one or more traces disposed thereon in one or more layers. For example, the PCB 1014 may include one or more flex circuits, rigid printed circuit boards, or any other suitable circuitry including one or more current paths disposed on a generally planar substrate. One or more heating traces 1032 electrically connect test well heating elements 1033 to heating current pads 1034. The heating current pads 1034 may come into contact with contacts of a current source of a reader device when the cartridge 1000 is inserted into the reader device, such that a current may be provided to the test well heating elements 1033 to heat fluid samples in one or more test wells of the cartridge body 1010.

The PCB 1014 further comprises a pair of electrodes 1036, 1038 (e.g., an excitation electrode and a sensor electrode) corresponding to each test well. In some embodiments, the electrodes 1036, 1038 may be in direct contact with the fluid sample in each test well if the PCB 1014 serves as a boundary for the test wells. Each electrode 1036, 1038 is electrically connected to an electrode interface pad 1035 by electrode traces 1037, 1039 of the PCB 1014.

In various embodiments, the PCB 1014 may include one or more layers. For example, in some embodiments the PCB is a flex circuit comprising an electrode layer and a heating layer separated from the electrode layer. The electrode layer may include the electrodes 1036, 1038 as well as the electrode traces 1037, 1039 and/or the electrode interface pads 1035. The heating layer may include the heating elements 1033, heating traces 1032, and/or heating current pads 1034. In some aspects, the electrode layer and the heating layer may be disposed on opposite sides of a common substrate, or may be provided on separate substrates. Preferably, the PCB 1014 may be disposed such that the electrode layer including the electrodes 1036, 1038 is adjacent to the cartridge body 1010 and the electrodes 1036, 1038 are fluidically connected to the test wells 1040.

FIGS. 11A-11D illustrate mechanical fluid transfer aspects of the cartridges 920, 1000 described herein. Similar to the fluid transfer aspects described with reference to FIGS. 3A-3E, the cartridge body 1010 and cap 1050 are configured to create air pressure when coupled together, such that the air pressure propels a fluid sample through the fluid paths of the cartridge body 1010. The cap 1050 is illustrated with translucency in FIGS. 11A-11D, and the cartridge body 1010 is illustrated with translucency in FIGS. 11C and 11D, to reveal interior features of the cap 1050 and cartridge body 1010. The cartridge body 1010 is depicted with the PCB 1014 removed in FIG. 11C.

Figure 11A:
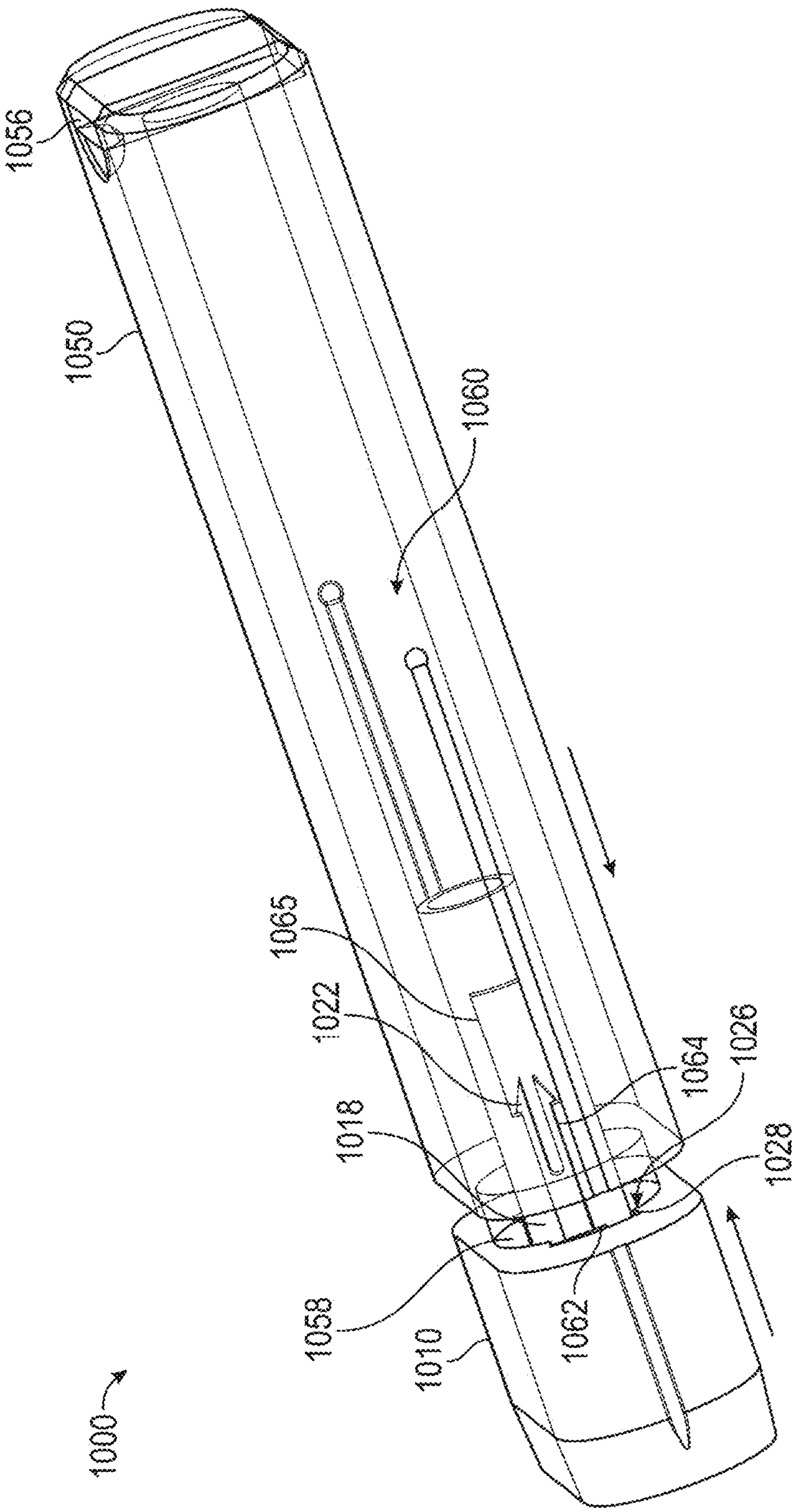
FIGS. 11A-11D depict a mechanical fluid transfer mechanism of the example cartridge of FIGS. 10A-10K.

With reference to FIG. 11A, a fluid sample may be received within the cap 1050. For example, a swab or other sample carrier may be inserted into an opening of the cap 1050 opposite the cartridge body 1010, and the opening may then be sealed by the sample receiving area cap 1056 to contain the sample within the cap (e.g., within the plunger receiving well 1060 or other internal space within the cap 1050. When the fluid sample has been sealed within the cap 1050, the process of FIGS. 11A-11D may be used to mechanically couple the cartridge body 1010 to the cap 1050 and move the fluid sample into the cartridge body 1010.

As shown in FIG. 11A, the mechanical coupling of the cartridge body 1010 and the cap 1050 begins by inserting the plunger 1018 of the cartridge body 1010 into the plunger receiving well 1060 of the cap 1050. The sealing portion 1020 of the plunger 1018 can sealingly engage with the interior of the plunger receiving well 1060 to trap and begin compressing a volume of air within the plunger receiving well 1060. As the plunger 1018 slides into the plunger receiving well 1060, the snap-fit clips 1022 slide within the receiving channels 1064 until they pass into the widened sections 1065 of the receiving channels 1064, where they are longitudinally retained. Retention of the snap-fit clips 1022 within the receiving channels 1064 prevents removal of the cap 1050 from the cartridge body 1010, and further locks the cap 1050 rotationally with the plunger 1018, thereby allowing a user to rotate the plunger 1018 and plunger baseplate 1019 by rotating the cap 1050, which may be relatively large and easy to manipulate manually. The cap 1050 and cartridge body 1010 may slide together until the collar 1058 of the cap 1050 is partially within the receiving well 1026 of the cartridge body 1010 and the interlocking fins 1062 of the collar 1058 contact the stops 1030 (FIG. 10F) within the cutouts 1028.

Figure 11B:
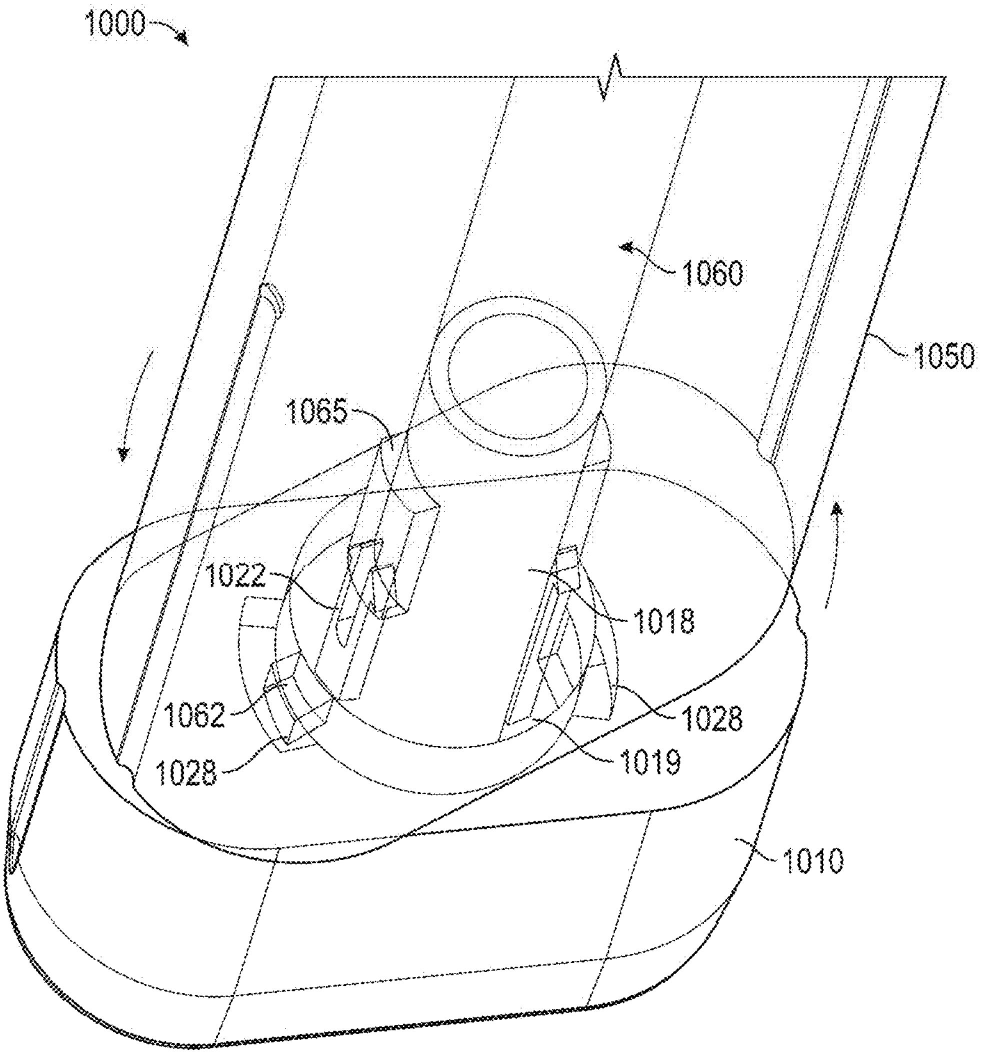

As shown in FIG. 11B, the cap 1050, plunger 1018, and plunger baseplate 1019 may then be rotated about the longitudinal axis. Because the snap-fit clips 1022 rotationally fix the plunger 1018 to the cap 1050, rotation of the plunger 1018 and plunger baseplate 1019 may be achieved by rotating the cap 1050. The cap 1050 may rotate until the interlocking fins 1062 are blocked by a lateral side of the cutouts 1028 of the receiving well 1026. In the example cartridge 1000, the cutouts 1028 and interlocking fins 1062 are sized to allow a total rotation of approximately 22.5° while the interlocking fins 1062 are within the cutouts 1028. However, other example cartridges may function with a different range of rotational motion, such as between approximately 5° and approximately 90°, between approximately 10° and approximately 45°, between approximately 15° and approximately 30°, between approximately 20° and approximately 25°, or any angle or subrange of angles therebetween. In some embodiments in which liquid constituents are contained in a blister pack within the cap 1050 and/or the plunger 1018, the rotation of components in FIG. 11B may cause the blister pack to be punctured so as to release the liquid constituents to mix with the sample.

Figure 11C:
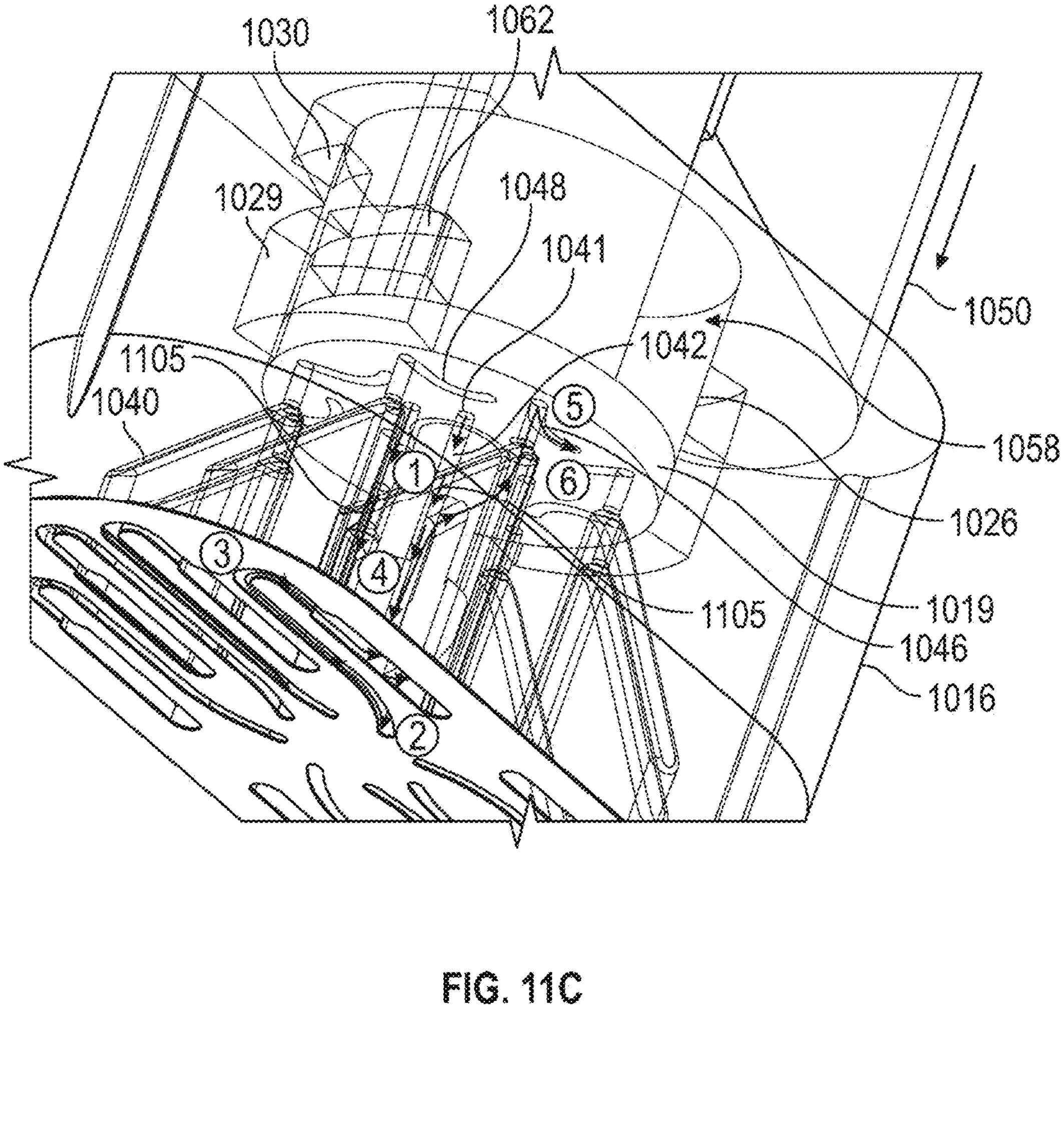

With reference to FIG. 11C, the cap 1050 may be moved downward along the longitudinal axis, such that the collar 1058 moves further into the receiving well 1026. Because the stops 1030 only extend along a portion of the cutouts 1028, the rotational motion described with reference to FIG. 11B moves the interlocking fins 1062 clear of the stops 1030 such that the interlocking fins 1062 can move to an interior portion 1029 of the cutouts 1028. As shown in FIG. 11C, the rotated position of the plunger baseplate 1019 substantially aligns the inlet channels 1042 and the outlet channels 1046 with the sample inlets 1041 and the sample outlets 1048, respectively. When the cap 1050 is pressed further onto the cartridge body 1010 to the position of FIG. 11C, the sample carrier and/or one or more internal structures within the cap 1050 may mechanically contact and rupture a seal on or within the plunger 1018 (e.g., the sacrificial seal 1024 of FIG. 10F), thereby allowing the trapped air compressed by the plunger 1018 to flow into the interior of the plunger and propel the fluid sample through the plunger baseplate 1019 and into the fluid paths of the cartridge body 1010. In some embodiments in which liquid constituents are contained in a blister pack within the cap 1050 and/or the plunger 1018, the longitudinal motion of components in FIG. 11C may cause the blister pack to be punctured so as to release the liquid constituents to mix with the sample.

The flow of the fluid sample through the fluid paths of the cartridge body 1010 will now be described with continued reference to FIG. 11C. FIG. 11C illustrates the flow of a portion of a fluid sample through a single example fluid path 1105 within the cartridge body 1010 with encircled numbers shown as labels for certain points along the fluid path. The encircled numbers are discussed below as example steps of a progression of a fluid sample as it travels through the flow path 1105. within the cartridge body 1010, with each step including a directional arrow showing the direction of fluid travel at that step.

At step (1), as the compressed air is allowed to flow into the plunger 1018, the fluid sample is forced through the sample inlet 1041 into the inlet channel 1042. The fluid sample travels along the inlet channel 1042 toward the lateral channel 1044.

At step (2), the fluid sample reaches the PCB 1014 boundary of the fluid path, and begins traveling parallel to the PCB 1014 within the lateral channel 1044. At step (3), the fluid sample continues through the curved lateral channel 1044 toward the test well 1040.

At step (4), the fluid sample enters the test well 1040. The test well 1040 may contain one or more reagents. Agitation caused by the turbulent flow of the fluid sample within the relatively larger space of the test well 1040 causes the reagent and the sample to be mixed. In some embodiments, the reagent and the fluid sample are mixed into a homogeneous solution in which the reagent is evenly distributed throughout the fluid sample. The depth, width, shape, and/or cross-sectional profile of the test well 1040 may be selected to facilitate mixing of the reagent and the fluid sample.

At step (5), any excess fluid sample is pushed from the test well 1040 into the outlet channel 1046 and enters the outer end of the J-shaped sample outlet 1048. As the excess fluid sample reaches the inner end the sample outlet 1048, it passes through a corresponding opening in the plunger baseplate 1019 at step (6) and is vented into the plunger 1018. In some embodiments, the interior volume of the plunger 1018 and/or the cap 1050 is separated from the interior volume that is fluidically connected to the sample inlet 1041, so as to create a directional flow of fluid sample along the fluid path 1105.

After the cap 1050 is pressed fully onto the cartridge body 1010 as shown in FIG. 11C, initiating the flow of the fluid sample through the fluid path within the cartridge body, the cartridge 1000 may reach a pressure equilibrium as the compressed air forces the fluid sample into the fluid path 1105, the fluid path 1105 is filled with the fluid sample, and a portion of the sample is vented back into the plunger 1018 and/or the cap 1050. The pressure equilibrium may be reached relatively quickly, for example, within 10 seconds, 5 seconds, 2 seconds, 1 second, or less.

Figure 11D:
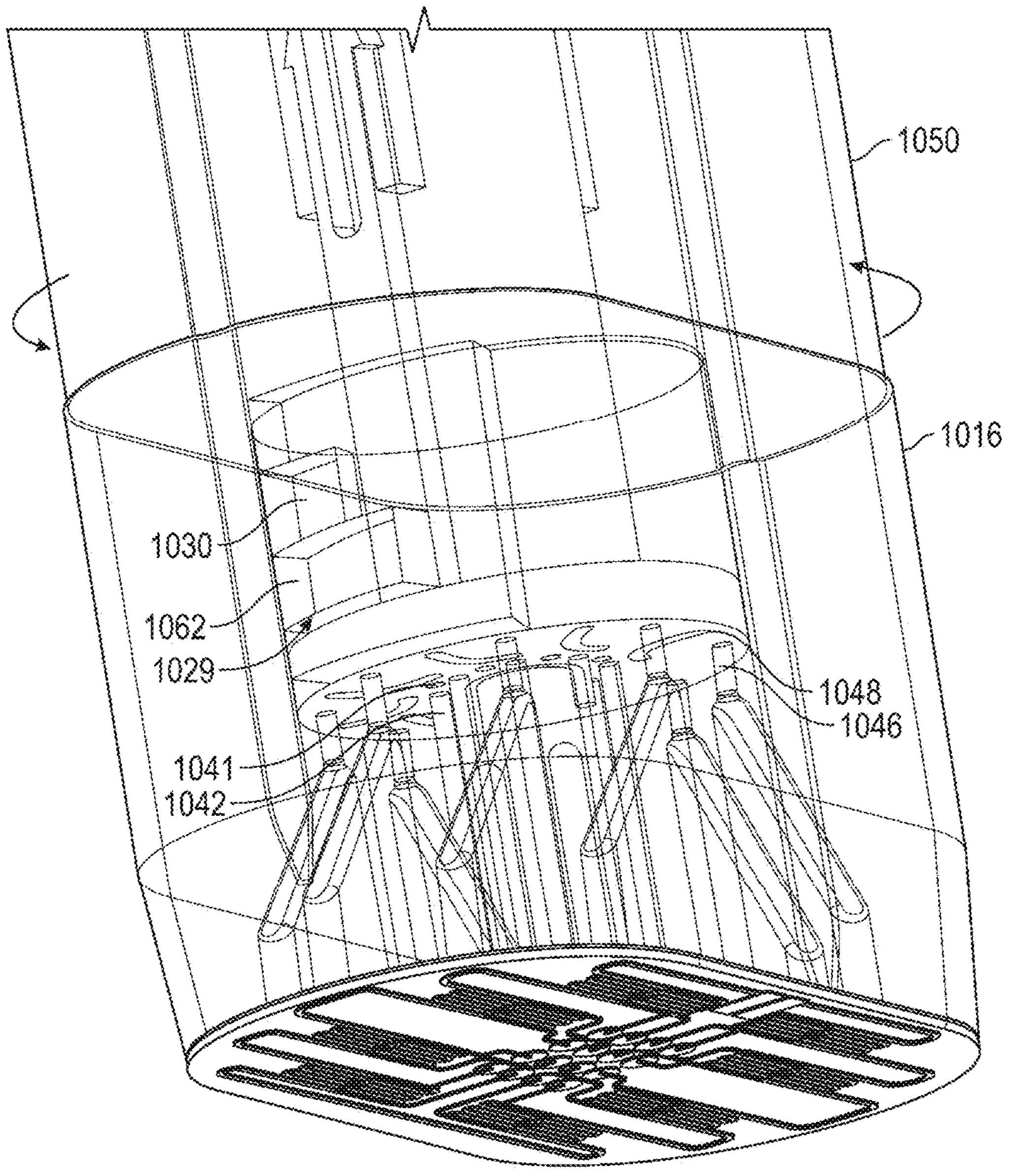

Referring now to FIG. 11D, when the fluid path 1105 is filled, the cap 1050, plunger 1018, and plunger baseplate 1019 may again be rotated relative to the cartridge body 1010. In the example process of FIGS. 11A-11D, the above components are rotated by the same angular displacement, but in the opposite direction, relative to the rotation of FIG. 11B. Thus, as shown in FIG. 11D, the plunger baseplate 1019 rotates relative to the fluid path 1105 such that the inlet channels 1042 and outlet channels 1046 are no longer aligned with the sample inlets 1041 and sample outlets 1048, thereby sealing the fluid path 1105 and retaining the fluid sample within the test wells 1040 for testing. This final rotation step additionally causes the interlocking fins 1062 of the cap 1050 to be retained under the stops 1030 within the interior portion 1029 of the receiving well cutouts 1028, completing and securing the mechanical coupling of the cartridge body 1010 and cap 1050. Moreover, the final rotation step substantially aligns the exterior profiles of the cartridge body 1010 and the cap 1050 such that the assembled cartridge 1000 can be inserted into a reader device to perform one or more tests on the fluid sample contained therein.

FIGS. 12A-12I illustrate a further embodiment of a cartridge 1200 configured for detection of a target. As described herein, the target may be a viral target, bacterial target, antigen target, parasite target, microRNA target, or agricultural analyte. Some embodiments of the cartridge 1200 can be configured for testing a single target, while some embodiments of the cartridge can be configured for testing for multiple targets. The cartridge 1200 includes a cartridge body 1202 and a swab assembly 1220 configured to be mechanically coupled to the cartridge body 1202 at a swab assembly insertion point 1208.

The cartridge body 1202 includes a thin film testing assembly 1204 and an ergonomic frame 1206 configured to be grasped by a user. The thin film testing assembly 1204 generally includes a plurality of test wells 1258, pinch valves 1214 for isolating fluid within the test wells 1258, a gas permeable filter 1212 such as a membrane or the like, and an electrode interface 1210 for electrically connecting electrodes at the test wells to circuitry of a reader device. The cartridge further includes a fluidic piston 1218 and a transition point 1216 for introducing a fluid sample from the swab assembly 1220 into the thin film testing assembly 1204. The features of the thin film testing assembly 1204 are discussed in greater detail with reference to FIGS. 12H and 121.

Figure 12A:
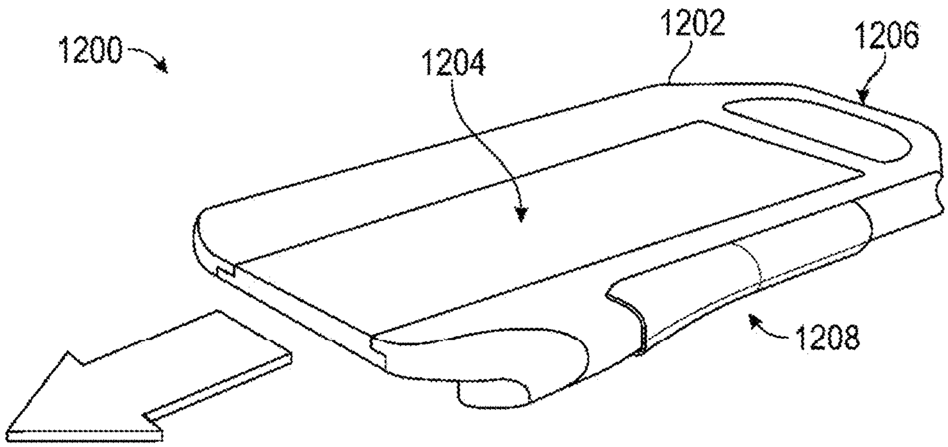
FIGS. 12A-12I depict an example cartridge for detection of a target that can be used in conjunction with the handheld systems disclosed herein.

Referring now to FIGS. 12C-12G, the swab assembly 1220 includes a tube 1222, a slider 1224, and a cap 1234 configured to fit together to form a substantially sealed swab assembly 1220. The tube 1222 includes a tube channel 1226 sized and shaped to receive a shaft 1236 of the cap 1234. The tube channel 1226 may be sealed, such as with a foil seal or the like, to contain one or more liquid reagents, buffers, etc., during shipping and/or prior to use of the swab assembly 1220. The tube channel 1226 may have an hourglass profile, a dual lobe profile, or other shape configured to facilitate mixing of fluids therein. In some embodiments, the tube channel 1226 may further include interior threading or other protruding features further configured to facilitate mixing of fluids within the tube channel 1226. The slider 1224 comprises a hollow structure configured to fit around an engagement end 1223 of the tube 1222. The tube 1222 further includes one or more snap-fit clips 1232 configured to interlock with first and second snap-fit openings 1228 and 1230 of the slider 1224. As shown in FIG. 12A, the cartridge body 1202 includes an overhand that keeps the tube 1222 centered in a width of the cartridge body 1202.

Figure 12B:
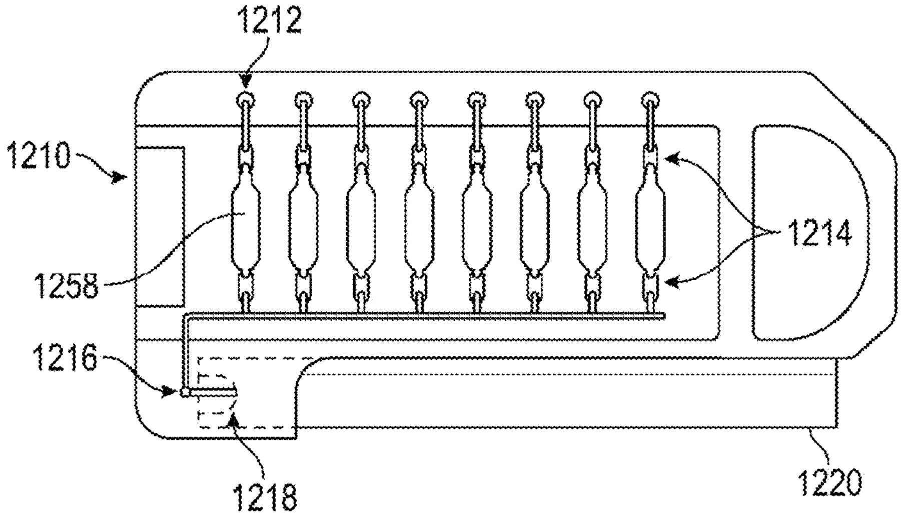
Figure 12C:
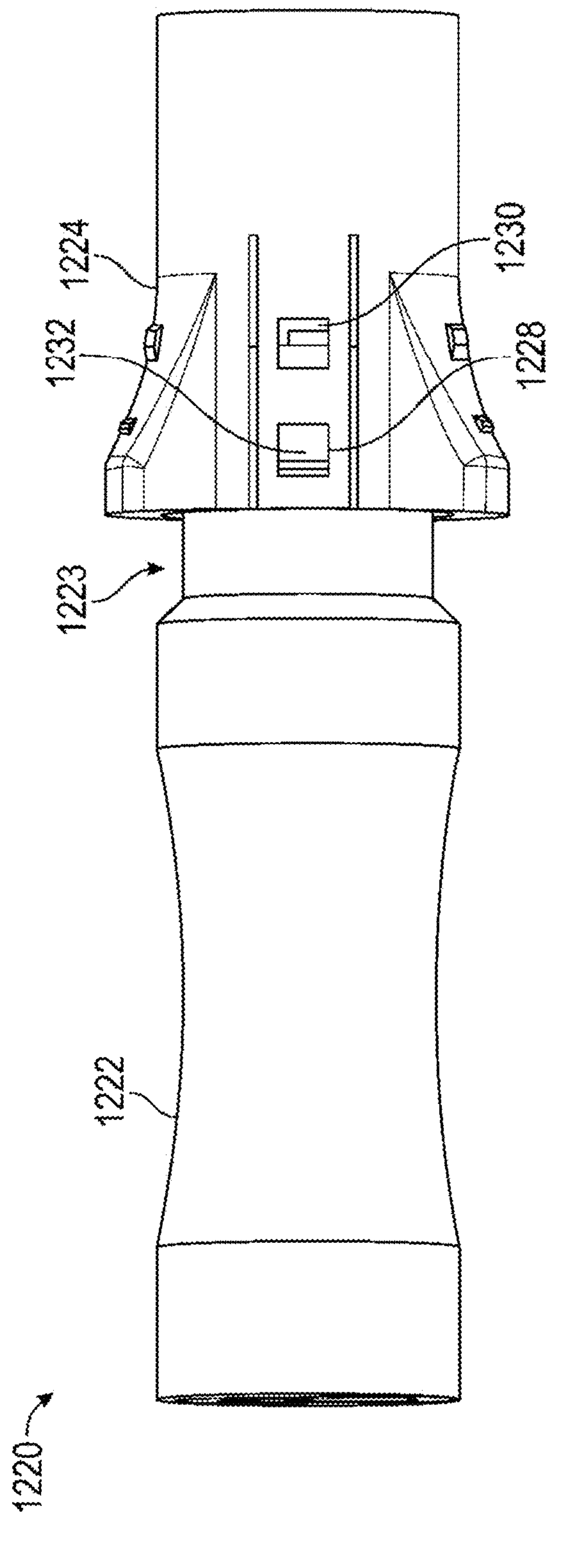
Figure 12D:
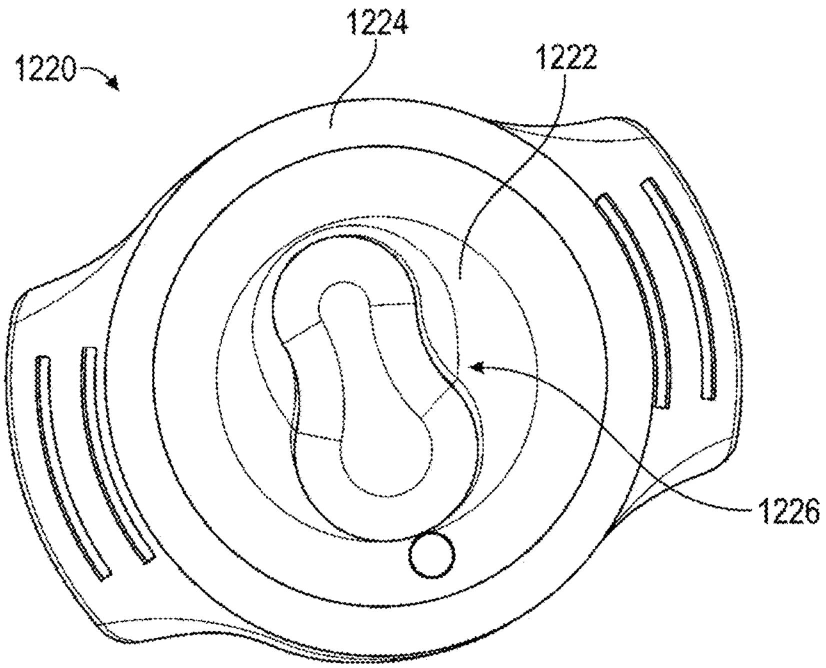
Figure 12E:
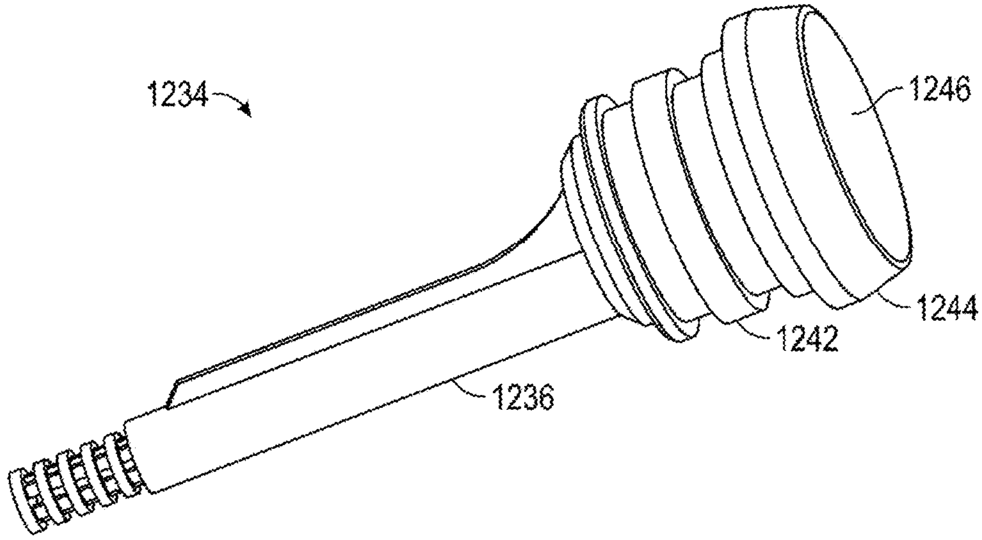
Figure 12F:
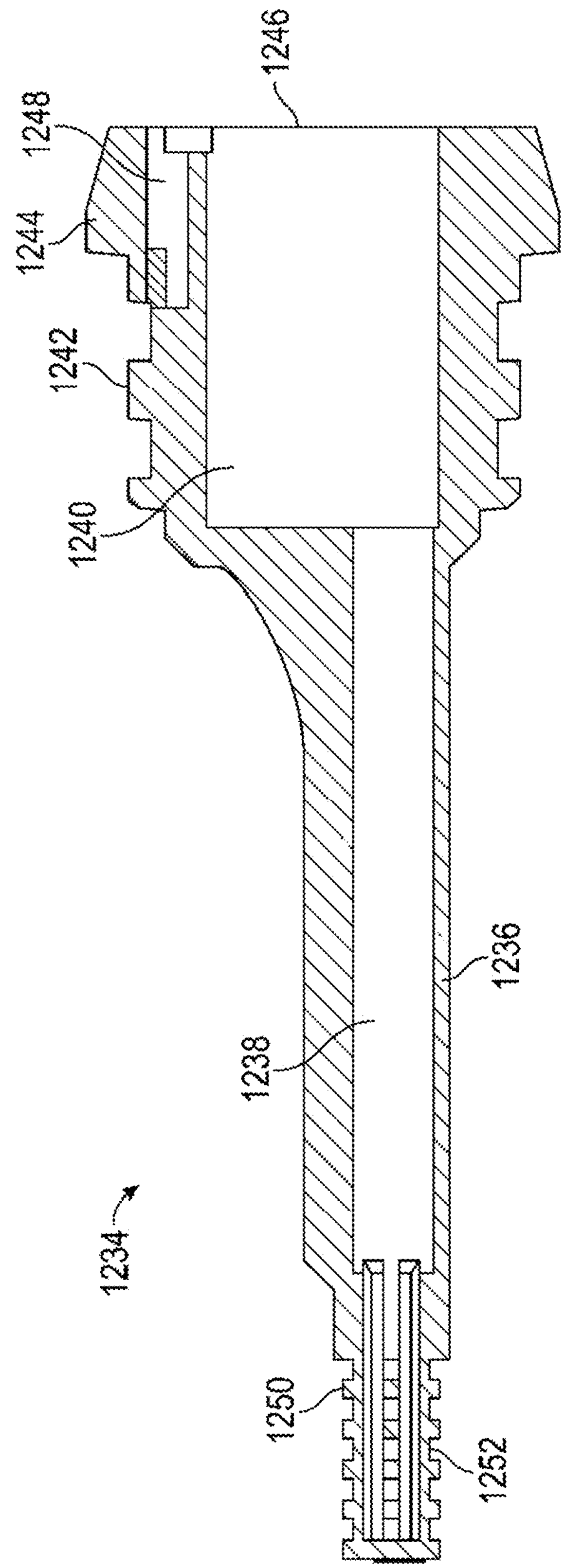

FIGS. 12E and 12F illustrate the cap 1234. FIG. 12E is a perspective view of the cap. FIG. 12F is a cross-sectional view of the cap illustrating internal components thereof. The cap 1234 comprises a hollow shaft 1236 surrounding a cap channel 1238, and a hollow upper section 1244 surrounding a metered volume 1240. The upper section 1244 may further include a sealing portion 1242 comprising a resilient material (e.g., rubber, a resilient plastic, or other elastomeric material) sized and shaped to sealingly engage the interior of the slider 1224. A foil seal 1246 may seal one or more liquid, dried and/or lyophilized reagents within the cap 1234. A vent 1248 may be fluidically connected to the metered volume 1240 to allow any gas trapped within the cap 1234 to be vented. The shaft 1236 terminates at a cap inlet 1250 fluidically connected to the cap channel 1238, which may include one or more sections of a filter 1252 configured to allow fluid flow into the cap channel 1238. In some embodiments, an additional seal may be provided over the cap inlet 1250 to seal any liquid, dried and/or lyophilized reagents within the cap 1234 prior to use.

Figure 12G:
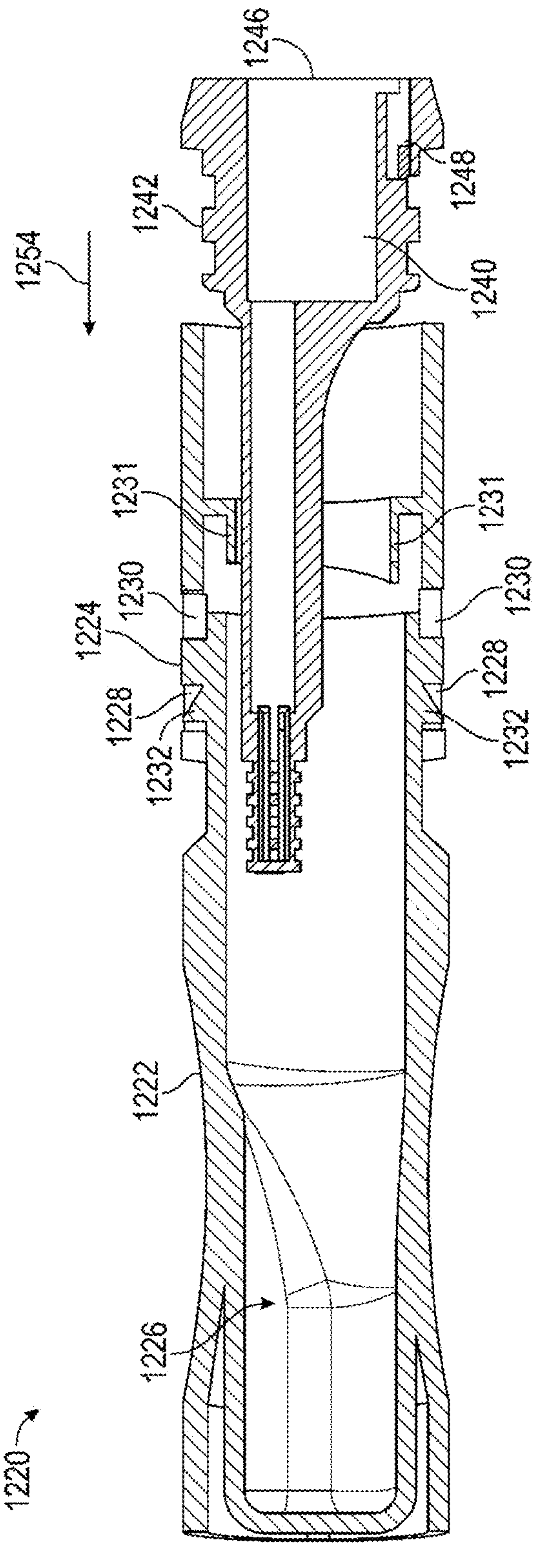

Referring jointly to FIGS. 12C-12G, and particularly with reference to FIG. 12G, an example process of introducing a sample to the swab assembly 1220 will now be described. Prior to introduction of the sample, the cap 1234 is separate from the tube 1222 and the slider 1224. The tube 1222 includes a liquid comprising one or more liquid reagents, buffers, or the like, sealed within the tube 1222 by a seal at the engagement end 1223 of the tube 1222. The cap 1234 includes one or more additional liquid reagents, buffers, or the like, sealed within the cap 1234 by the foil seal 1246. In the initial configuration, the snap-fit clips 1232 are engaged in first snap-fit openings 1228.

A sample (e.g., a nasal swab or other swab-collected sample) may be received on a swab. Prior to inserting the swab into the swab assembly 1220, the slider 1224 is moved along a first direction 1254 relative to the tube 1222 such that the snap-fit clips 1232 of the tube 1222 engage with the second snap-fit openings 1230. This motion may cause an internal structure 1231 of the slider 1224 to break the foil seal at the opening of the tube to expose the liquid reagents or buffers contained within the tube channel 1226.

When the tube channel 1226 is exposed, the swab may be introduced into the tube channel 1226 such that the sample on the swab mixes with the liquid reagents within the tube channel 1226. The interior profile and/or other mixing features of the tube channel 1226 may facilitate mixing of the sample with the liquid reagents to form a test fluid. In some embodiments, the swab may be broken off from a handle such that the portion of the swab containing the sample remains within the tube channel 1226.

After the sample has been introduced to the tube channel 1226 to form the test fluid, the cap 1234 may be mechanically coupled to the tube 1222 and slider 1224 to complete the swab assembly 1220. If a seal is provided around the cap inlet 1250, the seal may be removed. The shaft 1236 of the cap is inserted through the slider 1224, and the cap 1234 is pushed into the slider 1224 and the tube channel 1222 such that the sealing portion 1242 sealingly engages with the interior of the slider 1242. As the cap 1234 continues to move along the direction 1254, air and fluid are compressed within the tube channel 1222 to drive the mixed test fluid through the cap inlet 1250 and the cap channel 1238 into the metered volume 1240. Any gas, such as air, present within the metered volume 1240 may be vented externally through the vent 1248. The filter 1252 at the cap inlet 1250 prevents solids, such as solids within the swab sample or pieces of the swab itself, from entering the cap 1234. The location of the cap inlet 1250 at an end of the tube channel 1226 distal from the metered volume 1240 may advantageously cause the inlet 1250 to receive an optimal portion of the test fluid in the event that the test fluid has not quite achieved a homogeneous mixture. When the cap 1234 has been sealingly inserted into the tube 1222 and slider 1224, the swab assembly 1220 is fully assembled, and any liquid therein is retained within the swab assembly 1220 by the foil seal 1246 of the cap 1234. The swab assembly 1220 may then be placed into the swab assembly insertion point 1208 of the cartridge 1200 to introduce the test fluid to the thin film testing assembly 1204.

Figure 12H:
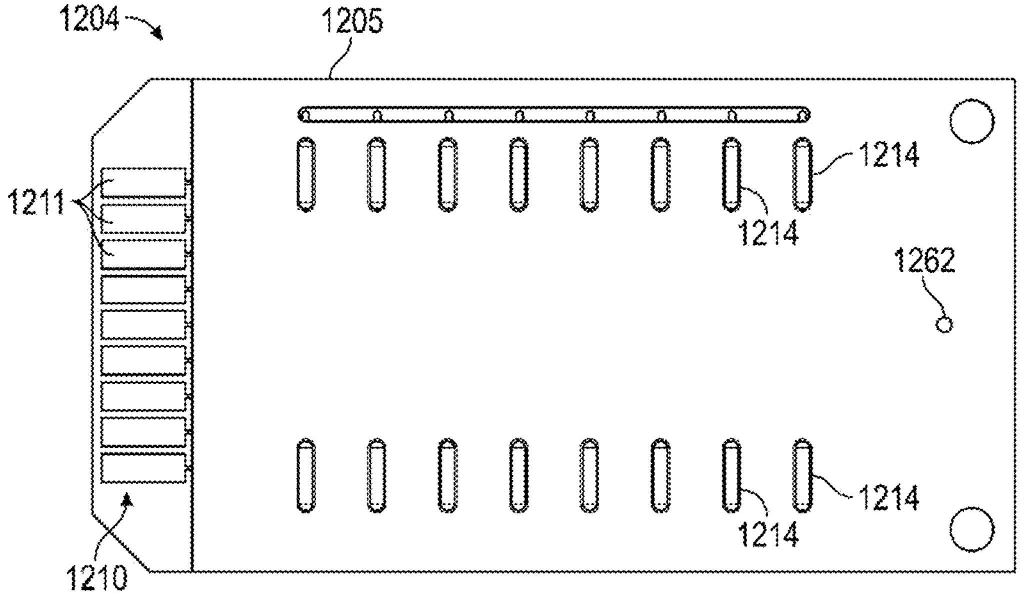
Figure 12I:
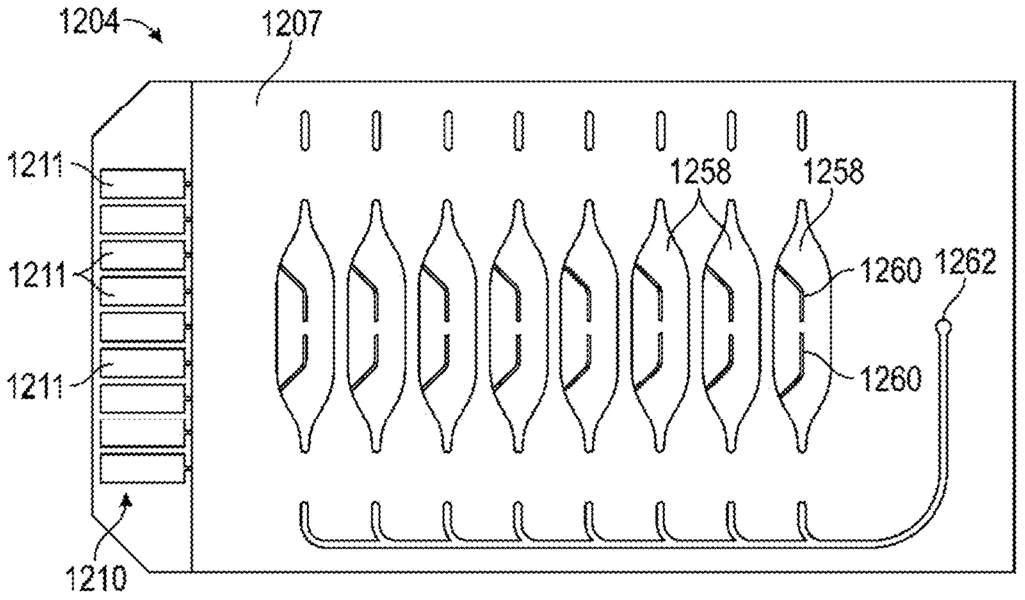

Referring now to FIGS. 12B, 12H, and 12I, the thin film testing assembly 1204 includes a substrate 1207 surrounding a plurality of test wells 1258. One boundary of the test wells 1258 is formed by a cover film 1205 including a plurality of pinch valves 1214 which form a portion of a fluid flow path into the thin film testing assembly 1204. A pair of electrodes 1260, which may be formed consistent with any of the electrodes described elsewhere herein, are provided within each test well 1258 and electrically connected to electrode connection pads 1211 of the electrode interface 1210 for connection to a reader device.

When the swab assembly 1220 is inserted into the swab assembly insertion point 1208 of the cartridge 1200, the fluid within the metered volume 1240 of the swab assembly 1220 flows through the transition point 1216 and along a fluid path within the thin film testing assembly 1204 to fill the test wells 1258. Any gas such as air within the thin film testing assembly 1204 may be displaced from the test wells 1258 and vented at a vent 1262 and/or at the gas permeable filter 1212.

The cartridge 1200 may then be inserted into a reader device sized and shaped to receive the cartridge 1200. As the cartridge 1200 is inserted into the reader device (in a direction of the arrow in FIG. 12A), electrical contacts within the reader device come into contact with the electrode connection pads 1211 of the cartridge 1200. In addition, the opening within the reader device for receiving the cartridge 1200 has a width selected such that an interior surface of the reader device compresses and/or crushes the pinch valves 1214, preventing fluid flow therethrough after the cartridge 1200 has been inserted into the reader device. In some embodiments, the pinch valves 1214 may comprise a thermoformed plastic or other material selected such that the pinch valves 1214 can be compressed and closed off without breaking and allowing the test fluid to escape. When the pinch valves 1214 are compressed and/or crushed, the test fluid within each test well 1258 is fluidically isolated within the test well 1258 for testing. Heating and testing of the test fluids in the test wells 1258 may then proceed as described above with reference to the cartridges 200, 1000. In some embodiments, the test wells 1258 may be pre-loaded with one or more primers (e.g., spot-dried, lyophilized, powdered, or other non-liquid primers) or other reagents corresponding to the tests to be performed and/or target agents to be detected in each test well 1258. Some or all of the test wells 1258 may include the same or different primers as the primers present in the other test wells 1258, depending on the individual test to be performed and/or target agents to be detected in each test well 1258.

FIGS. 13A-13E depict an example of another type or format of cartridge 1300 configured to detect a target, such as a nucleic acid e.g., a desired DNA or RNA sequence, which can be used in conjunction with one or more of the handheld systems disclosed herein. In some embodiments, the target may be a viral target, bacterial target, antigen target, parasite target, microRNA target, or agricultural analyte. Preferably, such targets are selected viral, bacterial, parasite, microRNA, or agricultural DNA or RNA sequences e.g., sequences complementary to selected primers designed to identify the presence or absence and/or amount of such targets. Some embodiments of the cartridge 1300 can be configured for testing for the presence or absence and/or amount of a single target, while some embodiments of the cartridge 1300 can be configured for testing for multiple targets, optionally simultaneously or within a short time after the first identified result. In some embodiments, the cartridge 1300 may be configured to test for enzymes (for example, in the evaluating and/or analyzing for enzyme replacement therapy). In some embodiments, the cartridge 1300 may be configured to test for environmental contaminants such as pesticide residues (e.g., glyphosate, and so forth), heavy metals, benzene residues, and so forth. In some embodiments, the cartridge 1300 may be configured to test for or identify pathogens, genomic materials, proteins, and/or other small molecules or biomarkers. In some embodiments, the cartridge 1300 may be configured to test for and/or identify elevated prostate-specific antigen (PSA) levels, elevated cells counts, low cell counts, tumor cells, and so forth, for use in oncology applications. In some embodiments, the cartridge 1300 may be configured to identify and/or test for microRNA or used to test for infections, diseases, and so forth often of concern with respect to food safety and/or plasma and/or blood screenings. In some embodiments, the cartridge 1300 may be further configured to identify and/or test for rare infectious diseases, tick and/or mosquito borne (or other insect, plant, and/or animal vector borne) diseases. In some embodiments, the cartridge 1300 may be configured to test for and/or identify norovirus and/or rotavirus, for example in water quality applications. In some embodiments, the cartridge 1300 is configured to test for anything any of the other cartridges described herein test for, and vice versa. The cartridge 1300 includes, among other components, a cartridge body 1302, a cover 1314, electrodes 1304, and a cap 1310. These components will be described in further detail below.

Referring now to FIGS. 13A-13E, the cartridge body 1302 may be thermoformed from a polyethylene or similar plastic material. The cartridge body 1302 may house various components and/or features of the cartridge 1300. For example, the cartridge body 1302 may house at least a portion of the electrodes 1304, a swab receptacle 1342, a sample mixing and microfiltration region 1330 (described further below), a reagent stored in a reagent blister 1340, and an integrated reagent blister rupture feature 1344, a distribution tree 1328 for a sample/reagent mixture from the sample mixing and microfiltration region 1330, an exhaust port 1326 to vent gases, a degassing gas-permeable membrane 1320, and a plurality of reaction wells 1322 configured to allow the electrodes 1304 to generate signals based on the sample/reagent mixture. The cartridge body 1302 also includes a thumb detent configured to be grasped by a user to facilitate removal of the cartridge 1300 from the analyzer, described in further detail below. The cartridge body 1302 also, optionally includes an isolation cap 1310 or a locking isolation cap 1310 configured to isolate, close, or protect the swab receptacle 1342 from external variables. The cover 1314 of the cartridge body 1302 may be thermoformed from a plastic or similar material and includes an exhaust port crush valve 1306 and well isolations crush valves 1312.

The well isolations crush valves 1312 may isolate fluid within the plurality of reaction wells 1322. In some embodiments, the reaction wells 1322 may function similarly to the test wells 1258 described above. The electrodes 1304 may electrically connect electrodes at the reaction wells 1322 to circuitry of a reader device described further below. The electrodes 1304 may function similarly to the electrode interface 1210 described above.

In some embodiments, the swab receptacle 1342 includes a tapering, tubular portion 1348, a scraper portion 1350, dispensing portion 1352, and the isolation cap 1310 or the locking isolation cap 1310. The isolation cap 1310 or the locking isolation cap 1310 and the swab receptacle 1342 are configured to fit together to form a sealed or substantially sealed swab assembly. The tapering, tubular portion 1348 includes a tapering tube channel sized and shaped to receive a swab including mucus or another sample and to be sealed or substantially sealed by the isolation cap 1310 or locking isolation cap 1310. The reagent blister 1340 may contain one or more reagents (for example, a liquid reagent, a buffer, etc.) during shipping and handling before the cartridge 1300 is inserted into the corresponding analyzer. In some embodiments, the reagent blister 1340 includes only reagents in a liquid form. In some embodiments, the reagent blister may comprise a sealed compartment, for example sealed with a foil seal or the like, similar to the sealed channel 1226 described above. The sample mixing and macrofiltration region 1330 may be configured and operate to facilitate mixing of fluids and so forth therein (for example, the sample with the reagent). In some embodiments, the tapering, tubular portion 1348 may further include the scraper 1350 configured to facilitate acquisition of the sample from the swab inserted into the swab receptacle 1342. Further details are provided below. The cartridge body 1302 includes snap-fit clips 1346 that may lock and/or engage with snap-fit openings to interlock and hold the cartridge body 1302 together, similar to the snap-fit clips 1232 and snap-fit openings 1228 described above.

The cartridge 1300 may be a disposable cartridge that is fully integrated, enables detection of one or more pathogens, and includes no moving parts, improving reliability of the cartridge 1300. In many instances, the cartridge 1300 operates similarly to the cartridge 1200 described above.

The cartridge 1300 may be used in conjunction with an analyzer, similar to the analyzer or reader device (for example, reader device 110, 600, or 910) described above with reference to the cartridges described above (for example, cartridge 120, 200, 1000, and 1200). In some embodiments, the analyzer (also referred to herein as the "reader device") may be handheld and battery operated and enable wireless communication with an application operating, for example, on a user's mobile phone or other mobile device. In some embodiments, the application may provide the operator or patient with a view of the results from the analysis of the cartridge as well as an option for the patient to input particular symptoms being suffered. In some embodiments, the application may communicate with a cloud storage system (or similar storage) to store data from the application that is received from or via the analyzer. In some embodiments, the analyzer, application, and cloud storage may enable secure communications and may aggregate information from various cartridge samples to enable treatment decisions (for example, identify that a sample being tested with a cartridge indicates a particular sickness, etc., based on a comparison of the analysis results from the analyzer with results from a historical database of analyses and corresponding sickness, etc., determinations. For example, if the cartridge analyzed by the analyzer indicates influenza, as compared to similar results in the cloud-based historical database, the application may identify appropriate treatments or therapies for influenza and present them to the operator of the application (e.g., to the patient, physician, or health care practitioner, etc.). In some embodiments, the data stored in the cloud may be analyzed in real time to identify outbreaks of diseases, and so forth. Additionally, such information may be used to update manufacturers of vaccines and medications in response to the outbreaks, etc., to ensure sufficient stockpiles of vaccines and/or medications are available.

Figure 14A:
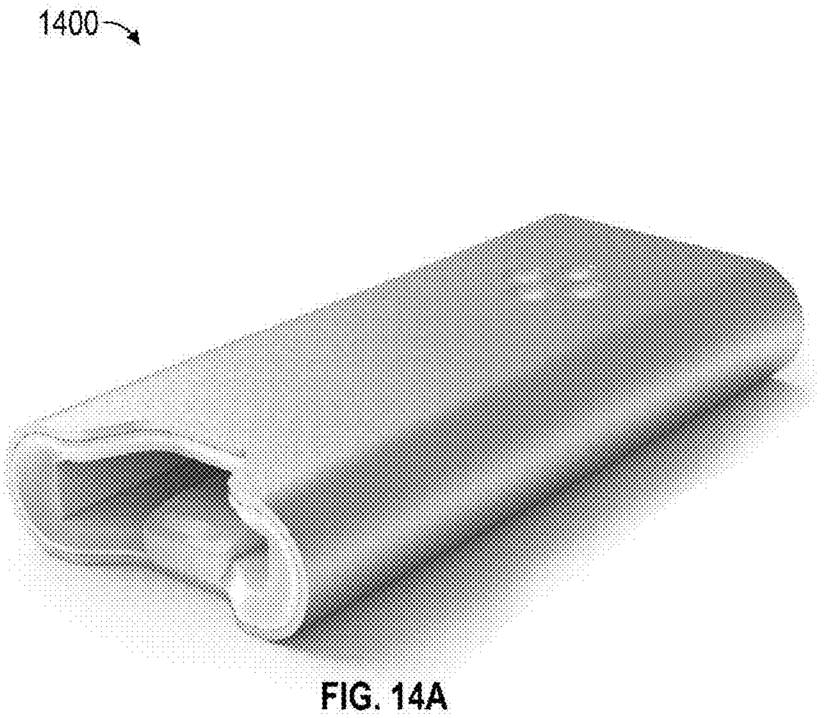
FIGS. 14A and 14B depict an example of another handheld system disclosed herein.
Figure 14B:
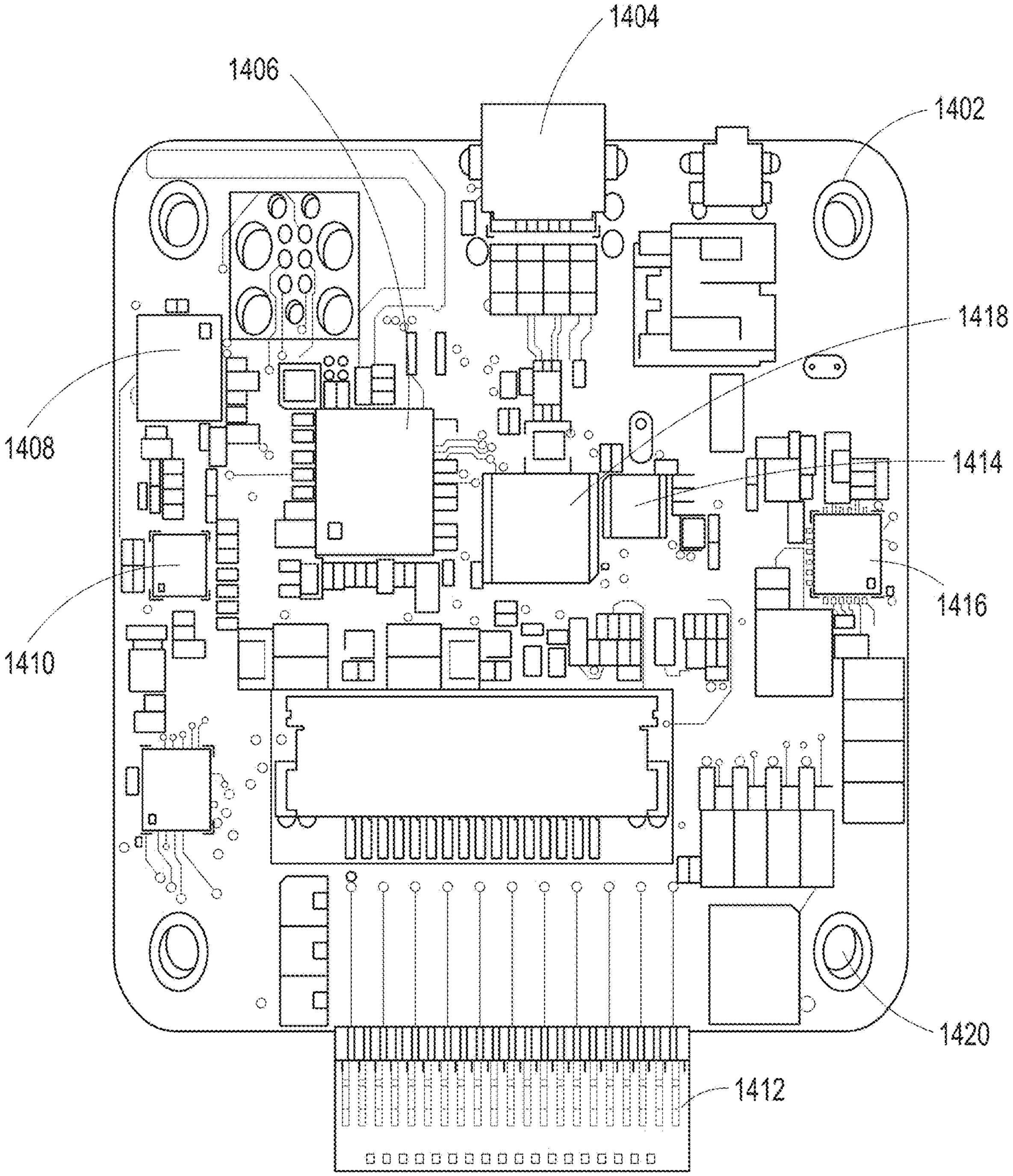

FIGS. 14A and 14B depict an example of the other handheld analyzer system 1400 disclosed herein. The analyzer 1400 includes the features described above of other analyzers, including a slot for insertion of the cartridge, for example the cartridge 1300. In some embodiments, the analyzer 1400 comprises a printed circuit board (PCB) 1402 on which various electrical components are disposed and electrically connected. The PCB 1402 includes a communication or charging port, such as a USB (or similar) port 1404. The PCB 1402 further includes a microprocessor 1406 and a digital signal processor (DSP) 1408. The PCB 1402 further comprises an analog sub-section 1410 and cartridge mating connectors 1412 to electronically couple to the cartridge 1300. The PCB 1402 further comprises a cryptographic processor 1414, a battery controller 1416, and storage 1418. The PCB 1402 may also include one or more mounting holes or devices 1420.

Operation of the cartridge 1300 with the analyzer 1400 is now described.

Before operating the cartridge and the analyzer 1400, the application may be used to select a particular cartridge 1300 that will be used with the analyzer 1400. In some embodiments, the selection may comprise indicating one or more parameters associated with the particular cartridge 1300 to the analyzer 1400. A swab may be used to collect a fluid sample (for example, a nasal fluid or sputum sample). The swab with the fluid sample from the patient may be pressed into the swab receptacle 1342 until the swab stops moving into the swab receptacle 1342. As described above, the swab receptacle 1342 tapers down in diameter to a shape/size that compresses the bristles or other material of the swab against the walls of the swab receptacle 1342. In some embodiments, the swab receptacle 1342 comprises one or more walls (or other surfaces) molded with a specifically selected surface finish. The surface finish enables wetting the fluid sample to the walls. As the swab continues to its fully compressed position as it is pushed into the swab receptacle 1342, the fluid that has been wetted to the walls is forced further in front of the swab because of the decreasing cross-section profile of the swab receptacle 1342. As the swab is removed, the fluid that is forced ahead of the swab is drawn back with the swab being removed, trailing behind the swab. At the point in which the bristles or material of the swab have separated far enough from the walls of the swab receptacle 1342, a surface tension of the fluid sample that is wetted to the walls is sufficient to retain at least a portion of the fluid sample in the swab receptacle 1342 (for example, a reservoir portion of the swab receptacle 1342). Thus, the fluid sample to be analyzed by the analyzer is removed from the fluid sample initially collected on the swab and remains in place as the cap 1310 is closed, sealing or substantially sealing the swab receptacle 1342 and the cartridge 1300.

Figure 13A:
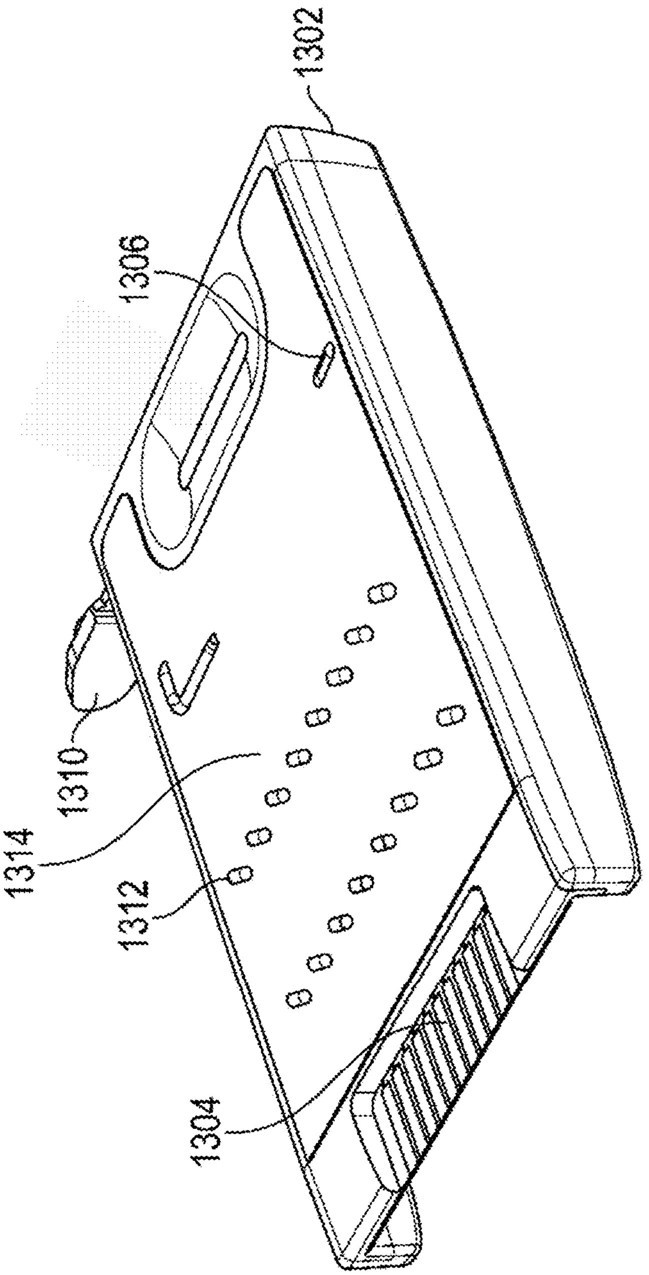
FIGS. 13A-13E depict an example of another type or format of cartridge configured to detect a target that can be used in conjunction with a handheld system disclosed herein.
Figure 13B:
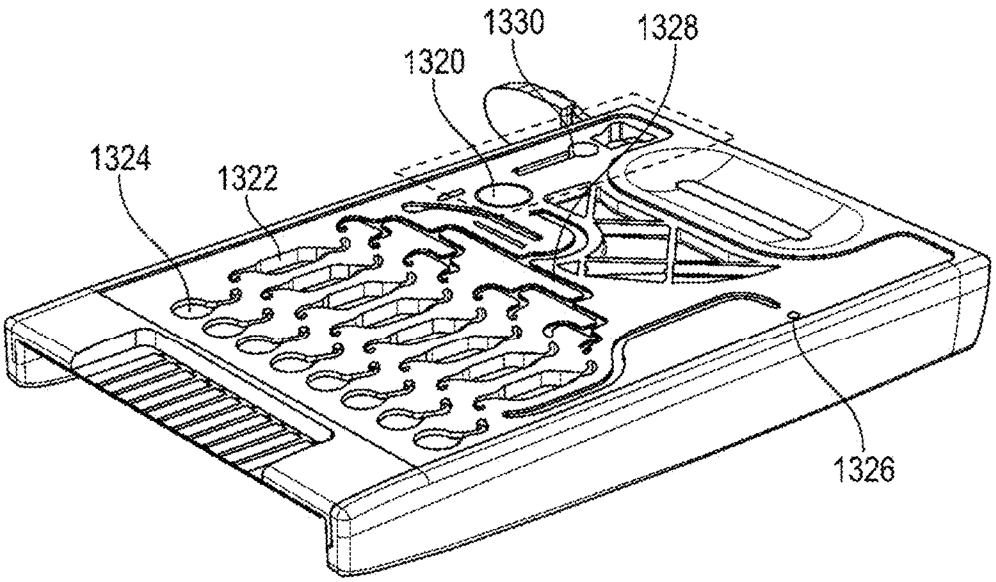
Figure 13C:
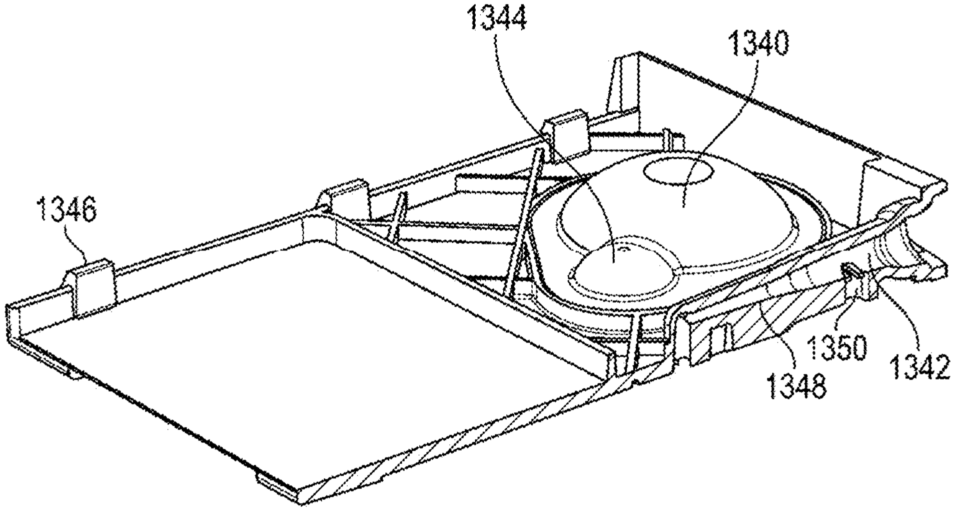
Figure 13D:
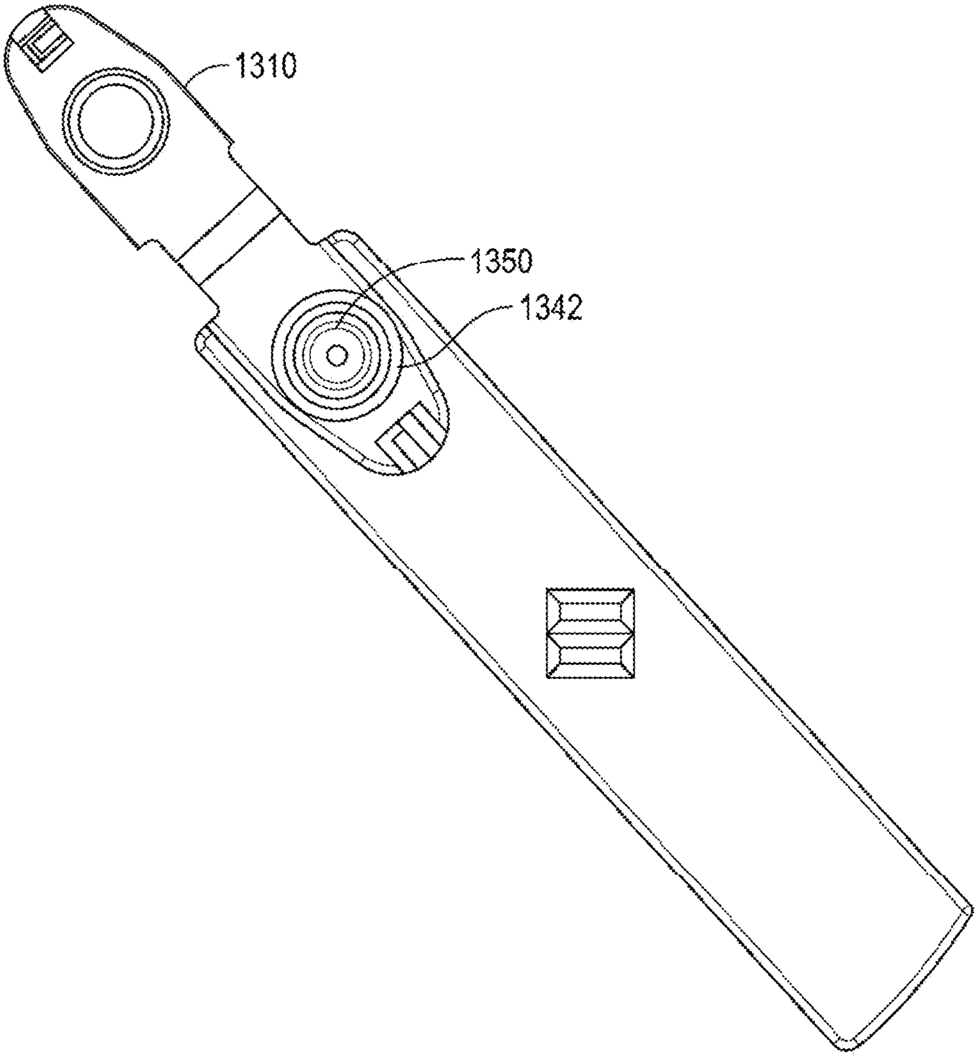
Figure 13E:
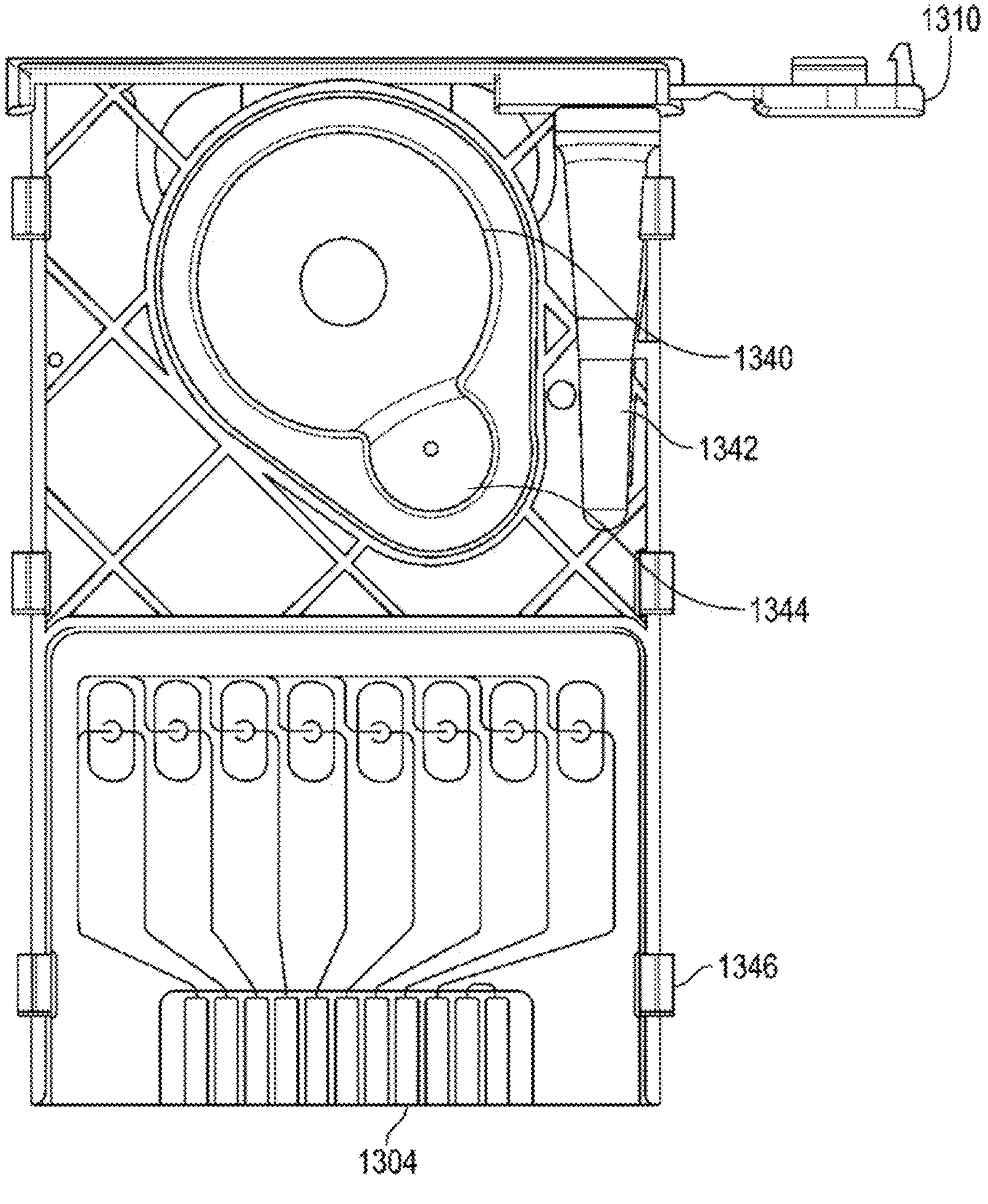
Figure 13H:
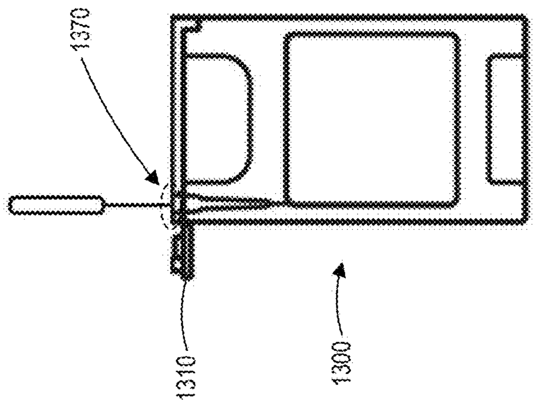
FIGS. 13F-13J schematically depict an example process of collecting and testing a sample.
Figure 13G:
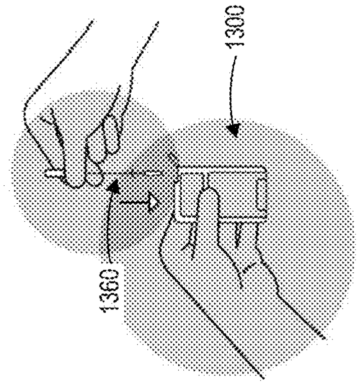

In some embodiments, a user may insert a swab 1360 into the swab receptacle 1342 of the cartridge 1300 as shown in, for example, FIG. 13G. Once inserted into the swab receptacle 1342, the swab 1360 may be broken or cut, for example, at 1, 2, 3, 4, 5, 6, 7, 8, 9, or 10 mm or within a range defined by any two of the aforementioned sizes below a swab stopper 1362 or the cartridge interface, such that two separate pieces are generated one being a portion of the swab 1360 including mucus or another type of sample (for example, a first portion), which remains inside the swab receptacle 1342 and a portion of the swab 1360 without the mucus or another type of sample (for example, a second portion), which is separated from the first portion and discarded. FIG. 13H schematically illustrates a location 1370 where swab 1360 can be broken or cut (for example, snapped) into two separate pieces. As shown in FIG. 13I, the cap 1310 can be moved to close (for example, seal) the swab receptacle 1342 of the cartridge 1300, leaving the first portion of the swab (for example, a portion with mucus or another type of sample) positioned inside the swab receptacle 1342. After the swab receptacle 1342 of the cartridge 1300 is closed via the cap 1310, a user (for example, a patient, a care provider, an operator of the analyzer 1400 and the cartridge 1300) can insert the sealed cartridge 1300 into the analyzer 1400 as shown in FIG. 13J to test the collected sample.

Figure 13F:
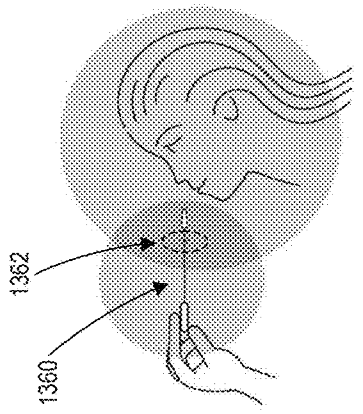
Figure 13J:
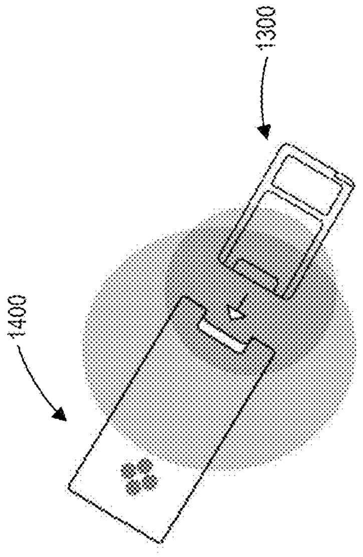
Figure 13I:
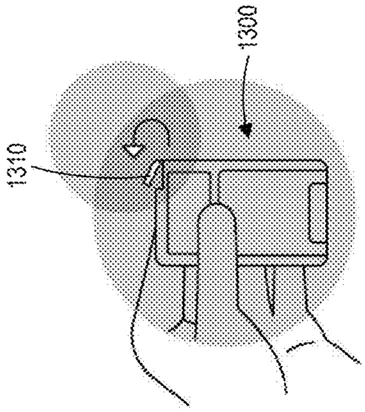
Figure 13L:
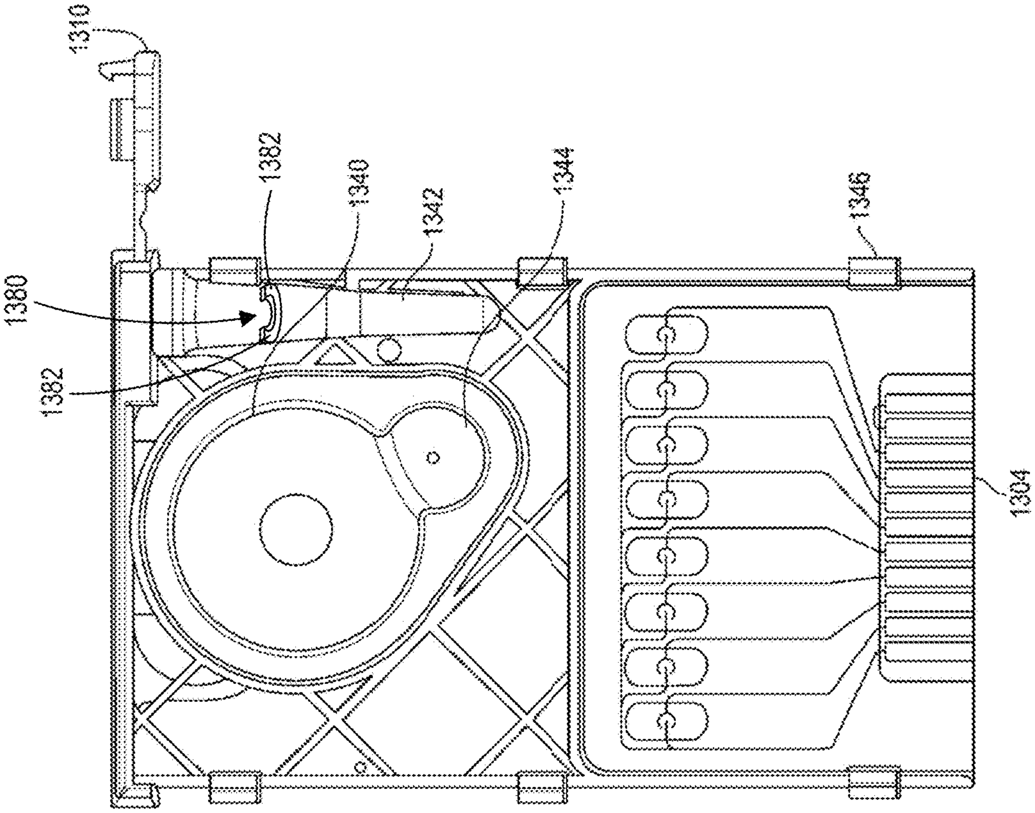
FIGS. 13K-13L depict an example cartridge with an example retainer that can hold a swab in place inside a swab receptacle.
Figure 13K:
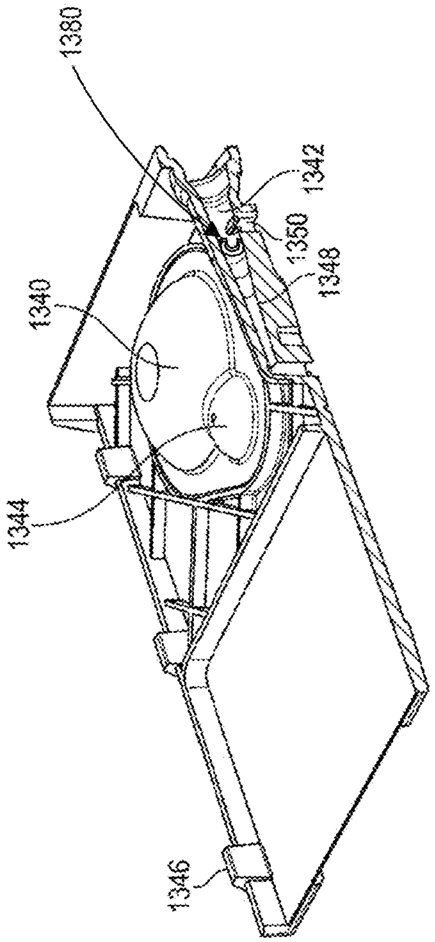

In some embodiments, as shown in FIG. 13F, a swab 1360 can include a stopper 1362. The stopper 1362 can be a radial protrusion from a shaft of the swab 1360 that can cover an opening of the swab receptacle 1342 when the swab 1360 is inserted into the swab receptacle 1342. As such, when the swab 1360 is inserted into the swab receptacle 1342, the stopper 1362 can prevent the swab 1360 from being inserted into the swab receptacle 1342 further, for example, than a predetermined distance.

The stopper 1362 can indicate where to break or cut the swab 1360 after inserting the swab 1360 into the swab receptacle 1342. In some embodiments, the swab 1360 has a perforated or marked section 1364, which indicates a position to break or cut the swab 1360. When the stopper 1362 covers the opening of the swab receptacle 1342, a user can break or cut a shaft of the swab 1360, for example, proximal to or against the opening of the swab receptacle 1342 using the stopper 1362 as a lever or guide for the cut. In some examples, the stopper 1362 can remain with, for example, a portion of the swab 1360 with the bristles or flock. In other examples, the stopper 1362 may break off from the portion of the swab 1360 with the bristles or flock and be discarded.

In some embodiments, the location of the stopper 1362 can be such that the bristles or flock (or a portion of the swab 1360 having mucus or another type of sample) of the swab 1360 are positioned near or adjacent to the scraper 1350 when the stopper 1362 stops the swab 1360 from entering further into the swab receptacle 1342. Alternatively, the location of the stopper 1362 can be such that the swab 1360 is in its fully compressed or substantially fully compressed position in the swab receptacle 1342 when the stopper 1362 stops the swab 1360 from moving further into the swab receptacle 1342. Alternatively, the location of the stopper 1362 can be such that, for example, the bristles or flock (or a portion of the swab 1360 having mucus or another type of sample) of the swab are positioned further down into the swab receptacle 1342 past the scraper 1350. The stopper 1362 can desirably indicate to users how far the swab 1360 is preferably inserted into the swab receptacle 1342 to allow the cartridge 1300 via the scraper 1350 to collect mucus or other types of sample from the swab 1360.

In some embodiments, the swab receptacle 1342 can include, for example, a retainer 1380 that can hold a swab once it is inserted into the swab receptacle 1342. For example, the retainer 1380 can include fingers 1382 that can function as a clamp for the swab 1360. After the swab 1360 is inserted into the swab receptacle 1342, the swab 1360, for example, pressed against the retainer 1380 such that the swab 1360 can be positioned between the fingers 1382 and held in place in the swab receptacle 1342. Once the swab is held in place in the swab receptacle 1342, a user (for example, a patient, a care provider, an operator of the analyzer 1400 and the cartridge 1300) can insert the cartridge 1300 into the analyzer 1400 to test the sample from the swab. Other designs of the retainer 1380 suitable to hold, for example, the shaft of the swab 1360 may be used in conjunction with the swab receptacle 1342. Having the retainer 1380 to hold the swab 1360 in place inside the swab receptacle 1342 can desirably eliminate the need to break the swab and closing the cap 1310 to keep the swab in place inside the swab receptacle 1342 during testing.

Figure 35A:
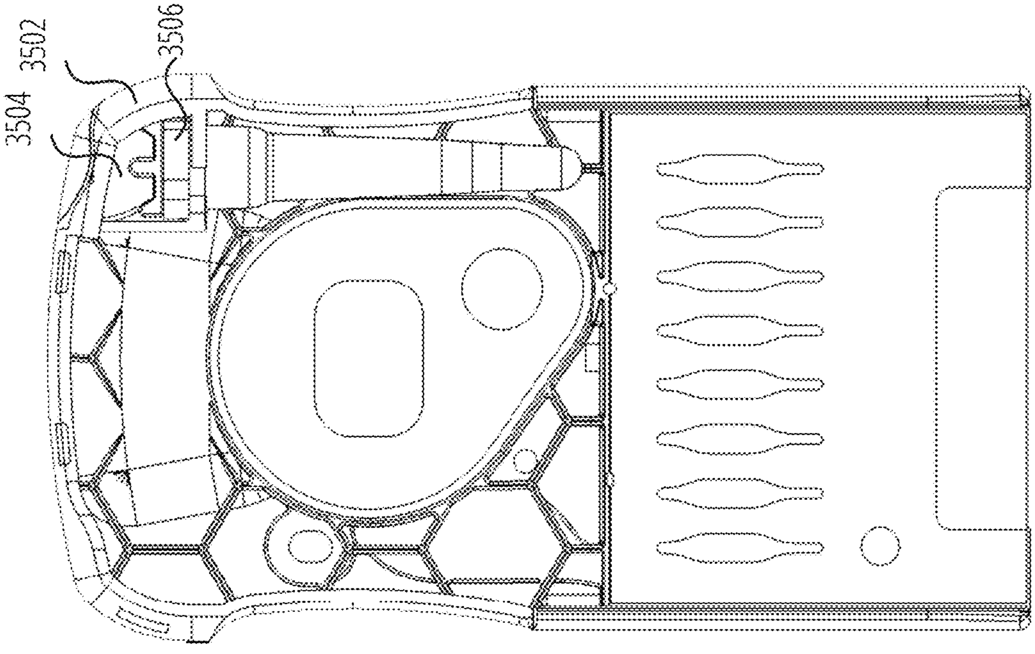
FIGS. 35A-35K depict a representative cartridge comprising an exemplary retention feature configured to accept and retain a swab in place within a swab receptacle.

In some embodiments, illustrated in FIGS. 35A-35K, the cartridge may house a retention feature 3502. FIG. 35A illustrates an example cartridge comprising a retention feature 3502, which includes a closure 3504 and an o-ring 3506.

Figure 35B:
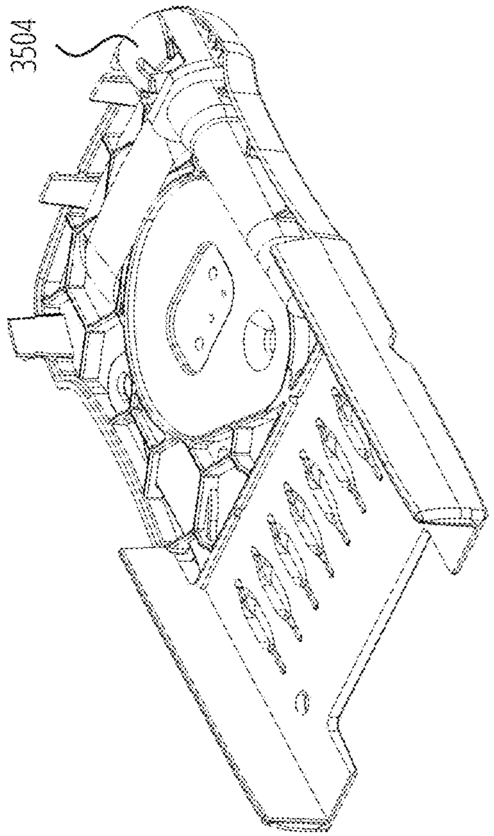
Figure 35C:
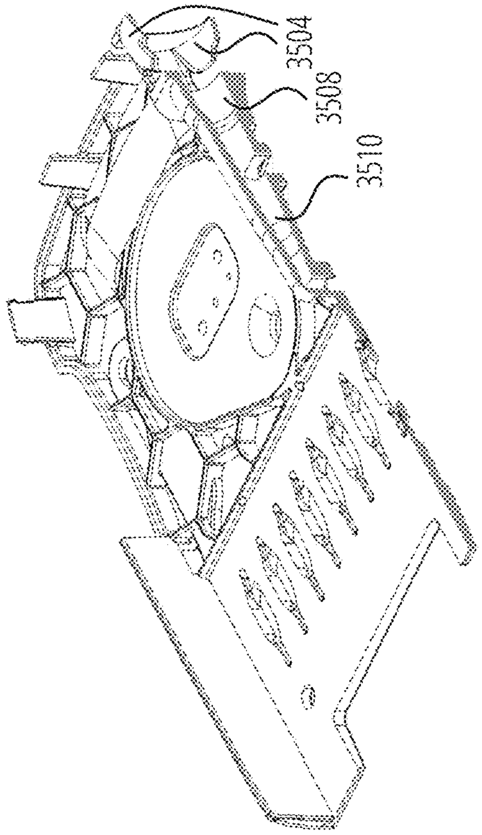
Figure 35E:
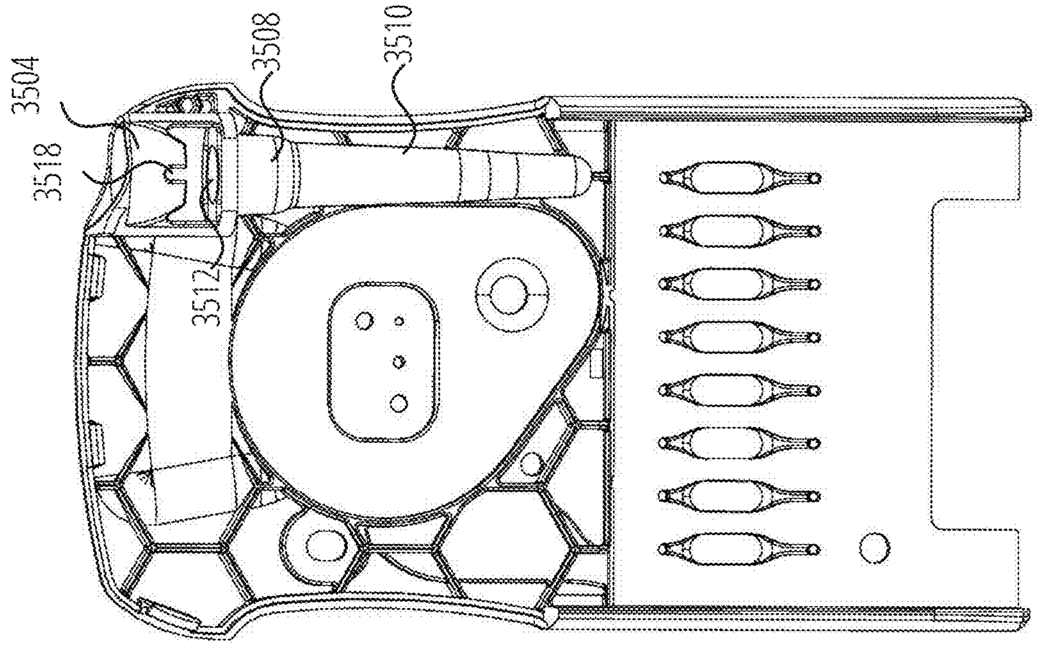
Figure 35D:
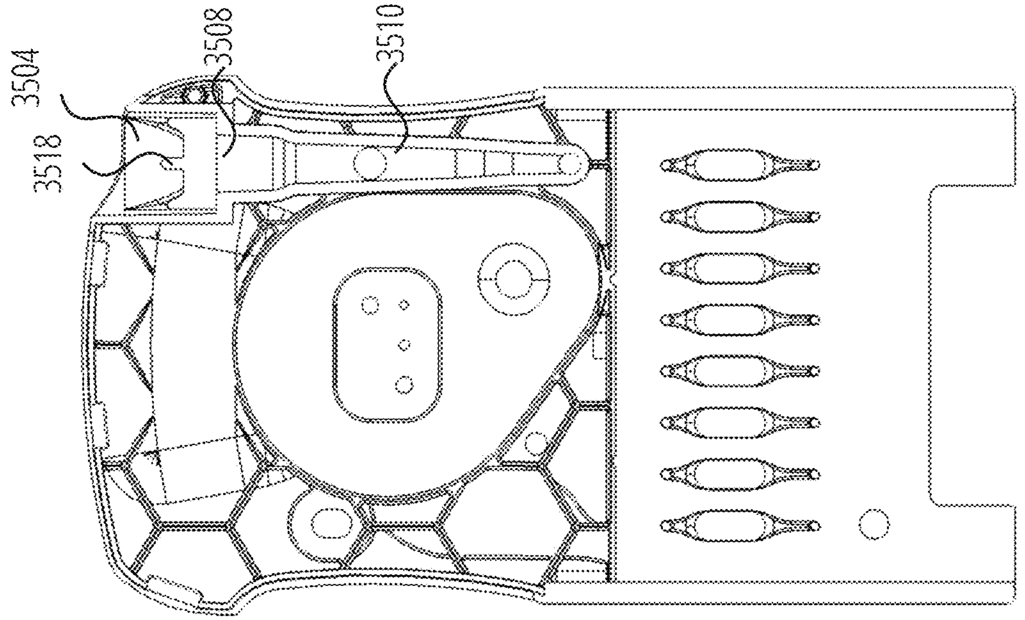

FIG. 35B illustrates an isometric view of the cartridge with the o-ring removed to show the closure 3504. The closure 3504 may be thermoformed from a polyethylene or similar plastic material and may be integrated into the cartridge body. FIG. 35C shows a cross-sectional view of closure 3504, swab receptacle 3508, and tapering, tubular portion 3510. Tapering, tubular portion 3510 may comprise a tapering tube channel sized and shaped to receive a swab comprising a biological fluid or sample such as mucus or saliva or both. Tapering, tubular portion 3510 may be in fluid connection with or comprise a mixing region, wherein reagents come in contact with a sample introduced via insertion of a swab to the cartridge. Swab receptacle 3508 and tapering, tubular portion 3510 may also be thermoformed from a polyethylene or similar plastic material. FIG. 35D shows a top-down view of the same features. FIG. 35E shows a slight tilted top-down view of the cartridge to show entry to swab receptacle 3512, through which a swab tip may be inserted to access swab receptacle 3508 and tapering, tubular portion 3510. The geometry of closure 3504 may include one or more recess 3518. Inclusion of one or more recess 3518 may be desirable to allow dilation of closure 3504.

Figure 35I:
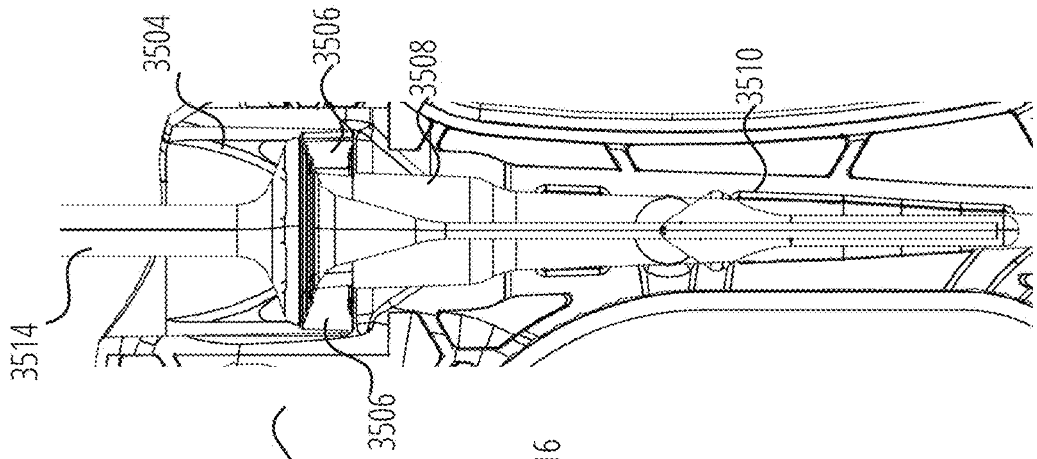
Figure 35H:
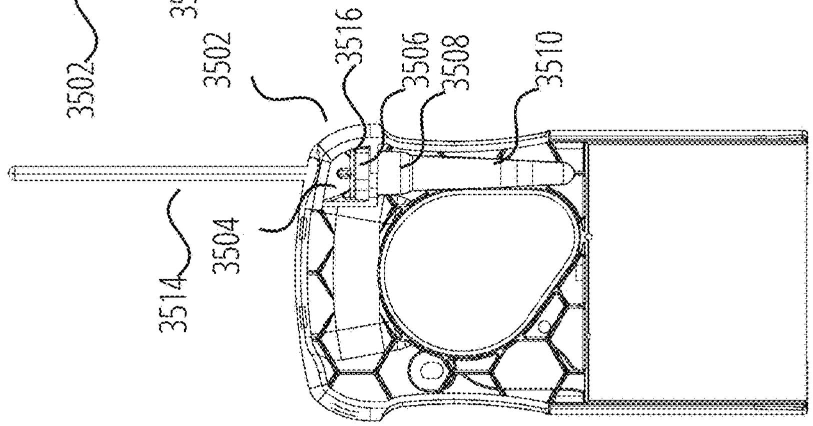
Figure 35G:
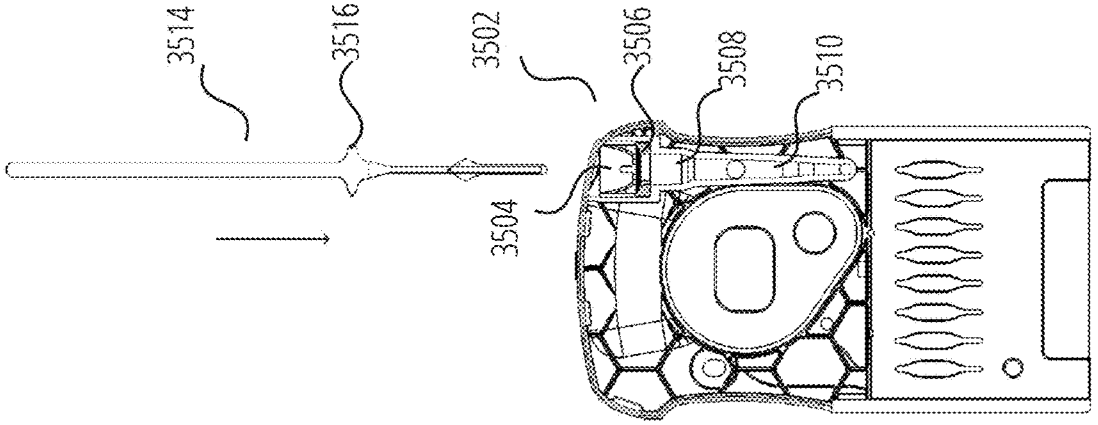
Figure 35F:
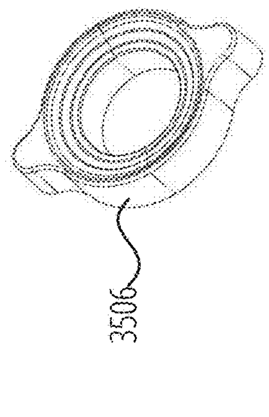

FIG. 35F illustrates an o-ring 3506. The o-ring 3506 may comprise an elastomer material. It may be desirable for the elastomer material to be relatively soft to ensure a seal between o-ring 3506, the material of the cartridge, and swab flange 3516. For example, the elastomer may have a hardness between Shore 0A and Shore 70A, a hardness between Shore 0A and Shore 60A, a hardness between Shore 0A and Shore 50A, a hardness between Shore 0A and Shore 40A, a hardness between Shore 0A and Shore 30A, a hardness between Shore 0A and Shore 20A, or a hardness between Shore 0A and Shore 10A, or any value or range within or bounded by any of these ranges or values, although values outside these values or ranges can be used in some cases. Additionally or alternatively, in some examples, the elastomer has a hardness of Shore 40A. In some examples, the elastomer comprises a santoprene material.

Figure 35J:
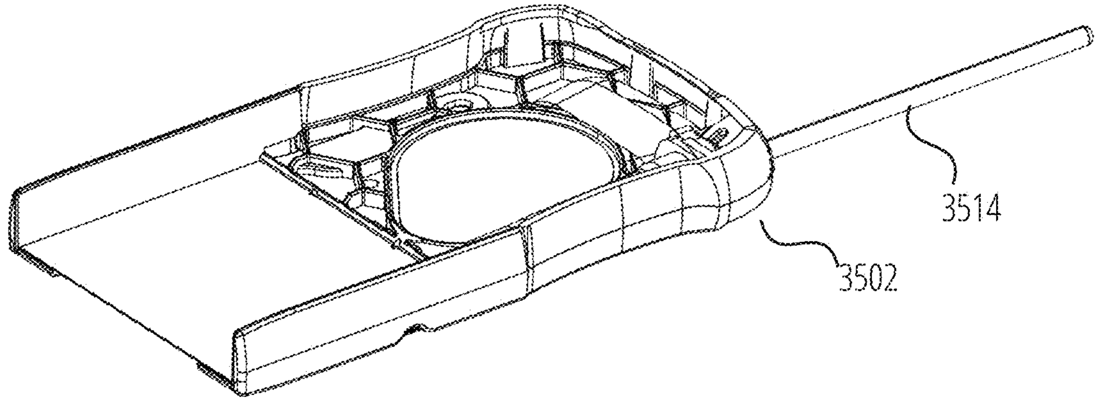
Figure 35K:
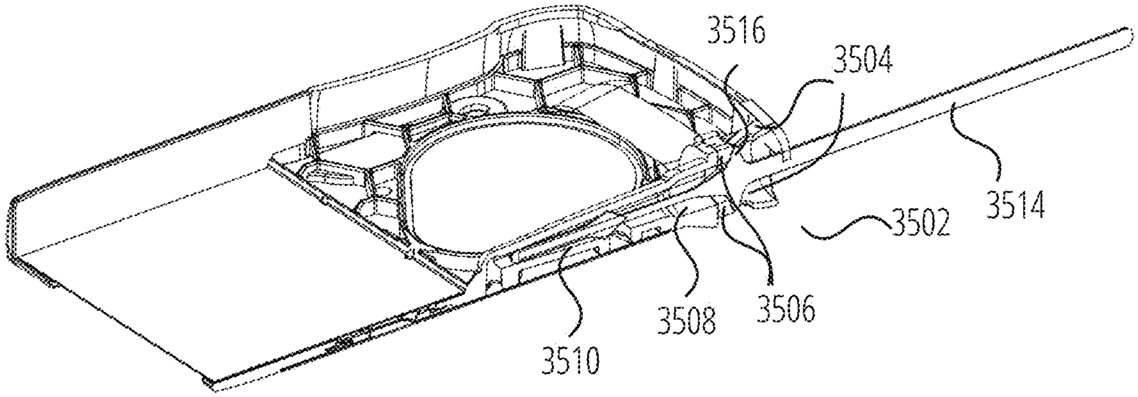

FIG. 35G illustrates a swab 3514 ready for insertion into the retention feature 3502 while FIG. 35H illustrates the swab 3514 once inserted into the retention feature 3502. FIG. 35I illustrates a cross-sectional, expanded view of the swab 3514 inserted into the retention feature 3502. FIG. 35J illustrates an isometric view of the swab 3514 inserted into retention feature 3502, and FIG. 35K illustrates the same isometric viewpoint but with a cross-sectional view of the swab 3514 within the retention feature 3502 and swab receptacle 3508. As a user (for example, a patient, a care provider, and/or an operator) inserts the swab 3514 into the retention feature 3502, the flange 3516 moves through the closure 3504. The closure 3504, which may have one or more recess 3518, may dilate to allow passage of the flange 3516 through closure 3504. Once flange 3516 has passed through closure 3504, closure 3504 may return to its non-dilated conformation, which may prevent flange 3516 from passing back through closure 3504. Once the flange 3516 passes through closure 3504, o-ring 3506 may contact the flange 3516 to press flange 3516 against the bottom surface of the closure 3504. This pressing between the o-ring 3506 and the flange 3516 may desirably create a seal such that any liquid introduced into swab receptacle 3508 or tapering, tubular portion 3510 is prevented or inhibited from leaking out through the entry of the retention feature 3502. Once inserted, retention feature 3502 may hold swab 3514 such that the tip of swab 3514, which may contain a sample, is held within tapering, tubular portion 3510. After the swab 3514 is secured, reagents, such as a buffer solution, may be introduced to contact the swab tip to mix with the sample, as described herein.

The closure 3504 is described and illustrated herein as an example component of the retention feature. FIGS. 35A-K diagram the closure as a collar, which encircles the swab flange on insertion. One having skill in the art may recognize other mechanisms, which could receive and retain the swab. For example, a swab retention feature may alternatively comprise a latch. A latch may contact an inserted swab. The latch may be configured to allow insertion and securement of a swab into the retention feature while preventing and/or inhibiting removal of an inserted swab.

The reagent blister 1340 and the integrated rupture feature 1344 of the cartridge 1300 can be used to improve testing of collected samples. Prior to receiving samples (for example, mucus or other types of samples), the integrated rupture feature 1344 may be pressed. When the integrated rupture feature 1344 is pressed, it may rupture and release solution or solutions stored inside (that is, inside the integrated rupture feature 1344) e.g., 10, 20, 30, 40, 50, 60, 70, 80, 90, or 100 microliters of solution or an amount of solution that is within a range defined by any two of the aforementioned volumes, which then enters the swab receptacle also referred to as the sample port 1342. Once sample is collected via the swab receptacle 1342, the cap 1310 can be closed to seal the swab receptacle 1342. Once the cap 1310 is closed, the reagent blister 1340 may be pressed. The pressing of the reagent blister 1340 can desirably mix the solution (for example, a buffer) released from the rupture feature 1344 with solution (for example, reagent) previously stored in the reagent blister 1340. Additionally, the pressing of the reagent blister 1340 can cause the mixed solution to flow towards, for example, the sample mixing and macrofiltration region 1330 of the cartridge 1300. The mixing of the solutions from the integrated rupture feature 1344 and the reagent blister 1340 can provide improved recovery of sample from the swab 1360, improved reaction rate between the collected sample and the reagent, and improved test results (for example, decreased rate of false-positive). In some embodiments, after the solution from the integrated rupture feature 1344 is provided to the swab receptacle 1342, the swab 1360 is inserted into the swab receptacle 1342 and is twisted or rotated a plurality of times e.g., 1, 2, 3, 4, 5, 6, 7, 8, 9, or 10 times or an amount that is within a range defined by any two of the aforementioned times.

After the swab receptacle 1342 of the cartridge 1300 is closed via the cap 1310, the patient or operator of the analyzer and cartridge may be prompted to insert the now sealed cartridge 1300 into the analyzer 1400. The process of inserting the cartridge 1300 into the analyzer 1400 may actuate multiple features on the cartridge 1300 using static and/or passive components. For example, the singular action of inserting the cartridge 1300 into the analyzer 1400, as performed by the patient or operator, can have its functionality divided into 3 major phases, with some overlap amongst them, as described below.

The first major phase involves inserting the cartridge 1300 into the analyzer 1400. As the cartridge 1300 is first inserted into the analyzer 1400, a static platform located on the bottom mating surface of the cartridge/analyzer interface in the analyzer 1400 depresses a living hinge via interference (for example, mechanical interference). Thus, the static platform translates a linear motion of the cartridge 1300 as it is inserted into the analyzer 1400 into an angular displacement of a lever mechanically coupled to and engaged with the living hinge. The displacement of the lever/living hinge may result in the rupture of the reagent blister 1340. In some embodiments, the lever and/or living hinge may correspond to the integrated rupture feature 1344, introduced above. The lever coupled to the living hinge may continue to rotate about the living hinge and flex along a length of the lever to depress the reagent blister 1340, thereby distributing the reagents into the cartridge 1300 (for example, into the sample mixing and macrofiltration region 1330 of the cartridge 1300). In some embodiments, forces associated with this distribution action may cause the sample in from the swab receptacle 1342 to mix with and be diluted by the reagents from the ruptured reagent blister 1340 in the sample mixing and macrofiltration region 1330. The forces may further distribute the mixed sample and reagent to the reaction wells 1322, rehydrating dried and/or lyophilized reagents disposed in the reaction wells 1322. The flow of the mixed sample and reagent may terminate at the exhaust gas-permeable membrane 1324 located at the exit of each reaction well 1322, thereby ensuring uniform filling in each well. All of these processes may occur before the cartridge 1300 is inserted into the analyzer 1400.

As a second of the three major phases, the reaction wells 1322 are isolated. As the mixed sample and reagent is distributed through the cartridge 1300 as described above, a path through with the mixed sample and reagent flows transitions from the distribution tree 1328 of the injection molded cartridge body 1302 (for example, the portions of the cartridge 1300 not including and below the thermoformed cover 1314) into small channels 1315 formed in the thermoformed cover 1314. In some embodiments, the thermoformed cover 1314 is attached to the cartridge body 1302 via pressure-sensitive adhesive (PSA) above the plane of the injection molded cartridge body 1302. In some embodiments, the thermoformed cover 1314 also serves as a housing for or includes other fluidic channel components for the cartridge body 1302. In some embodiments, these other fluidic channel components, for example, the well isolation crush valves 1312, act as isolation valves for each individual reaction well 1322. As the cartridge 1300 nears the end of its insertion into the analyzer 1400, after each of the reaction wells 1322 has been filled with the mixed sample and reagent, passive features located on the upper mating surface of the analyzer 1400 "crush" the isolation crush valves 1312 (which may comprise thin channels) down against the PSA bonding the thermoformed cover 1312 or a film to the injection molded cartridge body 1302. Because of the nature of the PSA, the PSA conforms to the deformed shape of the thin film channel in the cartridge body 1302, serving to isolate the reaction well 1322 fluidically from the channels that join the reaction wells 1322 together fluidically. This isolation may prevent crosstalk and diffusion from reaction well 1322 to reaction well 1322. Additionally, this isolation may serve to isolate the reagents and the byproducts of the reaction from the analyzer 1400 and user.

While the cartridge 1302 is being inserted into the analyzer 1400, the third phase occurs. As described above, the well-isolation crush valves 1312 may protrude from an upper surface of the thermoformed cover 1314 on the cartridge body 1302 so that they are crushed when the cartridge 1302 is inserted into the analyzer 1400. This orientation combined with a dual sided heating design for the cartridge 1300 in the analyzer 1400 necessitated a method of removing a heater surface out of the way of the exhaust crush valve 1306. In order to passively accomplish this, an upper heater is mounted to an integrated crossbar and leaf spring of the analyzer 1400. In some embodiments, two cam runners are positioned in a cartridge receptacle of the analyzer 1400 such that when the cartridge 1300 begins to be inserted, the cam runners push the upper heater up and out of the way of the crush valves (for example, the well isolation crush valves 1312 and/or the exhaust port crush valve 1306) disposed on the thermoformed cover 1312. The cam runners continue to pass along an upper edge of the cartridge body 1302 until the cam runners arrive at a molded drop in the upper edge of the cartridge body 1302. The molded drop in the upper edge of the cartridge body 1302 may be timed or positioned in such a way so as to allow the upper heater to press back down against the cartridge body 1302 while not interfering with the thermoformed valves on the thermoformed cover 1312. In some embodiments, the cam runners dropping into the molded drop of the cartridge body 1302 may also double as a retention feature for the cartridge 1300 in the analyzer 1400. As such, the user may displace a leaf spring that moves the upper heater up and out of the way of the crush valves and displacing the cam runners from the molded drop in order to extract the cartridge 1300 after the testing is completed in the analyzer 1400.

After these three major phases are completed, the cartridge 1300 is fully inserted into the analyzer 1400, the mixed sample and reagent are distributed to the reaction wells 1322 and isolated in each reaction well 1322. The upper heater in the analyzer 1400 may uniformly contact the upper surface of the cartridge body 1302, sandwiching the cartridge body 1302 against a lower heater in the analyzer 1400. Upon full insertion, the cartridge 1300 may also establish an electrical connection to the analyzer 1400 via the flexible electrode layer 1304, thereby enabling the analyzer 1400 to begin a test of the mixed sample and reagent in the reaction wells 1322.

In some embodiments, the method for using the cartridge 1300 with the analyzer 1400 to detect a target involves first collecting a sample fluid from a patient or user. In some embodiments, the sample fluid may be collected using a swab or other similar sample collecting method or means. Once the sample fluid is collected, the sample fluid is introduced into the cartridge 1300. For example, when the sample fluid is collected using the swab, the swab is inserted into the cartridge 1300 via the swab receptacle 1342. The optional cartridge cap 1310 may be closed and the cartridge 1300 may be inserted into the analyzer 1400. The insertion of the cartridge 1300 may cause a reagent blister 1340 to rupture and mix the reagents contained therein with the sample fluid. In some embodiments, the mixture of the reagents and the sample fluid is conveyed to the reaction wells 1322. The reaction wells 1322 may each have a volume of approximately 25 microliters (μL). In some embodiments, the reaction wells 1322 has a volume, size, and/or shape that is based on the overall volume of liquid which will fill the reaction wells 1322 as well as a favorable geometry above the sensing electrode. For example, in some embodiments the reaction wells 1322 are circular, triangular, or rectangular, or any other polygonal shape. In some embodiments, when the reaction wells 1322 comprise a plurality of reaction wells (for example, eight (8) reaction wells), the electrodes 1304 (or corresponding circuitry and/or circuit board components/parameters) of the cartridge 1300 may enable the analyzer 1400 to simultaneously test each of the reaction wells 1322 (for example, each representing a different channel) at a plurality of frequencies (for example, three (3) frequencies). In some embodiments, each reaction well 1322 has a depth or height of approximately 1 millimeter (mm). In some embodiments, the reaction wells 1322 may have a shape such that the volume of each reaction well 1322 is or is approximately 25 μL when each reaction well 1322 has a depth or height of 1 mm. In some embodiments, the reaction wells 1322 contain dried and/or lyophilized enzymes and primers. The primers and enzymes may be spotted into the reaction wells 1322 as liquids and dried and/or lyophilized (for example, in two spots per well). Thus, the reaction wells 1322 may include dried and/or lyophilized primers and enzymes while the reagent blister 1340 may include the wet or liquid reagents. In some embodiments, the reagent blister 1340 and/or the reaction wells 1322 may contain liquid reagents and/or primers and enzymes, respectively, configured to allow for the testing of one or more of a viral target, a bacterial target, an antigen target, a parasite target, a microRNA target, an agricultural analyte, an enzyme, an environmental contaminant, pathogens, genomic materials, proteins, PSA levels, elevated or reduced cell counts, specific cells and/or cell types, infections and/or diseases associated with a particular industry or environment, infectious diseases, vector borne diseases, norovirus, rotavirus, and/or any other small molecules or biomarkers. In some embodiments, the dried and/or lyophilized enzymes and primers are contained in the reagent blister 1340 or elsewhere in the cartridge 1300. Once the mixture of the reagents and the sample fluid is introduced to the reaction wells 1322, one or more heating elements in the analyzer 1400 are activated to increase a temperature of the mixture in the reaction wells 1322 and impedance sensors begin tracking data in real time. The analyzer 1400 then conducts a test through an isothermal nucleic acid amplification process, and any results are communicated to an application and/or a database for further analysis.

In some embodiments, each of the reader devices 110, 600, 910, and 1400 may incorporate any of the functions and/or components of the other reader devices. For example, the components (and corresponding functions) of the reader device 600 in FIG. 6 may be integrated into the reader devices 110, 910, and 1400. Similarly, each of the reader devices 110, 600, and 910 may include the functionality and features of the reader device 1400. Similarly, the reader device 1400 may include in the functionality and features of the readers devices 110 and 910 to process any cartridge inserted into the reader device 1400.

Similarly, each of the cartridges 120, 200, 1000, 1200, and 1300 may incorporate any of the functions and/or components of the other cartridges. For example, the components and corresponding functions of the cartridge 1300 in FIGS. 13A-13E may be integrated into the cartridges 120, 200, 1000, and 1200. Similarly, the cartridge 1300 may include in the functionality and features of one or more of the cartridges 120, 200, 1000, and 1200 and may be processed by any reader device described herein.

The various components of the handheld detection systems 100 and 900 (for example, the analyzers or reader devices 110, 600, 910, and 1400 and cartridges 120, 200, 1000, 1200, and 1300, described herein) may be integrated with an external computing device. The external computing device, for example a mobile phone, a computer, a tablet, a laptop, or similar device, may communicate with the reader devices 110, 600, 910, and/or 1400 using a communication interface, for example the communications module 615. The external computing device may comprise a testing monitoring and/or control application installed thereon to provide a user options and abilities to monitor and/or control one or more of the cartridge and the reader device. Further details of the functionality of the testing control application (including providing a testing system user interface for controlling options and/or presenting test results and other test information to users, on a display of the remote device) are provided below with reference to FIGS. 15A-15P.

Figure 15C:
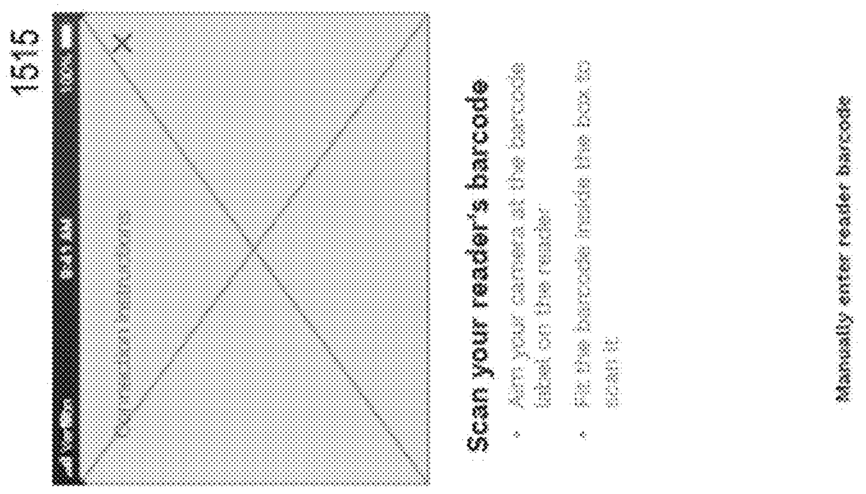
FIGS. 15A-15P depict screenshots of an example graphical user interface hosted on an external computing device and configured to receive input, provide instructions, testing control, and/or monitoring of the handheld system disclosed herein.
Figure 15B:
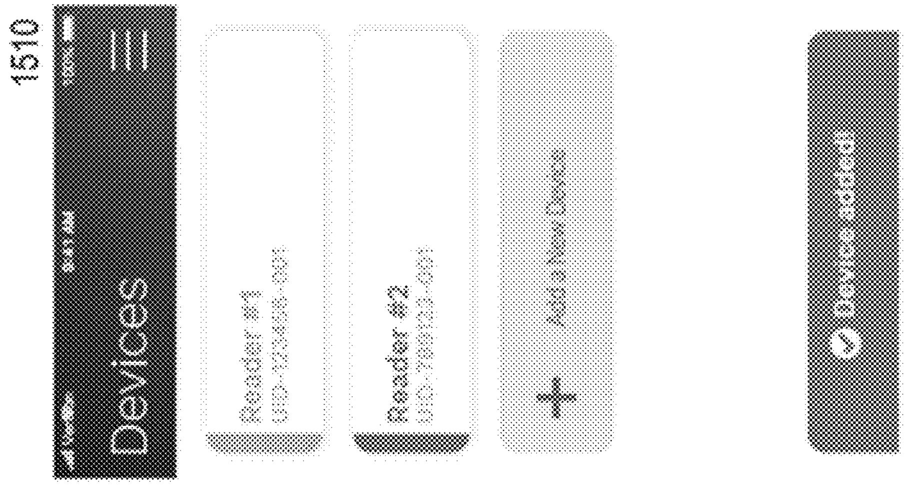
Figure 15A:
Figure 15D:
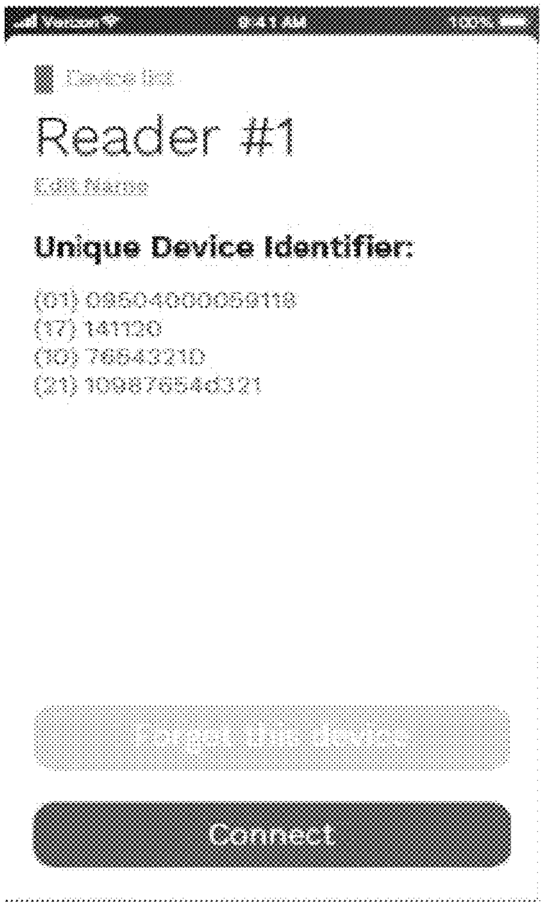
Figure 15E:
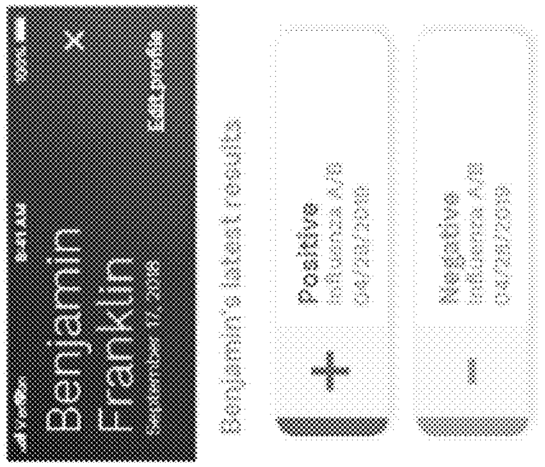
Figure 15F:
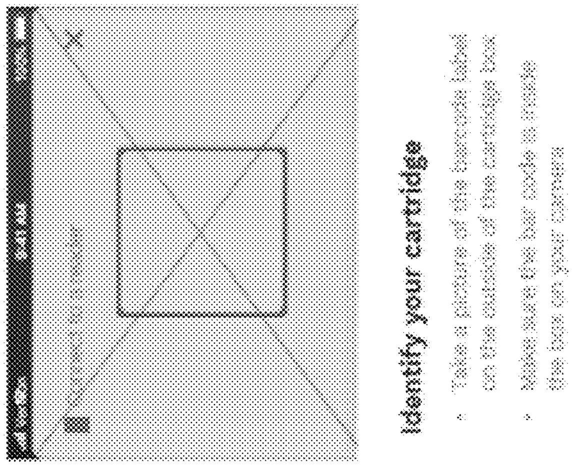
Figure 15G:
Figure 15J:
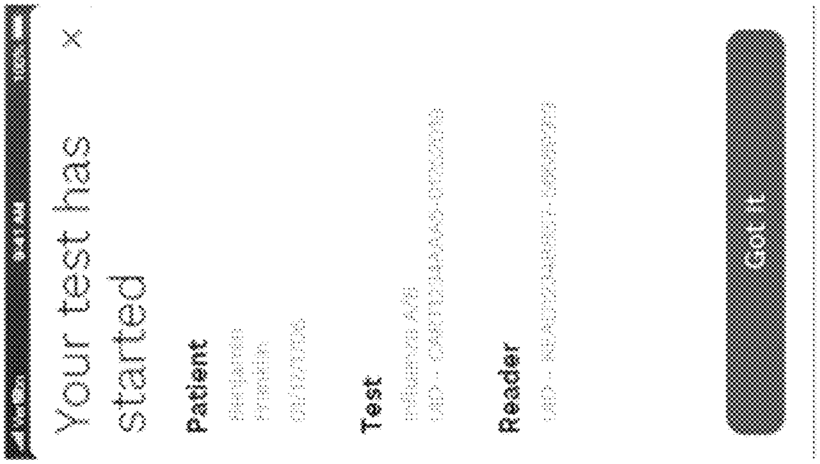
Figure 15I:
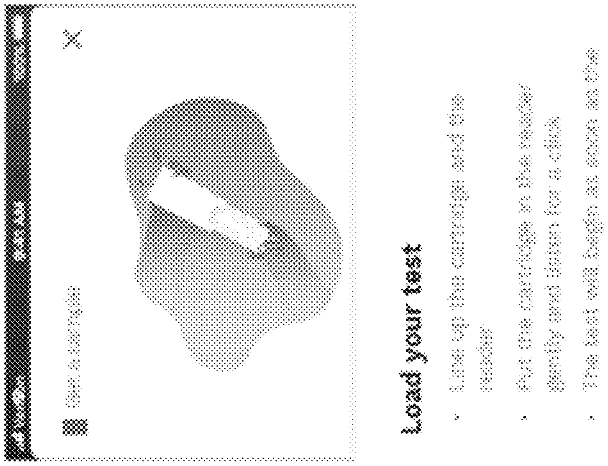
Figure 15H:
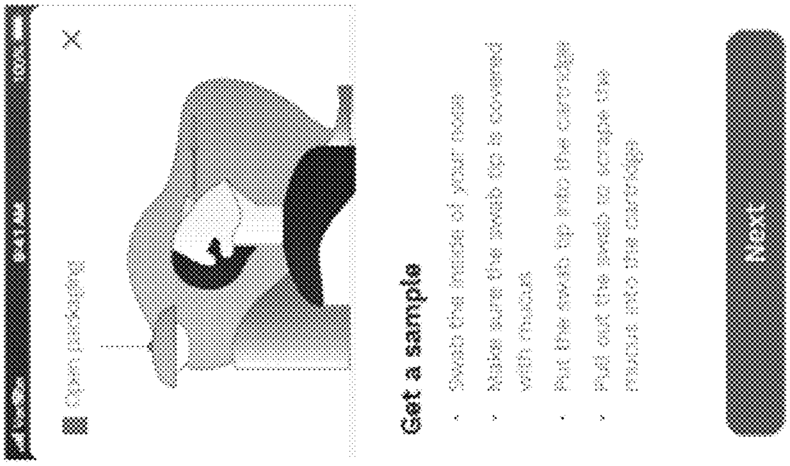
Figure 15K:
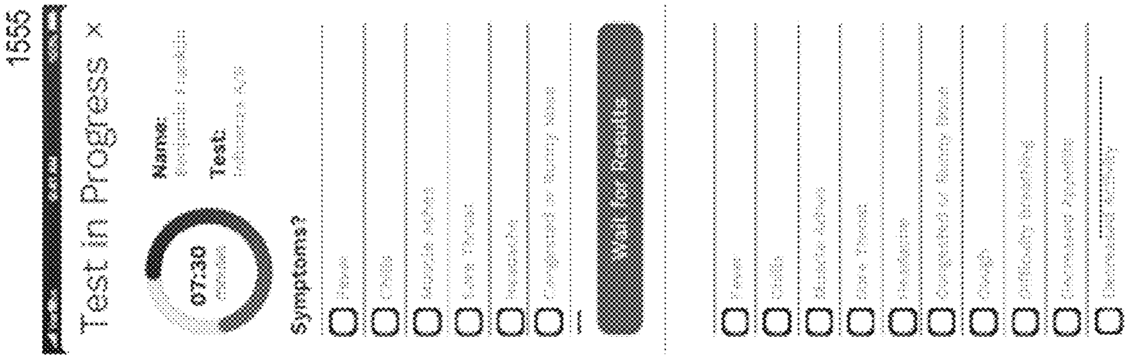
Figure 15L:
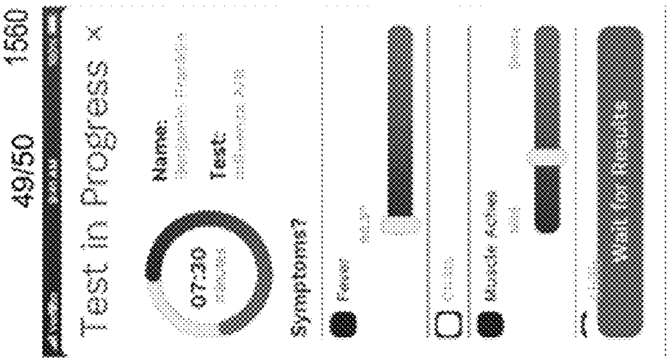
Figure 15M:
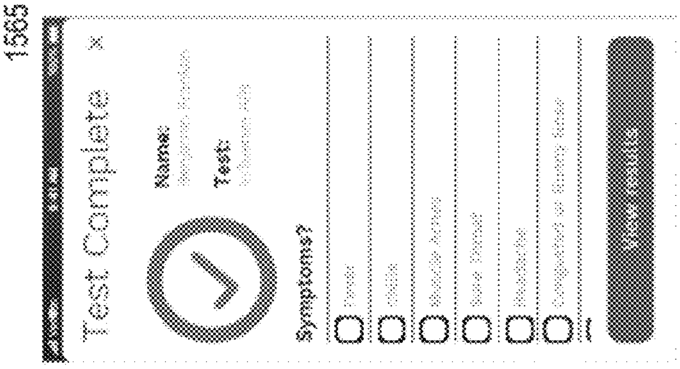
Figures 15N, 15O, 15P:
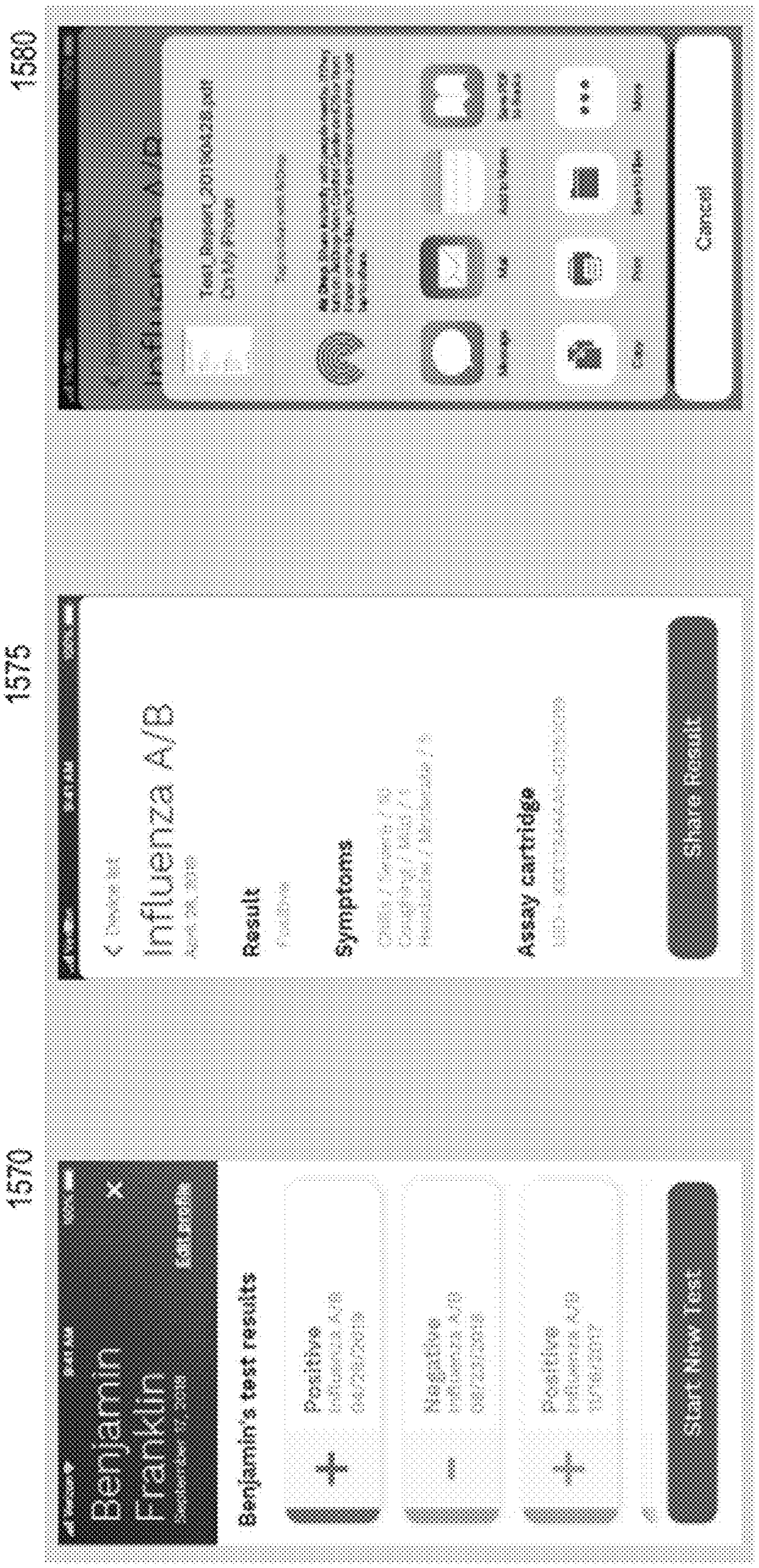

FIGS. 15A-15P depict screenshots of an example graphical user interface 1500 hosted on an external computing device and configured to provide testing control and/or monitoring of the handheld system disclosed herein. The graphical user interface 1500 may include one or more of the features of the graphical user interface 800 described with reference to FIGS. 8A-8D above.

The user interface 1500 may be, for example, the user interface 620 illustrated in connection with the reader device 600 of FIG. 6 or the user interface 800. The user interface 1500 may be implemented with any of the reader devices 110, 600, 910, and/or 1400 and/or assay cartridges 120, 200, 1000, 1200, and 1300 described herein. The screens depicted in FIGS. 15A-15P may be displayed, for example, by an application executing on the external computing device paired to the reader device 110, 600, 910, 1400 (e.g., by WiFi, Bluetooth, or the like). The screens may allow a user of the external computing device to control and/or monitor the reader device 110, 600, 910, 1400 from the external computing device.

FIG. 15A depicts an initial user screen 1505 which may be displayed when the application is activated or run. In one example, a user selects the application from a home screen or the application is launched automatically when the external computing device is paired with the reader device. In some embodiments, the application may run in the background of the external computing device and automatically open or prompt the user when the application detects that the reader is paired to the external computing device or when a cartridge is inserted into the reader device. The user screen 1505 optionally includes a header portion that may be generic to all or a majority of screenshots for the application. The header portion may include a title portion and a menu portion. The title portion may provide a title for the screen being viewed (for example, the title portion for the user screen 1505 includes "Who is Sick?", prompting the user of the application to select or add a person for whom a test has been run, is being run, or will be run. The menu portion optionally may comprise a "hamburger" button that, when clicked, presents the user with available options from a current screen (for example, the screen from which the user accesses the hamburger button.

The user screen 1505 allows the user to identify a patient for which test results are being generated by the reader device, test results are being reviewed, or a profile is being created, revised, or reviewed. The user may be one of the patients identified on the screen 1505 or may be associated with one of the patients identified. The user screen 1505 identifies a single patient's profile, "Benjamin Franklin", but includes a button to add new patients or people to the application. By including an ability for multiple patients to be associated with the application (for example, have test information stored in or by the application), the user interface can link and reference tests associated with corresponding patients in a simplified and secure manner. Accessing a patient's account may require a password or biometric (or other) authentication to ensure privacy of test results and corresponding data.

When the user logs into the application (and provides any necessary authorization information), the application may provide the user with the option to edit an existing profile (for example, the Benjamin Franklin profile) or add a new profile. When the user edits the existing profile(s), the user may edit one or more of the name, birthdate, and representative image or photo. In some embodiments, editing the existing profile comprises removing or deleting the existing profile, which may delete the profile along with any associated information (for example, associated test information). In some embodiments, when a profile is deleted, the user has the option to save or export corresponding test information and other information. When the user adds a new profile, the user may create a new profile including the name, birthdate, and/or representative image or photo for the new profile. Adding a new profile may require the user to authenticate (for example, via e-mail authentication) some information associated with the new profile.

In some embodiments, when the user selects the menu button on any of the screens (for example, screen 1505 of FIG. 15A, the menu may provide the user with many options. The options include: (1) closing the menu; (2) transitioning to a home page; (3) transitioning to a page to manage connected devices; (4) transitioning to a page for ordering supplies; (5) transitioning to a page with information about the application; (6) transitioning to a page to contact a vendor of the application; (7) transitioning to a page for a user manual; and (8) logging out of and exiting the application. Option (1) may close the menu and return the user to the previously visible screen. Option (2) may take the user to the home page of the application, which may be the "Who is Sick?" page where the patient is selected. Option (3) may transition to a page where connected devices (for example, one or more of the reader devices 110, 600, 910, and/or 1400) are managed. Option (4) transitions to a page where the user can order supplies, for example additional cartridges 120, 200, 1000, 1200, and/or 1300 or reader devices 110, 600, 910, and/or 1400, swabs, or similar items. Option (5) may display details of the application (for example, copyright date, version information, application identifier, and so forth). Option (6) may allow the user to contact the vendor of one or more of the application, the reader devices 110, 600, 910, and/or 1400, and the cartridges 120, 200, 1000, 1200, and/or 1300. Option (7) opens a digital user manual for one or more of the application, the reader devices 110, 600, 910, and/or 1400, and the cartridges

120, 200, 1000, 1200, and/or 1300. Option (8) causes the user to sign out (for example, de-authenticate) and exit the application.

Option (3) from the menu may transition the application to the user screen 1510 of FIG. 15B, having the title portion "Devices". The screen 1510 shows devices that are added to and/or associated with the application, such as the Reader #1 and the Reader #2, and an option to add a new device. When the user selects to add the new device, the application transitions to a pairing reader screen 1515 that requests the user to input information to enable the application to communicate with the new device(s), such as a new reader. For example, the pairing reader screen 1515 may prompt the user to pair the new reader with the application over Bluetooth, Wi-Fi, or another communication medium. The pairing reader screen 151 may include a video prompt to show the user how to add the new reader and generally include instructions for pairing the new reader with the application. In some embodiments, the pairing reader screen 1515 may prompt the user to scan or enter a barcode on or associated with the new reader. Once the new reader is added to or associated with the application, the application may return to the screen 1510, where the added reader (e.g., Reader #2) is shown with a note of "Device added!".

When the user selects one of the added devices (for example, the Reader #1), the application transitions to a user screen 1520 of FIG. 15D. The user screen 1520 may provide various information and options to the user. For example, the user screen 1520 provides an option to change the name of the Reader #1, to forget the Reader #1, and to connect to the Reader #1. If the Reader #1 is currently connected to the application, then the user screen 1520 may provide an option to disconnect from the Reader #1. The user screen 1520 also displays identifying information for the Reader #1 and may include a connection status indicator, indicating a status of the connection between the Reader #1 and the application. In some embodiments, the user screen 1520 also includes information regarding current status of the Reader #1. For example, the screen 1520 can indicate whether the Reader #1 is performing a test, analyzing a cartridge, waiting for a cartridge, and so forth, or a recently completed action. Though not shown in FIG. 15D, the screen 1520 may provide one or more commands or controls to the Reader #1.

As described herein, the reader devices and the cartridges provide testing for target agents. The application on the external computing device may facilitate the performance, control, and review of the test and the review and/or communication of the test results. For example, user screen 1525 of FIG. 15E shows results for the user Benjamin Franklin for two previous tests or provides the user the option to start a new test. The screen 1525 shows the two previous test results: a positive test result for Influenza A/B on Apr. 28, 2019 and a negative test result for Influenza A/B on Apr. 28, 2019. The user of the external computing device may select one of the previously completed positive and negative test results and review details of the test, the test results, and any symptoms reported for the patient at the time that the selected test was performed. Additionally, the user can review identifiers for the cartridge from each test and/or the reader device from each test. When the user selects to start a new test, the user interface 1500 may prompt the user to connect to a reader device (for example, one of reader devices 110, 600, 910, and/or 1400, if not already connected). The user interface may also request the user to identify a cartridge (for example, one of cartridges 120, 200, 1000, 1200, and/or 1300) to be used in the test.

When the user selects to start a new test from the screen 1525, the user interface 1500 transitions to and through the screens described above that the user accesses when selecting to add the new reader from the screen 1510. As such, the pairing and connecting of the reader device with the external computing device and user interface 1500 may be completed as described above. When the reader device is paired with the external computing device and the user interface 1500, the user interface 1500 may prompt the user to identify the cartridge being used with the paired reader device at a user screen 1530 of FIG. 15F. The screen 1530 provides the user with a video and/or instructions for identifying, to the application, the cartridge being used. In some embodiments, as described herein, different cartridges may be used for different tests. For example, an influenza test uses a first cartridge while a bronchitis test uses a second cartridge. Because the different tests may use different cartridges, identifying the cartridge to being used for the test may be essential to the test providing a reliable result when analyzed by the reader device. For example, the reader device may receive specific instructions and/or set points, etc., for use in the test based on the identified cartridge. Thus, the instructions provided by the screen 1530 may include scanning a barcode or taking a picture of the cartridge being used or manually entering information identifying the cartridge.

Once the user provides the details of the cartridge being used for the requested test, the user interface 1500 provides instructions to the user for using the cartridge, at a screen 1535 of FIG. 15G. The instructions comprise obtaining a swab and removing a cartridge that matches the identified cartridge for use in the test. The screen 1535 also shows the test that corresponds to the selected and identified cartridge, in this case the influenza A/B test. The screen 1535 may provide any additional instructions or notes to assist the user in preparing to conduct the test.

FIGS. 15H-15J show the user screens 1540-1550, which include instructions provided to the user via the external computing device. The instructions provided to the user screens 1540-1545 include instructions for getting the sample, loading the sample into the cartridge, and getting the cartridge into the reader device. For example, the user interface 1500 instructs the user to get the sample by swabbing the patient's nose such that mucus covers a tip of the swab. The instructions tell the user to then put the tip of the swab into the cartridge and then retract or extract the swab, which causes the cartridge to scrape the mucus into the cartridge. The instructions further teach the user to insert the cartridge into the reader until the user hears a click, which may cause the test to begin. The click may be the result of a mechanical coupling of the reader device to the cartridge. In some embodiments, the user interface 1500 may provide additional instructions to the user. The screens 1540-1550 also include navigation buttons to navigate between screens. The screen 1550 may indicate to the user that the corresponding test has begun. Specifically, the screen 1550 provides the user with a summary of the patient or subject (for example, Benjamin Franklin) along with some information about the patient (for example, date of birth). The screen 1550 also provides details on the test being run, here the Influenza A/B test, and an identifier for the cartridge being used to run the test and the reader running the test. In some embodiments, the screen 1550 also includes a timer or countdown indicating how much time is remaining in the current test, if any.

FIGS. 15K-15M show examples of user screens 1565-1565 through which the user can provide symptoms that the patient is experiencing. In some embodiments, the user can provide the symptoms before the test is run, while the test is run, and/or after the test is run. In some embodiments, the reader or the user interface (herein referred to also as the "application") may use the symptoms in conjunction with the test results to make a determination as to whether the patient is suffering from an ailment (otherwise referred to herein as a sickness or illness) associated with the test. For example, as shown in FIGS. 15K and 15L, the user can input or select symptoms such as fever, chills, muscle aches, sore throat, headache, congested or runny nose, cough, difficulty breathing, decreased appetite, or decreased activity, and so forth. The user may input a symptom that is not shown in FIGS. 15K and 15L. In some embodiments, the user interface 1500 allows the user to select severity levels associated with one or more indicated symptoms, as shown on the screen 1560. For example, if the patient reports having a fever, the user can enter the patient's temperature when the swab collected the sample of the patient's mucus. Similarly, other symptoms may have sliding scale values to provide associated values (for example, a sliding scale for severity of muscle aches or congestion, and so forth. Additionally, screens 1555-1565 include a timer or countdown regarding the test being run as well as the patient name and the test name. On the screen 1565 of FIG. 15M, the user interface 1500 shows when the test is complete and shows any symptoms that the user identifies for the patient. The screen 1565 also gives the user options to view the results of the completed test. The results may include any target agent levels or associated information.

The screen 1570 of FIG. 15N shows a list of completed tests, similar to the screen 1525 of FIG. 15E, described above. However, the screen 1570 includes an additional test as compared to the screen 1525, the additional test being the influenza A/B test completed in screen 1565. The new test is shown as being positive for influenza A/B and includes the date on which the new test was completed. In some embodiments, though not shown in the figures, the user interface 1500 can show the status of the reader device being disconnected and unable to show test results. In some embodiments, if the reader device becomes disconnected from the user interface 1500 and the external computing device during a test, then the user interface 1500 may provide the user with an alert and/or steps to take to reconnect with the reader device. In some embodiments, if the reader device is disconnected from the user interface 1500 and the external computing device, then the user interface 1500 may track and/or display information from when the reader device was last connected to the user interface 1500 and the external computing device. Selecting the new test on the screen 1570 causes the user interface 1500 to present the screen 1575 of FIG. 15O, which includes details of the positive influenza A/B test, symptoms reported along with the test by the user, and details of the cartridge used in the test and potentially the reader device used in the test. In some embodiments, the screen 1575 of FIG. 15O may also include an indicator (not shown in the figures) of a diagnosed ailment and/or one or more recommended steps to follow-up on the test results and/or the indicated ailment. Screen 1580 of FIG. 15P provides the user with options for sharing the test results, for example via text message, e-mail, printing, and so forth. In some embodiments, the user establishes a default sharing plan for all test results, symptoms, and other data for a particular patient. For example, the user can set up the sharing plan to e-mail or message all results, symptoms, and other data to the patient's doctor or parents automatically upon completion of a test or entry of new data, or both.

In some embodiments, as described above with reference to FIGS. 8A-8D, the external computing device and the user interface 1500 are used to scan a cartridge identifier (e.g., cartridge identifier 215 of FIG. 2B) of a cartridge before inserting the cartridge into the reader device. When the cartridge is inserted, the paired reader device detects the inserted cartridge and sends a message to the user interface that the cartridge has been inserted. The user interface 1500 may then display one of the screens described above, with reference to FIGS. 15A-15P. In some embodiments, one or more of the screens of the FIGS. 15A-15P include one or more of the indications, buttons, input fields, areas, and so forth of the FIGS. 8A-8D.

In some embodiments, the user interface (for example, the user interface 1500 or the user interface 800) works with the reader device (for example, one of the reader devices 110, 600, 910, and/or 1400) to determine whether a patient is suffering from a particular illness. For example, the reader device may perform a test using one of the cartridges 120, 200, 1000, 1200, and/or 1300 and determine that a particular target agent is present in the patient's mucus. However, merely the presence and/or amount of the target agent may be insufficient to determine that the patient is suffering from an illness or ailment. For example, if the patient is merely a carrier of an illness, the patient test results may indicate presence and/or amount of the virus but the patient may not be suffering from an associated illness. Thus, the user interface may receive symptoms that the patient is experiencing and combine these symptoms with the test results from the reader device to determine whether the patient is suffering from an illness or ailment corresponding to the target agent. For example, if the test result from the reader device indicates the presence and/or amount of the influenza A/B virus in the patient's mucus but the patient is not experiencing or reporting any symptoms, then the user interface may determine that the patient is not suffering from the influenza virus but is instead a carrier for the virus. On the other hand, when the test result indicates the presence and/or amount of the influenza A/B virus and the patient reports symptoms known to coincide with the influenza A/B virus in someone suffering from the influenza illness, then the user interface may determine that the patient is infected with the influenza illness. Such a determination may be based on a threshold number of symptoms or specific being met while the target agent is detected (for example, one or two symptoms being suffered while the influenza A/B virus is present). The symptoms may be weighted differently depending on the target agent in the test and/or the corresponding illness. For example, when the target agent is influenza A/B, then symptoms such as fever, chills, muscle aches may be more highly weighted than symptoms such as headache or cough. Thus, symptoms associated with a corresponding illness for the target agent may have higher weights and be more indicative that the patient carrying the virus is suffering the corresponding illness. In some embodiments, the threshold number of symptoms, weighting of symptoms, or specific symptoms to be met to determine that the patient is ill is determined based on one or more metrics. A standard setting or national organization, such as the Center for Disease Control (CDC) or similar organization or entity, may establish the one or more metrics. Thus, the user interface may use the test results from the reader device and the symptom information provided by the user to determine whether the patient is (1) ill or sick or (2) a carrier for the target agent. In some embodiments, the user interface offloads one or more of the determinations described herein to one or more external systems with which the user interface (and the corresponding external computing device) interacts.

In some embodiments, the user interface may generate a score or similar indicator to indicate a probability that the patient is ill or sick. A higher score may correspond to a higher probability that the patient is ill while a lower score may correspond to a higher probability that the patient is not ill. For example, the user interface may use details from the test results from the reader device along with the user provided symptom information to generate the score indicating the probability of sickness of the patient.

The reader device may provide test results that include a range of values, where the range of values correspond to a range of possible detection levels of the target agent. For example, the test results may include one or more of a likelihood that the mucus sample included the target agent (for example, between 0 and 100% probability) and a quantity of the target agent determined to have been included in the mucus sample. The probability that the mucus sample included the target agent may be associated with the quantity of the target agent determined to have been included in the mucus. The range of possible detection levels may refer to different likelihoods or probabilities that the patient has a particular virus or infection. For example, if the reader device provides test results indicating that the patient does have the virus or infection with 100% certainty or that a quantity of the target agent above a first threshold was present, then the score (or probability) may be assigned a minimum value, for example 50 out of a 0 to 100 range. Then, if the patient is experiencing any symptoms associated with the illness associated with the virus or infection, then the value of the score (indicating that the patient is suffering from the corresponding illness) may be increased. For example, for each symptom that the patient experiences that is associated with the illness, the value may increase by a threshold value (for example, 10 points). Thus, the combination of the target agent detection and the symptoms can increase or decrease the score or probability of the patient being sick. Alternatively, if the reader device indicates that the patient has the virus or infection with 50% certainty (or that a quantity of the target agent below the first threshold but above a second threshold was present), then the score may be assigned a different minimum value, for example 25 out of the 0 to 100 range. Accordingly, when the test results indicate a lower probability of the presence of the target agent, more symptoms suffered by the patient are needed to increase the score to the same value as compared to when the test results indicate a high probability of sickness. If the reader device indicates that the patient does not have the virus or infection (or that a quantity of the target agent below the second threshold was present), then the score may be assigned a zero value, for example 0 out of the 0 to 100 range. When the score starts at a zero-value based on the test results, no quantity of symptoms may be sufficient to raise the score because the virus or target agent is not present to make the patient ill. Thus, the user interface and the reader device may together generate the score that represents the probability of the patient being sick based on the test results of the target agent and the symptoms suffered by the patient.

In some embodiments, the user interface may review the test results and the provided symptoms to determine whether the patient is suffering from a particular illness not associated with the target agent for which the test was run. For example, if the patient's test results are negative for influenza A/B but the patient is experiencing a fever with chills and a sore throat, the user interface may determine that the patient is suffering from a cold or respiratory syncytial virus (RSV). Thus, the user interface may identify an illness that the patient is suffering from or is likely suffering from based on a positive or negative test results and the symptoms experienced. As such, the user interface may use knowledge (for example, databases) of similarities and differences in symptoms of different illnesses but differences in test results and so forth in illness determinations.

In some embodiments, the user interface generates a score value that indicates a probability that the patient is sick or ill, based on the test results and the symptom information. The user interface may further aggregate external information into the score value, regardless of what the test results and symptoms by themselves would otherwise indicate. The external information may include one or more of test results from other patients that used the same reader device, test results from other reader devices that interfaced with the user interface and the external computing device, test results and other diagnostic information for patients in a hospital or a geographic region, and so forth. For example, the user interface may use test results and/or symptom information from other patients tested by the reader device to inform further the score values. For example, many other patients tested with the reader device coupled to the user interface have positive test results for the same target agent and report one or more similar symptoms. The user interface may use this information to increase a score or probability that the patient is ill or sick, even if the patient's test results and/or symptoms may alone not indicate that the patient is ill. Similarly, the test results and the symptom information for the patient may indicate that the patient is ill but other patients having similar test results and symptoms report that they are not ill. The user interface then may decrease the score or probability that the patient is ill, regardless of what the patient's test results and/or symptom information otherwise indicate. If the test results and the symptoms for the patient are different from those of other patients that report as not being sick (for example, by a threshold amount), then the user interface may increase the score or probability that the patient is sick. On the other hand, if the test results and symptoms are different from those of other patients that report as being sick (for example, by the threshold amount), then the user interface may decrease the score or probability that the patient is sick, regardless of the test results and symptoms.

In some embodiments, the user interface performs one or more actions based on the score or probability values. The user interface may communicate information to one or more of the user, the patient, attending medical staff, the CDC, or similar entities. Alternatively, or additionally, the user interface may generate an alert to the one or more of the user, the patient, attending medical personnel, the CDC, or similar entities. The alert may comprise one or more of a phone call, a text message, an e-mail message, a push message, an audio message, a flashing indicator, or audible indicator, or any other communication used to communicate information. For example, the user interface may automatically generate and transmit an alert to the user based on the results of the test or the indicated symptoms, a combination of the two, or the test results or symptoms in aggregate with information from other patients. For example, if the test results and the indicated symptoms suggest that the patient is suffering from a rare illness, then the user interface may generate and communicate an alert to the patient or user suggesting a follow-up visit to a specialist. Similarly, if the test results and the indicated symptoms suggest that the patient is suffering from highly contagious illness, then the user interface may generate and communicate the alert to the patient or user requesting that the patient restrict interaction with others to minimize risk of communication of the illness to others. If the test results and the indicated symptoms suggest that the patient is suffering from a highly contagious, rare, and difficult to treat illness, then the user interface may generate and communicate the alert to the patient or user but also to local, regional, or national medical staff or disease monitoring agencies. As such, the reader device, cartridge, and user interface on the external computing device may generate information used to help detect an outbreak of a virus or disease.

For example, the user interface and the external computing device may communicate and/or interact with a system that tracks illnesses over a geographic area, for example a city, county, state, or nation, or a specific portion of the population. Thus, the user interface and the external computing device may enable tracking of diseases and/or infections by the system for a number of patients in various geographic areas. In some embodiments, the system performs the tracking based on one or both of the test results and the identified symptoms. In some embodiments, the system performs the tracking based on the scores or probabilities generated by the user interface. The system may aggregate and use the information from multiple user interfaces and external computing devices to generate a geographic heat map. The heat map may show levels of one or more illnesses and/or corresponding rates of infection or healing as different colors or levels on the map, where different colors correspond to different levels (for example, numbers) of reported injections or rates of infection. Thus, the heat map may visually show how numbers of ill patients vary in the geographic area. In some embodiments, the system may use such heat maps to identify pockets of specific illnesses or infections and/or an epidemic that is occurring based on aggregated test results and symptoms provided from multiple user interfaces and corresponding external computing devices. The heat map may show different quantities of illnesses or different rates of illness detection in different colors. The heat map may enable an entity to review quickly the geographic area to identify relational information (for example, information for portions of the geographic area relative to one another) and specific information (for example, detailed information for individual portions of the geographic area).

In some embodiments, the user interface and the external computing device may be integrated with a system (for example, the system that generates the heat map) used to track and/or determine need for vaccines or other medications. The system may receive the test results, symptoms, and/or scores from a number of user interfaces and corresponding external computing devices. The system may track that information to ensure that a particular geographic region is supplied with appropriate vaccines or medications to handle the identified quantity of illnesses. If the system identifies that a difference in identified illnesses and an expected level of supplies exceeds a determined threshold, then the system may automatically request vaccine and/or medication suppliers to increase production to meet an expected demand based on the illnesses tracked by the system. For example, the system determines that test results, symptoms, and/or scores received from a city in California indicate that 50,000 people out of a population of 500,000 are suffering from influenza A/B. The city is expected to have vaccine and medication supplies for 10,000 people to treat and prevent the spread of the influenza A/B virus (for example, only 10,000 units of medication and/or vaccines). The system may determine that the difference of 40,000 people exceeds the threshold amount and may automatically request that influenza A/B vaccine and medication manufacturers and/or suppliers increase production and provide an increased supply to the city. Such automatic detection of supply need and request for additional supplies may improve response times in times of outbreaks and help prevent and/or reduce the spread of communicable diseases.

Similarly, such aggregate tracking of test results, symptoms, and/or scores may allow the system to provide recommendations. Such recommendations may include increased education, advertisement, and so forth. For example, if the system determines an increase in numbers of people infected with a communicable disease that presents itself as or shares symptoms with another disease, then the system may recommend increased education of the different diseases and advertisements to inform people of the potential confusion and to help them seek treatment. For example, certain sexually transmitted diseases may exhibit cold- or flu-like symptoms. For example, hepatitis and/or gonorrhea may have similar symptoms to the common cold or influenza. Thus, some people experiencing the cold-like or flu-like symptoms may not get tested for any infection, assuming they just have the cold or flu. Thus, the system may determine that an unusually large number of people in a town have test results, symptoms, and scores that indicate infection with hepatitis during a period when a large number of patients are reporting cold or flu infections. The system may then determine that education regarding safer sex practices and differences between the diseases should be provided to the town. The system may also recommend increased advertisement about the spike in infections to encourage the safer practices and lead to increased detection and treatment for the appropriate illness.

In some embodiments, the user interface may also generate an indicator to indicate whether the patient is becoming sicker or healthier. For example, if the user performs multiple tests for the patient, then the user interface may determine that different combinations of symptoms suffered by the patient or different quantities of the target agent in the test sample indicate whether the patient is sicker than a previous test or healthier than a previous test.

In some embodiments, the indicator may comprise an arrow or representation of a face, or similar indicator.

Overview of Example Devices

Some embodiments of the methods, systems and compositions provided herein include devices comprising an excitation electrode and a sensor electrode. In some embodiments, the excitation electrode and the sensor electrode measure electrical properties of a sample. In some embodiments, the electrical properties comprise complex admittance, impedance, conductivity, resistivity, resistance, and/or a dielectric constant.

In some embodiments, the electrical properties are measured on a sample having electrical properties that do not change during the measurement. In some embodiments, the electrical properties are measured on a sample having dynamic electrical properties. In some such embodiments, the dynamic electrical properties are measured in real-time.

In some embodiments, an excitation signal is applied to the excitation electrode. The excitation signal can include direct current or voltage, and/or alternating current or voltage. In some embodiments, the excitation signal is capacitively coupled to/through a sample. In some embodiments, the excitation electrode and/or the sensor electrode is passivated to prevent direct contact between the sample and the electrode.

In some embodiments, parameters are optimized for the electric properties of a sample. In some such embodiments, parameters can include the applied voltage, applied frequency, and/or electrode configuration with respect to the sample volume size and/or geometry.

In some embodiments, the voltage and the frequency of the excitation voltage may be fixed or varied during the measurement. For example, measurement may involve sweeping voltages and frequencies during detection, or selecting a specific voltage and frequency which may be optimized for each sample. In some embodiments, the excitation voltage induces a current on the signal electrode that is can vary with the admittance of the device and/or sample characteristics.

In some embodiments, the detection parameters are optimized by modeling the admittance, device and sample by the lumped-parameter equivalent circuit consisting of electrode-sample coupling impedances, sample impedance, and inter-electrode parasitic impedance. Parameters of the lumped-parameter equivalent circuit is determined by measuring the admittance of the electrode-sample system at one or many excitation frequencies for a device. In some embodiments, the complex (number having both real and imaginary components) admittance of the electrode-sample system is measured using both magnitude- and phase-sensitive detection techniques. In some embodiments, the detection parameters are optimized by determining the frequencies corresponding to the transitions between the frequency regions by measuring the admittance across a wide range of frequencies. In some embodiments, the detection parameters are optimized by determining the frequencies corresponding to the transitions between the frequency regions by computing from the values given lumped-parameter model.

In some embodiments, the admittance of a capacitively-coupled electrode-sample system comprises three frequency regions: a low frequency region dominated by the electrode-sample coupling impedance, a mid-frequency region dominated by the sample impedance, and a high frequency region dominated by parasitic inter-electrode impedance. The admittance in the electrode-sample coupling region is capacitive in nature and is characterized by a magnitude that increases linearly with frequency, whose phase is ninety degrees. The admittance in the sample region is conductive in nature and is characterized by an admittance that does not vary significantly with respect to frequency, whose phase is approximately zero degrees. The admittance inter-electrode region is capacitive in nature and is characterized by a magnitude that increases linearly with frequency and a phase of ninety degrees.

In some embodiments, an induced current at the pick-up electrode is related to the excitation voltage and complex admittance by the relation:

$$\text{current}=(\text{complex admittance})\times(\text{voltage})$$

In some embodiments, the device measures both the excitation voltage magnitude and induced current magnitude to determine the magnitude of the complex admittance. In some embodiments, the device is calibrated to known excitation voltages and measure the magnitude of the induced current. In order to determine the phase of complex admittance, the device may measure the relative phase difference between the excitation voltage and the induced current.

In some embodiments, the magnitude and phase are measured directly.

In some embodiments, the magnitude and phase are measured indirectly e.g., by using both synchronous and asynchronous detection. The synchronous detector gives the in-phase component of the induced current. The asynchronous detector gives the quadrature component of the induced current. Both components can be combined to determine the complex admittance.

In some embodiments, the electrodes are not passivated.

In some embodiments, the excitation and/or detection electrodes are passivated. The excitation and/or detection electrodes may be passivated to prevent e.g., undesirable adhesion, fouling, adsorption or other detrimental physical interactions between the electrode with the sample or components therein. In some embodiments, the passivation layer comprises a dielectric material. In some embodiments, passivation enables efficient capacitive coupling from the electrodes to the sample. The efficiency of the coupling is determined by measuring the characteristics of the electrode/sample system, for example, which may include: the dielectric properties of the passivation layer, the thickness of the passivation layer, the area of the passivation/sample interface, the passivation surface roughness, the electric double layer at the sample/passivation interface, temperature, applied voltage and applied frequency, the electrical properties of the sample, the electric and/or chemical properties of the electrode materials.

In some embodiments, the electrode configuration and fabrication are optimized to mitigate undesirable parasitic coupling between electrodes. This may be accomplished through electric field shielding, the use of a varying dielectric constant electrode substrate, layout optimization, and/or grounding layers.

In some embodiments, the electrode configuration and fabrication are not optimized to mitigate undesirable parasitic coupling between electrodes.

Implementing Systems and Terminology

Implementations disclosed herein provide systems, methods and apparatus for detection of the presence and/or quantity of a target analyte. One skilled in the art will recognize that these embodiments may be implemented in hardware or a combination of hardware and software and/or firmware.

The signal processing and reader device control functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

Additional Definitions

The practice of the present disclosure will employ, unless indicated specifically to the contrary, conventional methods of molecular biology and recombinant DNA techniques within the skill of the art, many of which are described below for the purpose of illustration. Such techniques are explained fully in the literature. See, e.g., Sambrook, el al, Molecular Cloning: A Laboratory Manual (3rd Edition, 2000); DNA Cloning: A Practical Approach, vol. 1 & II (D. Glover, ed.); Oligonucleotide Synthesis (N. Gait, ed., 1984); Oligonucleotide Synthesis: Methods and Applications (P. Herdewijn, ed., 2004); Nucleic Acid Hybridization (B. Hames & S. Higgins, eds., 1985); Nucleic Acid Hybridization: Modern Applications (Buzdin and Lukyanov, eds., 2009); Transcription and Translation (B. Hames & S. Higgins, eds., 1984); Animal Cell Culture (R. Freshney, ed., 1986); Freshney, R. I. (2005) Culture of Animal Cells, a Manual of Basic Technique, 5th Ed. Hoboken NJ, John Wiley & Sons; B. Perbal, A Practical Guide to Molecular Cloning (3rd Edition 2010); Farrell, R., RNA Methodologies: A Laboratory Guide for Isolation and Characterization (3rd Edition 2005).

The terms "function" and "functional" as used herein refer to a biological, enzymatic, or therapeutic function.

The term "isolated" as used herein refers to material that is substantially or essentially free from components that normally accompany it in its native state. For example, an "isolated cell," as used herein, includes a cell that has been purified from the milieu or organisms in its naturally occurring state, a cell that has been removed from a subject or from a culture, for example, it is not significantly associated with in vivo or in vitro substances.

The terms "nucleic acid" or "nucleic acid molecule" as used herein refers to polynucleotides, such as deoxyribonucleic acid (DNA) or ribonucleic acid (RNA), oligonucleotides, fragments generated by the polymerase chain reaction (PCR), and fragments generated by any of ligation, scission, endonuclease action, and exonuclease action. Nucleic acid molecules can be composed of monomers that are naturally-occurring nucleotides (such as DNA and RNA), or analogs of naturally-occurring nucleotides (e.g., enantiomeric forms of naturally-occurring nucleotides), or a combination of both. Modified nucleotides can have alterations in sugar moieties and/or in pyrimidine or purine base moieties. Sugar modifications include, for example, replacement of one or more hydroxyl groups with halogens, alkyl groups, amines, and azido groups, or sugars can be functionalized as ethers or esters. Moreover, the entire sugar moiety can be replaced with sterically and electronically similar structures, such as aza-sugars and carbocyclic sugar analogs. Examples of modifications in a base moiety include alkylated purines and pyrimidines, acylated purines or pyrimidines, or other well-known heterocyclic substitutes. Nucleic acid monomers can be linked by phosphodiester bonds or analogs of such linkages. Analogs of phosphodiester linkages include phosphorothioate, phosphorodithioate, phosphoroselenoate, phosphorodiselenoate, phosphoroanilothioate, phosphoranilidate, or phosphoramidate. The term "nucleic acid molecule" also includes so-called "peptide nucleic acids," which comprise naturally-occurring or modified nucleic acid bases attached to a polyamide backbone. Nucleic acids can be either single stranded or double stranded. "Oligonucleotide" can be used interchangeable with nucleic acid and can refer to either double stranded or single stranded DNA or RNA. A nucleic acid or nucleic acids can be contained in a nucleic acid vector or nucleic acid construct (e.g. plasmid, virus, bacteriophage, cosmid, fosmid, phagemid, bacterial artificial chromosome (BAC), yeast artificial chromosome (YAC), or human artificial chromosome (HAC)) that can be used for amplification and/or expression of the nucleic acid or nucleic acids in various biological systems. Typically, the vector or construct will also contain elements including but not limited to promoters, enhancers, terminators, inducers, ribosome binding sites, translation initiation sites, start codons, stop codons, polyadenylation signals, origins of replication, cloning sites, multiple cloning sites, restriction enzyme sites, epitopes, reporter genes, selection markers, antibiotic selection markers, targeting sequences, peptide purification tags, or accessory genes, or any combination thereof.

A nucleic acid or nucleic acid molecule can comprise one or more sequences encoding different peptides, polypeptides, or proteins. These one or more sequences can be joined in the same nucleic acid or nucleic acid molecule adjacently, or with extra nucleic acids in between, e.g. linkers, repeats or restriction enzyme sites, or any other sequence that is 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 150, 200, or 300 bases long, or any length in a range defined by any two of the aforementioned lengths. The term "downstream" on a nucleic acid as used herein refers to a sequence being after the 3'-end of a previous sequence, on the strand containing the encoding sequence (sense strand) if the nucleic acid is double stranded. The term "upstream" on a nucleic acid as used herein refers to a sequence being before the 5'-end of a subsequent sequence, on the strand containing the encoding sequence (sense strand) if the nucleic acid is double stranded. The term "grouped" on a nucleic acid as used herein refers to two or more sequences that occur in proximity either directly or with extra nucleic acids in between, e.g. linkers, repeats, or restriction enzyme sites, or any other sequence that is 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 150, 200, or 300 bases long, or any length in a range defined by any two of the aforementioned lengths, but generally not with a sequence in between that encodes for a functioning or catalytic polypeptide, protein, or protein domain.

The terms "peptide", "polypeptide", and "protein" as used herein refers to macromolecules comprised of amino acids linked by peptide bonds. The numerous functions of peptides, polypeptides, and proteins are known in the art, and include but are not limited to enzymes, structure, transport, defense, hormones, or signaling. Peptides, polypeptides, and proteins are often, but not always, produced biologically by a ribosomal complex using a nucleic acid template, although chemical syntheses are also available. By manipulating the nucleic acid template, peptide, polypeptide, and protein mutations such as substitutions, deletions, truncations, additions, duplications, or fusions of more than one peptide, polypeptide, or protein can be performed. These fusions of more than one peptide, polypeptide, or protein can be joined in the same molecule adjacently, or with extra amino acids in between, e.g. linkers, repeats, epitopes, or tags, or any other sequence that is 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 150, 200, or 300 bases long, or any length in a range defined by any two of the aforementioned lengths.

The term "% w/w" or "% wt/wt" as used herein has its ordinary meaning as understood in light of the specification and refers to a percentage expressed in terms of the weight of the ingredient or agent over the total weight of the composition multiplied by 100. The term "% v/v" or "% vol/vol" as used herein has its ordinary meaning as understood in the light of the specification and refers to a percentage expressed in terms of the liquid volume of the compound, substance, ingredient, or agent over the total liquid volume of the composition multiplied by 100.

The term "loop-mediated isothermal amplification (LAMP)" as used herein has its plain and ordinary meaning as understood in light of the specification and refers to a method of nucleic acid amplification that is performed isothermally, or without the repeating cycles of temperatures as seen in PCR. LAMP offers a robust way to amplify and detect nucleic acid material from samples such as those derived from patients rapidly and cost-effectively. Methods of LAMP are well established in the art. Amplification is generally done with a DNA template and a strand-displacing DNA polymerase; inclusion of a reverse transcriptase either added to the amplification solution in a one-pot method, or used to prepare complementary DNA (cDNA) prior to the amplification enables the detection of RNA. Amplification is typically carried out at elevated temperatures (but not near-boiling temperatures as seen with PCR) anywhere within a range between 50° C.-70° C. that is optimized for the thermotolerant Bst DNA polymerase. However, other temperatures and DNA polymerases can be used with minimal optimization required. LAMP involves at least 4 primers designed for a short region of interest of the nucleic acid target (e.g. a pathogenicity island of a pathogenic bacteria genome). According to conventional primer nomenclature, the 4 primers include two inner primers, forward inner primer (FIP) and backward inner primer (BIP), and two outer primers, F3 and B3. Amplification of the target nucleic acid with the 4 primers results in a characteristic stem-loop containing "dumb-bell" shaped template. Progressive strand synthesis with the inner primers results in the formation of large stem-loop structures from this original template. A later improvement to this original LAMP technique involves the inclusion of 2 loop primers, LF and LB, which hybridize to loop regions of the amplicons and serve as additional points of DNA elongation, significantly improving the speed of complete amplification. The LAMP process can be quantified by several different approaches. Traditional methods include colorimetric detection (e.g. observation of solution turbidity due to the formation of insoluble magnesium pyrophosphate, or with DNA-specific colorimetric dyes), electrophoresis, or antibody-based immunoassays. As disclosed herein in embodiments of detection systems and methods of measuring or analyzing modulations of electrical signals (e.g. impedance or capacitance), LAMP amplification may also be electrochemically detected (e.g. magnesium pyrophosphate accumulation, or the buildup of protons as a result of DNA polymerase activity). Additional information about LAMP can be found in Notomi T et al. "Loop-mediated isothermal amplification of DNA" *Nucleic Acids Res.* (2000); 28(12):e63 and Nagamine K et al. "Accelerated reaction by loop-mediated isothermal amplification using loop primers" *Mol. Cell. Probes* (2002); 16(3):223-229, each of which is hereby expressly incorporated by reference in its entirety.

Disclosed herein are methods of detecting the presence and/or amount of a nucleic acid in a biological sample. In some embodiments, the biological sample is obtained from a subject, preferably a human or other animal, a plant, a food, soil, or a surface, or any combination thereof. In some embodiments, the biological sample is obtained by swabbing. In some embodiments, the biological sample is or is derived from saliva, nasal wash, nasal swab, nasal nasopharyngeal swab, oropharyngeal swab, mucus, lavage fluid, blood, plasma, urine, stool, serum, cerebral spinal fluid, or any material comprising a pathogen such as one or more of a microbe, virus, bacteria, mold, or fungus. In some embodiments, the subject is a human. In some embodiments, the subject is a mammal. The methods comprise contacting the biological sample with an assay cartridge or a detection system, amplifying the nucleic acid by loop-mediated isothermal amplification (LAMP) with a primer set, measuring or analyzing a modulation of an electrical signal for the duration of the amplification with the primer set using the detection system, thereby detecting successful amplification of the nucleic acid with the primer set, and determining the presence and/or amount of the nucleic acid in the biological sample. In some embodiments, the nucleic acid is a nucleic acid from a pathogen. In some embodiments, the primer set comprises, consists essentially of, or consists of one or more F3 primers, one or more B3 primers, one or more FIP primers, and one or more BIP primers. In some embodiments, the primer set comprises, consists essentially of, or consists of one or more F3 primers, one or more B3 primers, one or more LF primers, one or more LB primers, one or more FIP primers, or one or more BIP primers, or any combination thereof. In some embodiments, the primer set comprises, consists essentially of, or consist of one or more F3 primers, one or more B3 primers, one or more LF primers, one or more LB primers, one or more FIP primers, and one or more BIP primers. Each of the F3 primers, B3 primers, LF primers, LB primers, FIP primers and BIP primers are used for LAMP. The FIP primers and BIP primers are required for the LAMP process, whereas the F3 primers, B3 primers, LF primers and/or LB primers strongly enhance the amplification but optionally may be excluded for high concentration targets. In some embodiments, each of the one or more F3 primers, one or more B3 primers, one or more LF primers, one or more LB primers, one or more FIP primers, or one or more BIP primers comprise 1, 2, 3, 4, 5, 6, 7, 8, 9, or 10 primers. In some embodiments, the pathogen comprises more than one population obtained from different sources that may exhibit variations in their genes or genome regions (e.g., serotypes, strains, mutants, isolates, species, variants, types, subtypes, or clones) and the inclusion of more than one primer may increase amplification of the pathogen comprising more than one population. In some embodiments, the primer set is specific for a gene or a genome region of the pathogen. In some embodiments, the gene or the genome region is associated with the pathogenicity of the pathogen. In some embodiments, the nucleic acid is DNA, RNA, both, or a fragment or hybrid thereof. In some embodiments, where the nucleic acid is RNA, the nucleic acid is reverse transcribed to complementary DNA (cDNA) during the amplifying step. In other embodiments, where the nucleic acid is RNA, the nucleic acid is reverse transcribed to cDNA prior to the amplifying step. In some embodiments, the subject is a mammal. In some embodiments, the subject is a human.

Any one of the methods disclosed herein that employ an assay cartridge or detection system for LAMP may be applied to any one of the assay cartridges or detection systems, or both, disclosed herein or those that are previously known in the art. In some embodiments, the assay cartridges or detection systems, or both, comprise elements that permit detection of the electrical signal during the amplifying step. In some embodiments, the electrical signal is impedance or capacitance, or both. In some embodiments, the electrical signal is measured or analyzed compared to a pre-determined control value. In some embodiments, the methods further comprise determining the biological sample as comprising the pathogen, or the gene or genome region thereof.

Any one of the methods disclosed herein may further comprise mixing the biological sample with a reagent and the primer set in the assay cartridge or detection system, or both, prior to the amplifying step. In some embodiments, the reagent is used for LAMP. In some embodiments, the reagent comprises a strand-displacing DNA polymerase and optionally a reverse transcriptase. Some non-limiting examples of strand-displacing DNA polymerases include but are not limited to Klenow fragment, phi29 DNA polymerase, Bsm DNA polymerase, or Bst DNA polymerase, or any combination thereof, or any strand-displacing DNA polymerase known in the art. Some non-limiting examples of reverse transcriptases include but are not limited to M-MLV reverse transcriptase, reverse transcription xenopolymerase (RTX), or variants thereof, or any combination thereof, or any reverse transcriptase known in the art. In some embodiments, the reagent or the primer set, or both, have been dried and/or lyophilized prior to mixing with the biological sample. In some embodiments, the biological sample is aqueous and dissolves the dried and/or lyophilized reagent or primer set, or both.

Any one of the methods disclosed herein may comprise an assay cartridge or detection system, or both, that comprises a heater. In some embodiments, the amplifying step comprises incubating the biological sample at, optionally a first temperature for a first time period, and at least a second temperature for a second time period. In some embodiments, the amplifying step comprises incubating the biological sample at, optionally a first temperature for a first time period, and one or more second temperatures for one or more second time periods (e.g., a second temperature, a third temperature, a fourth temperature, a fifth temperature, and/or a sixth temperature or more for a second, third, fourth, fifth, sixth, and/or more time periods). In some embodiments, the first temperature is 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., or 55° C., or about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., or about 55° C., or any temperature within a range defined by any two of the aforementioned temperatures, preferably 23° C. or about 23° C. or 50° C. or about 50° C., and the first time period is 1, 2, 3, 4, 5, 6, 7, 8, 9, 10, 11, 12, 13, 14, or 15 minutes, or about 1, about 2, about 3, about 4, about 5, about 6, about 7, about 8, about 9, about 10, about 11, about 12, about 13, about 14, or about 15 minutes, or any time period within a range defined by any two of the aforementioned times, preferably 5 to 10 minutes or about 5 to about 10 minutes. In some embodiments, the second temperature or each of the one or more second temperatures (e.g., second, third, fourth, fifth, sixth, and/or more temperatures) is 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., or 55° C., 56° C., 57° C., 58° C., 59° C., 60° C., 61° C., 62° C., 63° C., 64° C., 65° C., 66° C., 67° C., 68° C., 69° C., or 70° C., or about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., or about 55° C., about 56° C., about 57° C., about 58° C., about 59° C., about 60° C., about 61° C., about 62° C., about 63° C., about 64° C., about 65° C., about 66° C., about 67° C., about 68° C., about 69° C., or about 70° C., or any temperature within a range defined by any two of the aforementioned temperatures, preferably 50° C. or about 50° C., and each of the one or more second time periods (e.g., a second temperature, a third temperature, a fourth temperature, a fifth temperature, and/or a six temperature or more for a second, third, fourth, fifth, sixth, and/or more time periods) is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes, or about 1, about 2, about 3, about 4, about 5, about 6, about 7, about 8, about 9, about 10, about 11, about 12, about 13, about 14, about 15 minutes, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 51, about 52, about 53, about 54, about 55, about 56, about 57, about 58, about 59, or about 60 minutes, or any time period within a range defined by any two of the aforementioned times, preferably 10 minutes or about 10 minutes.

In one embodiment, the first step is performed at or about at 50° C., and the second step is performed at or about at 65° C. In another embodiment, the first step is performed for about 10 minutes or 10 minutes.

In some embodiments, the amplifying step further comprises incubating the biological sample at a third temperature for a third time period. In some embodiments, the third temperature is 60° C., 61° C., 62° C., 63° C., 64° C., 65° C., 66° C., 67° C., 68° C., 69° C., or 70° C., or about 60° C., about 61° C., about 62° C., about 63° C., about 64° C., about 65° C., about 66° C., about 67° C., about 68° C., about 69° C., or about 70° C., or any temperature within a range defined by any two of the aforementioned temperatures, preferably 65° C. or about 65° C., and the third time period is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes, or about 1, about 2, about 3, about 4, about 5, about 6, about 7, about 8, about 9, about 10, about 11, about 12, about 13, about 14, about 15 minutes, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 51, about 52, about 53, about 54, about 55, about 56, about 57, about 58, about 59, or about 60 minutes, or any time period within a range defined by any two of the aforementioned times, preferably 30 minutes or about 30 minutes. In some embodiments, the first temperature is performed at room temperature (e.g., 23° C. or about 23° C.) for a time period sufficient to allow the dried down reagents to rehydrate (e.g., 10 minutes or about 10 minutes); the second temperature is performed at 50° C. or about 50° C. for 10 minutes or about 10 minutes, and the amplification period is then conducted at 65° C. or about 65° C.

Examples 1 and 2 (FIGS. 29 and 30) show that by using the primers described herein and a SARS-CoV-2 template, that enhancement of LAMP occurs when a two-step incubation is used, and that the two-step protocol surprisingly resulted in a lower limit of detection (LOD), than the one-step protocol, with the most consistent detection occurring at the 10 minute time point. Example 3 (FIG. 31) shows that the two-step protocol resulted in improved detection of low concentration of SARS-CoV-2 genomic RNA compared to the one-step protocol. Lastly, Example 4 (FIG. 32) shows that 50° C. appears to be the optimal temperature for the two-step protocol.

The ramping protocols for LAMP amplification set forth herein (e.g., the two-step protocol) is suitable for use with any primer directed to any viral or bacterial pathogen nucleic acid template, preferably using the primers described herein, and is not limited to SARS-CoV-2. While it is preferred that the ramping protocols for LAMP amplification set forth herein (e.g., the two-step protocol) are utilized in one or more of the systems described herein (e.g., a be.well cartridge), it is also evident that the ramping protocols for LAMP amplification set forth herein (e.g., the two-step protocol) will improve the level of detection in other assays that utilize LAMP amplification. Accordingly, more generally, use of a starting temperature that is lower than the amplification temperature of 65° C. for a pre-amplification time period is contemplated to improve the level of detection in LAMP amplification, preferably in one or more of the systems described herein (e.g., a be.well cartridge) but also in other detection systems that utilize e.g., optical or radioactivity detection. That is, a method of improving a limit of detection of a nucleic acid using LAMP amplification with a primer set at more than one temperature is contemplated.

Any one of the methods disclosed herein may be applied to the detection of a nucleic acid of a pathogen, or a genome region thereof. In some embodiments, the pathogen is a human pathogen. In some embodiments, the primer sets, or the one or more F3 primers, one or more B3 primers, one or more LF primers, one or more LB primers, one or more FIP primers, or one or more BIP primers, or any combination thereof, are designed, configured or selected to be not only specific towards a genome region of a pathogen but also to amplify said specific genome region more efficiently than other primer sets (e.g., more rapidly, exhibiting faster time to detection of a positive amplification and/or with greater specificity). In some embodiments, the pathogen is a virus or a bacterium. In some embodiments, the pathogen is SARS-CoV-2, hepatitis A virus, Influenza A virus subtype H1N1, human immunodeficiency virus-1, respiratory syncytial virus A, respiratory syncytial virus B, *Escherichia coli, Listeria monocytogenes, Mycobacterium tuberculosis, Salmonella enterica*, or any combination thereof.

In some embodiments, the primers of any of the methods disclosed herein are provided for LAMP at defined concentrations.

In some embodiments, each of the one or more F3 primers are provided at a concentration of 100 nM, 200 nM, 300 nM, 400 nM, 500 nM, 600 nM, 700 nM, 800 nM, 900 nM, 1000 nM, 1100 nM, 1200 nM, 1300 nM, 1400 nM, 1500 nM, 1600 nM, 1700 nM, 1800 nM, 1900 nM, or 2000 nM or about 100 nM, about 200 nM, about 300 nM, about 400 nM, about 500 nM, about 600 nM, about 700 nM, about 800 nM, about 900 nM, about 1000 nM, about 1100 nM, about 1200 nM, about 1300 nM, about 1400 nM, about 1500 nM, about 1600 nM, about 1700 nM, about 1800 nM, about 1900 nM, or about 2000 nM per amplifying reaction, or any concentration within a range defined by any two of the aforementioned concentrations, preferably 200 nM or about 200 nM.

In some embodiments, each of the one or more B3 primers are provided at a concentration of 100 nM, 200 nM, 300 nM, 400 nM, 500 nM, 600 nM, 700 nM, 800 nM, 900 nM, 1000 nM, 1100 nM, 1200 nM, 1300 nM, 1400 nM, 1500 nM, 1600 nM, 1700 nM, 1800 nM, 1900 nM, or 2000 nM, or about 100 nM, about 200 nM, about 300 nM, about 400 nM, about 500 nM, about 600 nM, about 700 nM, about 800 nM, about 900 nM, about 1000 nM, about 1100 nM, about 1200 nM, about 1300 nM, about 1400 nM, about 1500 nM, about 1600 nM, about 1700 nM, about 1800 nM, about 1900 nM, or about 2000 nM per amplifying reaction, or any concentration within a range defined by any two of the aforementioned concentrations, preferably 200 nM or about 200 nM.

In some embodiments, each of the one or more LF primers are provided at a concentration of 100 nM, 200 nM, 300 nM, 400 nM, 500 nM, 600 nM, 700 nM, 800 nM, 900 nM, 1000 nM, 1100 nM, 1200 nM, 1300 nM, 1400 nM, 1500 nM, 1600 nM, 1700 nM, 1800 nM, 1900 nM, or 2000 nM, or about 100 nM, about 200 nM, about 300 nM, about 400 nM, about 500 nM, about 600 nM, about 700 nM, about 800 nM, about 900 nM, about 1000 nM, about 1100 nM, about 1200 nM, about 1300 nM, about 1400 nM, about 1500 nM, about 1600 nM, about 1700 nM, about 1800 nM, about 1900 nM, or about 2000 nM per reaction, or any concentration within a range defined by any two of the aforementioned concentrations, preferably 400 nM, about 400 nM, 1000 nM or about 1000 nM.

In some embodiments, each of the one or more LB primers are provided at a concentration of 100 nM, 200 nM, 300 nM, 400 nM, 500 nM, 600 nM, 700 nM, 800 nM, 900 nM, 1000 nM, 1100 nM, 1200 nM, 1300 nM, 1400 nM, 1500 nM, 1600 nM, 1700 nM, 1800 nM, 1900 nM, or 2000 nM, or about 100 nM, about 200 nM, about 300 nM, about 400 nM, about 500 nM, about 600 nM, about 700 nM, about 800 nM, about 900 nM, about 1000 nM, about 1100 nM, about 1200 nM, about 1300 nM, about 1400 nM, about 1500 nM, about 1600 nM, about 1700 nM, about 1800 nM, about 1900 nM, or about 2000 nM per amplifying reaction, or any concentration within a range defined by any two of the aforementioned concentrations, preferably 400 nM, about 400 nM, 1000 nM or about 1000 nM.

In some embodiments, each of the one or more FIP primers are provided at a concentration of 100 nM, 200 nM, 300 nM, 400 nM, 500 nM, 600 nM, 700 nM, 800 nM, 900 nM, 1000 nM, 1100 nM, 1200 nM, 1300 nM, 1400 nM, 1500 nM, 1600 nM, 1700 nM, 1800 nM, 1900 nM, or 2000 nM, or about 100 nM, about 200 nM, about 300 nM, about 400 nM, about 500 nM, about 600 nM, about 700 nM, about 800 nM, about 900 nM, about 1000 nM, about 1100 nM, about 1200 nM, about 1300 nM, about 1400 nM, about 1500 nM, about 1600 nM, about 1700 nM, about 1800 nM, about 1900 nM, or about 2000 nM per amplifying reaction, or any concentration within a range defined by any two of the aforementioned concentrations, preferably 1600 nM or about 1600 nM.

In some embodiments, each of the one or more BIP primers are provided at a concentration of 100 nM, 200 nM, 300 nM, 400 nM, 500 nM, 600 nM, 700 nM, 800 nM, 900 nM, 1000 nM, 1100 nM, 1200 nM, 1300 nM, 1400 nM, 1500 nM, 1600 nM, 1700 nM, 1800 nM, 1900 nM, or 2000 nM, or about 100 nM, about 200 nM, about 300 nM, about 400 nM, about 500 nM, about 600 nM, about 700 nM, about 800 nM, about 900 nM, about 1000 nM, about 1100 nM, about 1200 nM, about 1300 nM, about 1400 nM, about 1500 nM, about 1600 nM, about 1700 nM, about 1800 nM, about 1900 nM, or about 2000 nM per amplifying reaction, or any concentration within a range defined by any two of the aforementioned concentrations, preferably 1600 nM or about 1600 nM.

In some embodiments of any of the methods disclosed herein, the pathogen is SARS-CoV-2. In some embodiments, the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 1, 7, 13, 19. In some embodiments, the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 6, 12, 18, 25. In some embodiments, the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 3, 9, 15, 21. In some embodiments, the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 5, 11, 17, 23, 24. In some embodiments, the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 2, 8, 14, 20. In some embodiments, the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 4, 10, 16, 22. In some embodiments, the primer set comprises, consists essentially of, or consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 1-6.

In some embodiments of any of the methods disclosed herein, the pathogen is hepatitis A virus. In some embodiments, the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 26, 27, 34, 35, 43. In some embodiments, the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 32, 33, 41, 42, 48, 49. In some embodiments, the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 28, 36, 44. In some embodiments, the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 31, 39, 40, 47. In some embodiments, the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 29, 37, 45. In some embodiments, the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 30, 38, 46. In some embodiments, the primer set comprises, consists essentially of, or consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 26-33.

In some embodiments of any of the methods disclosed herein, the pathogen is influenza A virus subtype H1N1. In some embodiments, the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 50, 51, 59. In some embodiments, the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 52, 53, 60, 61. In some embodiments, the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 54, 62, 63, 64. In some embodiments, the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 55, 56, 65. In some embodiments, the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 57, 66. In some embodiments, the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 58, 67. In some embodiments, the primer set comprises, consists essentially of, or consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 50-58.

In some embodiments of any of the methods disclosed herein, the pathogen is human immunodeficiency virus-1. In some embodiments, the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 68, 69, 77, 89, 90. In some embodiments, the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 75, 76, 87, 88, 96. In some embodiments, the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 70, 71, 78, 79, 80, 91. In some embodiments, the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 74, 84, 85, 86, 94, 95. In some embodiments, the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 72, 81, 92. In some embodiments, the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 73, 82, 83, 93. In some embodiments, the primer set comprises, consists essentially of, or consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 68-76.

In some embodiments of any of the methods disclosed herein, the pathogen is respiratory syncytial virus A. In some embodiments, the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 97, 98, 108. In some embodiments, the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 99, 100, 109. In some embodiments, the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 101, 102, 110. In some embodiments, the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 103, 111. In some embodiments, the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 104, 106. In some embodiments, the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 105, 107. In some embodiments, the primer set comprises, consists essentially of, or consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 97-105.

In some embodiments of any of the methods disclosed herein, the pathogen is respiratory syncytial virus B. In some embodiments, the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 112, 113, 125. In some embodiments, the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 114, 126. In some embodiments, the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 115, 116, 117, 127. In some embodiments, the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 118, 119, 120, 128. In some embodiments, the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 121, 123. In some embodiments, the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 122, 124. In some embodiments, the primer set comprises, consists essentially of, or consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 112-122.

In some embodiments of any of the methods disclosed herein, the pathogen is *Escherichia coli*. In some embodiments, the genome region comprises at least one of Z3276, Shiga toxin 1 (Stx1), or Shiga toxin 2 (Stx2) genes. In some embodiments, the one or more F3 primers, one or more B3 primers, one or more LF primers, one or more LB primers, one or more FIP primers, or one or more BIP primers, or any combination thereof, are specific for the Z3276, Stx1, or Stx2 genes, or any combination thereof. In some embodiments, the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 129, 135, 141, 147, 153, 159. In some embodiments, the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 134, 140, 146, 152, 158, 164. In some embodiments, the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 131, 137, 143, 149, 155, 161. In some embodiments, the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 133, 139, 145, 151, 157, 163. In some embodiments, the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 130, 136, 142, 148, 154, 160. In some embodiments, the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 132, 138, 144, 150, 156, 162. In some embodiments, the primer set comprises, consists essentially of, or consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 135-140, 141-146, 159-164.

In some embodiments of any of the methods disclosed herein, the pathogen is *Listeria monocytogenes*. In some embodiments, the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NO: 165. In some embodiments, the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NO: 166. In some embodiments, the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NO: 167. In some embodiments, the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 172, 173. In some embodiments, the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 168, 169. In some embodiments, the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 170, 171. In some embodiments, the primer set comprises, consists essentially of, or consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 165-168, 170, 172.

In some embodiments of any of the methods disclosed herein, the pathogen is *Mycobacterium tuberculosis*. In some embodiments, the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 174, 180, 186. In some embodiments, the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 175, 181, 187. In some embodiments, the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 178, 184, 190. In some embodiments, the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 179, 185, 191. In some embodiments, the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 176, 182, 188. In some embodiments, the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 177, 183, 189. In some embodiments, the primer set comprises, consists essentially of, or consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 186-191.

In some embodiments of any of the methods disclosed herein, the pathogen is *Salmonella enterica*. In some embodiments, the one or more F3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 192, 196. In some embodiments, the one or more B3 primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 203, 204. In some embodiments, the one or more LF primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 194, 198, 199. In some embodiments, the one or more LB primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 201, 202. In some embodiments, the one or more FIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 193, 197. In some embodiments, the one or more BIP primers comprise one or more sequences having at least 85%, 86%, 87%, 88%, 89%, 90%, 91%, 92%, 93%, 94%, 95%, 96%, 97%, 98%, 99%, or 100% homology to the sequences of SEQ ID NOs: 195, 200. In some embodiments, the primer set comprises, consists essentially of, or consists of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 196-204.

In some embodiments of any of the methods disclosed herein, the method can be multiplexed to be used to detect the presence and/or amount of more than one nucleic acid, such as more than one pathogen, or serotypes, strains, mutants, isolates, species, variants, types, subtypes, or clones thereof. In some embodiments, the methods are multiplexed by detecting more than one nucleic acid in a single reaction well 1322. In some embodiments, to multiplex the detection, more than one primer sets are included in the single reaction well 1322. In some embodiments, the multiplexed methods comprise amplifying the more than one nucleic acid with the more than one primer sets (e.g., in the single reaction well 1322) and determining the presence and/or amount of the more than one nucleic acid in the biological sample. In some embodiments, the more than one primer sets comprise at least 1, 2, 3, 4, 5, 6, 7, 8, 9, 10, 11, 12, 13, 14, 15, 16, 17, 18, 19, or 20 primer sets, each comprising any combination of: one or more F3 primers, one or more B3 primers, one or more LF primers, one or more LB primers, one or more FIP primers, and one or more BIP primers. In some embodiments, determining the presence and/or amount of the more than one nucleic acid comprises determining the presence and/or amount of at least one of the more than one nucleic acid in the biological sample without knowing which of the more than one nucleic acid is amplified. In other embodiments, determining the presence and/or amount of the more than one nucleic acid comprises determining the presence and/or amount of each of the more than one nucleic acid in the biological sample.

Also disclosed herein are the primers (e.g., F3, B3, LF, LB, FIP, or BIP primers) and/or the primer sets, or compositions thereof, provided in any one of the methods disclosed herein. In some embodiments is the primer comprising, consisting essentially of, or consisting of the sequence having at least 85%, 86%, 87%, 88%, 89%, 90%, 91%, 92%, 93%, 94%, 95%, 96%, 97%, 98%, 99%, or 100% homology to any one of the sequences of SEQ ID NOs: 1-204. In some embodiments is the primer set comprising, consisting essentially of, or consisting of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 1-6, SEQ ID NOs: 7-12, SEQ ID NOs: 13-18, or SEQ ID NOs: 19-25. In some embodiments is the primer set comprising, consisting essentially of, or consisting of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 26-33, SEQ ID NOs: 34-42, or SEQ ID NOs: 43-49. In some embodiments is the primer set comprising, consisting essentially of, or consisting of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 50-58, or SEQ ID NOs: 59-67. In some embodiments is the primer set comprising, consisting essentially of, or consisting of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 68-76, SEQ ID NOs: 77-88, or SEQ ID NOs: 89-96. In some embodiments is the primer set comprising, consisting essentially of, or consisting of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 97-105, or SEQ ID NOs: 106-111. In some embodiments is the primer set comprising, consisting essentially of, or consisting of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 112-122, or SEQ ID NOs: 123-128. In some embodiments is the primer set comprising, consisting essentially of, or consisting of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 129-134, SEQ ID NOs: 135-140, SEQ ID NOs: 141-146, SEQ ID NOs: 147-152, SEQ ID NOs: 153-158, or SEQ ID NOs: 159-164. In some embodiments is the primer set comprising, consisting essentially of, or consisting of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 165-168, 170, 172, SEQ ID NOs: 165-168, 171, 173, or SEQ ID NOs: 165-167, 169, 171, 173. In some embodiments is the primer set comprising, consisting essentially of, or consisting of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 174-179, SEQ ID NOs: 180-185, or SEQ ID NOs: 186-191. In some embodiments is the primer set comprising, consisting essentially of, or consisting of sequences having at least 85%, 86%, 87%, 88%, 89%, 90%, 91%, 92%, 93%, 94%, 95%, 96%, 97%, 98%, 99%, or 100% homology to the sequences of SEQ ID NOs: 1-6, SEQ ID NOs: 26-33, SEQ ID NOs: 50-58, SEQ ID NOs: 68-76, SEQ ID NOs: 97-105, SEQ ID NOs: 112-122, SEQ ID NOs: 135-140, 141-146, 159-164, SEQ ID NOs: 165-168, 170, 172, SEQ ID NOs: 186-191, or SEQ ID NOs: 196-204.

LAMP-Mediated Pathogen Detection

Detection of SARS-CoV-2 Coronavirus:

LAMP primers specific for the SARS-CoV-2 coronavirus are provided in FIG. 16A. Each primer set may comprise one or more of F3 (SEQ ID NOs: 1, 7, 13, 19), B3 (SEQ ID NOs: 6, 12, 18, 25), LF (SEQ ID NOs: 3, 9, 15, 21), LB (SEQ ID NOs: 5, 11, 17, 23, 24), FIP (SEQ ID NOs: 2, 8, 14, 20), and BIP (SEQ ID NOs: 4, 10, 16, 22) primers. Some non-limiting embodiments of primer sets include one selected set (SEQ ID NOs: 1-6) and three alternative sets (SEQ ID NOs: 7-12, SEQ ID NOs: 13-18, and SEQ ID NOs: 19-25).

Figure 16B:
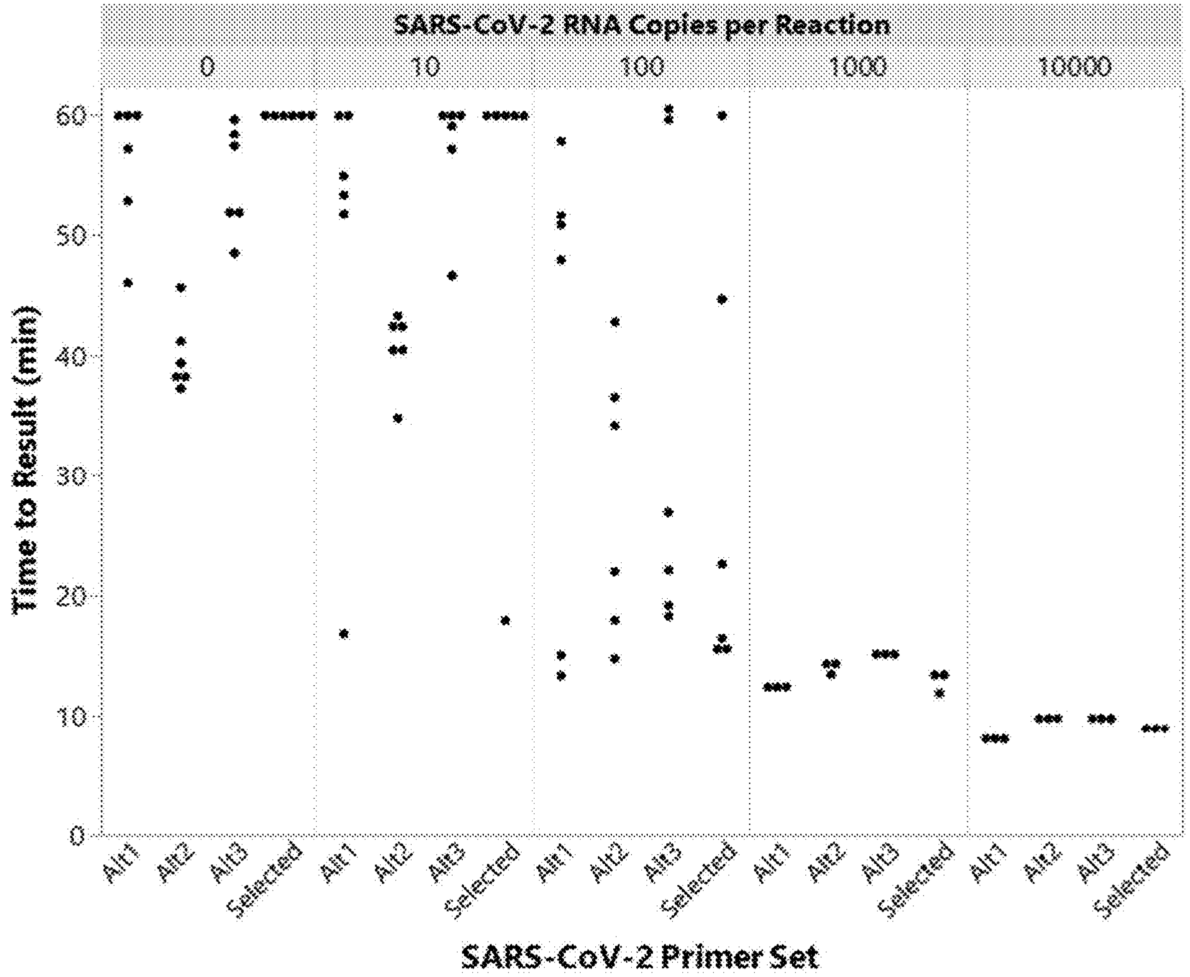
FIG. 16B depicts the time to detection of a positive amplification, or lack thereof, at different copy numbers of SARS-CoV-2 RNA genomes using the primer sets of FIG. 16A. 0, 10, 100, 1000, and 10000 copies of the SARS-CoV-2 RNA genome were tested in each reaction. Time points at "60 min" denote unsuccessful amplifications.

An embodiment of the detection of SARS-CoV-2 RNA genomic material in samples measured with an assay cartridge, or system, disclosed herein is shown in FIG. 16B. In such an assay, the concentrations of each primer were: 200 nM (each) for F3 and B3 primers; 1000 nM (each) for LF and LB primers; 1600 nM (each) for FIP and BIP primers. Time points at 60 minutes represent assay reactions that did not amplify. The selected set (SEQ ID NOs: 1-6) was chosen due to its complete lack of false-positive amplification (0 SARS-CoV-2 RNA genome copies per reaction) while maintaining fast amplification (approximately 10-15 minutes for positive result) in all but the lowest positive concentration (10 SARS-CoV-2 RNA genome copies per reaction) where no primer set amplified well.

Detection of Hepatitis A Virus (HAV):

LAMP primers specific for HAV are provided in FIG. 17A. Each primer set may comprise one or more of F3 (SEQ ID NOs: 26, 27, 34, 35, 43), B3 (SEQ ID NOs: 32, 33, 41, 42, 48, 49), LF (SEQ ID NOs: 28, 36, 44), LB (SEQ ID NOs: 31, 39, 40, 47), FIP (SEQ ID NOs: 29, 37, 45), and BIP (SEQ ID NOs: 30, 38, 46) primers. Some non-limiting embodiments of primer sets include one selected set (SEQ ID NOs: 26-33) and two alternative sets (SEQ ID NOs: 34-42 and SEQ ID NOs: 43-49).

Figure 17B:
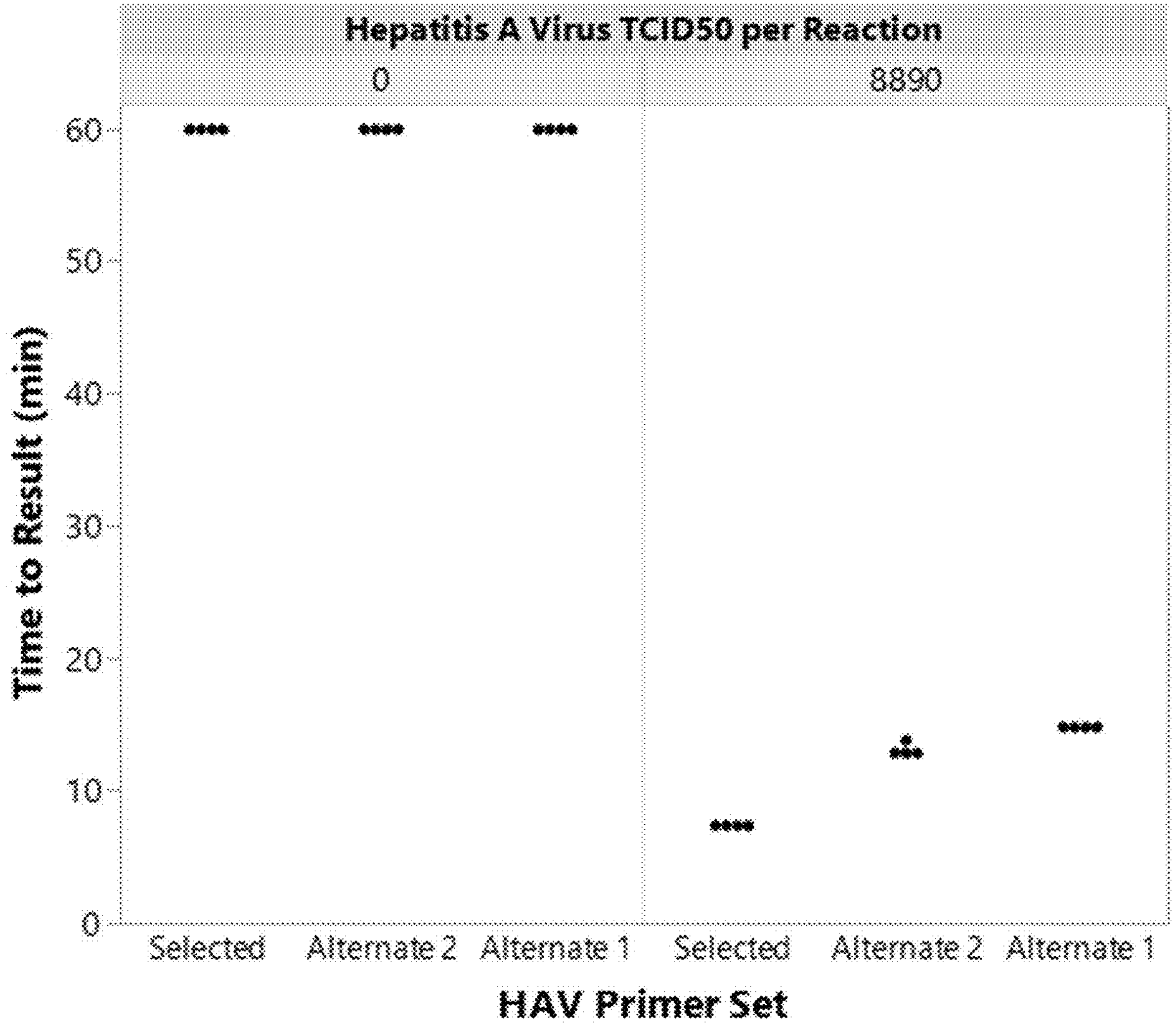
FIG. 17B depicts the time to detection of a positive amplification, or lack thereof, of samples with either 0 or 8890×(50% Tissue Culture Infectious Dose [TCID50]) virus titer using the primer sets of FIG. 17A. Time points at "60 min" denote unsuccessful amplifications.

An embodiment of the detection of HAV RNA genomic material in samples measured with an assay cartridge, or system, disclosed herein is shown in FIG. 17B. In such an assay, the concentrations of each primer were: 200 nM (each) for F3 and B3 primers; 1000 nM (each) for LF and LB primers; 1600 nM (each) for FIP and BIP primers. Time points at 60 minutes represent assay reactions that did not amplify. Viral genome amounts corresponding to 0× (no virus) and 8890× the measured 50% Tissue Culture Infectious Dose (TCID50) of the tested HAV sample were used. The selected set (SEQ ID NOs: 26-33) was chosen due to having the fastest time to a positive detection result (approximately 8 minutes).

Detection of Influenza A Virus Subtype H1N1 (H1N1):

LAMP primers specific for H1N1 are provided in FIG. 18A. Each primer set may comprise one or more of F3 (SEQ ID NOs: 50, 51, 59), B3 (SEQ ID NOs: 52, 53, 60, 61), LF (SEQ ID NOs: 54, 62, 63, 64), LB (SEQ ID NOs: 55, 56, 65), FIP (SEQ ID NOs: 57, 66), and BIP (SEQ ID NOs: 58, 67) primers. Some non-limiting embodiments of primer sets include one selected set (SEQ ID NOs: 50-58) and one alternative set (SEQ ID NOs: 59-67).

Figure 18B:
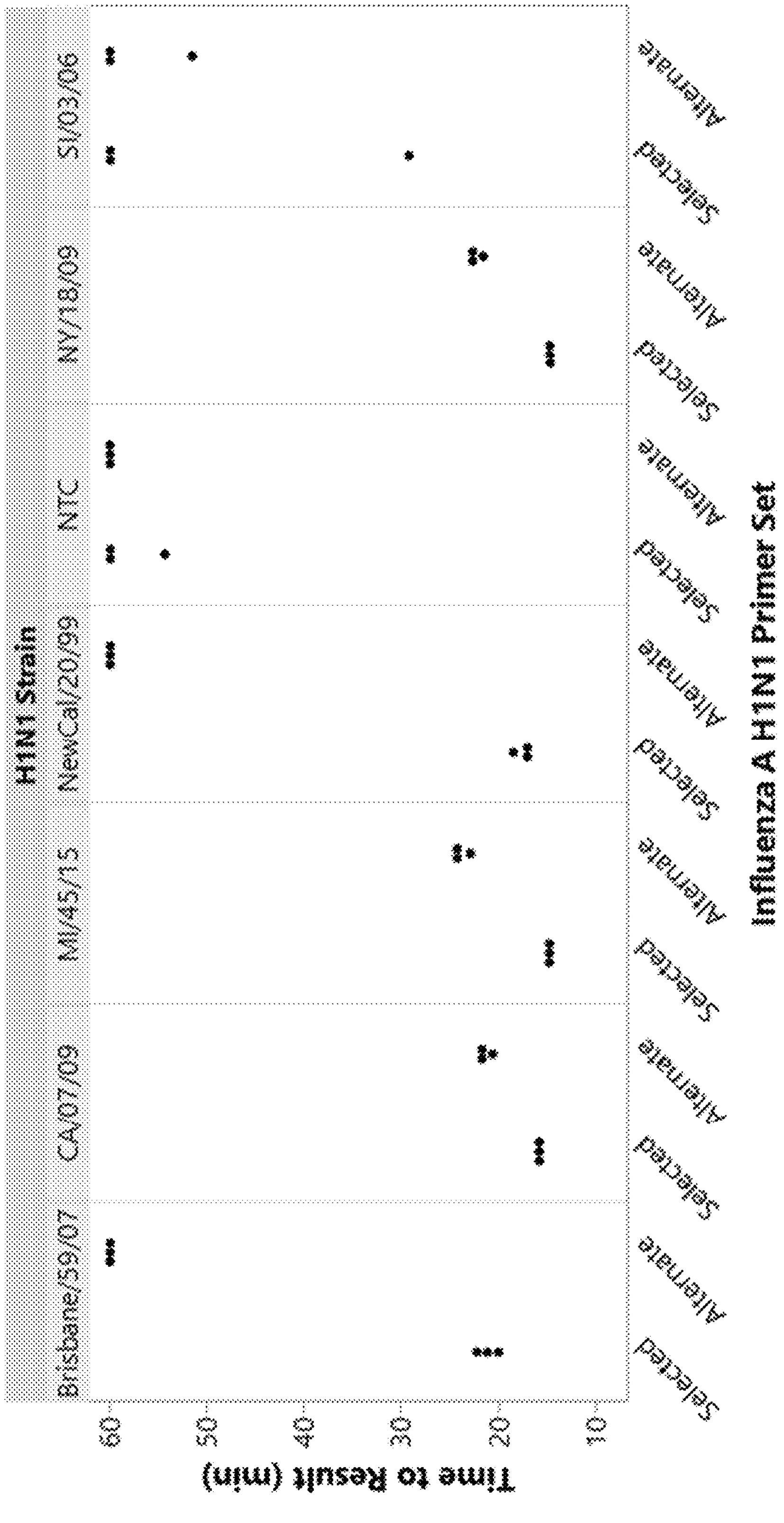
FIG. 18B depicts the time to detection of a positive amplification, or lack thereof, of samples containing synthetic DNA copies of Influenza A H1N1 strains Brisbane/59/07, CA/07/09, MI/45/15, NewCal/20/99, NY/18/09, or SI/03/06, or non-template control (NTC), at 1 million copies per reaction using the primer sets of FIG. 18A. Time points at "60 min" denote unsuccessful amplifications.

An embodiment of the detection of H1N1 genomic material in samples measured with an assay cartridge, or system, disclosed herein is shown in FIG. 18B. In such an assay, the concentrations of each primer were: 200 nM (each) for F3 and B3 primers; 1000 nM (each) for the selected set and 400 nM (each) for the alternative sets for LF and LB primers; 1600 nM (each) for FIP and BIP primers. Time points at 60 minutes represent assay reactions that did not amplify. The viral genomes were in the form of synthetic DNA at 1 million copies per reaction, and genomes for the following strains were tested: H1N1/Brisbane/59/07, H1N1pdm/California/07/09 (CA/07/09), H1N1pdm/Michigan/45/15 (MI/45/15), H1N1/New Caledonia/20/99 (NewCal/20/99), H1N1/pdm/New York/18/09 (NY/18/09), and H1N1/Solomon Islands/03/06 (SI/03/06). A non-template control (NTC) was also tested. The selected set (SEQ ID NOs: 50-58) was chosen due to its ability to amplify more of the 6 tested strains and with faster times to result.

Detection of Human Immunodeficiency Virus-1 (HIV-1):

LAMP primers specific for HIV-1 are provided in FIG. 19A. Each primer set may comprise one or more of F3 (SEQ ID NOs: 68, 69, 77, 89, 90), B3 (SEQ ID NOs: 75, 76, 87, 88, 96), LF (SEQ ID NOs: 70, 71, 78, 79, 80, 91), LB (SEQ ID NOs: 74, 84, 85, 86, 94, 95), FIP (SEQ ID NOs: 72, 81, 92), and BIP (SEQ ID NOs: 73, 82, 83, 93) primers. Some non-limiting embodiments of primer sets include one selected set (SEQ ID NOs: 68-76) and two alternative sets (SEQ ID NOs: 77-88 and SEQ ID NOs: 89-96).

Figure 19B:
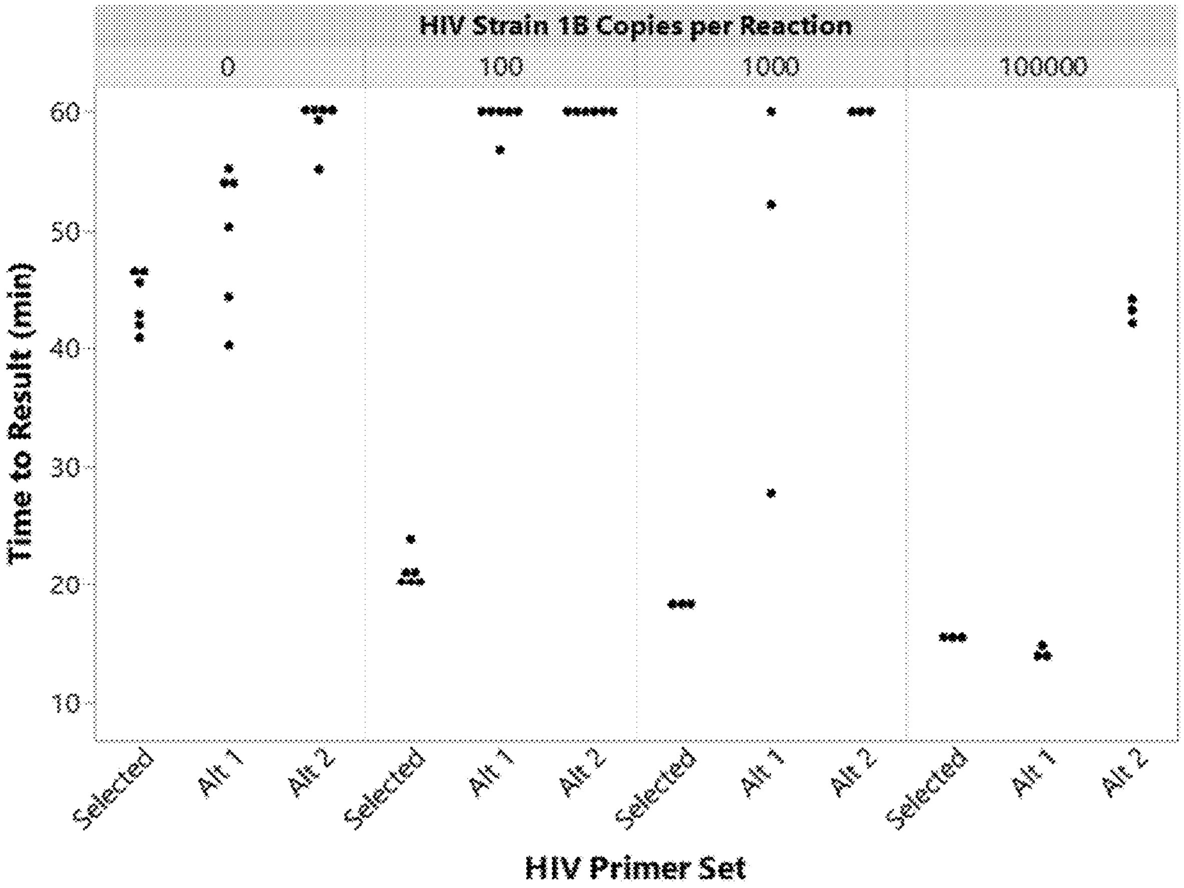
FIG. 19B depicts the time to detection of a positive amplification, or lack thereof, of samples containing 0 (null), 100 (low), 1000 (medium), or 100000 (high) copies of HIV-1 genomic template per reaction using the primer sets of FIG. 19A. Time points at "60 min" denote unsuccessful amplifications.

An embodiment of the detection of HIV-1 RNA genomic material from intact virus in samples measured with an assay cartridge, or system, disclosed herein is shown in FIG. 19B. In such an assay, the concentrations of each primer were: 200 nM (each) for F3 and B3 primers; 1000 nM (each) for LF and LB primers; 1600 nM (each) for FIP and BIP primers. Time points at 60 minutes represent assay reactions that did not amplify. Concentrations of HIV-1 genome corresponding to 0, 100, 1000, and 100000 genome copies per reaction were tested. The selected set (SEQ ID NOs: 68-76) was chosen due to its acceptably low false positive amplification times (all greater than 40 minutes) and overall sensitivity, as no other set amplified the 100 copies condition. This amplification can also use reverse transcribed viral DNA genomic material instead of RNA from intact virus.

Detection of Respiratory Syncytial Virus A (RSV A):

LAMP primers specific for RSV A are provided in FIG. 20A. Each primer set may comprise one or more of F3 (SEQ ID NOs: 97, 98, 108), B3 (SEQ ID NOs: 99, 100, 109), LF (SEQ ID NOs: 101, 102, 110), LB (SEQ ID NOs: 103, 111), FIP (SEQ ID NOs: 104, 106), and BIP (SEQ ID NOs: 105, 107) primers. Some non-limiting embodiments of primer sets include one selected set (SEQ ID NOs: 97-105) and one alternative set (SEQ ID NOs: 106-111).

Figure 20B:
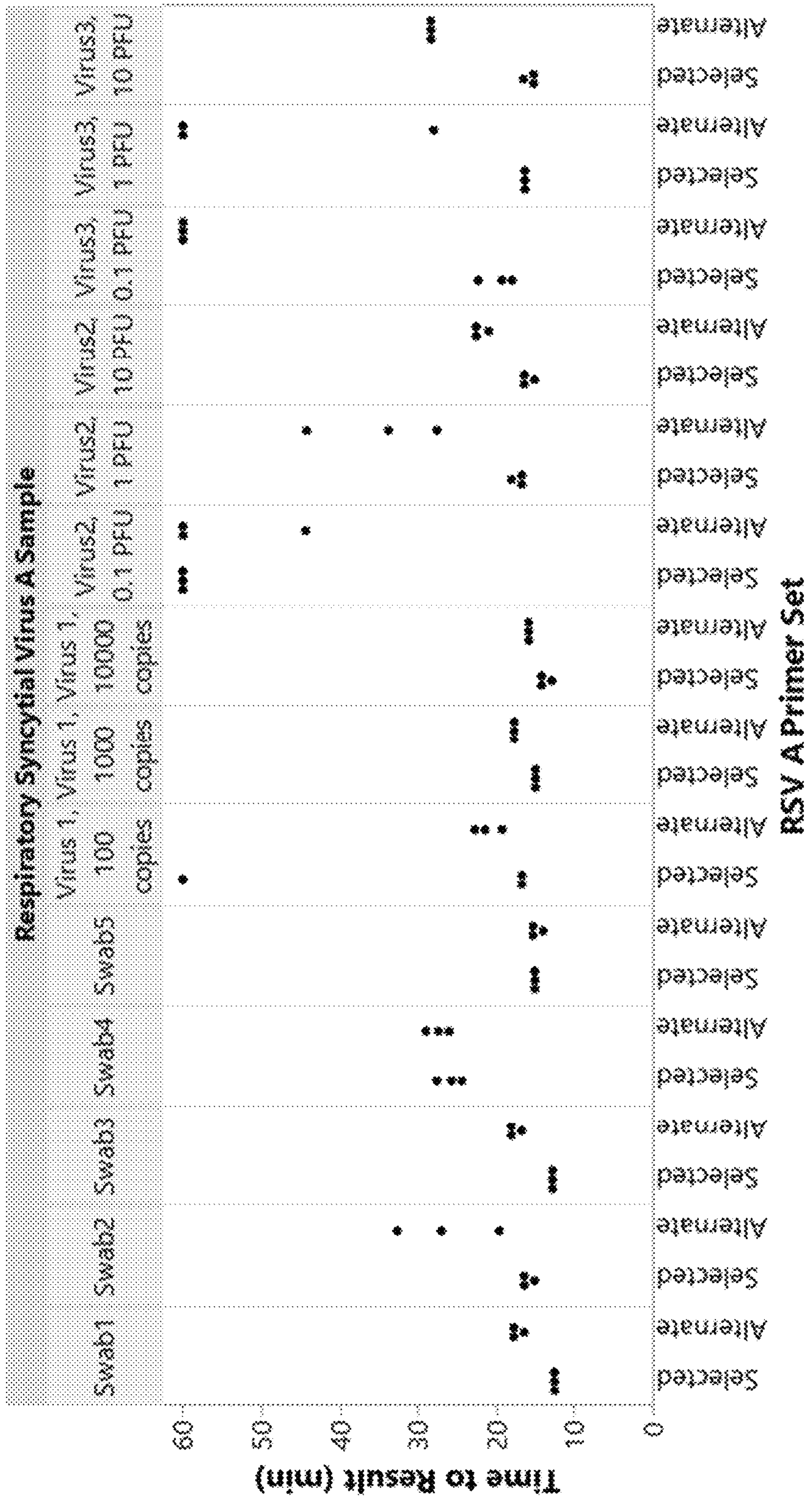
FIG. 20B depicts the time to detection of a positive amplification, or lack thereof, of either RSV A patient-derived swab samples (Swab1-5), or purified RSV A virus (100, 1000, or 10000 copies for Virus 1, and 0.1, 1, or 10 PFU for Virus 2 and Virus 3 per sample) using the primer sets of FIG. 20A. Time points at "60 min" denote unsuccessful amplifications.

An embodiment of the detection of RSV A genomic material in samples measured with an assay cartridge, or system, disclosed herein is shown in FIG. 20B. In such an assay, the concentrations of each primer were: 200 nM (each) for F3 and B3 primers; 400 nM (each) for LF and LB primers; 1600 nM (each) for FIP and BIP primers. Time points at 60 minutes represent assay reactions that did not amplify. The samples tested were either derived from 5 patient-derived nasal swabs (Swab1-5) in Universal Transport Media (Copan) or 3 purified virus samples used at three concentration levels (100, 1000, or 10000 copies for Virus 1, and 0.1, 1, or 10 PFU for Virus 2 and Virus 3 per sample). RNA concentrations for patient-derived samples were unknown. The selected set (SEQ ID NOs: 97-104) was chosen due to its overall speed and sensitivity (e.g. the alternative set did not amplify in the Virus 3, 0.1 PFU condition).

Detection of Respiratory Syncytial Virus B (RSV B):

LAMP primers specific for RSV B are provided in FIG. 21A. Each primer set may comprise one or more of F3 (SEQ ID NOs: 112, 113, 125), B3 (SEQ ID NOs: 114, 126), LF (SEQ ID NOs: 115, 116, 117, 127), LB (SEQ ID NOs: 118, 119, 120, 128), FIP (SEQ ID NOs: 121, 123), and BIP (SEQ ID NOs: 122, 124) primers. Some non-limiting embodiments of primer sets include one selected set (SEQ ID NOs: 112-122) and one alternative set (SEQ ID NOs: 123-128).

Figure 21B:
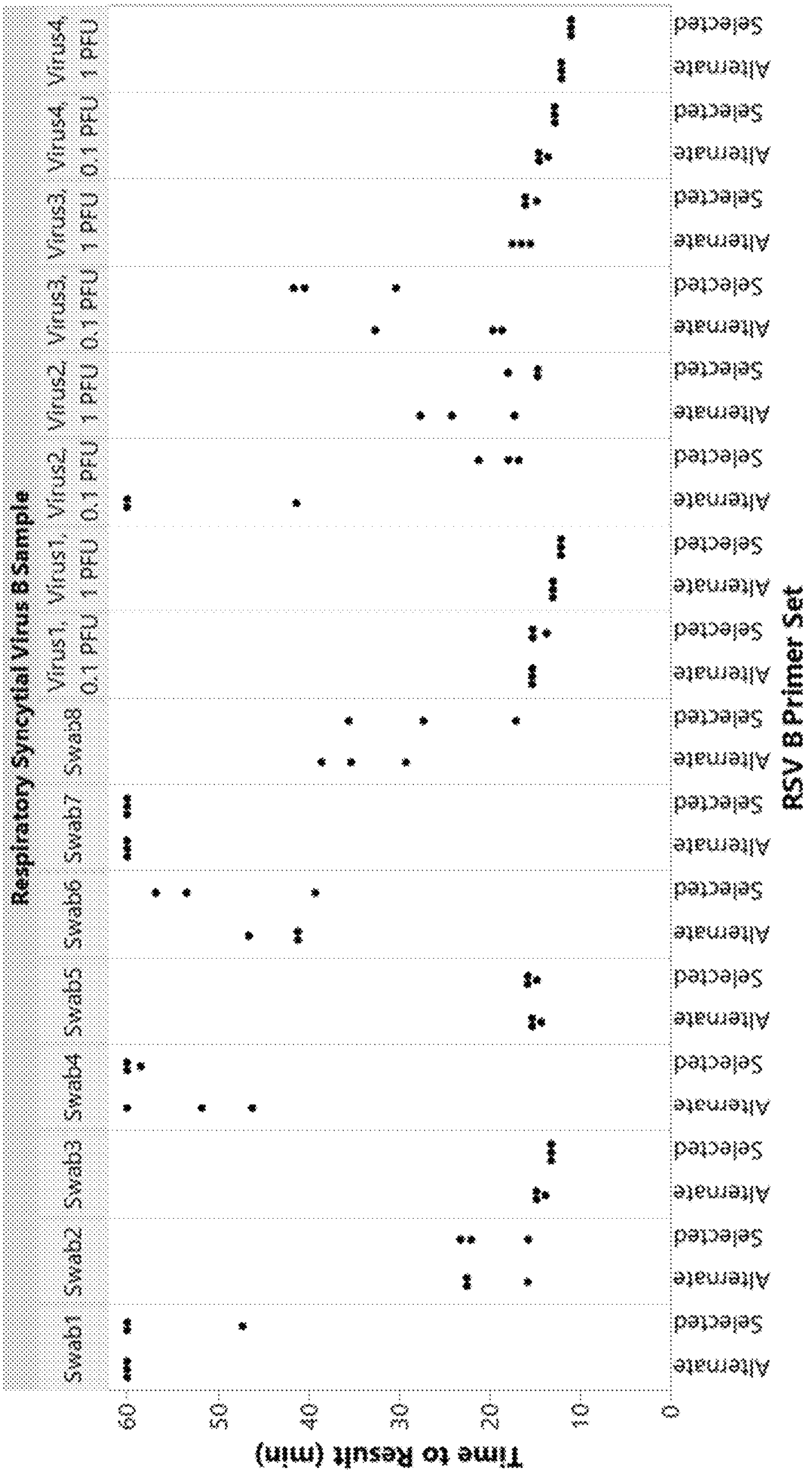
FIG. 21B depicts the time to detection of a positive amplification, or lack thereof, of either RSV B patient-derived swab samples (Swab1-8), or purified RSV B virus (0.1 or 1 PFU for Virus 1-4 per sample) using the primer sets of FIG. 21A. Time points at "60 min" denote unsuccessful amplifications.

An embodiment of the detection of RSV B genomic material in samples measured with an assay cartridge, or system, disclosed herein is shown in FIG. 21B. In such an assay, the concentrations of each primer were: 200 nM (each) for F3 and B3 primers; 1000 nM (each) for the selected set and 400 nM (each) for the alternative sets for LF and LB primers; 1600 nM (each) for FIP and BIP primers. Time points at 60 minutes represent assay reactions that did not amplify. The samples tested were either derived from 8 patient-derived nasal swabs (Swab1-8) in Universal Transport Media or 4 purified virus samples used at two different concentration levels (0.1 or 1 PFU for each of Virus1-4 per sample). RNA concentrations for patient-derived samples were unknown. The selected set (SEQ ID NOs: 112-122) was chosen due to its comparatively faster time to detection for conditions where both sets amplified well (e.g. Virus1-4 samples).

Detection of *Escherichia coli:*

Figures 22A, 22B:
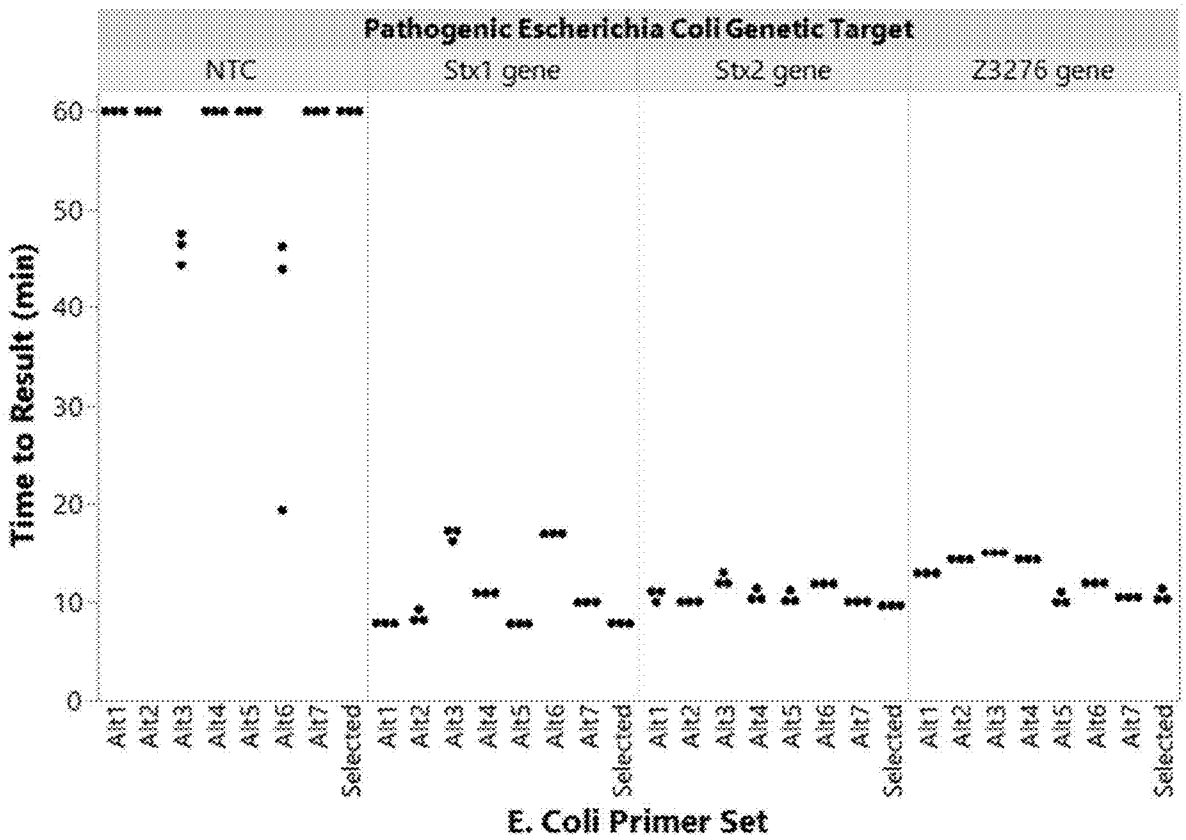
FIG. 22A depicts *Escherichia coli*-specific primer sequences for LAMP (SEQ ID NOs: 129-164). One selected and seven alternative primer sets obtained from the combination of primer sets Z3276 A, Z3276 B, Stx1 A, Stx1 B, Stx2 A, and Stx2 B are depicted. F3, B3, LF, LB, FIP, and BIP primers are denoted accordingly in respective primer names. Primer sequences are shown 5' to 3'.
FIG. 22B depicts the time to detection of a positive amplification, or lack thereof, of the Stx1, Stx2, or Z3276 gene of pathogenic *E. coli* genomes, or non-template control (NTC) using the primer sets of FIG. 22A. One million copies of *E. coli* genome were used per reaction. Time points at "60 min" denote unsuccessful amplifications.

LAMP primers specific for *E. coli* genes associated with pathogenicity (Z3276, Shiga toxin 1 [Stx1], and Shiga toxin 2 [Stx2]) are provided in FIG. 22A. Z3276 is a sequence specific for *E. coli* O157:H7. Two sets of primers (called A or B) were prepared for each pathogenicity gene. Z3276 primer sets may comprise one or more of F3 (SEQ ID NOs: 129, 135), B3 (SEQ ID NOs: 134, 140), LF (SEQ ID NOs: 131, 137), LB (SEQ ID NOs: 133, 139), FIP (SEQ ID NOs: 130, 136), and BIP (SEQ ID NOs: 132, 138) primers. Stx1 primer sets may comprise one or more of F3 (SEQ ID NOs: 141, 147), B3 (SEQ ID NOs: 146, 152), LF (SEQ ID NOs: 143, 149), LB (SEQ ID NOs: 145, 151), FIP (SEQ ID NOs: 142, 148), and BIP (SEQ ID NOs: 144, 150) primers. Stx2 primer sets may comprise one or more of F3 (SEQ ID NOs: 153, 159), B3 (SEQ ID NOs: 158, 164), LF (SEQ ID NOs: 155, 161), LB (SEQ ID NOs: 157, 163), FIP (SEQ ID NOs: 154, 160), and BIP (SEQ ID NOs: 156, 162) primers. Primer sets for LAMP were selected by combining one of two of each of the Z3276, Stx1, and Stx2 primer sets. They include Z3276 A (SEQ ID NOs: 129-134), Z3276 B (SEQ ID NOs: 135-140), Stx1 A (SEQ ID NOs: 141-146), Stx1 B (SEQ ID NOs: 147-152), Stx2 A (SEQ ID NOs: 153-158), and Stx2 B (SEQ ID NOs: 159-164). Some non-limiting embodiments of primer sets can be seen in FIG. 22A and include one selected set (Z3276 B+Stx1 A+Stx2 B) and seven alternative sets 1) Z3276 A+Stx1 A+Stx2 A; 2) Z3276 A+Stx1 A+Stx2 B; 3) Z3276 A+Stx1 B+Stx2 A; 4) Z3276 A+Stx1 B+Stx2 B; 5) Z3276 B+Stx1 A+Stx2 A; 6) Z3276 B+Stx1 B+Stx2 A; and 7) Z3276 B+Stx1 B+Stx2 B. Sets for each of the three genes were combined to have the best chance of detecting all pathogenic *E. coli* strains, as not all of them have both Stx1 and Stx2, and *E. coli* O157:H7 is not the only strain that produces Shiga toxin.

An embodiment of the detection of the three *E. coli* pathogenicity genes in samples measured with an assay cartridge, or system, disclosed herein is shown in FIG. 22B. In such an assay, the concentrations of each primer were: 200 nM (each) for F3 and B3 primers; 1000 nM (each) for LF and LB primers; 1600 nM (each) for FIP and BIP primers. Time points at 60 minutes represent assay reactions that did not amplify. Three synthetic DNA targets each comprising one of the three genes were used at 1 million copies per reaction. The selected set (Z3276 B+Stx1 A+Stx2 B) was able to amplify all three genes rapidly and without false positives. A single synthetic DNA target comprising all three genes, or two synthetic DNA targets comprising the three genes in total can also be used for the amplification reaction.

Detection of *Listeria monocytogenes:*

LAMP primers specific for *L. monocytogenes* are provided in FIG. 23A. Each primer set may comprise one or more F3 (SEQ ID NO: 165), B3 (SEQ ID NO: 166), LF (SEQ ID NO: 167), LB (SEQ ID NOs: 172, 173), FIP (SEQ ID NOs: 168, 169), and BIP (SEQ ID NOs: 170, 171) primers. Some non-limiting embodiments of primer sets include one selected set (SEQ ID NOs: 165-168, 170, 172) and two alternative sets (SEQ ID NOs: 165-168, 171, 173 and SEQ ID NOs: 165-167, 169, 171, 173).

Figure 23B:
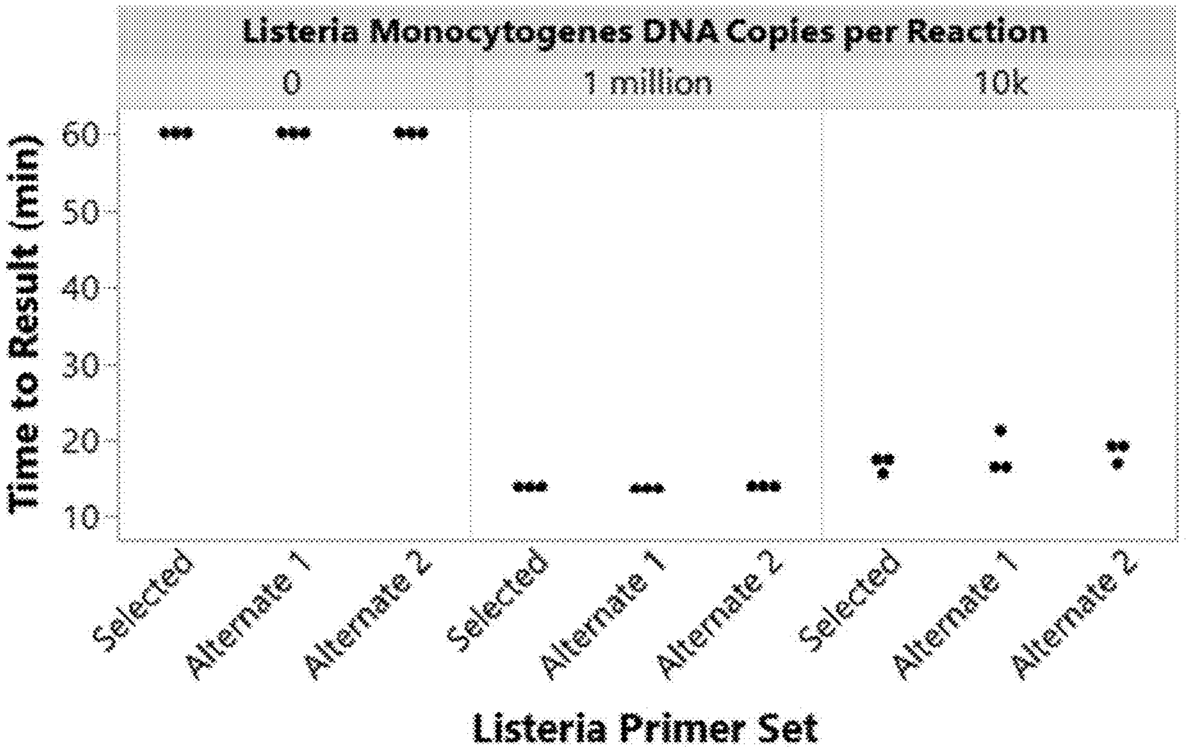
FIG. 23B depicts the time to detection of a positive amplification, or lack thereof, of *L. monocytogenes* genome at 0, 1 million, or 10000 copies of genome per reaction using the primer sets of FIG. 23A. Time points at "60 min" denote unsuccessful amplifications.

An embodiment of the detection of *L. monocytogenes* genomic material in samples measured with an assay cartridge, or system, disclosed herein is shown in FIG. 23B. In such an assay, the concentrations of each primer were: 200 nM (each) for F3 and B3 primers; 1000 nM (each) for LF and LB primers; 1600 nM (each) for FIP and BIP primers. Time points at 60 minutes represent assay reactions that did not amplify. Concentrations corresponding to 0, 1 million, and 10000 copies of *L. monocytogenes* genomes were tested. The selected set (SEQ ID NOs: 165-168, 170, 172) was chosen due to its slightly faster time to result at 10000 copies per reaction, although all three sets performed similarly.

Detection of *Mycobacterium tuberculosis:*

LAMP primers specific for *M. tuberculosis* are provided in FIG. 24A. Each primer set may comprise one or more F3 (SEQ ID NOs: 174, 180, 186), B3 (SEQ ID NOs: 175, 181, 187), LF (SEQ ID NOs: 178, 184, 190), LB (SEQ ID NOs: 179, 185, 191), FIP (SEQ ID NOs: 176, 182, 188), and BIP (SEQ ID NOs: 177, 183, 189) primers. Some non-limiting embodiments of primer sets include one selected set (SEQ ID NOs: 186-191) and two alternative sets (SEQ ID NOs: 174-179 and SEQ ID NOs: 180-185).

An embodiment of the detection of *M. tuberculosis* genomic material in samples measured with an assay cartridge, or system, disclosed herein is shown in FIG. 24B. In such an assay, the concentrations of each primer were: 200 nM (each) for F3 and B3 primers; 400 nM (each) for LF and LB primers; 1600 nM (each) for FIP and BIP primers. Time points at 60 minutes represent assay reactions that did not amplify. Either 1 million copies of *M. tuberculosis* genome (positive), or non-template control (NTC), were tested. The selected set (SEQ ID NOs: 186-191) was chosen due to having the fastest time to result.

Detection of *Salmonella enterica:*

LAMP primers specific for *S. enterica* are provided in FIG. 25A. Each primer set may comprise one or more F3 (SEQ ID NOs: 192, 196), B3 (SEQ ID NOs: 203, 204), LF (SEQ ID NOs: 194, 198, 199), LB (SEQ ID NOs: 201, 202), FIP (SEQ ID NOs: 193, 197), and BIP (SEQ ID NOs: 195, 200) primers. Some non-limiting embodiments of primer sets include one selected set (SEQ ID NOs: 196-204) and one alternative set (SEQ ID NOs: 192-195, 201-204).

An embodiment of the detection of *S. enterica* genomic material in samples measured with an assay cartridge, or system, disclosed herein is shown in FIG. 25B. In such an assay, the concentrations of each primer were: 200 nM (each) for F3 and B3 primers; 1000 nM (each) for LF and LB primers; 1600 nM (each) for FIP and BIP primers. Time points at 60 minutes represent assay reactions that did not amplify. Concentrations corresponding to 0, 1 million, or 10000 copies of *S. enterica* genome per reaction were tested. The selected set (SEQ ID NOs: 196-204) was chosen for being several minutes faster in time to result compared to the alternative set.

Tracking Infection Potential

Various conditions exist under which knowledge regarding whether a subject or product is infected, is at risk of being infected, or was exposed to an individual or other products that have been infected are useful. For example, during a local epidemic or global pandemic, a store or public venue that provides services, entertainment, or goods to the public may limit entry to people that are determined to be infected or have a likelihood of being infected or are at risk of being infected (e.g., people having a wellness score that deviates from a threshold value commensurate with that of healthy individuals) in favor of people that are not infected, have a reduced likelihood of being infected, or are not at risk of being infected (e.g., people having a wellness score commensurate with a range for healthy individuals). The store or public venue may implement restrictions to entry for individuals that have wellness scores, which deviate from the healthy threshold value (e.g., outside of the range for healthy individuals) so as to reduce the risk of exposing other members of the population to a pathogen. In particular, during cold and flu (influenza) season or localized outbreaks of contagious pathogens (for example, the COVID-19 coronavirus, tuberculosis, and the like), various entities (for example, people, stores, restaurants, business, government agencies, and so forth) may wish to limit access to spaces, facilities, services, and so forth to people who are not or likely not infected. Therefore, tracking wellness scores that can provide information specific and relevant to a particular infection of interest for large numbers of people in a population is desired.

Similarly, with respect to infected animals or products in the food supply, e.g., cattle, chickens, turkeys, lamb, fish, vegetables, fruits, or juices, or milk products, it is beneficial to evaluate the health or contamination status of the animal or product, determine whether it is infected with a pathogen, and/or determine whether the animal or product poses a risk to other animals or products in the population or to consumers. By evaluating the wellness scores for animals in an animal population or products in the food supply and comparing these wellness scores to thresholds indicative of healthy or diseased individuals or contaminated or non-contaminated products, one can choose to isolate or remove animals or products having wellness scores indicative of infection by a pathogen from animals having healthy wellness scores in the population or uncontaminated products in the food supply so as to reduce the spread of disease within the animal population, cross-infection to humans, or contamination of the food supply.

Initially identifying the healthy or uninfected subjects from those subjects that are infected is difficult, especially when, generally, the identification of infected subjects requires specific testing procedures and diagnostic tests. Such limitations would often hamper testing and monitoring capabilities in previous systems. For example, taking a test for a particular infection and obtaining the results for the test can involve going to a clinic or medical professional's office, waiting for the test to be administered and processed, and waiting for the results to be available and reported to the individual. In many instances, such testing processes take many days to complete. Even then, various risks with the tests exist, such as cross contamination of the test samples, mix-up of tests or test results, and so forth. Accordingly, such testing may not be practical or even possible for use in determining whether to permit or deny entry of people into a location, event, and so forth.

Furthermore, in some instances, testing alone may not be indicative of infection or infectivity to others, because other factors may contribute to a likelihood of a subject or product being infected or contaminated. Examples of these factors include the subject or product traveling to locations known to be hot spots of infection, not taking proper precautions when in public or in product handling when risk of infection is high, having been in contact with someone confirmed to be infected, having shown symptoms consistent with being infected, and so forth. Such factors, in conjunction with test results and corresponding information, may be applicable or useful for determining whether to allow entry or access of a product, person or animal to a location or into the food supply.

Additionally, contact tracing for people, products, or animals determined to be infected or possibly exposed to infected subjects or products is reliant on various factors and can be difficult to perform with high confidence and accuracy. For example, previous general contact tracing methods for people, products, or animals can include identifying a subject or product that is infected or contaminated, contacting that subject (or a responsible subject) or evaluating the chain of custody of a product to determine whether the subject or product may have exposed others or where the subject or product was exposed, attempting to identify other subjects or products that were at the same location or in the vicinity of the infected subject or product during the infectious period, and then attempting to identify and/or contact other potentially infected subjects or products. Thus, conventional general contact tracing methods often rely on a subject's self-reporting, memories, and willingness to participate, record keeping capabilities, and/or communication capabilities, which often can be difficult to implement.

The systems and methods described herein improve both determining whether a subject or product is infected and contact tracing. More specifically, the systems and methods described herein provide assistance in determining whether to allow entry or access to locations, the food supply, or the general population of individuals based on generally accepted indicators of infection while maintaining appropriate and consistent application of the indicators and analysis, maintaining privacy and confidentiality, and providing ongoing data collection and updates. For example, the systems and methods described herein may provide and utilize profiles, markers, identifiers, or accounts associated with people, animals, or products to establish a wellness score for the person, animal, or product based on which people, animals, or products are allowed or deny entry or access to locations, populations of other animals, or the food supply. A person's, animal's, or product's identity may be confirmed using, e.g., biometrics, bar coding, QR coding, RFID coding with or without other authentication systems to ensure the subject or product being presented for entry or access to a public place, general population, or food supply is confirmed to be the subject or product for which the wellness score applies.

For example, the individual or product may create a profile or have a profile created specific to the subject or product. In some embodiments, the subject's profile may be integrated with various medical accounts or health status records for the subject such that the subject's medical history is accessible via the profile and can be accounted for in any corresponding analysis. By linking or integrating the subject's medical accounts or health status records, any test results, health metrics, identification information, authentication information (for example, biometrics information and the like), appointments, and/or other corresponding information from the medical accounts can be considered when generating the wellness score for the subject. The subject's profile may include various fields, including identifier information (which may comprise a unique identifier), user credentials (for example, user name and passwords or similar identifying information), health information, test results, locations visited, health surveys, contact tracing information, the wellness score, and so forth.

The system may generate the wellness score based on one or more algorithms that dynamically account for the information in the subject's or product's profile. For example, age of test results (for example, time since the last test taken) has a varying weight in the algorithm, such that as the test results age (i.e., as the test results become older or are further in the past), the test results may lose weight in the algorithm. This allows more recent activity in the profile to have a greater impact on the subject's or product's wellness score. Furthermore, the test results may have a higher weight than other fields in the profile. In some embodiments, the algorithm may account for relationships between users or products when generating wellness scores. For example, if a first user or product is part of a family unit or unit of products and comes in contact with both a second user or product and a third user or product, then the algorithm for generating the wellness score accounts for such relationships or contacts. Thus, if the first and second users or products of the family unit or product unit have taken tests or have been tested with results that show that the first and second users or products are not infected, then the algorithm may generate the wellness score for the third user or product accounting for the recent, not infected test results for the first and second users or products even if the third user or product was not recently tested. This may be because the living situation or contact situation and the particular infection of interest indicates a high likelihood that if a majority of subjects in a household or animal population or products are not infected, then it is likely that none of the subjects or products are infected, and so forth. The algorithm(s) may generate the wellness score to indicate how the various fields are related to an expected wellness (or likelihood of being infected) for the subject or product. In some embodiments, the wellness score is indicative of an expected likelihood that the subject or product is infected. For example, the wellness score is inversely related to the expected likelihood that the subject or product is infected, where a high wellness score is indicative of a low likelihood of being infected and a low wellness score is indicative of a higher likelihood of being infected.

The system may interface with various external systems or devices, for example, to enable one to access their information and control access to information in the profile. The system may also interface with testing devices (for example comprising one or more of the readers and cartridges described herein), medical devices, computing systems, or third-party devices. The third-party devices may comprise computing systems or devices used by third party entities that provide goods or services or at which multiple people may gather, such as stores, restaurants, event venues, and so forth. The third-party entities may use the third party devices (for example, site devices) to identify whether the subject or product has a wellness score that exceeds a threshold value (e.g., has a likelihood of being infected that falls below a threshold). For example, when the subject or product arrives at the third-party location, the subject may present identification or the product can be identified by an identifier, marker, code, and/or biometric information, via the third-party device, to authenticate the subject or product. The third-party device may convey the identifying or biometric information with the subject's or product's identifier to the system, which uses the identifying or biometric information to authenticate the subject's or product's identity. If the identity is authenticated or verified, then the system returns, to the third-party device, the subject's or product's wellness score from the subject's or product's profile. In some embodiments, the third-party system may use the subject's or product's wellness score for comparison against the third party's threshold requirements. Alternatively, the system may compare the subject's or product's wellness score against the third party's threshold requirements or other standard threshold requirements and return an indication regarding whether or not the subject or product is allowed to access the third-party location or not. As such, third parties are able to determine whether people, animals, or products can access locations accurately based on unbiased, scientific information for a specific individual or product. Alternatively, or additionally, the system can provide the individual or product with a computer-generated code that is indicative or representative of the individual having the wellness score that meets or exceeds the threshold for entry to the third-party location. For example, the system can generate a barcode, Radio-frequency identification (RFID) code, or quick response (QR) code that the individual or product can present at the third party location and which the third party can scan to determine that the individual or product can enter the location.

In some embodiments, the system and methods update the subject's or product's profile dynamically with additional information, for example when the subject or product takes a new test, is tested, or visits a health professional. Thus, when the subject or product takes the new test, or is newly tested the system updates the subject's or product's profile based on results from the new test and then uses these results to revise the wellness score. Thus, as information in the profile changes, the system may update the subject's or product's wellness score accordingly such that the subject's or product's wellness score is always up-to-date.

Accordingly, the systems and methods described herein, incorporated with the cartridges and reader devices of the platform also described herein, provide for consistent and accurate determinations of whether people, animals, or products are infected while maintaining privacy for the people and granular monitoring of animals and products especially in the food supply. Further details are provided herein.

Figure 26:
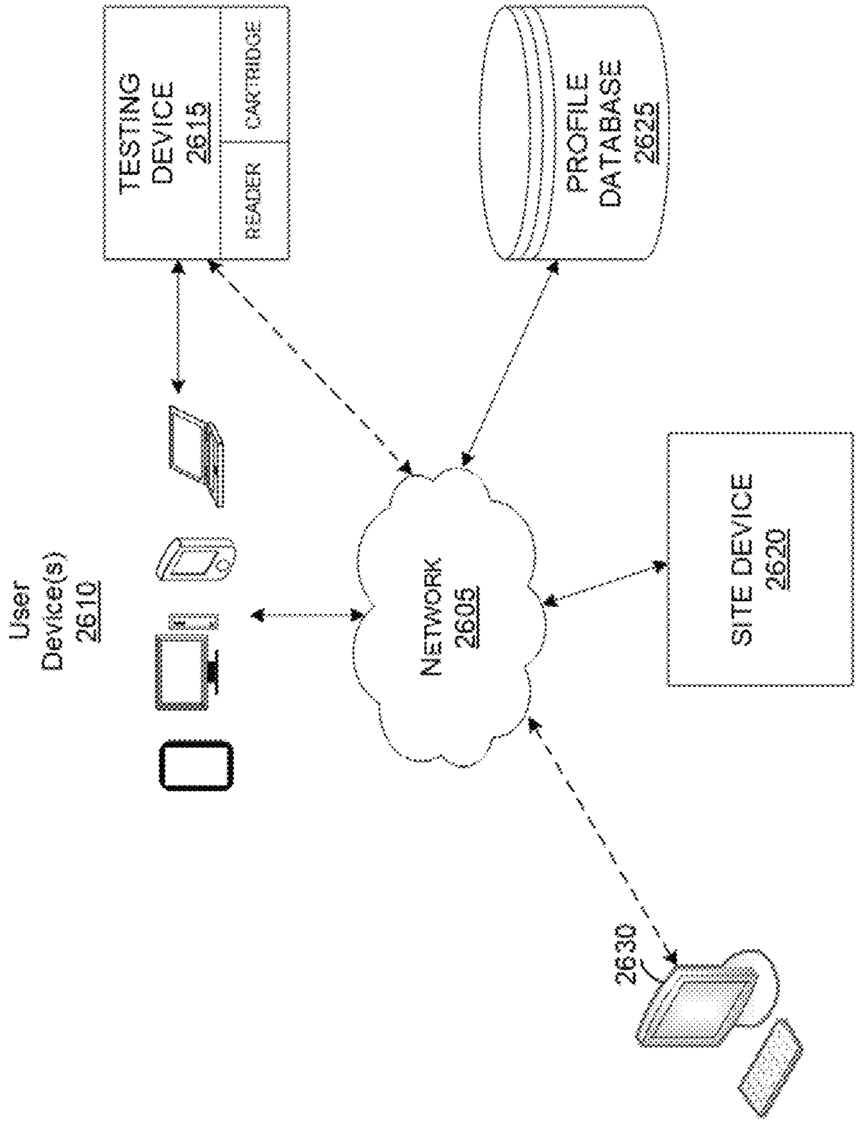
FIG. 26 depicts an example network diagram of a networked system for tracking infection potential.

An example of such a system is shown in FIG. 26, which shows a network diagram of a system 2600 for tracking users' wellness scores and likelihood of being infected. In some embodiments, the system 2600 operates over a network 2605 and comprises a user device 2610, a testing device 2615, a site device 2620, a profile database 2625, and a server 2630. The system 2600 may implement the methods described herein.

The network 2605 may allow various computing devices and/or other electronic devices to communicate with each other via wired or wireless communication links. The communications links between the various computing devices and components of the system 2600 may be wired or wireless connections (or a combination thereof) and may be part of a secured or unsecured network, such as a local area network (LAN), a wide area network (WAN), a combination of networks, and/or the Internet. For example, the communication links may be achieved through one or more a Wi-Fi system, Bluetooth® wireless technology, Ethernet, cellular communications, or satellite communications, or the like.

In some embodiments, the user device 2610 comprises the external computing device as described above with reference to FIGS. 15A-15P. The user device 2610 comprises a user interface through which the user may interact with various components in the system 2600, for example the testing device 2615, the site device 2620, the profile database 2625, and the server 2630. The user device 2610 may comprise any computing device used by the user. For example, the user device 2610 comprises one or more of a smart phone, a tablet, a smartwatch, a computer, a laptop, or any similar mobile or stationary computing device. In some embodiments, the user device 2610 communicates directly with the testing device 2615 (e.g., without communicating through the network 2605), for example via one of the wired or wireless communication links. The user device 2610, as described above, may allow the user to manage the testing device 2615 (comprising taking and reviewing results from the test) and respond to health information surveys (for example, provide information or responses, temperature measurements, and the like, as seen in FIGS. 15A-15P). The user of the user device 2610 may also use the user device 2610 to review and manage the user's profile, an animal's profile, or a product's profile as stored in the profile database 2625. Additionally, the user device 2610 enables the user to obtain and monitor the wellness score in the user's profile an animal's profile, or a product's profile. The user may use the wellness score to generate a barcode, QR code, RFID code, or other computer-generated value to present to third parties to identify whether the user, animal, or product is infected. In some embodiments, the user may use the wellness score to combine with other information, for example a ticket barcode or number for a ticket for admission of entry to an event or location (for example, a plane or transportation ticket, event ticket, and so forth). The user can then present the combined barcode or number (for example, via the user device 2610) to the site device 2620 to indicate both payment of appropriate fees as well as the user's wellness score indicative of the user being infected or not. Thus, the single barcode or computer readable number may be used with the third-party site device 2620 to gain admission to a location or event. Further details are provided below with respect to the description of the site device 2620 and the FIG. 27. In some embodiments, the user device 2610 operates an application (or similar software code) associated with the system 2600. The user device 2610 may use the application to track information, for example location information of the user device 2610 and identification information for other user devices 2610 with which the user device 2610 comes into close proximity. The user device 2610 may store the location information and identification information in the user profile for the user in the profile database 2625. In some embodiments, the user profile also enables the individual to monitor health information and records provided by various health institutions, for example the individual's doctor, records from blood tests, and the like, for example via the user device 2610.

In some embodiments, the user device 2610 may locally store test results from an infection test and enable the user to present the test results to the site device 2620 to gain entry to an event or to pass the animal or product on to a subsequent location. For example, the user takes the test using the testing device 2615 for a pathogen of concern and the test results are stored on the user device 2610 (and optionally stored in the user profile in the profile database 2625). The user may then take the user device 2610 to the event location and present the user device 2610 to the site device 2620. Alternatively, test results for a tested animal or product can register on a user's device, which can be presented at a subsequent location during transport of the animal or product. The site device 2610 may access the test results via the computer-generated code or directly via a pass/fail (not infected/infected) indication on the user device 2610. In some embodiments, the user may provide an identifier and/or biometrics information (via one of the site device 2620 or the user device 2610) to authenticate that the test results provided on the user device 2610 actually belong to the user presenting the user device 2610 or the animal or product for which the test results apply. For example, logging into an application on the user device 2610 that shows the test results may require a biometric input as opposed to just the username and password. As described herein, user credentials may include or comprise the username and password information and/or biometrics information. As such, the user device 2610 may comprise the application that, when used in conjunction with a user profile or testing device 2615, requires biometric inputs from users and associates test results and profile information with the biometric inputs and/or the user identifier information or identifying information about the tested animal or product so that test results cannot be shared with third parties or between users or event or location moderators and are always associated with a single user, animal or product.

The testing device 2615 may comprise a combination of a cartridge (for example, one of the test cartridges described herein, for example one of the test cartridges 120, 200, 920, 1000, 1200, 1300, and so forth) and a reader device (for example, one of the reader devices 110 and 600 or the analyzer 1400), as introduced above. The testing device 2615 may test for or identify pathogens, genomic materials, proteins, and/or other small molecules or biomarkers infections, diseases, and so forth, which may be indicative of whether or not the individual or product is infected, based on the test cartridges and readers described herein. As described above, the testing device 2615 communicates with the user devices 2610. However, the testing device 2615 may optionally communicate directly with the network 2605 and, therefore, communicate with one or more of the profile database 2625 and the system server 2630 via the network 2605 or via the user device 2610 in addition to the user device 2610. The testing device 2615 may enable testing of biological samples from the individual or product and may provide the results from the testing to the individual (via the user device 2610), the profile database 2625, or a third party. Additionally, the testing device 2615 may perform diagnostic tests, including tests that utilize test strips, diagnostics screenings, tests that require biological samples, and so forth. Further details regarding the testing device (more specifically, the reading device and the cartridge) are provided throughout this disclosure.

In some embodiments, the user may obtain or take one or more tests via the testing device 2620 to determine if the user, animal, or product is infected, for example with a viral or bacterial infection. For example, the user may employ an assay or similar cartridge and the reader device of the testing device 2620 to perform the test. The testing device 2620 may be used to detect whether the user, animal, or product is infected by detecting specific genomic material from a sample from the user, animal or product that the user deposits into the cartridge of the testing device 2620. The user then inserts the cartridge into the reader device, which analyzes the sample to detect whether the sample indicates that the user, animal, or product is infected. Further details regarding how the cartridge and reader device operate to detect whether the sample indicates that the individual, animal or product is infected are provided herein, for example with reference to FIGS. 1-15P. In some embodiments, the user or animal is infected whenever the sample from the user includes a marker associated with the infection or corresponding pathogen, regardless of whether the user is asymptomatic or symptomatic.

The site device 2620 may comprise a computing system or similar device that accesses the system 2600 via the network 2605 to enable access to information from the system 2600 at a location separate from the testing device 2615 and/or the user device 2610. The site device 2620 may be operated by the third party for use to monitor and/or manage entry of people, animals or products to a location or event or into the food supply. The site device 2620 includes a user interface to allow the users to provide identifiers and credentials (for example, username and password or biometric information) and view results of comparing the wellness score with the threshold. For example, the location can be an airport, a restaurant, an event venue (e.g., a concert, party or sports event), or in the case of animals a storage or processing facility, or in the case of products, a packing facility. In some embodiments, the site device 2620 comprises a barcode reader, QR reader, RFID reader, or similar computer-generated code reader to read the computer generated code described herein.

In some embodiments, the site device 2620 may operate in conjunction with the testing device 2615 to allow tests to be administered at the location, e.g., an event, and then compared or aggregated with information from the user profiles stored in the profile database 2625. For example, the user attending the event at the location or an animal or product arriving at a location are tested using the testing device 2625 at the location and the site device 2620 may obtain other user profile information to generate the wellness score, also including the test taken at the location using the testing device 2625, to generate an updated wellness score while the user, animal or product is at or in a vicinity of the location (e.g., at a pre-admittance point). The site device 2620 may then compare the wellness score with the threshold score for entry to determine whether to allow or deny entry of the user, animal, or product. As such, entry into the location for the user, animal or product may be based on the test that is as recent as possible relative to the event, location, or transport of the animal or product, as well as, the profile information for the user, animal or product where biometrics information or other identifying information is used to access the profile information from the profile database 2625 when the biometrics information or other identifying information matches that of the user's profile (identified by the identifier) or the profile for the animal or product being tested. The site device 2620 may then store the updated wellness score in the user profile, or profile for the animal or product in the profile database 2625.

The server 2630 may allow the site device 2620 to access the wellness score for the user, animal or product that presents to gain entry to the location or event. For example, the third party, when using the site device 2620 to manage entry of people, animals or products into the location or event, applies or establishes the threshold wellness score that people, animal or products must meet or exceed to be granted entry. In some embodiments, the threshold score is set by the third party or by a larger body (for example, governing body). The site device 2620 may be used to identify the wellness score for users, animals or products that are presented for entry and compare the wellness score to the threshold score. For example, the site device 2620 obtains the wellness score for each user, animal, or product in various ways. For example, the site device 2620 may obtain identifying and/or biometric information from the user, animal or product and submit the obtained information to the server 2630 for authentication of the user, animal or product via the user's, animal's or product's profile in the profile database 2625. Thus, the site device 2620 may be configured to capture and convey identifying information and/or biometric information for the user, animal or product for example user fingerprints, photo or video based biometrics (for example, facial recognition or retinal scans), user physiological based biometrics (for example, facial recognition, hand geometry recognition, finger geometry, iris/retinal scanning, palm vein recognition, ear recognition, and so forth), user voice recognition (for example, cadence, voice patterns, and so forth), user writing, signature, or typing pattern recognition, biological sample recognition, movement or gait recognition, bar coding, QR coding, RFID coding, branding, and the like. The server 2630 may confirm whether the identifying and/or biometric information match a user, animal or product profile in the profile database 2625. If they match, the server 2630 may identify the wellness score in the user, animal or product profile and return it to the site device 2620. If they do not match, then the server 2630 may return an error or request replacement identifying and/or biometric information. When the site device 2620 receives the wellness score for the user, animal or product, the site device compares the received wellness score with the threshold score and determines whether the user, animal or product can enter a location (for example, when the wellness score exceeds the threshold, the user, animal or product can enter and when the wellness score does not exceed the threshold, the user, animal or product cannot enter). Alternatively, the site device 2620 may scan a computer-generated code for each user, animal or product seeking entry and parse the scanned code to identify the wellness score for the user, animal or product. The site device 2620 may then compare to parsed wellness score to the threshold score, as described above, to determine whether the user, animal or product is allowed entry. In some embodiments, the site device 2620 further provides details of what users, animals or products (for example, via user, animal or product identifiers) were granted entry by the site device 2620 to the server 2630. This information may be used by the server 2630 for contact tracing purposes so that the server 2630 may identify all users, animals or products at the location at any given time. Thus, the site device 2620 may determine to limit entry to the location and obtain contact tracing information.

The profile database 2625 may store profile information received over the network 2605 and provide responses to requests for information received via the network 2605. For example, as described above, the profiles in the profile database 2625 may comprise, for each user, animal or product having a profile stored therein, one or more fields, including identifier information (for example, user name and passwords or similar identifying information), health information, testing information and results (for example, including when and what tests were taken, the corresponding results, and/or titers available), locations visited, health surveys, contact tracing information, the wellness score, and so forth. The profile database 2625 may update profiles for users, animals or products as new test results, health information, or corresponding information is provided to the profile database 2625 with respect to corresponding user identifiers. Additionally, the profile database 2625 may store updated wellness scores that are generated by the server 2630, as described herein. As described above, the profile database 2625 may provide the wellness score for the user, animal or product based on receipt of a request for the wellness score when the request includes matching user identification information and biometric information. The biometric or identifying information stored in the user, animal or product profile may include user fingerprints, photo or video based biometrics (for example, facial recognition or retinal scans), physiological based biometrics (for example, facial recognition, hand geometry recognition, iris/retinal scanning, palm vein recognition, ear recognition, and so forth), voice recognition (for example, cadence, voice patterns, and so forth), writing, signature, behavioral recognition, typing pattern recognition, physical movement recognition, navigation patterns, biological sample recognition, QR coding, RFID coding, bar coding, branding and the like. This biometric and/or identifying information may be updated in the profile database 2625 based on updated information received from the user, animal or product and so forth.

For example, the server 2630 may manage requests for wellness scores and other user, animal or product profile information received from the site device 2620. Additionally, the server 2630 may determine the wellness scores for user, animal or product profiles based on the other information stored in the user, animal or product profile according to one or more algorithms. For example, the one or more algorithms may incorporate freshness of medical information into the wellness scores by reducing values for aged information (for example, reducing the wellness score generated based on information in the user's profile even when there is no change to the information except with respect to its freshness. This may be because as the information in the user's, animal's, or product's profile ages, the corresponding likelihood that the profile information is missing relevant or potential infection indicating data increases. Thus, a first user, animal, or product profile with information that has aged a month (i.e., has not been updated in a month) may have a substantially lower wellness score as compared with a second user, animal, or product profile having information updated that has aged two days (i.e., has not been updated in two days), even if the information between the user's, animal's, or product's profile is identical with exception to the age of the information. In some embodiments, the server 2630 enables operational use of the system 2600, for example controlling authentication by the site device 2620 and user device 2610 of user, animal, or product profile identifying and/or biometrics information or user access or storage of data in their profiles in the profile database 2625.

For example, in some embodiments, the server 2630 may use the location information and identification information collected by the user device 2610 to perform contact tracing as appropriate and needed. For example, the server 2630 may receive an indication that a first user, animal, or product is infected with a pathogen (for example, from testing with the testing device 2615 or information added to the user's health information records). The server 2630 may then use the contact tracing information for the first user's user device 2610 or the animal or product profile to identify a second user, animal or product (and any additional users, animals or products) that came into close proximity with the first user, animal or product for example based on the stored location information and identifying information. Based on this information, the server 2630 may contact the second user or managers for the animals or products (and any additional users or managers for the animals or products) regarding the possible exposure and suggest that appropriate steps, such as take a corresponding test using the testing device 2615, visit the medical professional, quarantine, or removal form the transportation location and so forth.

In some embodiments, one or both of the server 2630 and the user device 2610 interface with the user's calendar or events to which the user is expecting to go (for example, a scheduled concern, flight, and so forth). In view of the expected event and need to meet the threshold wellness score to be assured entry, the server 2630 and/or the user device 2610 may provide instructions to the user regarding when to take the test, when or where to avoid traveling or visiting in advance of the event, and so forth. The instructions may be generated, based at least in part, on the algorithm(s) used to generate the wellness score in the user profiles. Thus, based on the algorithm(s), the server 2630 or the user device 2610 may determine which factors of the user profile the user can impact through action (for example, take a new test, avoiding stores between certain hours, and so forth). For example, the server 2630 and/or the user device 2610 instructs the user to take a test at least one day before the event to ensure the user's profile and wellness score are appropriately updated with the latest information but no longer than seven days before the event to avoid aging of the profile information. Thus, the algorithms described herein and as applied by the systems and methods described herein, may proactively assist users to help ensure they gain entry to the scheduled event.

In some embodiments, the server 2630 may integrate with external profiles, for example travel profiles, credit card profiles, payment services profiles, and the like. Such integration may allow the wellness score to be integrated with event information or the like. For example, if the individual purchases a plane ticket or event ticket, the server 2630 of the system 2600 may integrate the wellness score QR code described above (or corresponding information) with a QR code for the individual's plane or event ticket QR code or other barcode or identifier into a combined identifier. The combined identifier may represent the individual's wellness score, as well as, confirmation of payment for the flight or event. In some embodiments, instead of integrating with the external profiles, the server 2630 may provide sufficient information to enable the individual to manually integrate the wellness score QR code information with ticket barcode information (for example, via the ticket vendor, and so forth).

In some embodiments, the system 2600 may use biological samples from a surface (for example, a high contact surface), an environment (for example, a high-risk environment such as an infection testing location or medical professional's office), or an object to determine whether the surface, environment, or object was contaminated by a pathogen. For example, the third-party entity may use the testing device 2615 to determine whether the location may have been contaminated during the event and communicate that information to the server 2630 so that any users that visited the location during the event can be notified, via their user profiles and stored location information, of a possible exposure by visiting the location.

Figure 27:
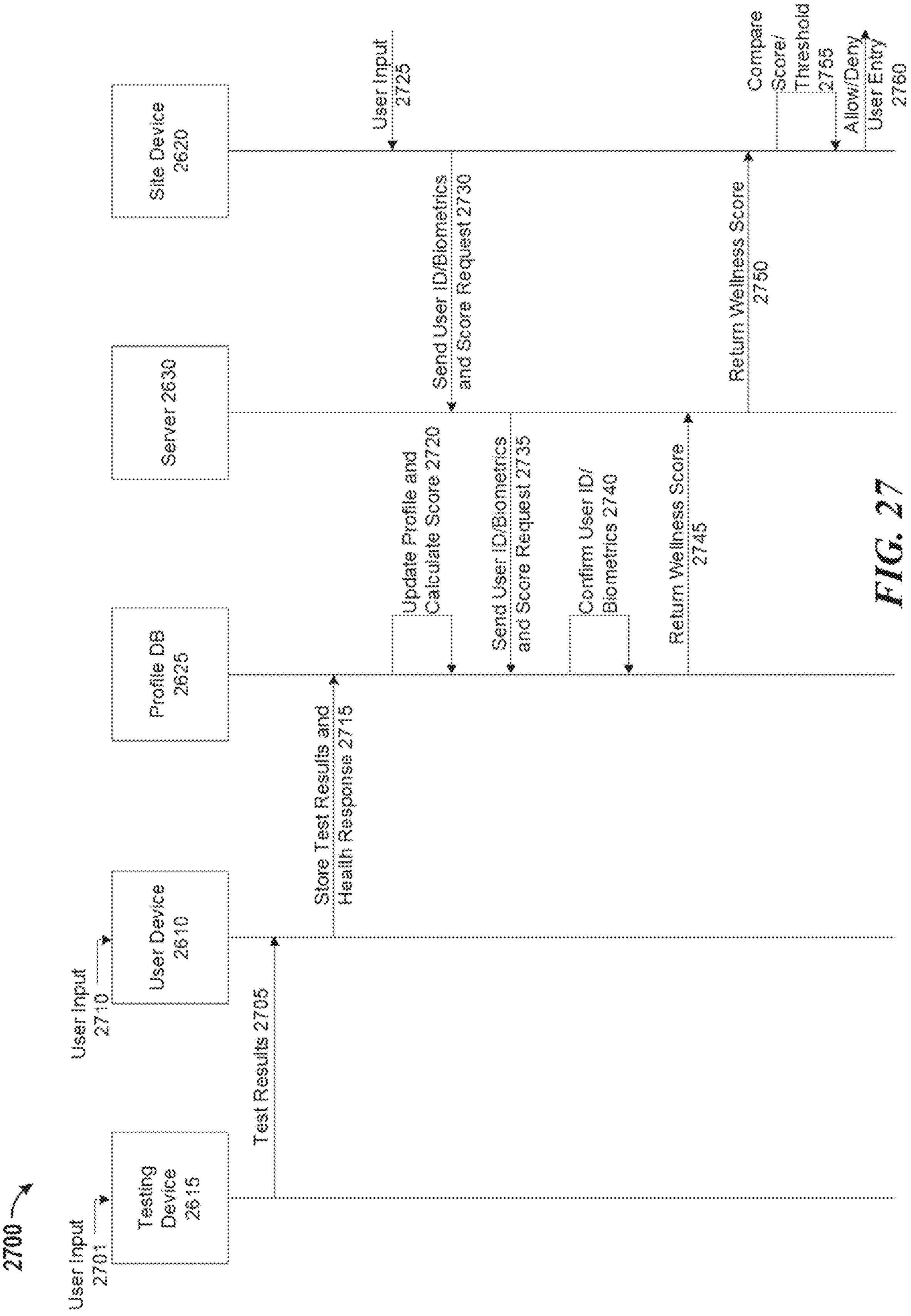
FIG. 27 is a flow diagram showing example interactions between components of the networked system of FIG. 26.

As described above, the networked system 2600 may enable the communications and interactions between the various components of the system 2600, for example the user device 2610, the testing device 2615, the site device 2620, the profile database 2625, and the server 2630. FIG. 27 is a flow diagram 2700 showing example interactions between components of the networked system 2600 of FIG. 26. The communications between these components may occur via one of the communication links described herein.

Though not shown in FIG. 27, the profile database 2625 may create the user profile for the user using the system 2600. Additionally, the interactions shown in FIG. 27 assume that the user has logged or signed into the user profile and/or the corresponding application on the user device 2610 that allows the user to take the test with the testing device 2615. The testing device 2615 may receive a user input at 2701, the user input comprising the user's biological (or other) sample to deposit in the testing device 2615 (for example, via the cartridge). The testing device 2615 may perform the corresponding test of the provided sample and generate test results, as described herein using the cartridge and the reader of the testing device 2615. These test results may then be communicated to the user device 2610, at 2710, and/or conveyed directly to the profile database 2625 via the network 2605, though not shown in FIG. 27. In some embodiments, before receiving the test results at 2705, the user provides biometric information and/or other identifying information or credentials to indicate an association with the test results and to indicate that the test results are to be associated with the user (and the user's profile).

The user device 2610 may further receive a user input 2710 that comprises one or more responses to health inquiries or surveys, temperature measurements, and so forth, that corresponds to health information for the user. The received test results from 2705 and the received responses or other health information from the user input 2710 are stored in the profile database 2625 at 2715. In some embodiments, the test results from 2705 and the health information from the user input 2715 are stored locally at the user device 2610 to enable the user device to process information and generate the wellness score.

The profile database 2625 may receive the information from the user device 2610 and/or the testing device 2615 and store the information in the profile database 2625 in the user profile associated with the user. Where the user profile already exists in the profile database 2625, as described above, the profile database 2625 may update the user profile and calculate the wellness score at 2720. Where the user profile does not already exist in the profile database 2625, the profile database 2625 may create the user profile, store the health information from the user device 2620 in the profile database 2625, and store the test results from the testing device 2615 in the profile database 2625, in the created user profile. Additionally, though not shown in FIG. 27, the user may provide credentials or authentication information to authenticate that the user is affiliated with or associated with the user profile. For example, the interaction between the user device 2610 and the profile database 2625 may include the user's identifying information or credentials or authentication information (for example biometrics information or username/password information). The profile database 2625 may associate each user profile with a particular user via the identifier and the biometrics information or username/password information. Thus, when the user provides the identifier and the biometrics information or credentials, the profile database 2625 may know which user profile to update based on the identifier and confirmation that the biometrics information or credentials are associated with the received test results and health information from 2715. Thus, at 2720, the profile database 2625 may determine which user profile to update based on the biometrics, identifying information, or credentials received from the user and update the corresponding user profile accordingly.

As described herein, the user that provides the user input 2701 and the user input 2710 may travel to a location using the site device 2620 and provide a user input 2725 to the site device 2620. The user input 2725 may comprise the identifier and credentials or biometric information to show that the user is the subject that the user claims to be. The credentials help ensure that the user's confidentiality is maintained and that all information associated with the user is properly affiliated with the user's profile. The user input 2725 is communicated to the server 2630, such that the user's identifier, credentials, and/or biometrics information are conveyed to the server 2630 along with a request for the user's wellness score. The site device 2620 may request the user's wellness score to determine whether the user can be allowed to enter the site or location of the site device 2620. In some embodiments, though not shown in FIG. 27, the site device 2620 may communicate directly with the profile database 2625. Instead, as shown in FIG. 27, the server 2630 acts as an intermediary between the site device 2620 and the profile database 2625. In some embodiments, the server 2630 operates to authenticate the site device 2620 to determine that the site device 2620 is allowed to access information from the profile database 2625 and use the system 2600.

When the server 2630 confirms that the site device 2620 is authenticated to use the system 2600 and access information from the profile database 2625, the server 2630 passes the user credentials and score request to the profile database 2625 at 2735. Based on the received user credentials and score request, the profile database 2625 may use the information in the user credentials and score request to confirm that the user is affiliated to the user profile identified by the user credentials at 2740. When the user credentials do match the user for the user profile, then the profile database 2625 may identify the wellness score and return the wellness score to the server 2630, which the server 2630 returns to the site device 2620 at 2750. When the profile database 2625 communicates with the site device 2620 directly, then the profile database 2625 returns the wellness score directly to the site device 2620, though not shown in FIG. 27.

The site device 2620 may compare the received wellness score to a threshold score value at 2755. This comparison, as described herein, may be used to determine whether the user is allowed or denied entry to the location or event. The site device 2620 then allows or denies entry for the user to the location at 2760. In some embodiments, the comparison of the wellness score and the threshold may occur at the server 2630.

Figure 28:
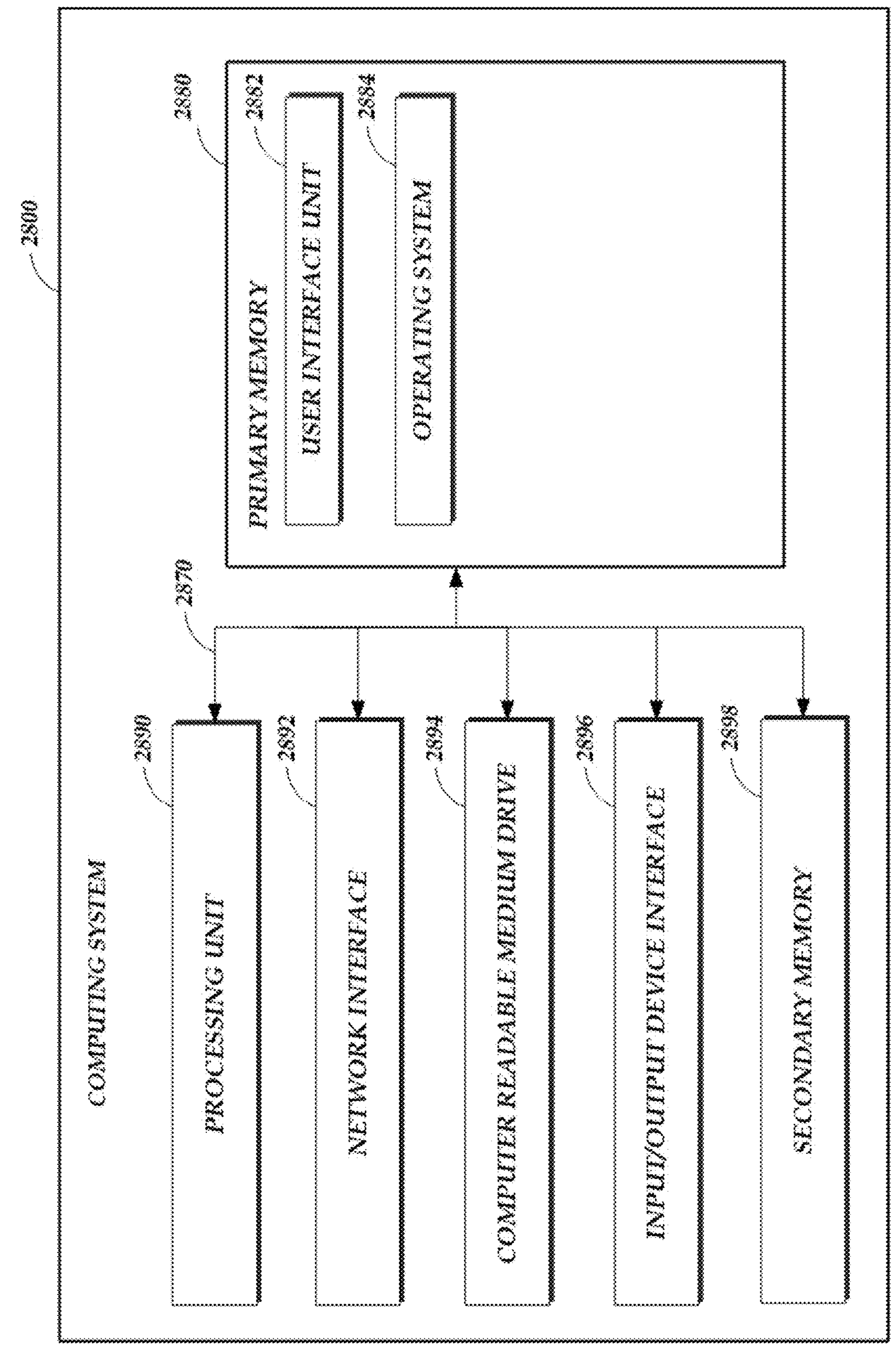
FIG. 28 depicts a general architecture of a computing device implementing one or more of the components of the system of FIG. 26.

FIG. 28 depicts a general architecture of a computing device implementing one or more of the components of the system of FIG. 26. The general architecture of the computing system 2800 depicted in FIG. 28 includes an arrangement of computer hardware and software that may be used to implement aspects of the present disclosure. The hardware may be implemented on physical electronic devices, as discussed in greater detail below. The software may be implemented by the hardware described herein. The computing system 2800 may include many more (or fewer) elements than those shown in FIG. 28. It is not necessary, however, that all of these generally conventional elements be shown in order to provide an enabling disclosure. Additionally, the general architecture illustrated in FIG. 28 may be used to implement one or more of the other components illustrated in FIG. 26.

As illustrated, the computing system 2800 includes a processing unit 2890, a network interface 2892, a computer readable medium drive 2894, and an input/output device interface 2896, all of which may communicate with one another by way of a communication bus 2870. The network interface 2892 may provide connectivity to one or more networks (for example, the network 2605) or computing systems (for example, the any of the components of the system 2600). The processing unit 2890 may thus receive information and instructions from other computing systems or services via the network 2605. The processing unit 2890 may also communicate to and from primary memory 2880 and/or secondary memory 2898 and further provide output information for an optional display (not shown) via the input/output device interface 2896. The input/output device interface 2896 may also accept input from an optional input device (not shown).

The primary memory 2880 and/or secondary memory 2898 may contain computer program instructions (grouped as units in some embodiments) that the processing unit 2890 executes in order to implement one or more aspects of the present disclosure. These program instructions are shown in FIG. 28 as included within the primary memory 2880 but may additionally or alternatively be stored within secondary memory 2898. The primary memory 2880 and secondary memory 2898 correspond to one or more tiers of memory devices, including (but not limited to) RAM, 3D XPOINT memory, flash memory, magnetic storage, cloud storage objects or services, block and file services, and the like. In some embodiments, all of the primary memory 2880 or the secondary memory 2898 may utilize one of the tiers of memory devices identified above. The primary memory 2880 is assumed for the purposes of description to represent a main working memory of the computing system 2800, with a higher speed but lower total capacity than secondary memory 2898.

The primary memory 2880 may store an operating system 2884 that provides computer program instructions for use by the processing unit 2890 in the general administration and operation of the computing system 2800. The memory 2880 may further include computer program instructions and other information for implementing aspects of the present disclosure. For example, in one embodiment, the memory 2880 includes a user interface unit 2882 that generates user interfaces (and/or instructions therefor) for display upon a computing device, e.g., via a navigation and/or browsing interface such as a web browser or software application installed on the computing device.

The computing system 2800 of FIG. 28 is one illustrative configuration of such a device, of which others are possible. For example, while shown as a single device, the computing system 2800 may, in some embodiments, be implemented as multiple physical host devices. In other embodiments, the computing system 2800 may be implemented as one or more virtual devices executing on a physical computing device. While described in FIG. 28 as a computing system 2800, similar components may be utilized in some embodiments to implement other devices shown in the system 2600 of FIG. 26.

EXAMPLES

Example 1

Figure 29:
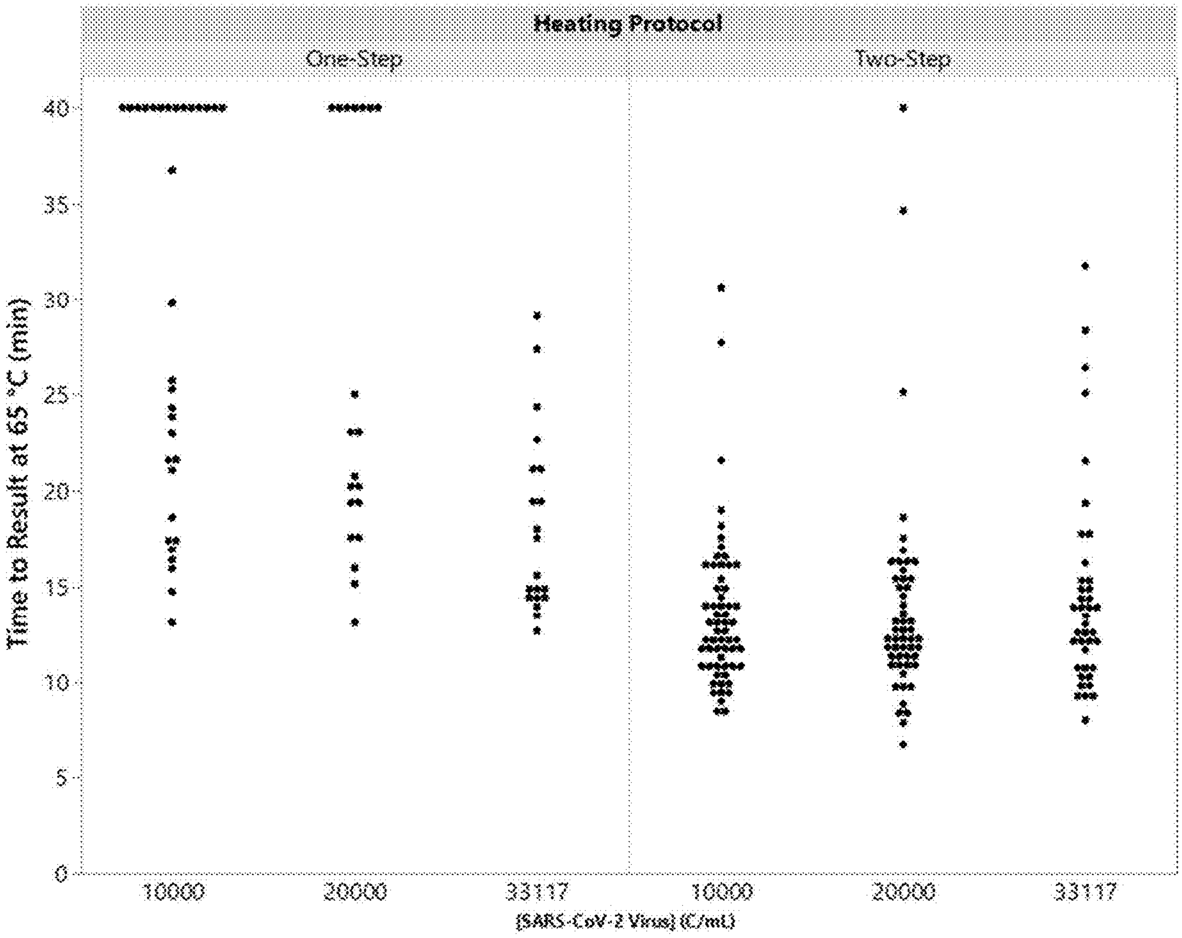
FIG. 29 depicts a comparison of LAMP amplification of SARS-CoV-2 gamma-inactivated virus using a one-step protocol comprising heating the sample for 40 min at 65° C., and a two-step protocol comprising heating the sample for 10 min at 50° C., then for 40 min at 65° C. Each point represents data from one well. Points at 40 min did not amplify.

A two-step protocol was performed, wherein LAMP protocols as described hereinabove were compared. An initial 50° C. reaction step was performed in one protocol, but not performed in the other. The "one step" protocol involved heating the sample for 40 minutes at 65° C., while the "two-step" protocol involved heating the sample for 10 minutes at 50° C., then for 40 minutes at 65° C. The sample was SARS-CoV-2 gamma-inactivated virus in 1% nasal fluid loaded into a be.well COVID-19 cartridge, (i.e., the system described herein utilizing selected SARS-CoV-2 primers SEQ ID NOs: 1-6) at concentrations of 33117 copies (C)/ml, 20,000 copies/ml and 10,000 copies/ml. All reagents with the exception of the assay buffer, nasal fluid and virus were lyophilized into the wells. The results are shown in FIG. 29. All result times reflect only the time at the LAMP reaction temperature of 65° C., not the reaction time at 50° C. plus the reaction time at 65° C. The results evidence that the two-step protocol greatly increased the number of wells that amplified at each concentration, and resulted in a lower limit of detection (LOD), than the one-step reaction conditions.

Example 2

Figure 30:
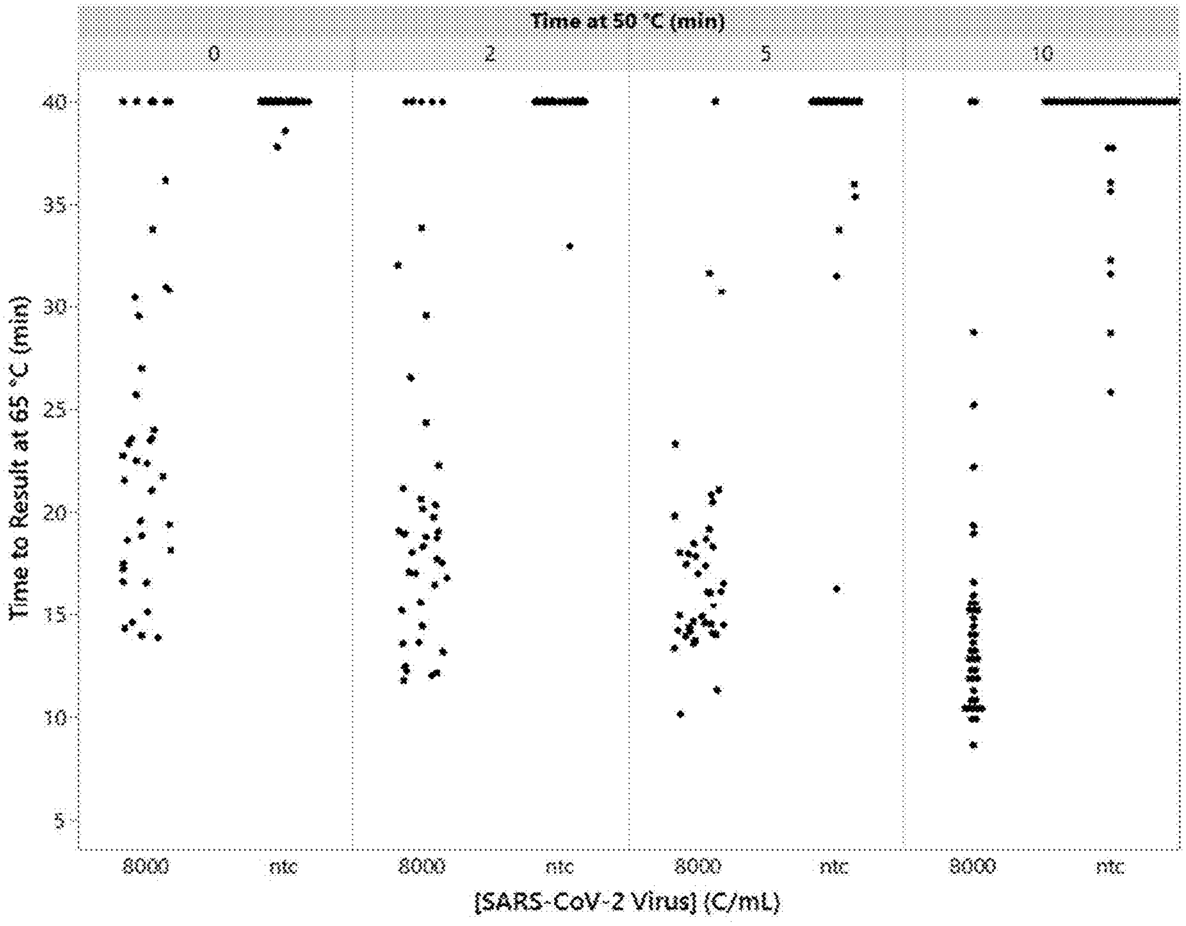
FIG. 30 depicts a comparison of the two-step protocol performed at 0, 2, 5, and 10 min at 50° C. Each point represents data from one well. Points at 40 min did not amplify.

The two-step protocol discussed above was compared using various reaction times at 50° C. In particular, the incubation was done at 0, 2, 5 and 10 min, with 0 min being equivalent to the one-step protocol. The sample was SARS-CoV-2 gamma-inactivated virus in 1% nasal fluid loaded into a be.well COVID-19 cartridge, (i.e., the system described herein utilizing SARS-CoV-2 primers SEQ ID NOs: 1-6) at concentrations of 8,000 and 0 C/ml. All reagents with the exception of the assay buffer, nasal fluid and virus were dried lyophilized into the wells. The results are shown in FIG. 30. All result times reflect only the time at the LAMP reaction temperature of 65° C., not the reaction time at 50° C. plus the reaction time at 65° C. The results indicate evidence that the two-step protocol at a reaction time at 50° C. for greater than 0 min improved detection at 8,000 C/ml, with the most consistent detection occurring at the 10-minute time point. The number of false positives also increased vs. control.

Example 3

Figure 31:
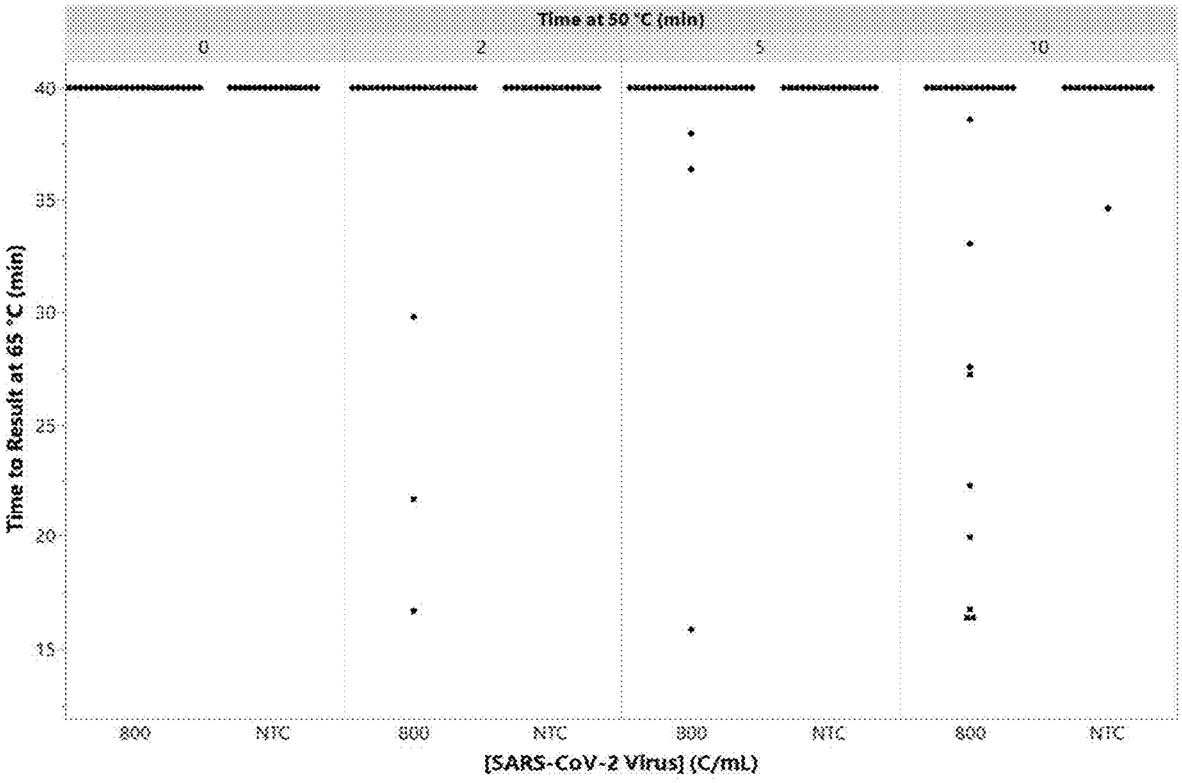
FIG. 31 depicts a comparison of the two-step protocol performed at 0, 2, 5, and 10 min at 50° C. using a low concentration of genomic viral RNA. Each point represents data from one well. Points at 40 min did not amplify.

The two-step protocol discussed above was compared using various reaction times at 50° C., and a low concentration of SARS-CoV-2 genomic RNA. In particular, the incubation was done at 0, 2, 5 and 10 min, with 0 min being equivalent to the one-step protocol. The sample was SARS-CoV-2 genomic RNA was loaded into a be.well COVID-19 cartridge (i.e., the system described herein utilizing SARS-CoV-2 primers SEQ ID NOs: 1-6). Concentrations were 800 and 0 C/ml. No nasal fluid was used, as this was intended to simulate a purified sample. All reagents with the exception of the assay buffer were dried lyophilized into the wells. The results are shown in FIG. 31. All result times reflect only the time at the LAMP reaction temperature of 65° C., not the reaction time at 50° C. plus the reaction time at 65° C. The results indicate evidence that the two-step protocol at a reaction time at 50° C. for greater than 0 min improved detection at 800 C/ml, with the most amplified replicates of the positive sample occurring at the 10-minute time point.

Example 4

Figure 32:
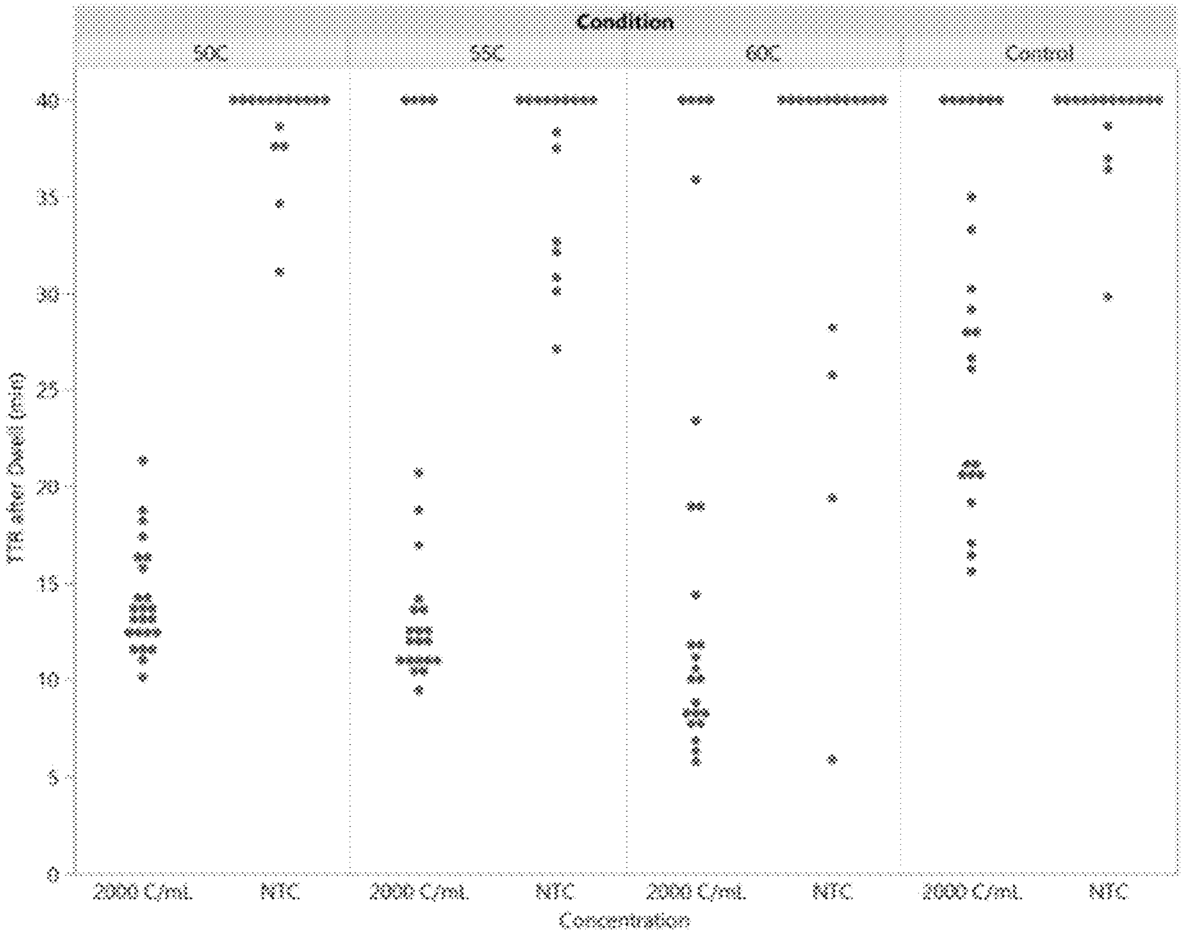
FIG. 32 depicts a comparison of the two-step protocols at 50° C., 55° C., and 60° C. using two different RNAse inhibitors. Each point represents data from one well. Points at 40 min did not amplify.

The two-step protocol discussed above was performed at various temperatures using a first alternate RNase inhibitor, which has a higher temperature tolerance than alternate RNase inhibitor, which has a temperature tolerance of 50° C. In particular, the two-step temperatures were 50° C., 55° C., 60° C., or none (one-step equivalent). SARS-CoV-2 gamma-inactivated virus in 1% nasal fluid was loaded into a be.well COVID-19 cartridge (i.e., the system described herein utilizing SARS-CoV-2 primers SEQ ID NOs: 1-6). Positive sample concentration was 2,000 C/mL. All reagents with the exception of the assay buffer, nasal fluid and virus were dried lyophilized into the wells. The results are shown in FIG. 32. All result times reflect only the time at the LAMP reaction temperature of 65° C., not the reaction time at 50° C. plus the reaction time at 65° C. The results indicate that despite the higher temperature tolerance of the two RNase inhibitors, 50° C. appears to be the optimal desirable temperature for the two-step protocol, and showed provided the most consistent amplification of true positive wells with no overlap between positives and false positives.

Additional Improvements

Traditionally, nucleic acid amplification and detection techniques, as described herein, involve various steps, including multiple pipetting steps for preparing for the amplification and detection techniques. Additionally, these techniques also often involve setting up various reagents (or reagent mixes), such as enzymes, primers and dNTP, for use in the amplification and detection techniques. Any of these steps can introduce errors, which can, in turn, lead to error-prone results in the amplification and detection. Additionally, the reagents may need a cold-chain compartment or facility to maintain stability of the reagents during storage and transportation. However, as described above, the systems and methods described herein utilize a dried, pre-optimized enzymatic reagent or reagent mix in the test cartridge, which overcomes these issues. The dried reagent, which is stable and ready-to-use for nucleic acid amplification, can be safely stored and transported in or via the test cartridges for use on demand with one of the readers described herein. As also described herein, when used to detect pathogens, genomic materials, proteins, and/or other small molecules or biomarkers, the test cartridge receives a sample deposited into a well (for example, via a swab or pipette). The sample is then mixed with the dried reagent(s) in the cartridge when the cartridge is inserted into the reader, thereby rehydrating the dried reagent(s) to further the testing. Three different improvements to the testing process are provided below to improve the general amplification and detection techniques.

Mixing Improvements

In the process described above, rapid rehydration of the reagent(s) by the sample and effective mixing with the sample is necessary for good assay performance (for example, accurate and consistent test results), which may include high sensitivity and amplification efficiency. While passive diffusion or mixing of the reagent with the sample and heat energy for rehydration may result in sensitivity and amplification efficiency that meets a minimum threshold, such a mixing strategy may, in some instances, not be sufficiently effective. Improved methods or strategies may include introducing various components to improve mixing, for example mixing beads, which may be magnetic.

In some alternatives, magnetic beads (or similar magnetic or mixing objects of non-magnetic materials, hereafter magnetic beads) inserted into a mixing chamber (for example, the mixing well 224 or test well 1258) may enhance the rehydration and mixing of the reagents with the sample. The magnetic beads may exist in the mixing chamber of the test cartridge when packaged with the reagents (for example, the magnetic beads may be inserted into the mixing chamber when or prior to when the reagents are inserted or injected into the mixing chamber). In some instances, the magnetic beads are movable by shaking the test cartridge (for example, the user shaking the reader once the test cartridge with the sample is inserted into the reader). Alternatively, or additionally, the user can move the magnetic beads by a magnetic field, sonic waves, oscillations, vibrations, sonication, shaking, or similar contact or non-contact methods to ensure the improvement to the rehydration and mixing between the sample introduced into the test cartridge and mixed with the reagent. In some embodiments, these fields, forces, and movements are generated by one or more of a magnetic field generator (for example a permanent magnet or an electromagnet), a vibration generator, a sonic generator, and physical movement In some embodiments, the reagent may be a dry or dried reagent or a liquid reagent.

The movement of the magnetic beads will help mix and combine the reagent with the sample, similar to physical mixing devices (mixers, stirring devices, and so forth) assist in mixing larger quantities of mixture. The analyzer may employ one or more corresponding components that causes the magnetic field (for example, an electromagnet) or other fields by which the magnetic beads are moved within the mixing chamber of the test cartridge. Thus, the analyzer may cause the magnetic beads in the test cartridge to mix the reagent mix with the sample using the electromagnet.

In some embodiments, the analyzer includes a single electromagnet installed in the analyzer at a position near a top edge or portion (or any other directional portion) of the mixing chamber when the test cartridge is installed in the analyzer. After the sample and reagent is loaded into the mixing chamber and the test cartridge is inserted into the analyzer, the magnetic beads are moved through the mixing chamber and the reagent and sample (for example, pulled towards the top of the mixing chamber by the magnetic field of the electromagnet). This mixing action will speed up reagent rehydration and mixing with the sample mechanically.

In some embodiments, the analyzer comprises two or more electromagnets, one located near the top of the mixing chamber when the test cartridge is inserted into the analyzer and a second located near a bottom (or other directional portion that is opposite the top portion) of the mixing chamber when the test cartridge is inserted into the analyzer. The electromagnets may have a fixed position or moving/movable positions and/or orientations relative to each other and the mixing chamber. When the test cartridge is inserted into the analyzer, the sample and reagent mixture is delivered to the reaction wells of the test cartridge. At the same time, a mechanism can be triggered to switch the position of the electromagnets (or otherwise change the field affecting the magnet beads or other mixing objects) to manipulate the magnetic field (or other field) in a way that induces magnetic bead (or mixing object) movement and enhanced mixing. In some embodiments, the electromagnet(s) is controllable such that the magnetic field from each electromagnet can be turned off/on. In embodiments where there is only a single electromagnet or permanent magnet, the magnetic field may not be controllable. In some embodiments, various parameters of the field or force applied to the mixing object can be varied or controlled by the user to control the movement of the mixing object to control the mixing of the reagent and the sample. Such control may be provided by a control circuit or similar component.

Reducing Inhibitor Impact

As noted above, the sample is mixed with the reagent to perform the testing. For example, the analyzer and test cartridges enable detection of nucleic acid targets in human biological samples or tissues without nucleic acid purification. In some embodiments, the biological samples or tissues include inhibitors that reduce an efficacy or capabilities of the testing of the sample with the reagent. For example, human samples such as nasal fluid and saliva contain one or more of lactoferrin, lysozyme, RNases, DNases, or other nuclease, which can either inhibit reverse transcriptase enzymes or degrade viral target RNA. Thus, the inhibitors in the samples can reduce the detection sensitivity of the test.

By reducing the effects or impacts of the inhibitors in the samples, the tests can provide improved detection sensitivities. In some embodiments, antibodies, proteinase, Aptamers, high affinity competitive binding proteins, or other agents (hereinafter antibodies) are added to the sample (for example, in the mixing chamber) by including the antibodies in the reagent or by introducing the antibodies into the mixing chamber independently. Thus, the antibodies can be added directly to the sample and reagent buffer. In some embodiments, activity of proteinase, such as proteinase K, will be inactivated by a chemical activated heater.

Alternatively, or additionally, one or more of the swab assembly insertion point 1208, the transition point 1216 and a fluid path of the test cartridge, and the mixing chamber are coated with the antibodies, allowing the sample and the reagent to mix with the antibodies and reduce the impact of the inhibitors in the sample as the sample flows through the test cartridge and into the mixing chamber. Thus, by coating the cartridge sample collection port and/or the wall of the fluid channels with antibodies, during the process of sample collection and delivery, these components of the sample will interact and bind to the antibodies. Therefore, the inhibitors can be removed from the reaction of the viral target amplification and detection. In some embodiments, one or more of the cartridge sample collection port, the mixing chamber, a test well, and the fluid channels includes an antibody that reduces effects of inhibitors that exist in the sample (for example, as a coating on a wall or similar surface relative to the cartridge sample collection port, the mixing chamber, a test well, and the fluid channels or injected into or otherwise released into the sample, reagent, or sample/reagent mixture).

Sample Deposit Improvements

Certain biological samples may include various components that may affect efficacy of the test performed on the sample. For example, nasal fluid or saliva samples from humans contain high concentration of inorganic salts, antimicrobial enzyme lysozymes, immunoglobulins, and glycoproteins such as lactoferrin and mucins. The amplification described herein may be RT-LAMP that detects the viral RNA or DNA in the sample. The inorganic salts, such as NaCl, in the sample will affect or interact with the salt concentration of the reagent and the Tm (melting temperature, the temperature at which an oligonucleotide is 50% annealed to its template) of the RT-LAMP assay primers. Thus, the inorganic salts may cause nonspecific amplification issues based on these interactions. The RNase in the sample may cause viral RNA target degradation, and other proteins in the sample may inhibit the enzyme activity for downstream target detection, as described above.

In many instances, a pipette or a swab may be used to deposit the sample into the test cartridge. The pipette and swab may be designed to minimize any effects on the sample. A replacement sample insertion device may be used to actively effect the sample, more specifically, to remove the salt and proteins in the sample, and generate a "purified" sample. The sample insertion device may load the purified sample directly into the test cartridge so that the purified sample can be tested as described herein without effect from the salts and other proteins.

Figure 33:
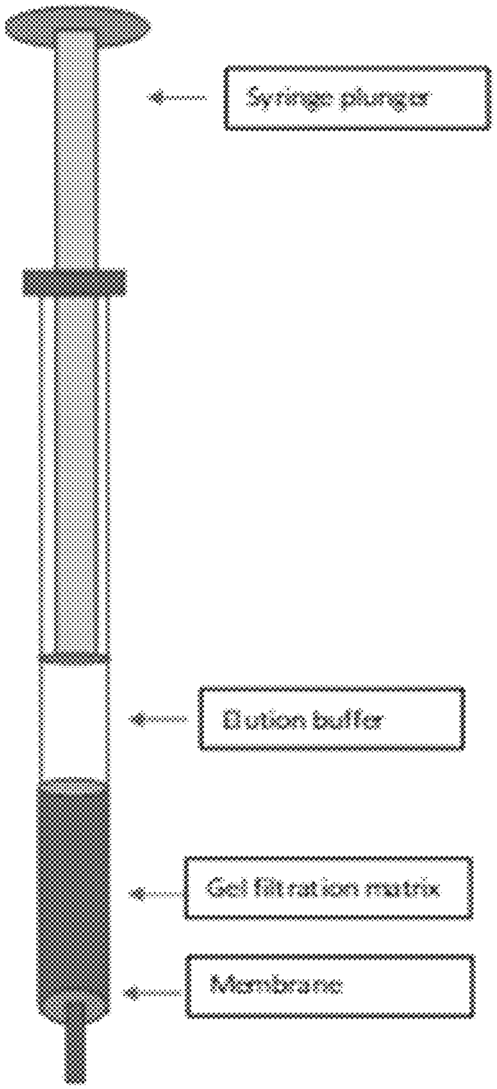
FIG. 33 depicts the sample insertion device that can deposit the purified sample into the test cartridge.

FIG. 33 depicts the sample insertion device 3300 that can deposit the purified sample into the test cartridge. The sample insertion device 3300, as shown, includes a plunger 3302, a body 3304 in which the plunger moves when a force is applied thereto to dispense any contents of the body 3304, and a tip 3306. The tip 3306 may have a smaller size or diameter as compared to the body 3304 to enable insert of the tip 3306 into a receiving component (for example, the sample insertion area of the test cartridges described herein, a test tube, and so forth). When the plunger 3302 is depressed, the contents of the body 3304 are dispensed or ejected via the tip 3306.

The sample insertion device 3300 may be structurally similar to a syringe, with certain modifications:

1. A membrane 3316 for large protein or glycoprotein molecule removal, where the membrane 3316 captures or otherwise holds the large protein or glycoprotein molecule so that it is not released when the sample is deposited.
2. A gel filtration bead bed or matrix or resin matrix 2614 (hereafter gel filtration bead bed 2614) that traps salts inserted into the sample insertion device 3300 so that the salts are not released when the sample is deposited. The gel filtration bead bed 2614 (or similar material or component) may operate as a size-exclusion material or molecular weight cutoff filter to limit what molecules, etc., can pass through the gel filtration bead bed 2614 (or similar component) based on physical size or weight, among other features of the sample in the sample insertion device 3300.

3. An elution and/or lysis buffer 3312 for sample collection and introductory extraction of the target agent from the sample in the body 3304. The elution and/or lysis buffer 3312 may be any buffer that assists in separating the target agent from the sample.
4. The body 3304 holds each of the gel filtration bead bed or matrix 3314 and the elution and/or lysis buffer 3312.
5. The plunger 3302 for pushing the sample through the body 3304 of the sample insertion device 3300.
6. The tip 3306 for delivering the pass-through purified sample into the test cartridge, where the membrane 3316 is disposed between the tip 3306 and the body 3304.

When using the sample insertion device 3300, the sample insertion device 3300 receives the sample. More specifically, the sample is eluted into the elution buffer 3312 in the sample insertion device 3300. This may be done by removing the plunger 3302 from the sample insertion device 3300. Then, the tip 3306 of the sample insertion device 3300 is inserted into the test cartridge, for example into the swab assembly insertion point 1208 or similar collection port. The plunger 3302 is inserted (or re-inserted) into the sample insertion device 3300 and used to push the sample within the body 3304 through the gel filtration bead bed and/or matrix 2614 and the membrane 3316 to deliver the purified sample into the test cartridge.

In some embodiments, any of the improvements described with respect to the Additional Improvements can be integrated or otherwise used together. Furthermore, one or more of these improvements may be integrated with one or more of the testing systems described herein (for example, the testing devices, test cartridges, and readers used in conjunction with the systems and methods of tracking infection potential, as described above). The systems and methods of determining wellness scores for users or individuals may include or utilize one or more primers described herein are able to implement or realize the limits of detection (LOD) described herein with reference to two-step incubation and improve tests performed by the testing device using any improvements described in the Additional Improvements.

Example Methods of Sample Collection and Testing

Figure 34A:
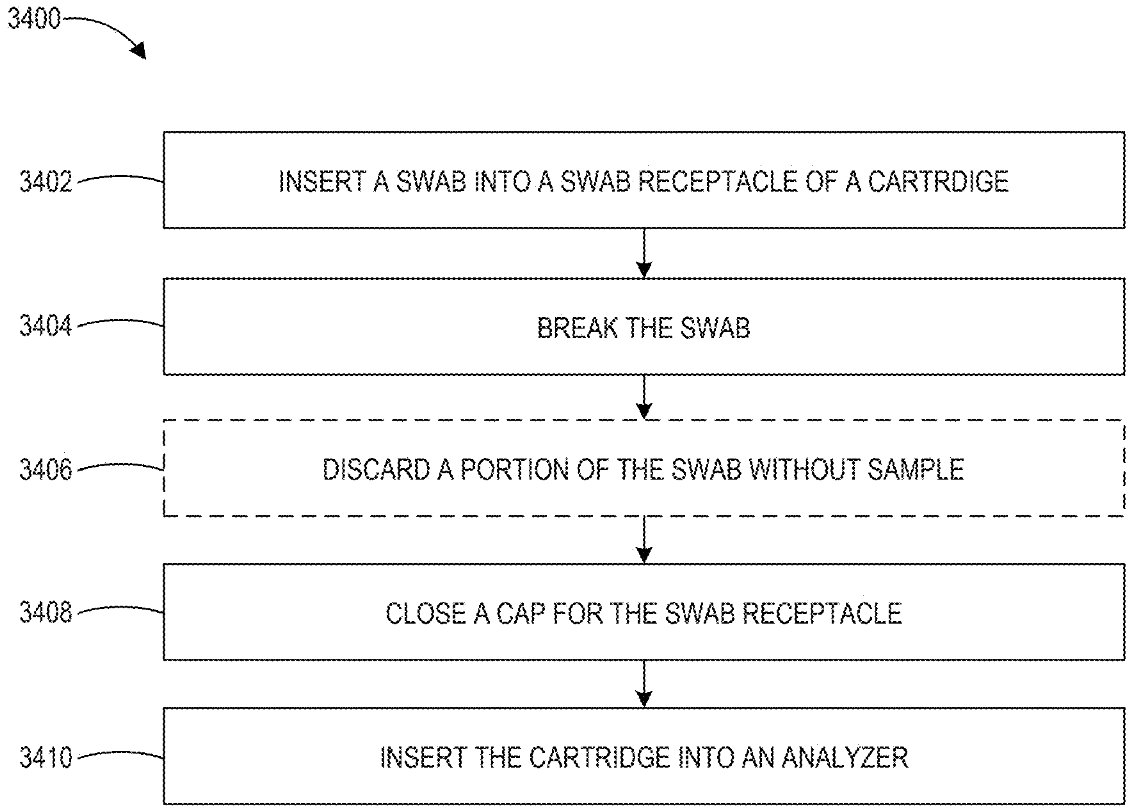

FIG. 34A illustrates a flowchart of a method 3400 of collecting samples and testing the collected samples using, for example, the cartridge 1300 and the analyzer 1400 described herein. At block 3402, a swab is inserted into the swab receptacle 1342. For example, the swab may be inserted into the swab receptacle 1342 until the bristles or flock of the swab moves past the scraper 1350 and towards the bottom of the swab receptacle 1342. At block 3404, the swab is broken or cut while positioned inside the swab receptacle 1342. Once broken or cut, a portion of the swab with the bristles or flock (for example, a portion with mucus or other types of samples) can remain in the swab receptacle 1342 and a remaining portion of the swab (for example, a portion without mucus or other types of samples) may be discarded optionally at block 3406. At block 3408, the cap 1310 of the swab receptacle 1342 is closed. Once the cap 1310 is closed, the portion of the swab with mucus or other types of samples is retained inside the swab receptacle 1342. At block 3410, the cartridge 1300 is inserted into the analyzer 1400 for testing.

Figure 34B:
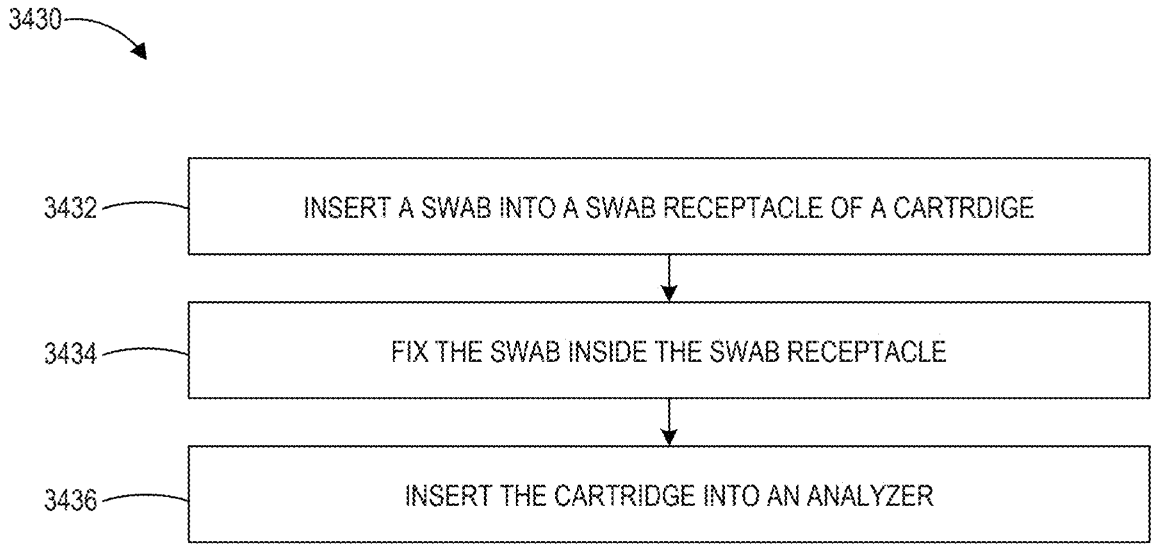

FIG. 34B illustrates a flowchart of a method 3430 of collecting samples and testing the collected samples using, for example, the cartridge 1300 and the analyzer 1400 described herein. At block 3432, a swab is inserted into the swab receptacle 1342 of the cartridge 1300. As described herein, the swab may be inserted into the swab receptacle 1342 past the scraper 1350 (for example, moving beyond the scraper 1350 towards the bottom portion of the swab receptacle). At block 3434, the swab is fixed in position inside the swab receptacle 1342. For example, the swab receptacle 1342 includes the retainer 1380 as described herein that can hold the swab in place while positioned within the swab receptacle 1342. While the swab is held in place within the swab receptacle 1342, the cartridge 1300 can be inserted into the analyzer 1400.

FIG. 34C illustrates a flowchart of a method 3450 of collecting samples and testing the collected samples using, for example, the cartridge 1300 and the analyzer 1400 described herein. At block 3452, the integrated rupture feature (for example, a blister) 1344 of the cartridge 1300 is pressed. Pressing the integrated rupture feature 1344 can rupture a membrane between the integrated rupture feature 1344 and the reagent blister 1340, and cause solution (or solutions) previously stored inside the integrated rupture blister 1344 to be released into the swab receptacle 1342. The integrated rupture feature 1344 can store a buffer and/or a reagent needed for testing the collected samples. At block 3454, a swab is inserted into the swab receptacle 1342 of the cartridge 1300. At block 3456, the swab, while positioned inside the swab receptacle 1342, is twisted or rotated once or a plurality of times e.g., 1, 2, 3, 4, 5, 6, 7, 8, 9, or 10 twists or revolutions. This can help the liberation of mucus or other types of samples from, for example, the bristles or flock of the swab. In some examples, the swab is twisted or rotated five times. At block 3458, the swab is removed from the swab receptacle 1342. At block 3460, the swab receptacle 1342 is sealed by closing the cap 1310. Closing the cap 1310 ensures that the collected sample does not leak out from the swab receptacle 1342. At block 2962, the reagent blister 1340 is pressed. Pressing the reagent blister 1340 can facilitate solution stored inside the reagent blister 1340 (which can include both the solution previously stored inside the integrated rupture blister and the solution previously stored inside the reagent blister) to towards, for example, the sample mixing and macrofiltration region 1330 of the cartridge 1300.

Table 1 below shows different parameters, test settings, and test results from using three different sample collection methods (that is, Control, Pre-Rupture, and Swab Leave-in).

TABLE 1

Performance Test Results using Various Sample Collection Methods

| Study | Control | Pre-Rupture | Swab Leave-in |
|---|---|---|---|
| Cartridges Run | 20 | 18 | 18 |
| Swab Workflow | Scraping | Pre-Rupture | Leave-in |
| Volume/Swab | 40 μL | 10/30/50 μL | 10/30/50 μL |

TABLE 1-continued

Performance Test Results using Various Sample Collection Methods

| Study | Control | Pre-Rupture | Swab Leave-in |
|---|---|---|---|
| Copies/Swab | 2760 | 2760 | 2760 |
| Cart. Hit Rate | 95% | 100% | 100% |
| Well Hit Rate | 50% | 74.07% | 94.44% |
| Mean TTR | 25.48 | 23.18 | 20.44 |

The "Cartridges Run" can represent the number of cartridges tests for each of the different sample collection methods. As shown above, 20 cartridges were tested for the Control method, 18 cartridges for the Pre-Rupture method, and 18 cartridges for the Swab Leave-in method.

The "Swab Workflow" can represent the method of collecting a sample from the swab 1360. The Control method can include inserting a sample collection device (for example, the swab 1360) into the swab receptacle 1342, rotating the sample collection device a predetermined number of times (for example, five times) inside the swab receptacle 1342, and removing the sample collection device from the swab receptacle 1342. The Swab Leave-in method can include, for example, leaving at least a portion of a sample collection device (for example, the swab 1360) with bristles or flock (or a portion containing the sample) in the swab receptable 1342 of the cartridge 1300 during sample tests. The Pre-Rupture method can include, for example, using the reagent blister 1340 and the integrated rupture feature 1344 to release buffer and/or reagent to mix with the collected sample as described herein.

The "Volume/Swab" can represent the amount of sample added to a sample collection device (for example, the swab 1360). As shown in the table above, 40 μL of the sample (for example, a solution including a target agent) was added to the sample collection device for the Control method, whereas varying amounts of the same was added to the sample collection device for the Pre-Rupture and the Swab Leave-in method.

The "Copies/Swab" can represent the number of copies generated from the sample collected from the swab 1360. In the performance test results shown in Table 1, the same number of copies (that is, 2760) were generated for all three methods.

The "Cart. Hit Rate" can represent a rate at which at least one reaction well of a given cartridge returns a positive detection of, for example, a target agent. For example, if one cartridge was tested and if a target agent is detected from at least one of reaction wells of the cartridge, then the "Cart. Hit Rate" for the cartridge would be 100%. On the other hand, if one cartridge was tested and if a target agent is not detected in any of the reaction wells of the cartridge, then the "Cart. Hit Rate" for the cartridge would be 0%. As such, higher "Cart Hit Rate" can indicate better accuracy of a given test method.

The "Well Hit Rate" can represent the percentage of reaction wells that, for example, detect the target agent. If a given cartridge has 20 reaction wells and the target agent was detected in 18 of the 20 reaction wells, the "Well Hit Rate" of the given cartridge would be 80%, whereas its "Cart. Hit Rate" would be 100% (since the target agent was detected from at least one of its reaction wells).

The "Mean TTR" can represent a mean (average) time it took to provide test results.

As shown in the table above, both the Pre-Rupture and the Swab Leave-in methods yielded higher "Cart. Hit Rate" and "Well Hit Rate" than the Control method, which indicates that both the Pre-Rupture and the Swab Leave-in methods are more accurate than the Control method. In addition, both the Pre-Rupture and the Swab Leave-in methods yielded smaller "Mean TTR" than the Control method, which indicates that both the Pre-Rupture and the Swab Leave-in methods can provide test results faster than the Control method.

ADDITIONAL DETAILS

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The term "comprising" as used herein is synonymous with "including," "containing," or "characterized by," and is inclusive or open-ended and does not exclude additional, unrecited elements or method steps. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The articles "a" and "an" are used herein to refer to one or to more than one (for example, at least one) of the grammatical object of the article. By way of example, "an element" means one element or more than one element.

The terms "about" or "around" as used herein refer to a quantity, level, value, number, frequency, percentage, dimension, size, amount, weight or length that varies by as much as 30, 25, 20, 15, 10, 9, 8, 7, 6, 5, 4, 3, 2 or 1% to a reference quantity, level, value, number, frequency, percentage, dimension, size, amount, weight or length.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

All references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

What is claimed is:

1. An assay cartridge for containing a sample comprising a target agent for detection by a reader device, the assay cartridge comprising:

a sample introduction area configured to receive a sample carrier containing the sample, the sample carrier comprising a shaft and a flange positioned on the shaft, the sample introduction area comprising a retention feature configured to accept and retain the sample carrier, the retention feature comprising a closure, the closure comprising a first end proximate an exterior of the assay cartridge and a second end extending into an interior of the sample introduction area, the second end comprising one or more recess, the first end comprising a first interior diameter, the second end comprising a second interior diameter, wherein the second interior diameter is smaller than the first interior diameter, wherein, in an undilated conformation, the second interior diameter is smaller than an outer diameter of the flange of the sample carrier, the closure configured to allow passage of the sample carrier to a sample introduction position by allowing the flange of the sample carrier to travel from the first end to the second end, dilating the closure by widening the one or more recess, the closure configured to return to an undilated conformation after passage of the flange past the second end, wherein, in the sample introduction position, at least a portion of the sample carrier is positioned within the sample introduction area, and wherein the closure is configured to, when the sample carrier is positioned in the sample introduction position, prevent or inhibit the sample carrier from exiting the sample introduction area by preventing the flange from exiting past the second end;

a mixing region configured to mix the sample with a reagent to generate a sample mixture;

at least one mixing object disposed in the mixing region and configured to move within the mixing region to enhance mixing of the sample with the reagent in response to a force applied to the mixing region;

a test well containing an excitation electrode and a sensing electrode, wherein the test well is configured to contain at least a portion of the sample mixture undergoing an amplification process; and a fluid path fluidically coupling the sample introduction area to the mixing region and the mixing region to the test well.

2. The assay cartridge of claim 1, wherein the sample carrier comprises a swab.

3. The assay cartridge of claim 1, wherein the closure comprises a plastic.

4. The assay cartridge of claim 3, wherein the plastic comprises a polyethylene.

5. The assay cartridge of claim 1, wherein the retention feature comprises an o-ring configured to contact the flange and hold the flange against the second end of the closure.

6. The assay cartridge of claim 5, wherein the o-ring comprises an elastomer.

7. The assay cartridge of claim 6, wherein the elastomer has a hardness between Shore 0A and Shore 60A.

8. The assay cartridge of claim 6, wherein the elastomer comprises a santoprene.

9. A sample cartridge comprising:

a sample introduction area configured to receive a swab containing a sample, the swab comprising a shaft and a flange positioned on the shaft, the sample introduction area comprising:

a swab retention feature, the swab retention feature configured to allow passage of the swab to a sample introduction position, wherein, in the sample introduction position, at least a portion of the swab is positioned within the sample introduction area, and wherein the swab retention feature is configured to, when the swab is positioned in the sample introduction position, prevent or inhibit the swab from exiting the sample introduction area, the swab retention feature comprising a closure, the closure comprising a first end proximate an exterior of the sample cartridge and a second end extending into an interior of the sample introduction area, the second end comprising one or more recess, the first end comprising a first interior diameter, the second end comprising a second interior diameter, wherein the second interior diameter is smaller than the first interior diameter, wherein, in an undilated conformation, the second interior diameter is smaller than an outer diameter of the flange of the swab, the closure configured to allow passage of the swab to a sample introduction position by allowing the flange of the swab to travel from the first end to the second end, dilating the closure by widening the one or more recess, the closure configured to return to an undilated conformation after passage of the flange past the second end;

a test well comprising an excitation electrode and a sensing electrode, wherein the test well is configured to contain at least a portion of a fluid mixture comprising the sample; and a fluid path fluidically coupling the sample introduction area to the test well.

10. The sample cartridge of claim 9, wherein the closure comprises a plastic.

11. The sample cartridge of claim 10, wherein the plastic comprises a polyethylene.

12. The sample cartridge of claim 9, the swab retention feature comprising an o-ring configured to contact and hold the flange of the swab against the closure.

13. The sample cartridge of claim 12, wherein the o-ring comprises an elastomer.

14. The sample cartridge of claim 13, wherein the elastomer has a hardness between Shore 0A and Shore 60A.

15. The sample cartridge of claim 13, wherein the elastomer comprises a santoprene.

16. The sample cartridge of claim 9, wherein the first interior diameter is larger than the outer diameter of the flange.

17. The assay cartridge of claim 1, wherein the first interior diameter is larger than the outer diameter of the flange.

* * * * *

SEQUENCE LISTING

<160> NUMBER OF SEQ ID NOS: 204

<210> SEQ ID NO 1
<211> LENGTH: 19
<212> TYPE: DNA
<213> ORGANISM: Artificial Sequence
<220> FEATURE:
<223> OTHER INFORMATION: Primer SARS-CoV-2_Set 1_F3

<400> SEQUENCE: 1
ttcaccgctc tcactcaac 19

<210> SEQ ID NO 2
<211> LENGTH: 43
<212> TYPE: DNA
<213> ORGANISM: Artificial Sequence
<220> FEATURE:
<223> OTHER INFORMATION: Primer SARS-CoV-2_Set 1_FIP

<400> SEQUENCE: 2
ggactgctat tggtgttagg caaggaagac cttaaattcc ctc 43

<210> SEQ ID NO 3
<211> LENGTH: 21
<212> TYPE: DNA
<213> ORGANISM: Artificial Sequence
<220> FEATURE:
<223> OTHER INFORMATION: Primer SARS-CoV-2_Set 1_LF

<400> SEQUENCE: 3
attggaacgc cttgtcctcg a 21

<210> SEQ ID NO 4
<211> LENGTH: 36
<212> TYPE: DNA
<213> ORGANISM: Artificial Sequence
<220> FEATURE:
<223> OTHER INFORMATION: Primer SARS-CoV-2_Set 1_BIP

<400> SEQUENCE: 4
atgaccaaat tggctactac cgtcaccacc acgaat 36

<210> SEQ ID NO 5
<211> LENGTH: 23
<212> TYPE: DNA
<213> ORGANISM: Artificial Sequence
<220> FEATURE:
<223> OTHER INFORMATION: Primer SARS-CoV-2_Set 1_LB

<400> SEQUENCE: 5
accgaagagc taccagacga att 23

<210> SEQ ID NO 6
<211> LENGTH: 26
<212> TYPE: DNA
<213> ORGANISM: Artificial Sequence
<220> FEATURE:
<223> OTHER INFORMATION: Primer SARS-CoV-2_Set 1_B3

<400> SEQUENCE: 6
ccatcttgga ctgagatctt tcattt 26

<210> SEQ ID NO 7
<211> LENGTH: 19
<212> TYPE: DNA
<213> ORGANISM: Artificial Sequence
<220> FEATURE:
<223> OTHER INFORMATION: Primer SARS-CoV-2_Set 2_F3

<400> SEQUENCE: 7
tacgcagaag ggagcagag 19

<210> SEQ ID NO 8
<211> LENGTH: 38
<212> TYPE: DNA
<213> ORGANISM: Artificial Sequence
<220> FEATURE:
<223> OTHER INFORMATION: Primer SARS-CoV-2_Set 2_FIP

<400> SEQUENCE: 8
tgcctggagt tgaatttctc aagcctcttc tcgttcct 38

<210> SEQ ID NO 9
<211> LENGTH: 26
<212> TYPE: DNA
<213> ORGANISM: Artificial Sequence
<220> FEATURE:
<223> OTHER INFORMATION: Primer SARS-CoV-2_Set 2_LF

<400> SEQUENCE: 9
tgaactgttg cgactacgtg atgagg 26

<210> SEQ ID NO 10
<211> LENGTH: 38
<212> TYPE: DNA
<213> ORGANISM: Artificial Sequence
<220> FEATURE:
<223> OTHER INFORMATION: Primer SARS-CoV-2_Set 2_BIP

<400> SEQUENCE: 10
aggggaactt ctcctgctaa gcaagagcag catcaccg 38

<210> SEQ ID NO 11
<211> LENGTH: 20
<212> TYPE: DNA
<213> ORGANISM: Artificial Sequence
<220> FEATURE:
<223> OTHER INFORMATION: Primer SARS-CoV-2_Set 2_LB

<400> SEQUENCE: 11
agaatggctg gcaatggcgg 20

<210> SEQ ID NO 12
<211> LENGTH: 18
<212> TYPE: DNA
<213> ORGANISM: Artificial Sequence
<220> FEATURE:
<223> OTHER INFORMATION: Primer SARS-CoV-2_Set 2_B3

<400> SEQUENCE: 12
atctgtcaag cagcagca 18

<210> SEQ ID NO 13
<211> LENGTH: 17
<212> TYPE: DNA
<213> ORGANISM: Artificial Sequence
<220> FEATURE:
<223> OTHER INFORMATION: Primer SARS-CoV-2_Set 3_F3

<400> SEQUENCE: 13
ttgcaactga gggagcc 17

<210> SEQ ID NO 14
<211> LENGTH: 39
<212> TYPE: DNA
<213> ORGANISM: Artificial Sequence
<220> FEATURE:
<223> OTHER INFORMATION: Primer SARS-CoV-2_Set 3_FIP

<400> SEQUENCE: 14
ttgttccttg aggaagttgt tggcacccgc aatcctgct 39

<210> SEQ ID NO 15
<211> LENGTH: 24
<212> TYPE: DNA
<213> ORGANISM: Artificial Sequence
<220> FEATURE:
<223> OTHER INFORMATION: Primer SARS-CoV-2_Set 3_LF

<400> SEQUENCE: 15
agcacgattg cagcattgtt agca 24

<210> SEQ ID NO 16
<211> LENGTH: 40
<212> TYPE: DNA
<213> ORGANISM: Artificial Sequence
<220> FEATURE:
<223> OTHER INFORMATION: Primer SARS-CoV-2_Set 3_BIP

<400> SEQUENCE: 16
cattgccaaa aggcttctac gagaagaggc ttgactgccg 40

<210> SEQ ID NO 17
<211> LENGTH: 20
<212> TYPE: DNA
<213> ORGANISM: Artificial Sequence
<220> FEATURE:
<223> OTHER INFORMATION: Primer SARS-CoV-2_Set 3_LB

<400> SEQUENCE: 17
acgcagaagg gagcagaggc 20

<210> SEQ ID NO 18
<211> LENGTH: 22
<212> TYPE: DNA
<213> ORGANISM: Artificial Sequence
<220> FEATURE:
<223> OTHER INFORMATION: Primer SARS-CoV-2_Set 3_B3

<400> SEQUENCE: 18
ttgcgactac gtgatgagga gc 22

<210> SEQ ID NO 19
<211> LENGTH: 22
<212> TYPE: DNA
<213> ORGANISM: Artificial Sequence
<220> FEATURE:
<223> OTHER INFORMATION: Primer SARS-CoV-2_Set 4_F3

<400> SEQUENCE: 19
acattgcgaa aaggcttcta cg 22

<210> SEQ ID NO 20
<211> LENGTH: 36
<212> TYPE: DNA
<213> ORGANISM: Artificial Sequence
<220> FEATURE:
<223> OTHER INFORMATION: Primer SARS-CoV-2_Set 4_FIP

<400> SEQUENCE: 20
gcgactacgt gatgaggatg aagggagcag aggcgg 36

<210> SEQ ID NO 21
<211> LENGTH: 22
<212> TYPE: DNA
<213> ORGANISM: Artificial Sequence
<220> FEATURE:
<223> OTHER INFORMATION: Primer SARS-CoV-2_Set 4_LF

<400> SEQUENCE: 21
acgagaagag gcttgactgc cg 22

<210> SEQ ID NO 22
<211> LENGTH: 43
<212> TYPE: DNA
<213> ORGANISM: Artificial Sequence
<220> FEATURE:
<223> OTHER INFORMATION: Primer SARS-CoV-2_Set 4_BIP

<400> SEQUENCE: 22
tcaagaaatt caactccagg ccgccattgc cagccattct agc 43

<210> SEQ ID NO 23
<211> LENGTH: 23
<212> TYPE: DNA
<213> ORGANISM: Artificial Sequence
<220> FEATURE:
<223> OTHER INFORMATION: Primer SARS-CoV-2_Set 4_LB_1

<400> SEQUENCE: 23
agcagtaggg gaacttctcc tgc 23

<210> SEQ ID NO 24
<211> LENGTH: 23
<212> TYPE: DNA
<213> ORGANISM: Artificial Sequence
<220> FEATURE:
<223> OTHER INFORMATION: Primer SARS-CoV-2_Set 4_LB_2

<400> SEQUENCE: 24
agcagtaaac gaacttctcc tgc 23

<210> SEQ ID NO 25
<211> LENGTH: 19
<212> TYPE: DNA
<213> ORGANISM: Artificial Sequence
<220> FEATURE:
<223> OTHER INFORMATION: Primer SARS-CoV-2_Set 4_B3

<400> SEQUENCE: 25
aaagcaagag cagcatcac 19

<210> SEQ ID NO 26
<211> LENGTH: 30
<212> TYPE: DNA
<213> ORGANISM: Artificial Sequence
<220> FEATURE:
<223> OTHER INFORMATION: Primer HAV_Set 1_F3_1

<400> SEQUENCE: 26
cagtgttaac ttggctttca tgaagctttt 30

<210> SEQ ID NO 27

<211> LENGTH: 21
<212> TYPE: DNA
<213> ORGANISM: Artificial Sequence
<220> FEATURE:
<223> OTHER INFORMATION: Primer HAV_Set 1_F3_2

<400> SEQUENCE: 27
gggacgcaga tgtttgggac g 21

<210> SEQ ID NO 28
<211> LENGTH: 24
<212> TYPE: DNA
<213> ORGANISM: Artificial Sequence
<220> FEATURE:
<223> OTHER INFORMATION: HAV_Set 1_LF

<400> SEQUENCE: 28
gcctaagagg tttcacccgt agcc 24

<210> SEQ ID NO 29
<211> LENGTH: 49
<212> TYPE: DNA
<213> ORGANISM: Artificial Sequence
<220> FEATURE:
<223> OTHER INFORMATION: Primer HAV_Set 1_FIP

<400> SEQUENCE: 29
tatccaaggc atctcttcat agaagtattt cttccacaag gggtaggct 49

<210> SEQ ID NO 30
<211> LENGTH: 40
<212> TYPE: DNA
<213> ORGANISM: Artificial Sequence
<220> FEATURE:
<223> OTHER INFORMATION: Primer HAV_Set 1_BIP

<400> SEQUENCE: 30
cggtggatat tggtgagttt ggatgagagc cagtcctccg 40

<210> SEQ ID NO 31
<211> LENGTH: 19
<212> TYPE: DNA
<213> ORGANISM: Artificial Sequence
<220> FEATURE:
<223> OTHER INFORMATION: Primer HAV_Set 1_LB

<400> SEQUENCE: 31
aaaaccattc aacgccgga 19

<210> SEQ ID NO 32
<211> LENGTH: 28
<212> TYPE: DNA
<213> ORGANISM: Artificial Sequence
<220> FEATURE:
<223> OTHER INFORMATION: Primer HAV_Set 1_B3_1

<400> SEQUENCE: 32
cctgacagtc aatccactca atgcatcc 28

<210> SEQ ID NO 33
<211> LENGTH: 27
<212> TYPE: DNA
<213> ORGANISM: Artificial Sequence
<220> FEATURE:
<223> OTHER INFORMATION: Primer HAV_Set 1_B3_2

<400> SEQUENCE: 33
cctgacagac aatccactta atgcatc 27

<210> SEQ ID NO 34
<211> LENGTH: 29
<212> TYPE: DNA
<213> ORGANISM: Artificial Sequence
<220> FEATURE:
<223> OTHER INFORMATION: Primer HAV_Alt1_F3_1

<400> SEQUENCE: 34
taattcctgc aggttcaggg ttcttgaat 29

<210> SEQ ID NO 35
<211> LENGTH: 19
<212> TYPE: DNA
<213> ORGANISM: Artificial Sequence
<220> FEATURE:
<223> OTHER INFORMATION: Primer HAV_Alt1_F3_2

<400> SEQUENCE: 35
ttcacgctct ctgtctgct 19

<210> SEQ ID NO 36
<211> LENGTH: 19
<212> TYPE: DNA
<213> ORGANISM: Artificial Sequence
<220> FEATURE:
<223> OTHER INFORMATION: Primer HAV_Alt1_LF

<400> SEQUENCE: 36
gcgcaacggc cagagccta 19

<210> SEQ ID NO 37
<211> LENGTH: 36
<212> TYPE: DNA
<213> ORGANISM: Artificial Sequence
<220> FEATURE:
<223> OTHER INFORMATION: Primer HAV_Alt1_FIP

<400> SEQUENCE: 37
catgaagttg accccgccgc tctccccttg ccctag 36

<210> SEQ ID NO 38
<211> LENGTH: 47
<212> TYPE: DNA
<213> ORGANISM: Artificial Sequence
<220> FEATURE:
<223> OTHER INFORMATION: Primer HAV_Alt1_BIP

<400> SEQUENCE: 38
gctgtaggag tctaaattgg tcatgagagc caagttaaca ctgcaag 47

<210> SEQ ID NO 39
<211> LENGTH: 25
<212> TYPE: DNA
<213> ORGANISM: Artificial Sequence
<220> FEATURE:
<223> OTHER INFORMATION: Primer HAV_Alt1_LB_1

<400> SEQUENCE: 39
ggacgcagat gtttgggacg tcacc 25

<210> SEQ ID NO 40
<211> LENGTH: 24
<212> TYPE: DNA

```
<213> ORGANISM: Artificial Sequence
<220> FEATURE:
<223> OTHER INFORMATION: Primer HAV_Alt1_LB_2

<400> SEQUENCE: 40

acacagatgt tgggaacgtc acct                                            24


<210> SEQ ID NO 41
<211> LENGTH: 24
<212> TYPE: DNA
<213> ORGANISM: Artificial Sequence
<220> FEATURE:
<223> OTHER INFORMATION: HAV_Alt1_B3_1

<400> SEQUENCE: 41

cctacctctt gtggaagatc aagg                                            24


<210> SEQ ID NO 42
<211> LENGTH: 25
<212> TYPE: DNA
<213> ORGANISM: Artificial Sequence
<220> FEATURE:
<223> OTHER INFORMATION: Primer HAV_Alt1_B3_2

<400> SEQUENCE: 42

gcctacctct tgtggaagat caaag                                           25


<210> SEQ ID NO 43
<211> LENGTH: 26
<212> TYPE: DNA
<213> ORGANISM: Artificial Sequence
<220> FEATURE:
<223> OTHER INFORMATION: Primer HAV_Alt2_F3

<400> SEQUENCE: 43

ttagcatgga gctgtaggag tctaaa                                          26


<210> SEQ ID NO 44
<211> LENGTH: 29
<212> TYPE: DNA
<213> ORGANISM: Artificial Sequence
<220> FEATURE:
<223> OTHER INFORMATION: Primer HAV_Alt2_LF

<400> SEQUENCE: 44

tcatgagagc caagttaaca ctgcaaggt                                       29


<210> SEQ ID NO 45
<211> LENGTH: 45
<212> TYPE: DNA
<213> ORGANISM: Artificial Sequence
<220> FEATURE:
<223> OTHER INFORMATION: HAV_Alt2_FIP

<400> SEQUENCE: 45

gcctacctct tgtggaagat catggggaca cagatgtttg ggacg                     45


<210> SEQ ID NO 46
<211> LENGTH: 49
<212> TYPE: DNA
<213> ORGANISM: Artificial Sequence
<220> FEATURE:
<223> OTHER INFORMATION: Primer HAV_Alt2_BIP

<400> SEQUENCE: 46

acctcttagg ctaatacttc tatgaagaga actcaccaat atccgccgc                 49
```

<210> SEQ ID NO 47
<211> LENGTH: 23
<212> TYPE: DNA
<213> ORGANISM: Artificial Sequence
<220> FEATURE:
<223> OTHER INFORMATION: Primer HAV_Alt2_LB

<400> SEQUENCE: 47
tgctttggat agggtaacag cgg 23

<210> SEQ ID NO 48
<211> LENGTH: 24
<212> TYPE: DNA
<213> ORGANISM: Artificial Sequence
<220> FEATURE:
<223> OTHER INFORMATION: Primer HAV_Alt2_B3_1

<400> SEQUENCE: 48
tcaatccact caatgcatcc actg 24

<210> SEQ ID NO 49
<211> LENGTH: 22
<212> TYPE: DNA
<213> ORGANISM: Artificial Sequence
<220> FEATURE:
<223> OTHER INFORMATION: Primer HAV_Alt2_B3_2

<400> SEQUENCE: 49
caattcactc aatgcatcca ct 22

<210> SEQ ID NO 50
<211> LENGTH: 23
<212> TYPE: DNA
<213> ORGANISM: Artificial Sequence
<220> FEATURE:
<223> OTHER INFORMATION: Primer H1N1_Set1_F3_1

<400> SEQUENCE: 50
cgagatcgca cagagactgg aag 23

<210> SEQ ID NO 51
<211> LENGTH: 25
<212> TYPE: DNA
<213> ORGANISM: Artificial Sequence
<220> FEATURE:
<223> OTHER INFORMATION: Primer H1N1_Set1_F3_2

<400> SEQUENCE: 51
cgagatcgca cagagattgg aaagt 25

<210> SEQ ID NO 52
<211> LENGTH: 29
<212> TYPE: DNA
<213> ORGANISM: Artificial Sequence
<220> FEATURE:
<223> OTHER INFORMATION: Primer H1N1_Set1_B3_1

<400> SEQUENCE: 52
cccatttcca tttagggcat tttggacaa 29

<210> SEQ ID NO 53
<211> LENGTH: 24
<212> TYPE: DNA
<213> ORGANISM: Artificial Sequence
<220> FEATURE:

<223> OTHER INFORMATION: Primer H1N1_Set1_B3_2

<400> SEQUENCE: 53
cccatttccg tttagggcat tttg 24

<210> SEQ ID NO 54
<211> LENGTH: 26
<212> TYPE: DNA
<213> ORGANISM: Artificial Sequence
<220> FEATURE:
<223> OTHER INFORMATION: Primer H1N1_Set1_LF

<400> SEQUENCE: 54
agccattcca tgagagcctc aaggtc 26

<210> SEQ ID NO 55
<211> LENGTH: 19
<212> TYPE: DNA
<213> ORGANISM: Artificial Sequence
<220> FEATURE:
<223> OTHER INFORMATION: Primer H1N1_Set1_LB_1

<400> SEQUENCE: 55
cgtgccaagt gagcgagga 19

<210> SEQ ID NO 56
<211> LENGTH: 19
<212> TYPE: DNA
<213> ORGANISM: Artificial Sequence
<220> FEATURE:
<223> OTHER INFORMATION: Primer H1N1_Set1_LB_2

<400> SEQUENCE: 56
cgtgcccagt gagcgaggg 19

<210> SEQ ID NO 57
<211> LENGTH: 54
<212> TYPE: DNA
<213> ORGANISM: Artificial Sequence
<220> FEATURE:
<223> OTHER INFORMATION: Primer H1N1_Set1_FIP

<400> SEQUENCE: 57
agtcagaggt gacaggattg gtcttgtctt gtctttgcag gaaagaacac agat 54

<210> SEQ ID NO 58
<211> LENGTH: 48
<212> TYPE: DNA
<213> ORGANISM: Artificial Sequence
<220> FEATURE:
<223> OTHER INFORMATION: Primer H1N1_Set1_BIP

<400> SEQUENCE: 58
gggaattttg ggatttgtgt tcacgctcat cgtctacgct gcagtcct 48

<210> SEQ ID NO 59
<211> LENGTH: 24
<212> TYPE: DNA
<213> ORGANISM: Artificial Sequence
<220> FEATURE:
<223> OTHER INFORMATION: Primer H1N1_Set2_F3

<400> SEQUENCE: 59
tgaaaatttg caggcctatc agaa 24

<210> SEQ ID NO 60
<211> LENGTH: 25
<212> TYPE: DNA
<213> ORGANISM: Artificial Sequence
<220> FEATURE:
<223> OTHER INFORMATION: Primer H1N1_Set2_B3_1

<400> SEQUENCE: 60
actctagctc tatgctgaca aaatg 25

<210> SEQ ID NO 61
<211> LENGTH: 25
<212> TYPE: DNA
<213> ORGANISM: Artificial Sequence
<220> FEATURE:
<223> OTHER INFORMATION: Primer H1N1_Set2_B3_2

<400> SEQUENCE: 61
actccagctc tatgctgaca aaatg 25

<210> SEQ ID NO 62
<211> LENGTH: 20
<212> TYPE: DNA
<213> ORGANISM: Artificial Sequence
<220> FEATURE:
<223> OTHER INFORMATION: Primer H1N1_Set2_LF_1

<400> SEQUENCE: 62
gcggcaacaa caagaggatc 20

<210> SEQ ID NO 63
<211> LENGTH: 20
<212> TYPE: DNA
<213> ORGANISM: Artificial Sequence
<220> FEATURE:
<223> OTHER INFORMATION: Primer H1N1_Set2_LF_2

<400> SEQUENCE: 63
gcggcaatag tgagaggatc 20

<210> SEQ ID NO 64
<211> LENGTH: 20
<212> TYPE: DNA
<213> ORGANISM: Artificial Sequence
<220> FEATURE:
<223> OTHER INFORMATION: Primer H1N1_Set2_LF_3

<400> SEQUENCE: 64
gctgcaatga cgagaggatc 20

<210> SEQ ID NO 65
<211> LENGTH: 25
<212> TYPE: DNA
<213> ORGANISM: Artificial Sequence
<220> FEATURE:
<223> OTHER INFORMATION: Primer H1N1_Set2_LB

<400> SEQUENCE: 65
agggaagaat atcaacagga acagc 25

<210> SEQ ID NO 66
<211> LENGTH: 51
<212> TYPE: DNA
<213> ORGANISM: Artificial Sequence
<220> FEATURE:
<223> OTHER INFORMATION: Primer H1N1_Set2_FIP

<400> SEQUENCE: 66
tgtcaagtgc aagatcccaa tgatattggg tgcagatgca acggttcaag t 51

<210> SEQ ID NO 67
<211> LENGTH: 49
<212> TYPE: DNA
<213> ORGANISM: Artificial Sequence
<220> FEATURE:
<223> OTHER INFORMATION: Primer H1N1_Set2_BIP

<400> SEQUENCE: 67
tacggaagga gtgccaaagt ctatgatcgt cagcatccac agcactctg 49

<210> SEQ ID NO 68
<211> LENGTH: 30
<212> TYPE: DNA
<213> ORGANISM: Artificial Sequence
<220> FEATURE:
<223> OTHER INFORMATION: Primer HIV_Set1_F3_1

<400> SEQUENCE: 68
ggggaaagaa taatagacat aatagcaaca 30

<210> SEQ ID NO 69
<211> LENGTH: 21
<212> TYPE: DNA
<213> ORGANISM: Artificial Sequence
<220> FEATURE:
<223> OTHER INFORMATION: Primer HIV_Set1_F3_2

<400> SEQUENCE: 69
ttcaaaattt tcgggtttat t 21

<210> SEQ ID NO 70
<211> LENGTH: 19
<212> TYPE: DNA
<213> ORGANISM: Artificial Sequence
<220> FEATURE:
<223> OTHER INFORMATION: Primer HIV_Set1_LF_1

<400> SEQUENCE: 70
agctttgctg gtcctttcc 19

<210> SEQ ID NO 71
<211> LENGTH: 18
<212> TYPE: DNA
<213> ORGANISM: Artificial Sequence
<220> FEATURE:
<223> OTHER INFORMATION: Primer HIV_Set1_LF_2

<400> SEQUENCE: 71
gctttgcgtg tcctttcc 18

<210> SEQ ID NO 72
<211> LENGTH: 47
<212> TYPE: DNA
<213> ORGANISM: Artificial Sequence
<220> FEATURE:
<223> OTHER INFORMATION: Primer HIV_Set1_FIP

<400> SEQUENCE: 72
tgccccttca cctctccagt acagggacag cagagatcca ctttgga 47

<210> SEQ ID NO 73
<211> LENGTH: 45

<212> TYPE: DNA
<213> ORGANISM: Artificial Sequence
<220> FEATURE:
<223> OTHER INFORMATION: Primer HIV_Set1_BIP

<400> SEQUENCE: 73
aaaagtagtg ccaagaagaa aagtgccaca caatcatcac ctgcc 45

<210> SEQ ID NO 74
<211> LENGTH: 30
<212> TYPE: DNA
<213> ORGANISM: Artificial Sequence
<220> FEATURE:
<223> OTHER INFORMATION: Primer HIV_Set1_LB

<400> SEQUENCE: 74
agatcattag ggattatgga aaacagatgg 30

<210> SEQ ID NO 75
<211> LENGTH: 18
<212> TYPE: DNA
<213> ORGANISM: Artificial Sequence
<220> FEATURE:
<223> OTHER INFORMATION: Primer HIV_Set1_B3_1

<400> SEQUENCE: 75
tcctcatcct gtctactt 18

<210> SEQ ID NO 76
<211> LENGTH: 19
<212> TYPE: DNA
<213> ORGANISM: Artificial Sequence
<220> FEATURE:
<223> OTHER INFORMATION: Primer HIV_Set1_B3_2

<400> SEQUENCE: 76
atcctcatcc tgtctacta 19

<210> SEQ ID NO 77
<211> LENGTH: 27
<212> TYPE: DNA
<213> ORGANISM: Artificial Sequence
<220> FEATURE:
<223> OTHER INFORMATION: Primer HIV_Set2_F3

<400> SEQUENCE: 77
ttttcggggt tattacaggg acagcag 27

<210> SEQ ID NO 78
<211> LENGTH: 20
<212> TYPE: DNA
<213> ORGANISM: Artificial Sequence
<220> FEATURE:
<223> OTHER INFORMATION: Primer HIV_Set2_LF

<400> SEQUENCE: 78
ctttccagag aagctttgct 20

<210> SEQ ID NO 79
<211> LENGTH: 20
<212> TYPE: DNA
<213> ORGANISM: Artificial Sequence
<220> FEATURE:
<223> OTHER INFORMATION: Primer HIV_Set2_LF_2

<400> SEQUENCE: 79
ttccagagaa gccttgctgg 20

<210> SEQ ID NO 80
<211> LENGTH: 18
<212> TYPE: DNA
<213> ORGANISM: Artificial Sequence
<220> FEATURE:
<223> OTHER INFORMATION: Primer HIV_Set2_LF_3

<400> SEQUENCE: 80
cttccagaga agctttgc 18

<210> SEQ ID NO 81
<211> LENGTH: 42
<212> TYPE: DNA
<213> ORGANISM: Artificial Sequence
<220> FEATURE:
<223> OTHER INFORMATION: Primer HIV_Set2_FIP

<400> SEQUENCE: 81
cttgtattac tactgcccct tcgatccact ttggaaagga cc 42

<210> SEQ ID NO 82
<211> LENGTH: 47
<212> TYPE: DNA
<213> ORGANISM: Artificial Sequence
<220> FEATURE:
<223> OTHER INFORMATION: Primer HIV_Set2_BIP_1

<400> SEQUENCE: 82
tagtgacata aaagtagtgc caagaaggac aatcatcacc tgccatc 47

<210> SEQ ID NO 83
<211> LENGTH: 48
<212> TYPE: DNA
<213> ORGANISM: Artificial Sequence
<220> FEATURE:
<223> OTHER INFORMATION: Primer HIV_Set2_BIP_2

<400> SEQUENCE: 83
tagtgacata aaagtagtgc caagaaggaa tcatcgcctg ccatctgt 48

<210> SEQ ID NO 84
<211> LENGTH: 22
<212> TYPE: DNA
<213> ORGANISM: Artificial Sequence
<220> FEATURE:
<223> OTHER INFORMATION: Primer HIV_Set2_LB

<400> SEQUENCE: 84
agcaaagatc attagggatt at 22

<210> SEQ ID NO 85
<211> LENGTH: 25
<212> TYPE: DNA
<213> ORGANISM: Artificial Sequence
<220> FEATURE:
<223> OTHER INFORMATION: Primer HIV_Set2_LB_2

<400> SEQUENCE: 85
gatcattagg gattatggaa aacag 25

<210> SEQ ID NO 86
<211> LENGTH: 27
<212> TYPE: DNA
<213> ORGANISM: Artificial Sequence
<220> FEATURE:
<223> OTHER INFORMATION: Primer HIV_Set2_LB_3

<400> SEQUENCE: 86
aagatcatta gggattatgg aaaacag 27

<210> SEQ ID NO 87
<211> LENGTH: 18
<212> TYPE: DNA
<213> ORGANISM: Artificial Sequence
<220> FEATURE:
<223> OTHER INFORMATION: Primer HIV_Set2_B3

<400> SEQUENCE: 87
atcctgtcta cttgccac 18

<210> SEQ ID NO 88
<211> LENGTH: 26
<212> TYPE: DNA
<213> ORGANISM: Artificial Sequence
<220> FEATURE:
<223> OTHER INFORMATION: Primer HIV_Set2_B3_2

<400> SEQUENCE: 88
ttaatcctca tcctgtctac gtgcca 26

<210> SEQ ID NO 89
<211> LENGTH: 30
<212> TYPE: DNA
<213> ORGANISM: Artificial Sequence
<220> FEATURE:
<223> OTHER INFORMATION: Primer HIV_Set3_F3_1

<400> SEQUENCE: 89
aatagcatca gacatacaaa ctagagaatt 30

<210> SEQ ID NO 90
<211> LENGTH: 22
<212> TYPE: DNA
<213> ORGANISM: Artificial Sequence
<220> FEATURE:
<223> OTHER INFORMATION: Primer HIV_Set3_F3_2

<400> SEQUENCE: 90
gttcaaaatt ttcgggttta tt 22

<210> SEQ ID NO 91
<211> LENGTH: 21
<212> TYPE: DNA
<213> ORGANISM: Artificial Sequence
<220> FEATURE:
<223> OTHER INFORMATION: Primer HIV_Set3_LF

<400> SEQUENCE: 91
agctttgctg gtcctttcca g 21

<210> SEQ ID NO 92
<211> LENGTH: 43
<212> TYPE: DNA
<213> ORGANISM: Artificial Sequence
<220> FEATURE:
<223> OTHER INFORMATION: Primer HIV_Set3_FIP

<400> SEQUENCE: 92
cccttcacct ttccagagac agggacagca gagagccact ttg 43

<210> SEQ ID NO 93
<211> LENGTH: 51
<212> TYPE: DNA
<213> ORGANISM: Artificial Sequence
<220> FEATURE:
<223> OTHER INFORMATION: Primer HIV_Set3_BIP

<400> SEQUENCE: 93
aaaagtagtg ccaagaagaa aagtacacaa tcatcacctg ccatctgttt g 51

<210> SEQ ID NO 94
<211> LENGTH: 23
<212> TYPE: DNA
<213> ORGANISM: Artificial Sequence
<220> FEATURE:
<223> OTHER INFORMATION: Primer HIV_Set3_LB_1

<400> SEQUENCE: 94
aagatcatta gggattatgg aag 23

<210> SEQ ID NO 95
<211> LENGTH: 22
<212> TYPE: DNA
<213> ORGANISM: Artificial Sequence
<220> FEATURE:
<223> OTHER INFORMATION: Primer HIV_Set3_LB_2

<400> SEQUENCE: 95
aagatcatta aggattatgg aa 22

<210> SEQ ID NO 96
<211> LENGTH: 21
<212> TYPE: DNA
<213> ORGANISM: Artificial Sequence
<220> FEATURE:
<223> OTHER INFORMATION: Primer HIV_Set3_B3

<400> SEQUENCE: 96
atcctcattc tgtctacttg c 21

<210> SEQ ID NO 97
<211> LENGTH: 18
<212> TYPE: DNA
<213> ORGANISM: Artificial Sequence
<220> FEATURE:
<223> OTHER INFORMATION: Primer RSV A_Set1_F3_1

<400> SEQUENCE: 97
ctaatgcttt ggctaagg 18

<210> SEQ ID NO 98
<211> LENGTH: 27
<212> TYPE: DNA
<213> ORGANISM: Artificial Sequence
<220> FEATURE:
<223> OTHER INFORMATION: Primer RSV A_Set1_F3_2

<400> SEQUENCE: 98
attaatacag ttaaccaatg ctttggc 27

<210> SEQ ID NO 99
<211> LENGTH: 27
<212> TYPE: DNA
<213> ORGANISM: Artificial Sequence
<220> FEATURE:
<223> OTHER INFORMATION: Primer RSV A_Set1_B3_1

<400> SEQUENCE: 99
tttaatttca caattgtcat ctattag 27

<210> SEQ ID NO 100
<211> LENGTH: 29
<212> TYPE: DNA
<213> ORGANISM: Artificial Sequence
<220> FEATURE:
<223> OTHER INFORMATION: Primer RSV A_Set1_B3_2

<400> SEQUENCE: 100
tcacaattgt catctattag accattagg 29

<210> SEQ ID NO 101
<211> LENGTH: 26
<212> TYPE: DNA
<213> ORGANISM: Artificial Sequence
<220> FEATURE:
<223> OTHER INFORMATION: Primer RSV A_Set1_LF_1

<400> SEQUENCE: 101
tgtaataaca tgcacaaata caatgc 26

<210> SEQ ID NO 102
<211> LENGTH: 26
<212> TYPE: DNA
<213> ORGANISM: Artificial Sequence
<220> FEATURE:
<223> OTHER INFORMATION: Primer RSV A_Set1_LF_2

<400> SEQUENCE: 102
tgtaataaca tgaacaaata caatgc 26

<210> SEQ ID NO 103
<211> LENGTH: 24
<212> TYPE: DNA
<213> ORGANISM: Artificial Sequence
<220> FEATURE:
<223> OTHER INFORMATION: Primer RSV A_Set1_LB_1

<400> SEQUENCE: 103
atggaggtta tatatgggaa atga 24

<210> SEQ ID NO 104
<211> LENGTH: 58
<212> TYPE: DNA
<213> ORGANISM: Artificial Sequence
<220> FEATURE:
<223> OTHER INFORMATION: Primer RSV A_Set1_FIP

<400> SEQUENCE: 104
caatattatt attagggcaa atatcactac gttatacata caatcaaatt gaatggca 58

<210> SEQ ID NO 105
<211> LENGTH: 51
<212> TYPE: DNA
<213> ORGANISM: Artificial Sequence
<220> FEATURE:
<223> OTHER INFORMATION: Primer RSV A_Set1_BIP

<400> SEQUENCE: 105
caatttcaca acaatgccag tattacagaa gcagtgtgtt aattccatca t 51

<210> SEQ ID NO 106

<211> LENGTH: 47
<212> TYPE: DNA
<213> ORGANISM: Artificial Sequence
<220> FEATURE:
<223> OTHER INFORMATION: Primer RSV A_Set2_FIP

<400> SEQUENCE: 106
atatggtaga atcctgcttc tccactacaa gcagaaatgg aacaagt 47

<210> SEQ ID NO 107
<211> LENGTH: 45
<212> TYPE: DNA
<213> ORGANISM: Artificial Sequence
<220> FEATURE:
<223> OTHER INFORMATION: Primer RSV A_Set2_BIP

<400> SEQUENCE: 107
tcaatttcct cacttctcta gtgttctgta ttctcccatt atgcc 45

<210> SEQ ID NO 108
<211> LENGTH: 20
<212> TYPE: DNA
<213> ORGANISM: Artificial Sequence
<220> FEATURE:
<223> OTHER INFORMATION: Primer RSV A_Set2_F3

<400> SEQUENCE: 108
ttatgttagg acacgctagt 20

<210> SEQ ID NO 109
<211> LENGTH: 20
<212> TYPE: DNA
<213> ORGANISM: Artificial Sequence
<220> FEATURE:
<223> OTHER INFORMATION: Primer RSV A_Set2_B3

<400> SEQUENCE: 109
tcttgattcc ttggtgtacc 20

<210> SEQ ID NO 110
<211> LENGTH: 23
<212> TYPE: DNA
<213> ORGANISM: Artificial Sequence
<220> FEATURE:
<223> OTHER INFORMATION: Primer RSV A_Set2_LF

<400> SEQUENCE: 110
gagcatactc atacacctcc aca 23

<210> SEQ ID NO 111
<211> LENGTH: 20
<212> TYPE: DNA
<213> ORGANISM: Artificial Sequence
<220> FEATURE:
<223> OTHER INFORMATION: Primer RSV A_Set2_LB

<400> SEQUENCE: 111
tattgggcaa tgctgctggc 20

<210> SEQ ID NO 112
<211> LENGTH: 29
<212> TYPE: DNA
<213> ORGANISM: Artificial Sequence
<220> FEATURE:
<223> OTHER INFORMATION: Primer RSV B_Set1_F3_1

<400> SEQUENCE: 112
ctcaattccc taacttctca agtgtggtc 29

<210> SEQ ID NO 113
<211> LENGTH: 30
<212> TYPE: DNA
<213> ORGANISM: Artificial Sequence
<220> FEATURE:
<223> OTHER INFORMATION: Primer RSV B_Set1_F3_2

<400> SEQUENCE: 113
atatattgaa caatccaaag gcatcattgc 30

<210> SEQ ID NO 114
<211> LENGTH: 27
<212> TYPE: DNA
<213> ORGANISM: Artificial Sequence
<220> FEATURE:
<223> OTHER INFORMATION: Primer RSV B_Set1_B3

<400> SEQUENCE: 114
ttgttaactt aaagctctac gtcatcc 27

<210> SEQ ID NO 115
<211> LENGTH: 20
<212> TYPE: DNA
<213> ORGANISM: Artificial Sequence
<220> FEATURE:
<223> OTHER INFORMATION: Primer RSV B_Set1_LF_1

<400> SEQUENCE: 115
tgatttcttg gtgtacctct 20

<210> SEQ ID NO 116
<211> LENGTH: 20
<212> TYPE: DNA
<213> ORGANISM: Artificial Sequence
<220> FEATURE:
<223> OTHER INFORMATION: Primer RSV B_Set1_LF_2

<400> SEQUENCE: 116
tggtttcttg gtgtacctct 20

<210> SEQ ID NO 117
<211> LENGTH: 19
<212> TYPE: DNA
<213> ORGANISM: Artificial Sequence
<220> FEATURE:
<223> OTHER INFORMATION: Primer RSV B_Set1_LF_3

<400> SEQUENCE: 117
ggtttcgtgg tgtacctct 19

<210> SEQ ID NO 118
<211> LENGTH: 30
<212> TYPE: DNA
<213> ORGANISM: Artificial Sequence
<220> FEATURE:
<223> OTHER INFORMATION: Primer RSV B_Set1_LB_1

<400> SEQUENCE: 118
tgtattagac ttaacaacag aagaattgga 30

<210> SEQ ID NO 119
<211> LENGTH: 29
<212> TYPE: DNA

```
<213> ORGANISM: Artificial Sequence
<220> FEATURE:
<223> OTHER INFORMATION: Primer RSV B_Set1_LB_2

<400> SEQUENCE: 119

gtattagatt taacaacaga ggaattgga                                      29


<210> SEQ ID NO 120
<211> LENGTH: 30
<212> TYPE: DNA
<213> ORGANISM: Artificial Sequence
<220> FEATURE:
<223> OTHER INFORMATION: Primer RSV B_Set1_LB_3

<400> SEQUENCE: 120

tgtattagac ttaacagcag aagaattgga                                     30


<210> SEQ ID NO 121
<211> LENGTH: 55
<212> TYPE: DNA
<213> ORGANISM: Artificial Sequence
<220> FEATURE:
<223> OTHER INFORMATION: Primer RSV B_Set1_FIP

<400> SEQUENCE: 121

catatgcttt ggctgcatca tagagatcgg actaggcata atgggagagt ataga         55


<210> SEQ ID NO 122
<211> LENGTH: 56
<212> TYPE: DNA
<213> ORGANISM: Artificial Sequence
<220> FEATURE:
<223> OTHER INFORMATION: Primer RSV B_Set1_BIP

<400> SEQUENCE: 122

actcaaagaa aatggagtaa taaactacag ggttgagttg atgctttatg gcttcc        56


<210> SEQ ID NO 123
<211> LENGTH: 47
<212> TYPE: DNA
<213> ORGANISM: Artificial Sequence
<220> FEATURE:
<223> OTHER INFORMATION: Primer RSV B_Set2_FIP

<400> SEQUENCE: 123

atatggtaga aaccagcttc tcctctccaa gcagaaatgg agcaagt                  47


<210> SEQ ID NO 124
<211> LENGTH: 45
<212> TYPE: DNA
<213> ORGANISM: Artificial Sequence
<220> FEATURE:
<223> OTHER INFORMATION: Primer RSV B_Set2_BIP

<400> SEQUENCE: 124

tcaatttcct aacttctcaa gtgttctata ctctcccatt atgcc                    45


<210> SEQ ID NO 125
<211> LENGTH: 20
<212> TYPE: DNA
<213> ORGANISM: Artificial Sequence
<220> FEATURE:
<223> OTHER INFORMATION: Primer RSV B_Set2_F3

<400> SEQUENCE: 125

tcatgctagg acatgctagt                                                20
```

<210> SEQ ID NO 126
<211> LENGTH: 20
<212> TYPE: DNA
<213> ORGANISM: Artificial Sequence
<220> FEATURE:
<223> OTHER INFORMATION: Primer RSV B_Set2_B3

<400> SEQUENCE: 126
tcttggtttc ttggtgtacc 20

<210> SEQ ID NO 127
<211> LENGTH: 23
<212> TYPE: DNA
<213> ORGANISM: Artificial Sequence
<220> FEATURE:
<223> OTHER INFORMATION: Primer RSV B_Set2_LF

<400> SEQUENCE: 127
gtgcatactc atagacttcc aca 23

<210> SEQ ID NO 128
<211> LENGTH: 20
<212> TYPE: DNA
<213> ORGANISM: Artificial Sequence
<220> FEATURE:
<223> OTHER INFORMATION: Primer RSV B_Set2_LB

<400> SEQUENCE: 128
tcctaggcaa tgcagcaggt 20

<210> SEQ ID NO 129
<211> LENGTH: 24
<212> TYPE: DNA
<213> ORGANISM: Artificial Sequence
<220> FEATURE:
<223> OTHER INFORMATION: Primer EC_Z3276_F3_1

<400> SEQUENCE: 129
cgacacaatt gggaaatcca gcaa 24

<210> SEQ ID NO 130
<211> LENGTH: 41
<212> TYPE: DNA
<213> ORGANISM: Artificial Sequence
<220> FEATURE:
<223> OTHER INFORMATION: Primer EC_Z3276_FIP_1

<400> SEQUENCE: 130
tctccagtaa aatcaggtcg caggcagtat taccttatgt g 41

<210> SEQ ID NO 131
<211> LENGTH: 23
<212> TYPE: DNA
<213> ORGANISM: Artificial Sequence
<220> FEATURE:
<223> OTHER INFORMATION: Primer EC_Z3276_LF_1

<400> SEQUENCE: 131
gtgcctctgg ctattttaac cac 23

<210> SEQ ID NO 132
<211> LENGTH: 36
<212> TYPE: DNA
<213> ORGANISM: Artificial Sequence
<220> FEATURE:

<223> OTHER INFORMATION: Primer EC_Z3276_BIP_1

<400> SEQUENCE: 132
agaaaatcta cctggtttga cgatgactca ccgcca 36

<210> SEQ ID NO 133
<211> LENGTH: 29
<212> TYPE: DNA
<213> ORGANISM: Artificial Sequence
<220> FEATURE:
<223> OTHER INFORMATION: Primer EC_Z3276_LB_1

<400> SEQUENCE: 133
atttcagata ccgtgattgc aaatattgg 29

<210> SEQ ID NO 134
<211> LENGTH: 21
<212> TYPE: DNA
<213> ORGANISM: Artificial Sequence
<220> FEATURE:
<223> OTHER INFORMATION: Primer EC_Z3276_B3_1

<400> SEQUENCE: 134
gccttacaaa tacccaacca a 21

<210> SEQ ID NO 135
<211> LENGTH: 22
<212> TYPE: DNA
<213> ORGANISM: Artificial Sequence
<220> FEATURE:
<223> OTHER INFORMATION: Primer EC_Z3276_F3_2

<400> SEQUENCE: 135
ttaggtaaaa ccagcgacac aa 22

<210> SEQ ID NO 136
<211> LENGTH: 38
<212> TYPE: DNA
<213> ORGANISM: Artificial Sequence
<220> FEATURE:
<223> OTHER INFORMATION: Primer EC_Z3276_FIP_2

<400> SEQUENCE: 136
aggtgtgcct ctggctattg ggaaatccag caatgcgc 38

<210> SEQ ID NO 137
<211> LENGTH: 25
<212> TYPE: DNA
<213> ORGANISM: Artificial Sequence
<220> FEATURE:
<223> OTHER INFORMATION: Primer EC_Z3276_LF_2

<400> SEQUENCE: 137
aaccacataa ggtaatactg cctgc 25

<210> SEQ ID NO 138
<211> LENGTH: 42
<212> TYPE: DNA
<213> ORGANISM: Artificial Sequence
<220> FEATURE:
<223> OTHER INFORMATION: Primer EC_Z3276_BIP_2

<400> SEQUENCE: 138
ctggagaaag aaaatctacc tgactcaccg ccaatatttg ca 42

<210> SEQ ID NO 139
<211> LENGTH: 26
<212> TYPE: DNA
<213> ORGANISM: Artificial Sequence
<220> FEATURE:
<223> OTHER INFORMATION: Primer EC_Z3276_LB_2

<400> SEQUENCE: 139
tggtttattt cagataccgt gattgc 26

<210> SEQ ID NO 140
<211> LENGTH: 18
<212> TYPE: DNA
<213> ORGANISM: Artificial Sequence
<220> FEATURE:
<223> OTHER INFORMATION: Primer EC_Z3276_B3_2

<400> SEQUENCE: 140
ccttacaaat acccaacc 18

<210> SEQ ID NO 141
<211> LENGTH: 22
<212> TYPE: DNA
<213> ORGANISM: Artificial Sequence
<220> FEATURE:
<223> OTHER INFORMATION: Primer EC_Stx1_F3_1

<400> SEQUENCE: 141
atctggattt aatgtcgcat ag 22

<210> SEQ ID NO 142
<211> LENGTH: 38
<212> TYPE: DNA
<213> ORGANISM: Artificial Sequence
<220> FEATURE:
<223> OTHER INFORMATION: Primer EC_Stx1_FIP_1

<400> SEQUENCE: 142
cagctgtcac agtaacaagg aacctcactg acgcagtc 38

<210> SEQ ID NO 143
<211> LENGTH: 26
<212> TYPE: DNA
<213> ORGANISM: Artificial Sequence
<220> FEATURE:
<223> OTHER INFORMATION: Primer EC_Stx1_LF_1

<400> SEQUENCE: 143
accgtaacat cgctcttgcc acagac 26

<210> SEQ ID NO 144
<211> LENGTH: 37
<212> TYPE: DNA
<213> ORGANISM: Artificial Sequence
<220> FEATURE:
<223> OTHER INFORMATION: Primer EC_Stx1_BIP_1

<400> SEQUENCE: 144
tacgttttcg gcaaataccg cccactgaga tcatcca 37

<210> SEQ ID NO 145
<211> LENGTH: 24
<212> TYPE: DNA
<213> ORGANISM: Artificial Sequence
<220> FEATURE:
<223> OTHER INFORMATION: Primer EC_Stx1_LB_1

<400> SEQUENCE: 145
agaggggatt tcgtacaaca ctgg 24

<210> SEQ ID NO 146
<211> LENGTH: 23
<212> TYPE: DNA
<213> ORGANISM: Artificial Sequence
<220> FEATURE:
<223> OTHER INFORMATION: Primer EC_Stx1_B3_1

<400> SEQUENCE: 146
cttcagcagt cattacataa gaa 23

<210> SEQ ID NO 147
<211> LENGTH: 18
<212> TYPE: DNA
<213> ORGANISM: Artificial Sequence
<220> FEATURE:
<223> OTHER INFORMATION: Primer EC_Stx1_F3_2

<400> SEQUENCE: 147
tacagcgtgt tgcaggga 18

<210> SEQ ID NO 148
<211> LENGTH: 39
<212> TYPE: DNA
<213> ORGANISM: Artificial Sequence
<220> FEATURE:
<223> OTHER INFORMATION: Primer EC_Stx1_FIP_2

<400> SEQUENCE: 148
cattaaatcc agataagaag tcagtcgtac ggggatgca 39

<210> SEQ ID NO 149
<211> LENGTH: 25
<212> TYPE: DNA
<213> ORGANISM: Artificial Sequence
<220> FEATURE:
<223> OTHER INFORMATION: Primer EC_Stx1_LF_2

<400> SEQUENCE: 149
agtcaacgaa tggcgattta tctgc 25

<210> SEQ ID NO 150
<211> LENGTH: 42
<212> TYPE: DNA
<213> ORGANISM: Artificial Sequence
<220> FEATURE:
<223> OTHER INFORMATION: Primer EC_Stx1_BIP_2

<400> SEQUENCE: 150
gcatagtgga acctcactac agtaacaaac cgtaacatcg ct 42

<210> SEQ ID NO 151
<211> LENGTH: 21
<212> TYPE: DNA
<213> ORGANISM: Artificial Sequence
<220> FEATURE:
<223> OTHER INFORMATION: Primer EC_Stx1_LB_2

<400> SEQUENCE: 151
gacgcagtct gtggcaagag c 21

<210> SEQ ID NO 152
<211> LENGTH: 19

<212> TYPE: DNA
<213> ORGANISM: Artificial Sequence
<220> FEATURE:
<223> OTHER INFORMATION: Primer EC_Stx1_B3_2

<400> SEQUENCE: 152
acgtaaagct tcagctgtc 19

<210> SEQ ID NO 153
<211> LENGTH: 27
<212> TYPE: DNA
<213> ORGANISM: Artificial Sequence
<220> FEATURE:
<223> OTHER INFORMATION: Primer EC_Stx2_F3_1

<400> SEQUENCE: 153
tcaggcagat acagagagaa tttcgtc 27

<210> SEQ ID NO 154
<211> LENGTH: 40
<212> TYPE: DNA
<213> ORGANISM: Artificial Sequence
<220> FEATURE:
<223> OTHER INFORMATION: Primer EC_Stx2_FIP_1

<400> SEQUENCE: 154
gagtgaggtc cacgtctcgg cactgtctga aactgctcct 40

<210> SEQ ID NO 155
<211> LENGTH: 22
<212> TYPE: DNA
<213> ORGANISM: Artificial Sequence
<220> FEATURE:
<223> OTHER INFORMATION: Primer EC_Stx2_LF_1

<400> SEQUENCE: 155
ccggcgtcat cgtatacaca gg 22

<210> SEQ ID NO 156
<211> LENGTH: 38
<212> TYPE: DNA
<213> ORGANISM: Artificial Sequence
<220> FEATURE:
<223> OTHER INFORMATION: Primer EC_Stx2_BIP_1

<400> SEQUENCE: 156
gcgaatcagc aatgtgcttc cccactctga caccatcc 38

<210> SEQ ID NO 157
<211> LENGTH: 19
<212> TYPE: DNA
<213> ORGANISM: Artificial Sequence
<220> FEATURE:
<223> OTHER INFORMATION: Primer EC_Stx2_LB_1

<400> SEQUENCE: 157
ccggagtatc ggggagagg 19

<210> SEQ ID NO 158
<211> LENGTH: 29
<212> TYPE: DNA
<213> ORGANISM: Artificial Sequence
<220> FEATURE:
<223> OTHER INFORMATION: Primer EC_Stx2_B3_1

<400> SEQUENCE: 158
atcgctgata tattattaaa ggatattct 29

<210> SEQ ID NO 159
<211> LENGTH: 19
<212> TYPE: DNA
<213> ORGANISM: Artificial Sequence
<220> FEATURE:
<223> OTHER INFORMATION: Primer EC_Stx2_F3_2

<400> SEQUENCE: 159
catccagagc agttctgcg 19

<210> SEQ ID NO 160
<211> LENGTH: 41
<212> TYPE: DNA
<213> ORGANISM: Artificial Sequence
<220> FEATURE:
<223> OTHER INFORMATION: Primer EC_Stx2_FIP_2

<400> SEQUENCE: 160
cagtgcctga cgaaattctg tcactgtcac agcagaagcc t 41

<210> SEQ ID NO 161
<211> LENGTH: 25
<212> TYPE: DNA
<213> ORGANISM: Artificial Sequence
<220> FEATURE:
<223> OTHER INFORMATION: Primer EC_Stx2_LF_2

<400> SEQUENCE: 161
ctctgtatct gcctgaagcg taagg 25

<210> SEQ ID NO 162
<211> LENGTH: 39
<212> TYPE: DNA
<213> ORGANISM: Artificial Sequence
<220> FEATURE:
<223> OTHER INFORMATION: Primer EC_Stx2_BIP_2

<400> SEQUENCE: 162
actgctcctg tgtatacgcc ccagttcaga gtgaggtcc 39

<210> SEQ ID NO 163
<211> LENGTH: 19
<212> TYPE: DNA
<213> ORGANISM: Artificial Sequence
<220> FEATURE:
<223> OTHER INFORMATION: Primer EC_Stx2_LB_2

<400> SEQUENCE: 163
atgacgccgg gagacgtgg 19

<210> SEQ ID NO 164
<211> LENGTH: 17
<212> TYPE: DNA
<213> ORGANISM: Artificial Sequence
<220> FEATURE:
<223> OTHER INFORMATION: Primer EC_Stx2_B3_2

<400> SEQUENCE: 164
ccccactctg acaccat 17

<210> SEQ ID NO 165
<211> LENGTH: 25
<212> TYPE: DNA
<213> ORGANISM: Artificial Sequence
<220> FEATURE:
<223> OTHER INFORMATION: Primer Listeria_F3_1

<400> SEQUENCE: 165
atgtagaact gacaaatatc atcaa 25

<210> SEQ ID NO 166
<211> LENGTH: 26
<212> TYPE: DNA
<213> ORGANISM: Artificial Sequence
<220> FEATURE:
<223> OTHER INFORMATION: Primer Listeria_B3_3

<400> SEQUENCE: 166
gttgtttcaa tatattctga gttgtt 26

<210> SEQ ID NO 167
<211> LENGTH: 28
<212> TYPE: DNA
<213> ORGANISM: Artificial Sequence
<220> FEATURE:
<223> OTHER INFORMATION: Primer Listeria_LF_1

<400> SEQUENCE: 167
cgaggttacc gtcgatgatt tgaacttc 28

<210> SEQ ID NO 168
<211> LENGTH: 43
<212> TYPE: DNA
<213> ORGANISM: Artificial Sequence
<220> FEATURE:
<223> OTHER INFORMATION: Primer Listeria_FIP_1

<400> SEQUENCE: 168
tcaaaatatc tcgtaagtct cggtggctcc gcaaaagatg aag 43

<210> SEQ ID NO 169
<211> LENGTH: 41
<212> TYPE: DNA
<213> ORGANISM: Artificial Sequence
<220> FEATURE:
<223> OTHER INFORMATION: Primer Listeria_FIP_2

<400> SEQUENCE: 169
ttcaaaatat ctcgtaagtc ttggctccgc aaaagatgaa g 41

<210> SEQ ID NO 170
<211> LENGTH: 50
<212> TYPE: DNA
<213> ORGANISM: Artificial Sequence
<220> FEATURE:
<223> OTHER INFORMATION: Primer Listeria_BIP_1

<400> SEQUENCE: 170
ggtgctactt ttaaccggca ttgtctttta agaagtttgt tgtataggca 50

<210> SEQ ID NO 171
<211> LENGTH: 48
<212> TYPE: DNA
<213> ORGANISM: Artificial Sequence
<220> FEATURE:
<223> OTHER INFORMATION: Primer Listeria_BIP_2

<400> SEQUENCE: 171
aggtgctact tttaaccgtg tcttttaaga agtttgttgt ataggcaa 48

<210> SEQ ID NO 172
<211> LENGTH: 23
<212> TYPE: DNA
<213> ORGANISM: Artificial Sequence
<220> FEATURE:
<223> OTHER INFORMATION: Primer Listeria_LB_1

<400> SEQUENCE: 172
gaaacaccag gagttcccat tgc 23

<210> SEQ ID NO 173
<211> LENGTH: 24
<212> TYPE: DNA
<213> ORGANISM: Artificial Sequence
<220> FEATURE:
<223> OTHER INFORMATION: Primer Listeria_LB_2

<400> SEQUENCE: 173
ggaaacacca ggagttccca ttgc 24

<210> SEQ ID NO 174
<211> LENGTH: 20
<212> TYPE: DNA
<213> ORGANISM: Artificial Sequence
<220> FEATURE:
<223> OTHER INFORMATION: Primer TB Set 1 F3

<400> SEQUENCE: 174
ggtcggaagc tcctatgaca 20

<210> SEQ ID NO 175
<211> LENGTH: 18
<212> TYPE: DNA
<213> ORGANISM: Artificial Sequence
<220> FEATURE:
<223> OTHER INFORMATION: Primer TB Set 1 B3

<400> SEQUENCE: 175
taggcagcct cgagttcg 18

<210> SEQ ID NO 176
<211> LENGTH: 38
<212> TYPE: DNA
<213> ORGANISM: Artificial Sequence
<220> FEATURE:
<223> OTHER INFORMATION: Primer TB Set 1 FIP

<400> SEQUENCE: 176
agggcttgcc gggtttgatc atgcactagc cgagacga 38

<210> SEQ ID NO 177
<211> LENGTH: 40
<212> TYPE: DNA
<213> ORGANISM: Artificial Sequence
<220> FEATURE:
<223> OTHER INFORMATION: Primer TB Set 1 BIP

<400> SEQUENCE: 177
cggtccatcg aggatgtcga gtcgccgcag tactggtaga 40

<210> SEQ ID NO 178
<211> LENGTH: 22
<212> TYPE: DNA
<213> ORGANISM: Artificial Sequence
<220> FEATURE:
<223> OTHER INFORMATION: Primer TB Set 1 LF

<400> SEQUENCE: 178
tcggtcttgt ataggccgtt ga 22

<210> SEQ ID NO 179
<211> LENGTH: 20
<212> TYPE: DNA
<213> ORGANISM: Artificial Sequence
<220> FEATURE:
<223> OTHER INFORMATION: Primer TB Set 1 LB

<400> SEQUENCE: 179
gctgggtcga ctggttcaac 20

<210> SEQ ID NO 180
<211> LENGTH: 20
<212> TYPE: DNA
<213> ORGANISM: Artificial Sequence
<220> FEATURE:
<223> OTHER INFORMATION: Primer TB Set 2 F3

<400> SEQUENCE: 180
cgagacgatc aacggcctat 20

<210> SEQ ID NO 181
<211> LENGTH: 20
<212> TYPE: DNA
<213> ORGANISM: Artificial Sequence
<220> FEATURE:
<223> OTHER INFORMATION: Primer TB Set 2 B3

<400> SEQUENCE: 181
tccggagact ctctgatctg 20

<210> SEQ ID NO 182
<211> LENGTH: 42
<212> TYPE: DNA
<213> ORGANISM: Artificial Sequence
<220> FEATURE:
<223> OTHER INFORMATION: Primer TB Set 2 FIP

<400> SEQUENCE: 182
tggttgaacc agtcgaccca gcagctgatc aaacccggca ag 42

<210> SEQ ID NO 183
<211> LENGTH: 41
<212> TYPE: DNA
<213> ORGANISM: Artificial Sequence
<220> FEATURE:
<223> OTHER INFORMATION: Primer TB Set 2 BIP

<400> SEQUENCE: 183
tctaccagta ctgcggcgac gttctctggc gttgagcgta g 41

<210> SEQ ID NO 184
<211> LENGTH: 19
<212> TYPE: DNA
<213> ORGANISM: Artificial Sequence
<220> FEATURE:
<223> OTHER INFORMATION: Primer TB Set 2 LF

<400> SEQUENCE: 184
gacatcctcg atggaccgc 19

<210> SEQ ID NO 185

<211> LENGTH: 21
<212> TYPE: DNA
<213> ORGANISM: Artificial Sequence
<220> FEATURE:
<223> OTHER INFORMATION: Primer TB Set 2 LB

<400> SEQUENCE: 185
ggtcgaactc gaggctgcct a 21

<210> SEQ ID NO 186
<211> LENGTH: 20
<212> TYPE: DNA
<213> ORGANISM: Artificial Sequence
<220> FEATURE:
<223> OTHER INFORMATION: Primer TB Set 3 F3

<400> SEQUENCE: 186
tcacctatgt gtcgacctgg 20

<210> SEQ ID NO 187
<211> LENGTH: 20
<212> TYPE: DNA
<213> ORGANISM: Artificial Sequence
<220> FEATURE:
<223> OTHER INFORMATION: Primer TB Set 3 B3

<400> SEQUENCE: 187
ccggatcgat gtgtactgag 20

<210> SEQ ID NO 188
<211> LENGTH: 39
<212> TYPE: DNA
<213> ORGANISM: Artificial Sequence
<220> FEATURE:
<223> OTHER INFORMATION: Primer TB Set 3 FIP

<400> SEQUENCE: 188
tggaggtggc catcgtggaa cctacgtggc ctttgtcac 39

<210> SEQ ID NO 189
<211> LENGTH: 39
<212> TYPE: DNA
<213> ORGANISM: Artificial Sequence
<220> FEATURE:
<223> OTHER INFORMATION: Primer TB Set 3 BIP

<400> SEQUENCE: 189
ccatctggac ccgccaacaa cccctatccg tatggtgga 39

<210> SEQ ID NO 190
<211> LENGTH: 20
<212> TYPE: DNA
<213> ORGANISM: Artificial Sequence
<220> FEATURE:
<223> OTHER INFORMATION: Primer TB Set 3 LF

<400> SEQUENCE: 190
aggatcctgc gacgtaggcg 20

<210> SEQ ID NO 191
<211> LENGTH: 24
<212> TYPE: DNA
<213> ORGANISM: Artificial Sequence
<220> FEATURE:
<223> OTHER INFORMATION: Primer TB Set 3 LB

<400> SEQUENCE: 191
gaaggcgtac tcgacctgaa agac 24

<210> SEQ ID NO 192
<211> LENGTH: 19
<212> TYPE: DNA
<213> ORGANISM: Artificial Sequence
<220> FEATURE:
<223> OTHER INFORMATION: Primer Sal_F3_2

<400> SEQUENCE: 192
tattggcggt atttcggtg 19

<210> SEQ ID NO 193
<211> LENGTH: 39
<212> TYPE: DNA
<213> ORGANISM: Artificial Sequence
<220> FEATURE:
<223> OTHER INFORMATION: Primer Sal_FIP_2

<400> SEQUENCE: 193
tcagcatggt ataagtaggg atgactcgcc atggtatgg 39

<210> SEQ ID NO 194
<211> LENGTH: 20
<212> TYPE: DNA
<213> ORGANISM: Artificial Sequence
<220> FEATURE:
<223> OTHER INFORMATION: Primer Sal_LF_3

<400> SEQUENCE: 194
acagggcgga ggacaaatcc 20

<210> SEQ ID NO 195
<211> LENGTH: 36
<212> TYPE: DNA
<213> ORGANISM: Artificial Sequence
<220> FEATURE:
<223> OTHER INFORMATION: Primer Sal_BIP_2

<400> SEQUENCE: 195
tggtgatggt cttgtcgcaa accggcacta atcgca 36

<210> SEQ ID NO 196
<211> LENGTH: 18
<212> TYPE: DNA
<213> ORGANISM: Artificial Sequence
<220> FEATURE:
<223> OTHER INFORMATION: Primer Sal_F3_1

<400> SEQUENCE: 196
tattggcggt atttcggt 18

<210> SEQ ID NO 197
<211> LENGTH: 36
<212> TYPE: DNA
<213> ORGANISM: Artificial Sequence
<220> FEATURE:
<223> OTHER INFORMATION: Primer Sal_FIP_1

<400> SEQUENCE: 197
cagcatggta taagtagagg gatgactcgc catggt 36

<210> SEQ ID NO 198
<211> LENGTH: 22
<212> TYPE: DNA

<213> ORGANISM: Artificial Sequence
<220> FEATURE:
<223> OTHER INFORMATION: Primer Sal_LF_1

<400> SEQUENCE: 198
gggcggagga caaatccata cc 22

<210> SEQ ID NO 199
<211> LENGTH: 21
<212> TYPE: DNA
<213> ORGANISM: Artificial Sequence
<220> FEATURE:
<223> OTHER INFORMATION: Primer Sal_LF_2

<400> SEQUENCE: 199
ggcggaggac aaatccatac c 21

<210> SEQ ID NO 200
<211> LENGTH: 37
<212> TYPE: DNA
<213> ORGANISM: Artificial Sequence
<220> FEATURE:
<223> OTHER INFORMATION: Primer Sal_BIP_1

<400> SEQUENCE: 200
ttggtgatgg tcttgtcgca aaccggcact aatcgca 37

<210> SEQ ID NO 201
<211> LENGTH: 24
<212> TYPE: DNA
<213> ORGANISM: Artificial Sequence
<220> FEATURE:
<223> OTHER INFORMATION: Primer Sal_LB_1

<400> SEQUENCE: 201
ccagatcccc gcattgttga ttgc 24

<210> SEQ ID NO 202
<211> LENGTH: 23
<212> TYPE: DNA
<213> ORGANISM: Artificial Sequence
<220> FEATURE:
<223> OTHER INFORMATION: Primer Sal_LB_2

<400> SEQUENCE: 202
cagatccccg cattgttgat tgc 23

<210> SEQ ID NO 203
<211> LENGTH: 19
<212> TYPE: DNA
<213> ORGANISM: Artificial Sequence
<220> FEATURE:
<223> OTHER INFORMATION: Primer Sal_B3_1

<400> SEQUENCE: 203
catttacgcg ggtcacgat 19

-continued

```
<210> SEQ ID NO 204
<211> LENGTH: 20
<212> TYPE: DNA
<213> ORGANISM: Artificial Sequence
<220> FEATURE:
<223> OTHER INFORMATION: Primer Sal_B3_2

<400> SEQUENCE: 204

ccatttacgc gggtcacgat                                              20
```